United States Patent
Lee et al.

(10) Patent No.: US 11,736,923 B2
(45) Date of Patent: Aug. 22, 2023

(54) BROADCAST RECEIVING DEVICE AND OPERATING METHOD THEREOF

(71) Applicant: LG ELECTRONICS INC., Seoul (KR)

(72) Inventors: Jinwon Lee, Seoul (KR); Sejin Oh, Seoul (KR); Kyoungsoo Moon, Seoul (KR); Seungjoo An, Seoul (KR); Woosuk Ko, Seoul (KR); Sungryong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 17/143,005

(22) Filed: Jan. 6, 2021

(65) Prior Publication Data

US 2021/0160678 A1    May 27, 2021

Related U.S. Application Data

(60) Continuation of application No. 16/846,125, filed on Apr. 10, 2020, now Pat. No. 10,917,777, which is a
(Continued)

(51) Int. Cl.
*H04W 4/90* (2018.01)
*H04W 4/80* (2018.01)
(Continued)

(52) U.S. Cl.
CPC .............. *H04W 4/90* (2018.02); *H04H 20/08* (2013.01); *H04H 20/59* (2013.01); *H04L 67/10* (2013.01);
(Continued)

(58) Field of Classification Search
CPC ........... H04W 4/90; H04W 4/80; H04W 4/06; H04W 88/04; H04L 67/55; H04L 67/10; H04H 20/08; H04H 20/59; H04H 2201/37
See application file for complete search history.

(56) References Cited

U.S. PATENT DOCUMENTS

| 7,873,344 B2 | 1/2011 | Bowser et al. |
| 7,904,921 B2 | 3/2011 | Yun et al. |

(Continued)

FOREIGN PATENT DOCUMENTS

| CN | 101188726 A | 5/2008 |
| CN | 102308577 A | 1/2012 |

(Continued)

OTHER PUBLICATIONS

"IPTV Standard Integrated Broadcast-Broadband System Specification IPTVFJ STD-0010 Version 2.0," Created on Mar. 22, 2013 (Version 1.0), Revised on Jun. 29, 2014 (Version 2.0), XP055288949

*Primary Examiner* — Melvin C Marcelo
(74) *Attorney, Agent, or Firm* — Bryan Cave Leighton Paisner LLP

(57) ABSTRACT

Provided is a broadcast receiving device receiving a broadcast service interoperating with a companion device. The broadcast receiving device includes: an IP communication unit configured to establish a pairing session with the companion device; a broadcast communication unit configured to receive an emergency alert message including an emergency alert alerting a disaster situation on the basis of the broadcast service; and a control unit configured to transmit information on the emergency alert message to the companion device.

4 Claims, 129 Drawing Sheets

Related U.S. Application Data continuation of application No. 16/392,346, filed on Apr. 23, 2019, now Pat. No. 10,659,945, which is a division of application No. 14/588,539, filed on Jan. 2, 2015, now Pat. No. 10,433,142.

(60) Provisional application No. 61/930,932, filed on Jan. 23, 2014, provisional application No. 61/923,209, filed on Jan. 2, 2014.

(51) Int. Cl.

| | | |
|---|---|---|
| H04H 20/08 | (2008.01) | |
| H04H 20/59 | (2008.01) | |
| H04L 29/08 | (2006.01) | |
| H04W 4/06 | (2009.01) | |
| H04L 67/10 | (2022.01) | |
| H04L 67/55 | (2022.01) | |
| H04W 88/04 | (2009.01) | |

(52) U.S. Cl.
CPC .............. *H04L 67/55* (2022.05); *H04W 4/06* (2013.01); *H04W 4/80* (2018.02); *H04H 2201/37* (2013.01); *H04W 88/04* (2013.01)

(56) References Cited

U.S. PATENT DOCUMENTS

| | | |
|---|---|---|
| 8,078,233 B1 | 12/2011 | Sennett et al. |
| 8,726,328 B2 | 5/2014 | Kim et al. |
| 2002/0066111 A1 | 5/2002 | Rodriguez |
| 2002/0122137 A1 | 9/2002 | Chen et al. |
| 2005/0030977 A1 | 2/2005 | Casey et al. |
| 2006/0184962 A1 | 8/2006 | Kendall et al. |
| 2007/0086465 A1 | 4/2007 | Paila et al. |
| 2009/0034591 A1 | 2/2009 | Julian et al. |
| 2010/0124898 A1 | 5/2010 | Qu et al. |
| 2012/0028615 A1 | 2/2012 | Sundaramurthy et al. |
| 2013/0227606 A1 | 8/2013 | Inagaki et al. |
| 2014/0059594 A1 | 2/2014 | Stein |
| 2014/0335823 A1 | 11/2014 | Heredia et al. |
| 2015/0288554 A1* | 10/2015 | Baek .................... H04L 1/0057 375/340 |
| 2016/0211931 A1 | 7/2016 | Takahashi et al. |

FOREIGN PATENT DOCUMENTS

| | | |
|---|---|---|
| CN | 103283219 A | 9/2013 |
| CN | 103416080 A | 11/2013 |
| EP | 0952734 A2 | 10/1999 |
| JP | 2003037690 A | 2/2003 |
| JP | 2007208340 A | 8/2007 |
| JP | 2007525057 A | 8/2007 |
| JP | 2010004344 A | 1/2010 |
| JP | 2010171896 A | 8/2010 |
| JP | 2013005053 A | 1/2013 |
| JP | 2013196570 A | 9/2013 |
| JP | 2013211816 A | 10/2013 |
| KR | 100980241 B1 | 9/2010 |
| WO | 2006063118 A2 | 6/2006 |
| WO | 2010059735 A2 | 5/2010 |

* cited by examiner

FIG. 12

| Content | Bits |
|---|---|
| PHY_PROFILE | 3 |
| FFT_SIZE | 2 |
| GI_FRACTION | 3 |
| EAC_FLAG | 1 |
| PILOT_MODE | 1 |
| PAPR_FLAG | 1 |
| FRU_CONFIGURE | 3 |
| RESERVED | 7 |

FIG. 13

| Content | Bits |
|---|---|
| PREAMBLE_DATA | 20 |
| NUM_FRAME_FRU | 2 |
| PAYLOAD_TYPE | 3 |
| NUM_FSS | 2 |
| SYSTEM_VERSION | 8 |
| CELL_ID | 16 |
| NETWORK_ID | 16 |
| SYSTEM_ID | 16 |
| for i = 0:3<br>    FRU_PHY_PROFILE<br>    FRU_FRAME_LENGTH<br>    FRU_GI_FRACTION<br>    RESERVED<br>end | <br>3<br>2<br>3<br>4 |
| PLS2_FEC_TYPE | 2 |
| PLS2_MOD | 3 |
| PLS2_SIZE_CELL | 15 |
| PLS2_STAT_SIZE_BIT | 14 |
| PLS2_SYN_SIZE_BIT | 14 |
| PLS2_REP_FLAG | 1 |
| PLS2_REP_SIZE_CELL | 15 |
| PLS2_NEXT_FEC_TYPE | 2 |
| PLS2_NEXT_MODE | 3 |
| PLS2_NEXT_REP_FLAG | 1 |
| PLS2_NEXT_REP_SIZE_CELL | 15 |
| PLS2_NEXT_REP_STAT_SIZE_BIT | 14 |
| PLS2_NEXT_REP_DYN_SIZE_BIT | 14 |
| PLS2_AP_MODE | 2 |
| PLS2_AP_SIZE_CELL | 15 |
| PLS2_NEXT_AP_MODE | 2 |
| PLS2_NEXT_AP_SIZE_CELL | 15 |
| RESERVED | 32 |
| CRC 32 | 32 |

FIG. 14

| Content | Bits |
|---|---|
| FIC_FLAG | 1 |
| AUX_FLAG | 1 |
| NUM_DP | 6 |
| for i = 1: NUM_DP | |
|     DP_ID | 6 |
|     DP_TYPE | 3 |
|     DP_GROUP_ID | 8 |
|     BASE_DP_ID | 6 |
|     DP_FEC_TYPE | 2 |
|     DP_COD | 4 |
|     DP_MOD | 4 |
|     DP_SSD_FLAG | 1 |
|     if PHY_PROFILE = '010' | |
|         DP_MIMO | 3 |
|     end | |
|     DP_TI_TYPE | 1 |
|     DP_TI_LENGTH | 2 |
|     DP_TI_BYPASS | 1 |
|     DP_FRAME_INTERVAL | 2 |
|     DP_FIRST_FRAME_IDX | 5 |
|     DP_NUM_BLOCK_MAX | 10 |
|     DP_PAYLOAD_TYPE | 2 |
|     DP_INBAND_MODE | 2 |
|     DP_PROTOCOL_TYPE | 2 |
|     DP_CRC_MODE | 2 |
|     if DP_PAYLOAD_TYPE == TS('00') | |
|         DNP_MODE | 2 |
|         ISSY_MODE | 2 |
|         HC_MODE_TS | 2 |
|         if HC_MODE_TS == '01' or '10' | |
|             PID | 13 |
|         end | |
|     if DP_PAYLOAD_TYPE == IP('01') | |
|         HC_MODE_IP | 2 |
|     end | |
|     RESERVED | 8 |
| end | |
| if FIC_FLAG == 1 | |
|     FIC_VERSION | 8 |
|     FIC_LENGTH_BYTE | 13 |
|     RESERVED | 8 |
| end | |
| if AUX_FLAG == 1 | |
|     NUM_AUX | 4 |
|     AUX_CONFIG_RFU | 8 |
|     for - 1 : NUM_AUX | |
|         AUX_STREAM_TYPE | 4 |
|         AUX_PRIVATE_CONF | 28 |
|     end | |
| end | |

FIG. 15

| Content | | Bit |
|---|---|---|
| FRAME_INDEX | | 5 |
| PLS_CHANGE_COUNTER | | 4 |
| FIC_CHANGE_COUNTER | | 4 |
| RESERVED | | 16 |
| for i = 1: NUM_DP | | |
| | DP_ID | 6 |
| | DP_START | 15 (or13) |
| | DP_NUM_BLOCK | 10 |
| end | RESERVED | 8 |
| EAC_FLAG | | 1 |
| EAS_WAKE_UP_VERSION_NUM | | 8 |
| if EAC_FLAG = 1 | | |
| | EAC_LENGTH_BYTE | 12 |
| else | | |
| | EAC_COUNTER | 12 |
| end | | |
| for i=1:NUM_AUX | | |
| | AUX_PRIVATE_DYN | 48 |
| end | | |
| CRC 32 | | 32 |

FIG. 31

| XML Element/Attribute | Cardinality | Data Type | Description |
|---|---|---|---|
| ServiceInfo | | | |
| @ServiceId | 1 | unsignedShort | Unique identifier for Service |
| @ServiceName | 0..N | string | Human readable name of the service |
| @MajorChanNum | 0..1 | integer 0..15 | Major "channel number" of the service, for service selection |
| @MinorChanNum | 0..1 | integer 0..15 | Minor "channel number" of the service, for service selection |
| @Description | 0..N | string | Textual description of the service |
| @Genre | 0..N | string | Genre(s) of the service |
| @Icon | 0..N | Base64Binary | Icon used to represent the service |
| @Language | 0..1 | string | Primary language used in the service |
| @UsageReportInfo | 0..N | string | Parameters to be used for service usage reporting (e.g., URL, reporting interval, etc.) |
| @Targeting | 0..N | string | Targeting properties for the service |
| @ServiceProtection | 0..1 | string | Service protection properties for the service |
| @AdvisoryRating | 0..N | string | Content advisory rating(s) for the service |
| ComponentItem | 1..N | | Component information of the service |
|   @ComponentId | 1 | unsignedShort | Unique identifier for component of Service |
|   @ComponentType | 1 | string | Component type |
|   @ComponentName | 0..N | string | Human readable name of the component of Service |
|   @StartTime | 0..1 | unsignedShort | Start time of the component |
|   @Duration | 0..1 | unsignedShort | Duration of the component |
|   @TargetScreen | 0..N | string | Targeting window of component (e.g. Secondary screen) |
|   @URL | 0..N | any URI | URL of component in the Content Server |
|   @ContentAdvisory | 0..N | string | Content advisory rating(s) for the component |
|   @Genre | 0..N | string | Genre(s) of the component |

FIG. 33

| Variable Name | Req/Opt | Data Type | Evented? |
|---|---|---|---|
| Service Property | Required | string | Yes |

FIG. 35

```
<?xml Version="1.0"?>
<propertyset>
  <property>
    <ServiceId>a000001</ServiceId>
  </property>
  <property>
    <ServiceName>MBC Music</ServiceId>
  </property>
  <property>
    <ContentId>mbcradio002</ServiceId>
  </property>
  <property>
    <ContentName>Pop Chart</ServiceId>
  </property>
  <property>
    <MajorChanNum>11</ServiceId>
  </property>
  <property>
    <MinorChanNum>5</ServiceId>
  <property>
....
</propertyset>
```

FIG. 36

| Variable Name | Req/Opt | Data Type | Evented? |
|---|---|---|---|
| Service Property | Required | string | No |
| ServicePropertyName | Required | string | No |
| ServicePropertyChangeFlag | Required | boolean | Yes |

(a)

| Name | Required/Optional |
|---|---|
| GetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

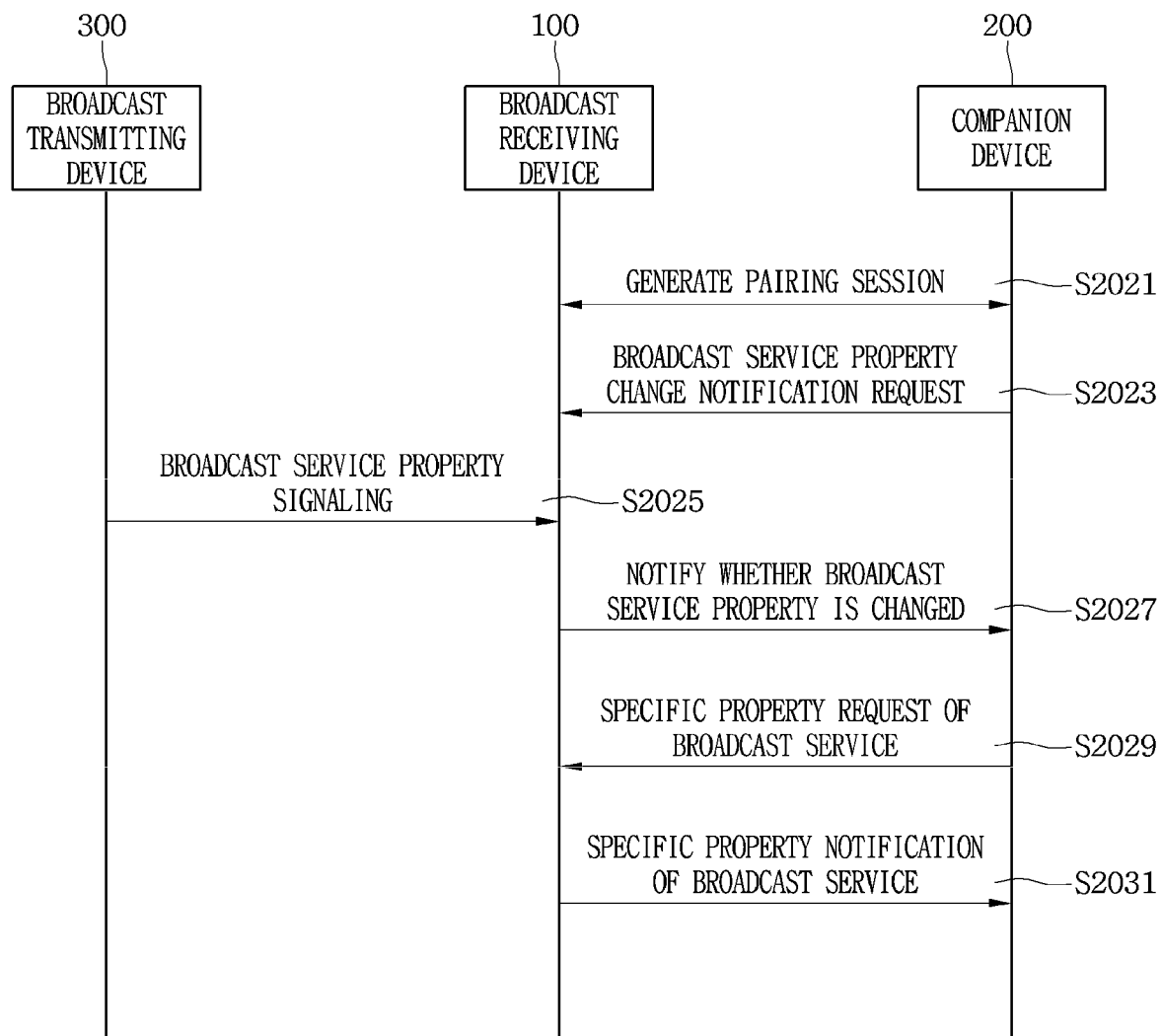

FIG. 38

```
<?xml Version="1.0"?>
<propertyset>
  <property>
    <ServicePropertyChangeFlag>true</ServicePropertyChangeFlag>
  </property>
</propertyset>
```

FIG. 39

| Variable Name | Req/Opt | Data Type | Evented? |
|---|---|---|---|
| Service Property | Required | string | No |
| ServicePropertyName | Required | string | No |
| ServicePropertyChangeFlag | Required | bin.hex | Yes |

FIG. 40

```
<?xml Version="1.0"?>
<propertyset>
  <property>
    <ServicePropertyChangeFlag>90080004</ServicePropertyChangeFlag>
  </property>
</propertyset>
```

FIG. 41

| Variable Name | Req/Opt | Data Type | Evented? |
|---|---|---|---|
| Service Property | Required | string | No |
| ServicePropertyName | Required | string | No |
| ServicePropertyChangeFlag | Required | bin.hex | Yes |
| ServicePropertyURL | Optional | string | No |

FIG. 43

| Variable Name | Req/Opt | Data Type | Evented? |
|---|---|---|---|
| Service Property | Required | string | No |
| ServicePropertyName | Required | string | No |

(a)

| Name | Required/Optional |
|---|---|
| GetServiceProperty | Required |
| SetServiceProperty | Required |

(b)

| Argument | Direction | Related State Variable |
|---|---|---|
| ServicePropertyName | IN | ServicePropertyName |
| ServiceProperty | OUT | ServiceProperty |

(c)

| Argument | Direction | Related State Variable |
|---|---|---|
| ServicePropertyName | IN | ServicePropertyName |

```xml
<?xml version = "1.0" encoding = "UTF-8"?>
<alert xmlns = "http://www.incident.com/cap/1.0">
  <identifier>KSTO1055887203</identifier>
  <sender>KSTO@NWS.NOAA.GOV</sender>
  <sent>2003-06-17T14:57:00-07:00</sent>
  <status>Actual</status>
  <msgType>Alert</msgType>
  <scope>Public</scope>
  <info>
    <category>Met</category>
    <event>SEVERE THUNDERSTORM</event>
    <urgency>Immediate</urgency>
    <severity>Severe</severity>
    <certainty>Likely</certainty>
    <eventCode>same=SVR</eventCode>
    <expires>2003-06-17T16:00:00-07:00</expires>
    <senderName>NATIONAL WEATHER SERVICE SACRAMENTO CA</senderName>
    <headline>SEVERE THUNDERSTORM WARNING</headline>
    <description> AT 254 PM PDT...NATIONAL WEATHER SERVICE DOPPLER RADAR INDICATED A SEVERE THUNDERSTORM OVER SOUTH CENTRAL ALPINE COUNTRY...OR ABOUT 18 MILES SOUTHEAST OF KIRKWOOD...MOVING SOUTHWEST AT 5 MPH. HAIL...INTENSE RAIN AND STRONG DAMAGING WINDS ARE LIKELY WITH THIS STORM.</description>
    <instruction>TAKE COVER IN A SUBSTANTIAL SHELTER UNTIL THE STORM PASSES.</instruction>
    <contact>BARUFFALDI/JUSKIE</contact>
    <area>
      <areaDesc>EXTREME NORTH CENTRAL TUOLUMNE COUNTY IN CALIFORNIA, EXTREME NORTHEASTERN CALAVERAS COUNTY IN CALIFONIA, SOUTHWESTERN ALPINE COUNTY IN CALIFORNIA</areaDesc>
      <polygon>38.47,-120.14 38.34,-119.95 38.52,-119.74 38.62,-119.89 38.47,-120.14</polygon>
      <geocode>fips6=006109</geocode>
      <geocode>fips6=006009</geocode>
      <geocode>fips6=006003</geocode>
    </area>
  </info>
</alert>
```

FIG. 48

| Variable Name | Req/Opt | Data Type | Evented? |
|---|---|---|---|
| EmergencyAlert | Required | string | Yes |
| EmergencyAlertProperty | Required | string | No |

(a)

| Name | Required/Optional |
|---|---|
| GetAllEmergencyAlertMessage | Required |

(b)

| Argument | Direction | Related State Variable |
|---|---|---|
| EmergencyAlertProperty | OUT | EmergencyAlertProperty |

```
<EmergencyAlert>
    <dateTime>20140122T052000</dateTime>
    <messageType>CAP</messageType>
    <version>1.1</version>
</EmergencyAlert>
```

FIG. 51

| Urgency | Severity | Certainty | |
|---|---|---|---|
| Immediate | Extreme | Very likely (>85%) | ⎫ High |
| Expected | Severe | Likely (>50%) | ⎭ |
| Future | Moderate | Possible (<50%) | — Medium |
| Past | Minor | Unlikely (0%) | — Low |
| Unknown | Unknown | Unknown | — Default (Medium) |

FIG. 52

| Urgency |
|---|
| Immediate − 5 |
| Expected − 4 |
| Future − 3 |
| Past − 2 |
| Unknown − 1 |

| Severity |
|---|
| Extreme − 5 |
| Severe − 4 |
| Moderate − 3 |
| Minor − 2 |
| Unknown − 1 |

| Certainty |
|---|
| Very likely (>85%) − 5 |
| Likely (>50%) − 4 |
| Possible (<50%) − 3 |
| Unlikely (0%) − 2 |
| Unknown − 1 |

FIG. 53

| Urgency |
|---|
| Immediate - 9 |
| Expected - 8 |
| Future - 7 |
| Past - 5 |
| Unknown - 0 |

| Severity |
|---|
| Extreme - 5 |
| Severe - 4 |
| Moderate - 3 |
| Minor - 2 |
| Unknown - 0 |

| Certainty |
|---|
| Very likely (>85%) - 6 |
| Likely (>50%) - 5 |
| Possible (<50%) - 4 |
| Unlikely (0%) - 3 |
| Unknown - 0 |

FIG. 54

| Variable Name | Req/Opt | Data Type | Evented? |
|---|---|---|---|
| EmergencyAlert | Required | string | Yes |
| EmergencyAlertProperty | Required | string | No |
| EmergencyAlertField | Required | string | No |

(a)

| Name | Required/Optional |
|---|---|
| GetEmergencyAlertMessage | Required |

(b)

| Argument | Direction | Related State Variable |
|---|---|---|
| EmergencyAlertField | IN | EmergencyAlertField |
| EmergencyAlertProperty | OUT | EmergencyAlertProperty |

(c)

FIG. 67
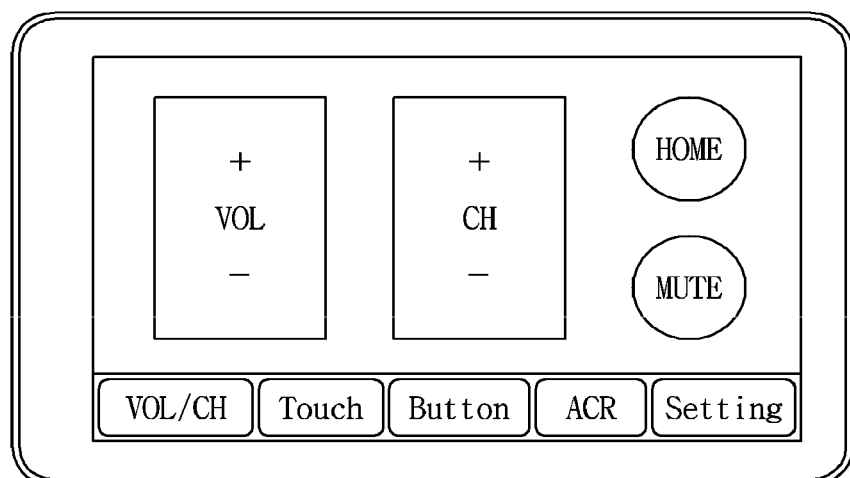
(a)
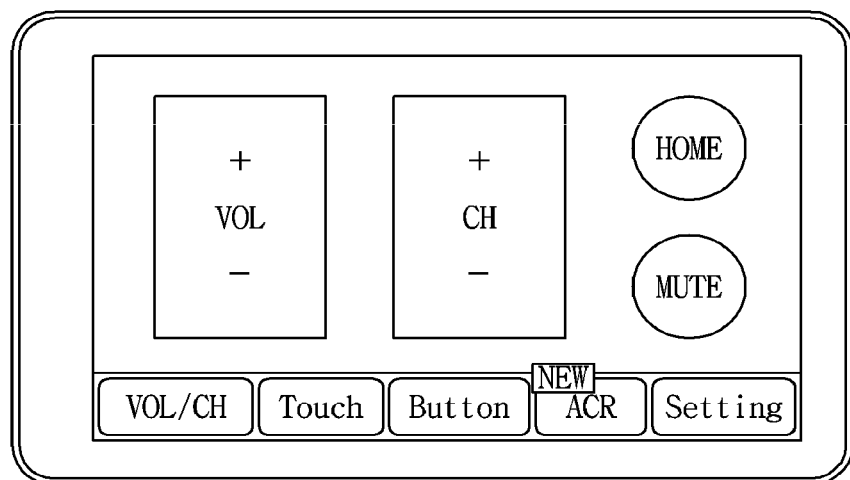
(b)

FIG. 68
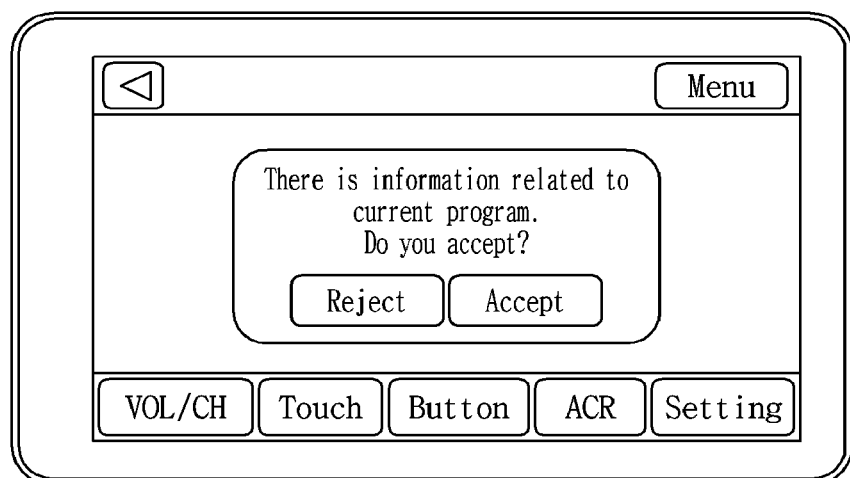
(a)
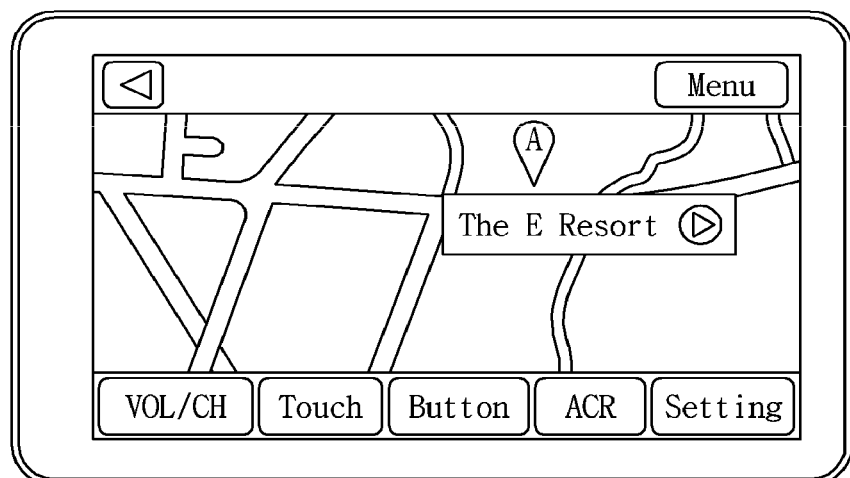
(b)

FIG. 69
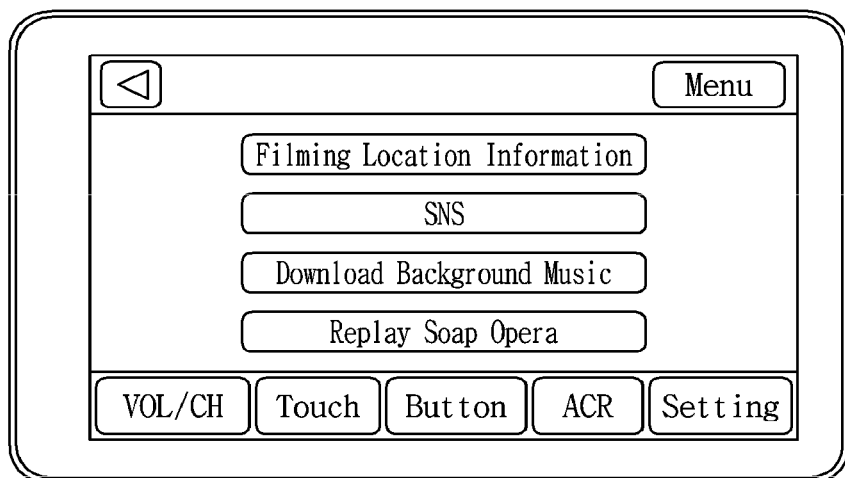
(a)
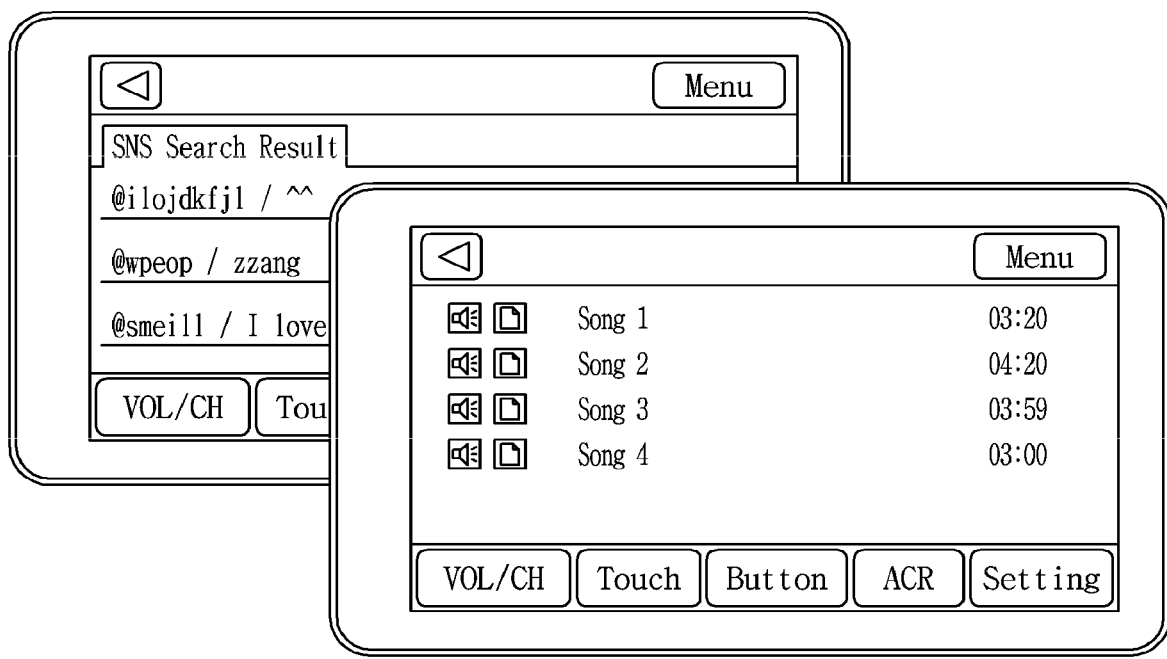
(b)

FIG. 70
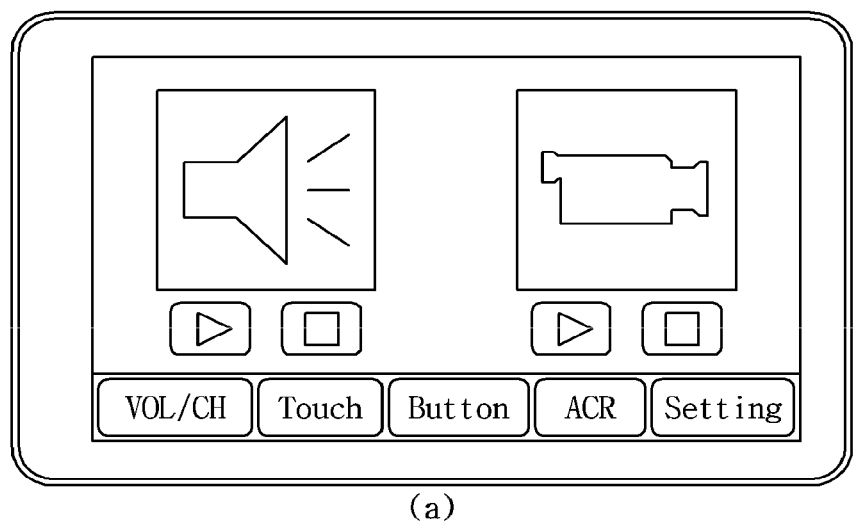
(a)
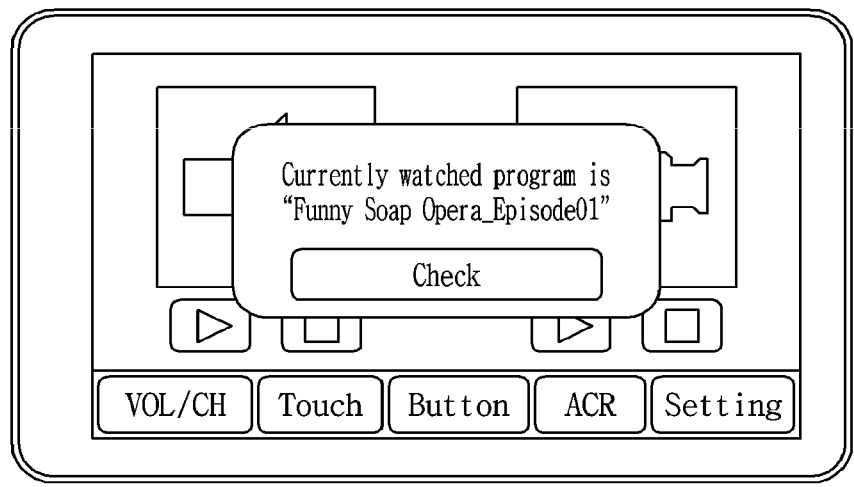
(b)

FIG. 74

```
POST /acr/api/auth HTTP/1.1
Host: target_ip:8080
Content-Type: application/atom+xml <?xml version= "1.0" encoding= "utf-8" ?>
<auth>
<type>AuthKeyRequest</type>
</auth>
```

FIG. 75

```
HTTP/1.1 200 OK
Content-Type: application/atom+xml; charset=utf-8

<?xml version= "1.0" encoding= "utf-8" ?>
<auth>
<result>200</result>
<resultDetail>OK</resultDetail>
</auth>
```

FIG. 76

| result | resultDetail | Description |
|---|---|---|
| 200 | OK | Process completed |
| 400 | Bad Request | Wrong format of request |
| 401 | Unauthorized | Authentication failed, request from unauthenticated session ID |
| 406 | Not Acceptable | Wrong URL |
| 409 | Conflict | Not supportable due to protocol or service version difference |
| 500 | Internal Server Error | Internal error occurs during process in host device |
| 503 | Service Unavailable | Requested command is not available for current service |

FIG. 77

```
POST /acr/api/auth HTTP/1.1
Host: target_ip:8080
Content-Type: application/atom+xml <?xml version= "1.0" encoding= "utf-8" ?>
<auth>
<type>AuthRequest</type>
<key>AABBCC</key>
<userType>Family</userType>
<pwd>abcde</pwd>
</auth>
```

FIG. 78

```
HTTP/1.1 200 OK
Content-Type: application/atom+xml; charset=utf-8

<?xml version= "1.0"  encoding= "utf-8" ?>
<auth>
<result>200</result>
<resultDetail>OK</resultDetail>
<session>12345</session>
</auth>
```

FIG. 82

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>ACRSupportRequest</name>
</acrCommand>
```

FIG. 83

```
HTTP/1.1 200 OK
Content-Type: application/atom+xml; charset=utf-8

<?xml version= "1.0" encoding= "utf-8" ?>
<acrResponse>
<session>12345<session>
<name>ACRSupportRequest</name>
<acrSupport>Support</acrSupport>
</acrResponse>
```

FIG. 84

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>CheckACRStatus</name>
<repeat>Once</repeat>
</acrCommand>
```

FIG. 85

```
HTTP/1.1 200 OK
Content-Type: application/atom+xml; charset=utf-8

<?xml version= "1.0" encoding= "utf-8" ?>
<acrResponse>
<session>12345<session>
<name>CheckACRStatus</name>
<recognition>Found</recognition>
<contentId>American Idol</contentId>
<mediaTime>210</mediaTime>
</acrResponse>
```

FIG. 86

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>RegisterAppNotifyEvent</name>
</acrCommand>
```

FIG. 87

```
HTTP/1.1 200 OK
Content-Type: application/atom+xml; charset=utf-8

<?xml version= "1.0" encoding= "utf-8" ?>
<acrResponse>
<session>12345<session>
<name>RegisterAppNotifyEvent</name>
<app>
   <appId>A123</appId>
   <appName>Chat with superstars</appName>
   <appType>controller</appType>
   <maxController>1</maxController>
   <appType>appTransfer</appType>
</app>
</acrResponse>
```

FIG. 88

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>ACRAppRequest</name>
<type>controller</type>
<deviceCapability>
   <resolution>960x540</resolution>
</deviceCapability>
</acrCommand>
```

FIG. 89

```
HTTP/1.1 200 OK
Content-Type: application/atom+xml; charset=utf-8

<?xml version= "1.0" encoding= "utf-8" ?>
<acrResponse>
<session>12345<session>
<name>ACRAppRequest</name>
<type>controller</type>
<appURL>http://hello.com/chat_mobile</appURL>
<result>OK</result>
</acrResponse>
```

FIG. 90

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>ShowACRApp</name>
<appId>A123</appId>
<show>true</show>
</acrCommand>
```

FIG. 91

```
HTTP/1.1 200 OK
Content-Type: application/atom+xml; charset=utf-8

<?xml version= "1.0" encoding= "utf-8" ?>
<acrResponse>
<session>12345<session>
<name>ShowACRApp</name>
<appId>A123</appId>
<result>OK</result>
</acrResponse>
```

FIG. 92

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>Play</name>
<url>http://hello.com/stream1.mp4</url>
</acrCommand>
```

FIG. 93

```
HTTP/1.1 200 OK
Content-Type: application/atom+xml; charset=utf-8

<?xml version= "1.0"  encoding= "utf-8" ?>
<acrResponse>
<session>12345<session>
<name>Play</name>
<result>OK</result>
</acrResponse>
```

FIG. 94

```
POST /acr/api/cmd HTTP/1.1
Host: target_ip:8080
Content-Type: application/atom+xml <?xml version= "1.0"  encoding= "utf-8" ?>
<acrCommand>
<session>12345<session>
<name>RegisterControllerConflictEvent</name>
<appId>A123</appId>
</acrCommand>
```

FIG. 95

```
HTTP/1.1 200 OK
Content-Type: application/atom+xml; charset=utf-8

<?xml version= "1.0" encoding= "utf-8" ?>
<acrResponse>
<session>12345<session>
<name>ACRAppRequest</name>
<appId>A123</appId>
<result>OK</result>
</acrResponse>
```

FIG. 96

```
POST /acr/api/cmd HTTP/1.1
Host: target_ip:8080
Content-Type: application/atom+xml <?xml version= "1.0"  encoding= "utf-8" ?>
<acrEvent>
<session>12345<session>
<name>ControllerConflictEvent</name>
<appId>A123</appId>
</acrEvent>
```

FIG. 97

```
POST /acr/api/cmd HTTP/1.1
Host: target_ip:8080
Content-Type: application/atom+xml <?xml version= "1.0" encoding= "utf-8" ?>
<acrCommand>
<scssion>12345<scssion>
<name>UnregisterController </name>
<appId>A123</appId>
</acrCommand>
```

FIG. 98

```
HTTP/1.1 200 OK
Content-Type: application/atom+xml; charset=utf-8

<?xml version= "1.0" encoding= "utf-8" ?>
<acrResponse>
<session>12345<session>
<name>UnregisterController </name>
<appId>A123</appId>
<result>OK</result>
</acrResponse>
```

FIG. 99

```
POST /acr/api/cmd HTTP/1.1
Host: target_ip:8080
Content-Type: application/atom+xml <?xml version= "1.0" encoding= "utf-8" ?>
<acrCommand>
<session>12345<session>
<name>UnregisterAppTransfer</name>
<appId>A123</appId>
</acrCommand>
```

FIG. 100

```
HTTP/1.1 200 OK
Content-Type: application/atom+xml; charset=utf-8

<?xml version= "1.0" encoding= "utf-8" ?>
<acrResponse>
<session>12345<session>
<name>UnregisterAppTransfer</name>
<appId>A123</appId>
<result>OK</result>
</acrResponse>
```

FIG. 107
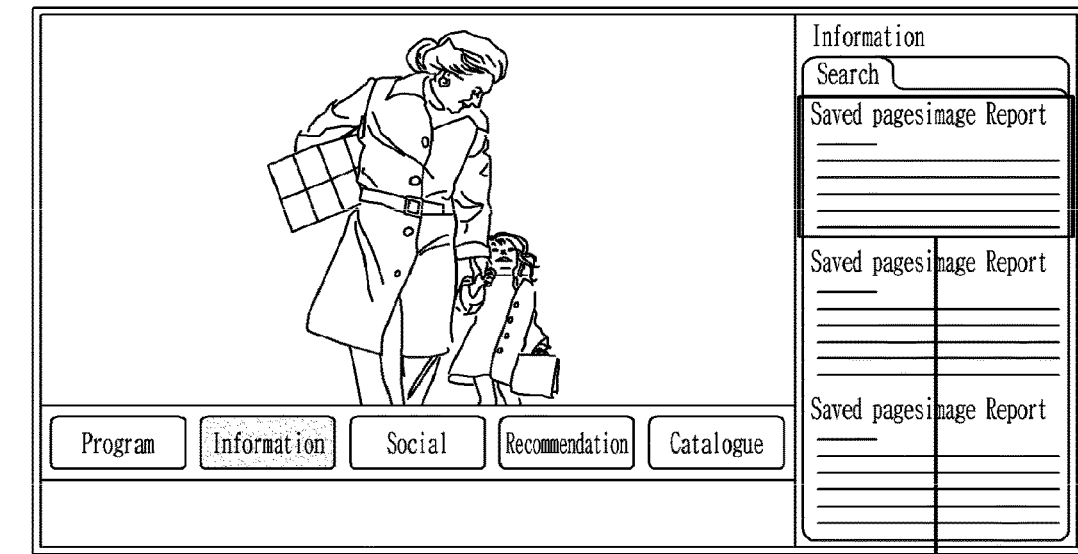
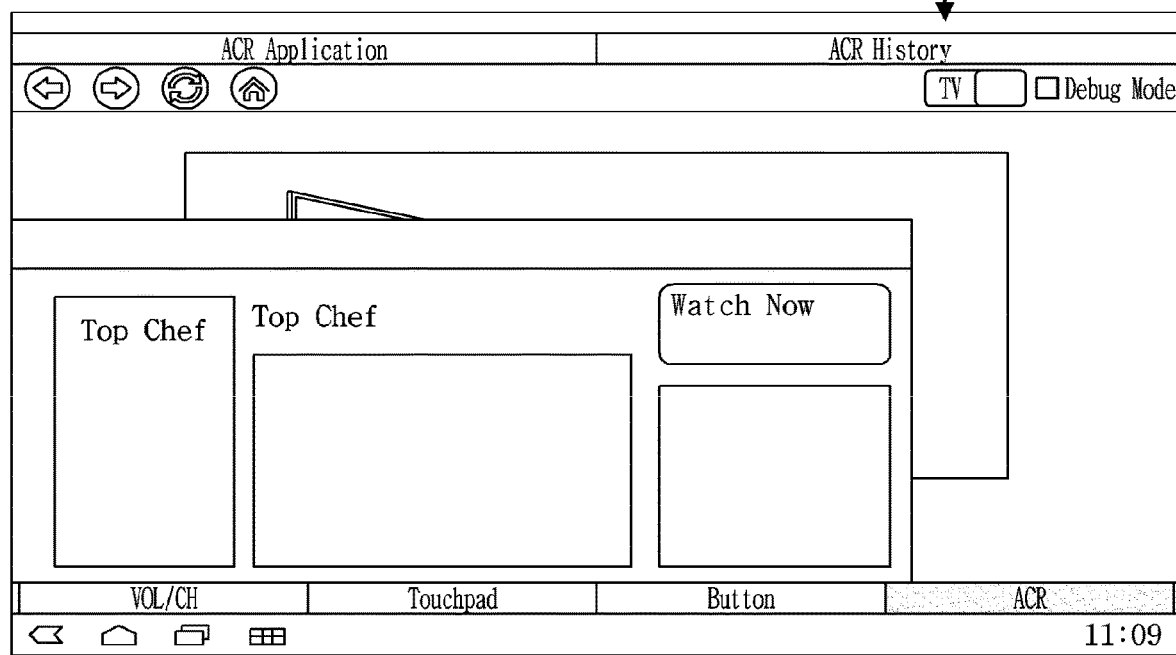

FIG. 109
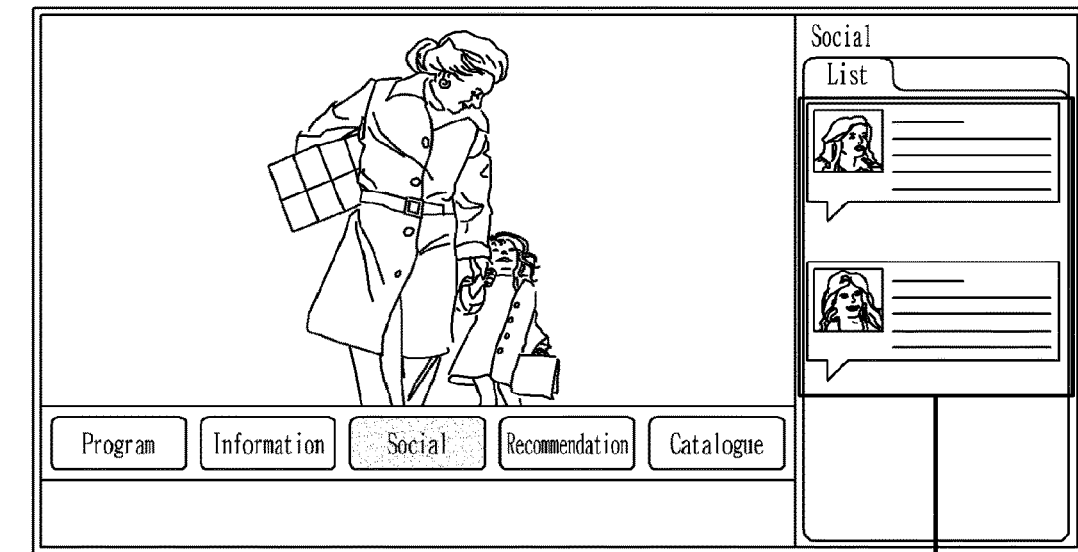
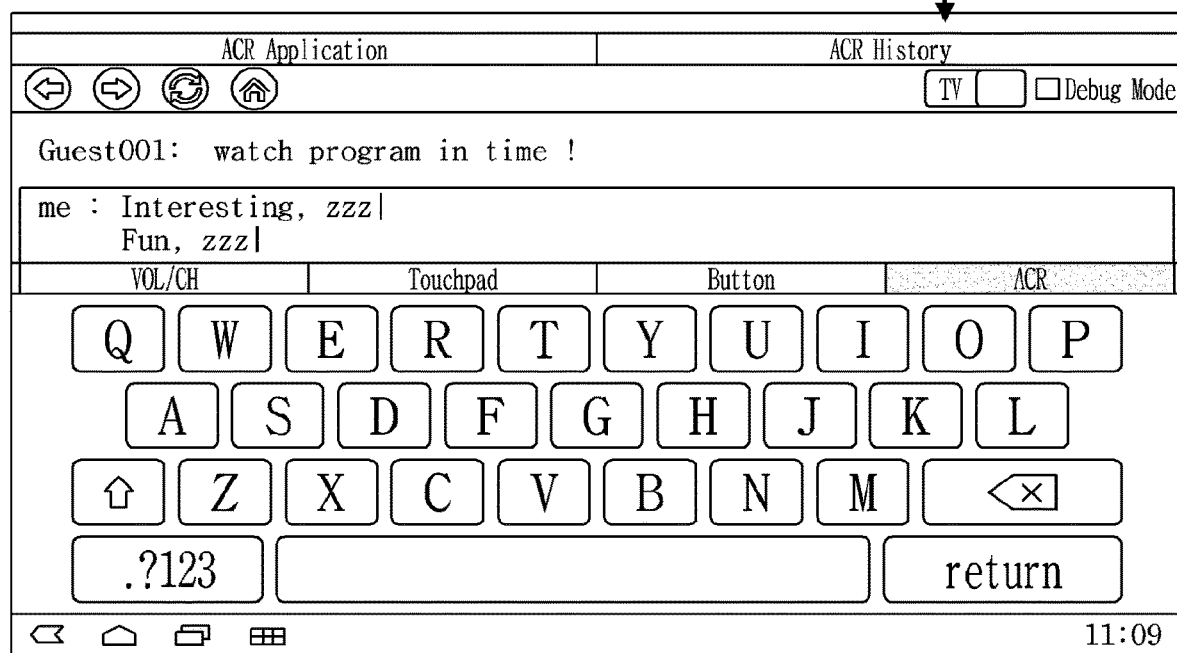

FIG. 110
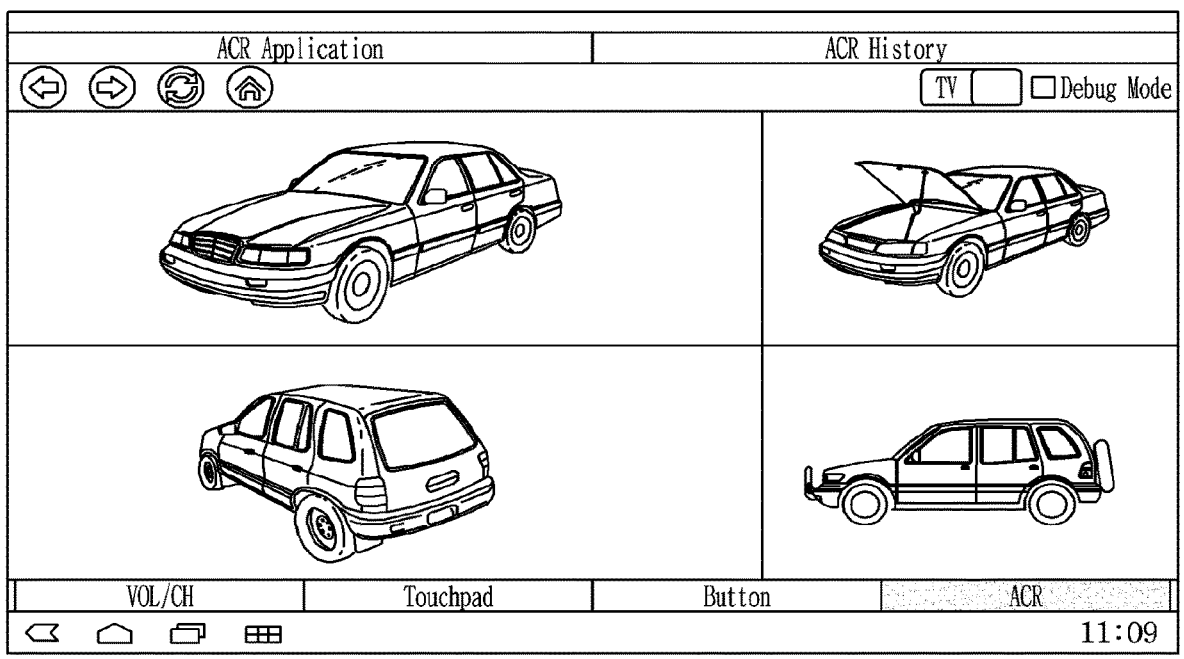
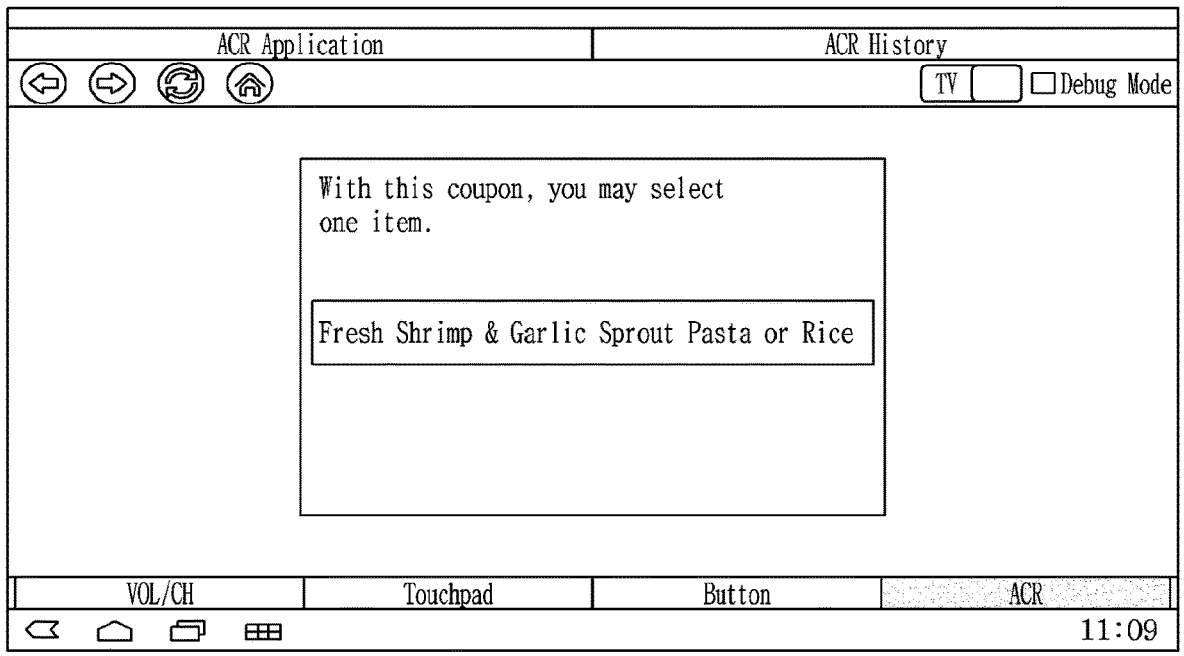

FIG. 112

| ACR Application | | ACR History | | |
|---|---|---|---|---|
| ☐ | ACR Application Histoty | | | 🗑 |
| ☑ Application Title | Content Title  http://appurl.com | | ▷ | 🗑 |
| ☐ Application Title | Content Title  http://appurl.com | | ▷ | 🗑 |
| ☐ Application Title | Content Title  http://appurl.com | | ▷ | 🗑 |

FIG. 118

```
POST /acr/api/cmd HTTP/1.1
Host: target_ip:8080
Content-Type: application/atom+xml <?xml version= "1.0" encoding= "utf-8" ?>
<command>
<session>12345<session>
<name>RegisterAppNotifyEvent</name>
<value>true</true>
</command>
```

FIG. 119

```
POST /acr/api/cmd HTTP/1.1
Host: target_ip:8080
Content-Type: application/atom+xml <?xml version= "1.0" encoding= "utf-8" ?>
<.response>
<session>12345<session>
<name>RegisterAppNotifyEvent</name>
<app>
   <appId>A123</appId>
   <appName>Chat with superstars</appName>
   <appType>controller</appType>
   <maxController>1</maxController>
   <appType>appTransfer</appType>
</app>
</response>
```

FIG. 120

```
POST /acr/api/cmd HTTP/1.1
Host: target_ip:8080
Content-Type: application/atom+xml <?xml version= "1.0" encoding= "utf-8" ?>
<command>
<session>12345<session>
<name>AppRequest</name>
<appId>App001</appId>
<type>controller</type>
<deviceCapability>
   <resolution>960x540</resolution>
</deviceCapability>
</command>
```

FIG. 121

```
HTTP/1.1 200 OK
Content-Type: application/atom+xml; charset=utf-8

<?xml version= "1.0" encoding= "utf-8" ?>
<response>
<session>12345<session>
<name>AppRequest</name>
<appId>App001</appId>
<type>controller</type>
<appURL>http://hello.com/chat_mobile</appURL>
<result>OK</result>
</response>
```

FIG. 122

```
POST /hdcp/api/dtv_wifirc HTTP/1.1
Host: target_ip:8080
Content-Type: application/atom+xml <?xml version= "1.0" encoding= "utf-8" ?>
<command>
<session>session id</session>
<name>RegisterAppOnOffStatusEvent</name>
<value>true</value>
</command>
```

FIG. 123

```
POST /hdcp/api/event HTTP/1.1
Host: target_ip:8080
Content-Type: application/atom+xml <?xml version= "1.0" encoding= "utf-8" ?>
<event>
<session>session id</session>
<name>AppOnOffStatus</name>
<appId>App0001</appId>
<status>off</status>
</event>
```

FIG. 124

URL: http://target_ip:8080/hdcp/api/data?target=GetCommonAppState&session=session_id

FIG. 125

```
<?xml version= "1.0" encoding= "utf-8" ?>
<envelope>
<HDCPError>error code</HDCPError>
<HDCPErrorDetail>message</HDCPErrorDetail>
<session>session id</session>
<data>
<value>state</value>
</data>
<envelope>
```

FIG. 126

URL: http://target_ip:8080/hdcp/api/data?target=GetCommonAppState&session=session_id

FIG. 127

```
<?xml version= "1.0" encoding= "utf-8" ?>
<envelope>
<HDCPError>error code</HDCPError>
<HDCPErrorDetail>message</HDCPErrorDetail>
<session>session id</session>
<data>
<value>state</value>
</data>
<envelope>
```

FIG. 128

```
POST /hdcp/api/dtv_wifirc HTTP/1.1
Host: target_ip:8080
Content-Type: application/atom+xml <?xml version= "1.0" encoding= "utf-8" ?>
<command>
<session>session id</session>
<type>TransferAppTo2ndDevice</type>
<value>app url for 2nd screen</value>
</command>
```

BROADCAST RECEIVING DEVICE AND OPERATING METHOD THEREOF

This application is a Continuation of U.S. patent application Ser. No. 16/846,125 filed on Apr. 10, 2020, which is a Continuation of U.S. patent application Ser. No. 16/392,346 filed on Apr. 23, 2019, now U.S. Pat. No. 10,659,945, which is a Divisional of U.S. patent application Ser. No. 14/588,539 filed on Jan. 2, 2015, now U.S. Pat. No. 10,433,142, which claims the benefit of U.S. Provisional Application No. 61/923,209, filed on Jan. 2, 2014 and U.S. Provisional Application No. 61/930,932, filed on Jan. 23, 2014, all of which are incorporated by reference in their entirety herein.

TECHNICAL FIELD

The present disclosure relates to a broadcast receiving device and an operating method thereof.

BACKGROUND ART

With developments of digital broadcast and communication environments, hybrid broadcasts using communication networks (for example, broadband) in addition to existing broadcast networks receive attentions. Additionally, such hybrid broadcasts provide applications or broadcast services interoperating with terminal devices such as smartphones or tablets. As the uses of terminal devices such as smartphones or tablets increase, it is necessary to provide broadcast services efficiently interoperating with the terminal devices.

Especially, broadcast services efficiently providing the properties of broadcast services or information such as an emergency alarm transmitted through broadcasts to terminal devices such as smartphones or tablets are required.

DISCLOSURE

Technical Problem

Embodiments provide a broadcast receiving device providing broadcast services efficiently interoperating with terminal devices and an operating method thereof.

Embodiments also provide a broadcast receiving device providing broadcast services efficiently transmitting information to terminal devices and an operating method thereof.

Technical Solution

In one embodiment, provided is a broadcast receiving device receiving a broadcast service interoperating with a companion device. The broadcast receiving device includes: an IP communication unit configured to establish a pairing session with the companion device; a broadcast communication unit configured to receive an emergency alert message including an emergency alert alerting a disaster situation on the basis of the broadcast service; and a control unit configured to transmit information on the emergency alert message to the companion device.

The control unit may transmit information on a user interface (UI) for the emergency alert to the companion device.

The information on the UI may include a UI list for the emergency alert.

The control unit may transmit a URL for obtaining information on the emergency alert to the companion device.

The control unit may extract information that the companion device designates among a plurality of information on the emergency alert from the emergency alert message and may transmit the extracted information to the companion device.

The emergency alert message may include at least one of an identifier for identifying the emergency alert, information representing a category of the emergency alert, information representing a description for the emergency alert, information representing a region corresponding to the emergency alert, information representing an urgency of the emergency alert, information representing a severity of a disaster causing the emergency alert, and information representing a certainty of a disaster causing the emergency alert.

The broadcast communication unit may receive information signaling a property of the broadcast service and the control unit may notify whether the property of the broadcast service is changed on the basis of information signaling the property of the broadcast service.

The control unit may notify whether the property of the broadcast service is changed to the companion device on the basis of a property that the companion devices designates among a plurality of properties of the broadcast service.

The control unit may transmit a URL for obtaining the property of the broadcast service to the companion device.

The control unit may extract a property that the companion device designates among a plurality of properties of the broadcast service from the information signaling the property of the broadcast service and may transmit the property that the companion device designates among the plurality of properties of the broadcast service to the companion device.

The property of the broadcast service may include a targeting property representing information of a device providing broadcast service.

In another embodiment, provided is an operating method of a broadcast receiving device receiving a broadcast service interoperating with a companion device. The method includes: establishing a pairing session with the companion device; receiving an emergency alert message including an emergency alert alerting a disaster situation on the basis of the broadcast service; and transmitting information on the emergency alert message to the companion device.

Advantageous Effects

According to an embodiment of the present invention, provided are a broadcast receiving device providing broadcast services efficiently interoperating with terminal devices and an operating method thereof.

According to an embodiment of the present invention, provided are a broadcast receiving device providing broadcast services efficiently transmitting information to terminal devices and an operating method thereof.

DESCRIPTION OF DRAWINGS

FIG. 12 illustrates preamble signaling data according to an embodiment of the present invention.

FIG. 13 illustrates PLS1 data according to an embodiment of the present invention.

FIG. 14 illustrates PLS2 data according to an embodiment of the present invention.

FIG. 15 illustrates PLS2 data according to another embodiment of the present invention.

FIG. 31 is a view illustrating a broadcast system providing a broadcast service interoperating with a companion device according to an embodiment of the present invention.

FIG. 33 is a view illustrating a parameter representing a state of a signaled broadcast service property according to an embodiment of the present invention.

FIG. 35 is a view illustrating a data format of a broadcast service property that a broadcast receiving device signals to a companion device according to an embodiment of the present invention.

FIG. 36 is a view illustrating a parameter representing a state of a broadcast service property that a broadcast receiving device signals to a companion device, an action for broadcast service property, and an argument of an action according to another embodiment of the present invention.

FIG. 37 is a ladder diagram illustrating operations when a broadcast receiving device signals a broadcast service property to a companion device according to another embodiment of the present invention.

FIG. 38 is a view illustrating a data format of whether a broadcast service property is changed that a broadcast receiving device signals to a companion device according to another embodiment of the present invention.

FIG. 39 is a view illustrating parameters representing a state of a broadcast service property that a broadcast receiving device signals to a companion device according to another embodiment of the present invention.

FIG. 40 is a view illustrating a data format of whether a broadcast service property is changed that a broadcast receiving device signals to a companion device according to another embodiment of the present invention.

FIG. 41 is a view illustrating parameters representing a state of a broadcast service property that a broadcast receiving device signals to a companion device according to another embodiment of the present invention.

FIG. 43 is a view illustrating a parameter representing a state of a broadcast service property that a broadcast receiving device signals to a companion device, an action for broadcast service property, and an argument of an action according to another embodiment of the present invention.

FIG. 47 is a view illustrating an emergency alert message format according to an embodiment of the present invention.

FIG. 48 is a view illustrating a parameter representing a state of an emergency alert that a broadcast receiving device signals, an action for emergency alert, and an action argument according to another embodiment of the present invention.

FIG. 49 is a view illustrating information including on an emergency alert signaled by a broadcast receiving device according to an embodiment of the present invention.

FIG. 51 is a view illustrating the criteria of a broadcast receiving device to determine the priority of an emergency alert according to an embodiment of the present invention.

FIG. 52 is a view illustrating the criteria of a broadcast receiving device to determine the priority of an emergency alert according to another embodiment of the present invention.

FIG. 53 is a view illustrating the criteria of a broadcast receiving device to determine the priority of an emergency alert according to another embodiment of the present invention.

FIG. 54 is a view illustrating a parameter representing a state of an emergency alert that a broadcast receiving device signals, an action for emergency alert, and an action argument according to another embodiment of the present invention.

FIG. 67 is a UI example 1 for ACR-based 2nd device content display.

FIG. 68 is a UI example 1 for ACR-based 2nd device content display.

FIG. 69 is a UI example 1 for ACR-based 2nd device content display.

FIG. 70 is a UI example 2 for ACR-based 2nd device content display.

FIG. 74 is an example message of Authentication Number Request.

FIG. 75 is an example message of Result of Authentication Number Generation.

FIG. 76 is an example of result.

FIG. 77 is an example of Authentication Number Request.

FIG. 78 is an example of Result of Authentication Number Generation.

FIG. 82 illustrates controller conflict adjustment flowchart.

FIG. 83 is an example message of response to query on ACR supportability.

FIG. 84 is an example message of asking whether ACR is performed.

FIG. 85 is an example message of response to query on whether ACR is performed.

FIG. 86 is an example message of request ACR App notification.

FIG. 87 is an example message of ACR App notification response.

FIG. 88 is an example message of ACR App request.

FIG. 89 is an example message of ACR App response.

FIG. 90 is an example message of ACR App OSD control request.

FIG. 91 is an example message of ACR App OSD control response.

FIG. 92 is an example message of Media playback control request.

FIG. 93 is an example message of Media playback control response.

FIG. 94 is an example message of controller conflict Event request.

FIG. 95 is an example message of controller conflict Event response.

FIG. 96 is an example message of controller conflict Event.

FIG. 97 is an example message of controller release request.

FIG. 98 is an example message of controller release response.

FIG. 99 is an example message of appTransfer release request.

FIG. 100 is an example message of appTransfer release response.

FIG. 107 is an example of a view search result of TV application in $2^{nd}$ screen.

FIG. 109 is an example of chanting input in $2^{nd}$ device.

FIG. 110 is an example of a user interface downloading coupons and catalogs from 2nd device.

FIG. 112 is an example of a user interface for managing event obtained from TV application in 2nd device.

FIG. 118 illustrates an application notification request message according to one embodiment of the present invention.

FIG. 119 illustrates an application notification response message according to one embodiment of the present invention.

FIG. 120 illustrates an application request message according to one embodiment of the present invention.

FIG. 121 illustrates an application response message according to one embodiment of the present invention.

FIG. 122 illustrates an event notification request message according to one embodiment of the present invention.

FIG. 123 illustrates an event notification response message according to one embodiment of the present invention.

FIG. 124 illustrates a query message according to one embodiment of the present invention.

FIG. 125 illustrates a response message according to one embodiment of the present invention.

FIG. 126 illustrates a query message according to another embodiment of the present invention.

FIG. 127 illustrates a response message according to another embodiment of the present invention.

FIG. 128 illustrates an application execution request message for a 2nd screen device according to another embodiment of the present invention.

FIG. 129 is a ladder diagram illustrating that an application of a 2nd screen device is executed through a host device in accordance with another embodiment of the present invention.

FIG. 130 is a view of a 32K FFT mode random interleaving-sequence generator according to an embodiment of the present invention.

BEST MODE

Figure 1:
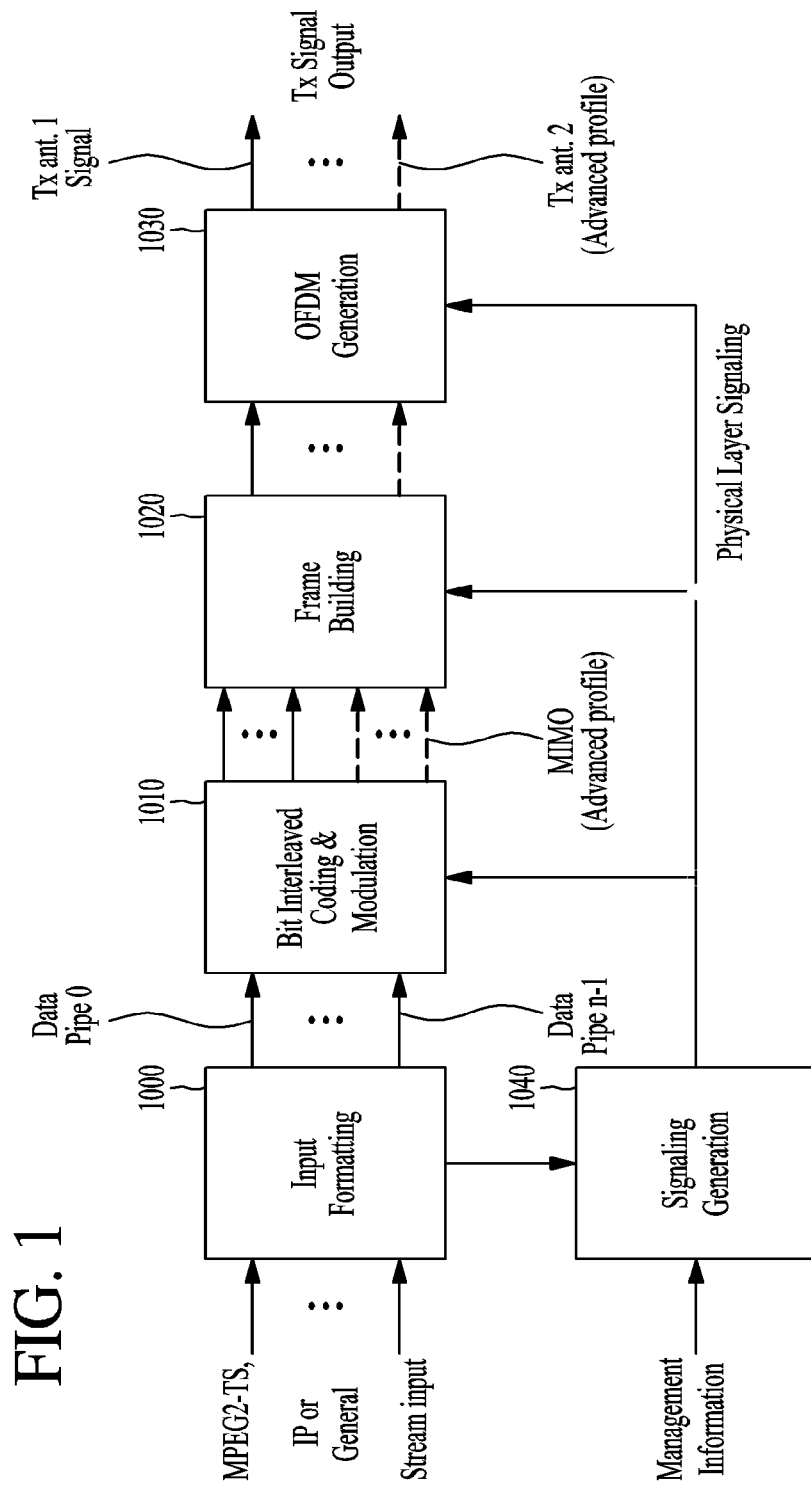
FIG. 1 illustrates a structure of an apparatus for transmitting broadcast signals for future broadcast services according to an embodiment of the present invention.

Hereinafter, embodiments of the present invention will be described in more detail with reference to the accompanying drawings, in order to allow those skilled in the art to easily realize the present invention. The present invention may be realized in different forms, and is not limited to the embodiments described herein. Moreover, detailed descriptions related to well-known functions or configurations will be ruled out in order not to unnecessarily obscure subject matters of the present invention. Like reference numerals refer to like elements throughout.

In additional, when a part "includes" some components, this means that the part does not exclude other components unless stated specifically and further includes other components.

The apparatuses and methods for transmitting according to an embodiment of the present invention may be categorized into a base profile for the terrestrial broadcast service, a handheld profile for the mobile broadcast service and an advanced profile for the UHDTV service. In this case, the base profile can be used as a profile for both the terrestrial broadcast service and the mobile broadcast service. That is, the base profile can be used to define a concept of a profile which includes the mobile profile. This can be changed according to intention of the designer.

The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. While MISO or MIMO uses two antennas in the following for convenience of description, the present invention is applicable to systems using two or more antennas. The present invention may defines three physical layer (PL) profiles (base, handheld and advanced profiles) each optimized to minimize receiver complexity while attaining the performance required for a particular use case. The physical layer (PHY) profiles are subsets of all configurations that a corresponding receiver should implement.

The three PHY profiles share most of the functional blocks but differ slightly in specific blocks and/or parameters. Additional PHY profiles can be defined in the future. For the system evolution, future profiles can also be multiplexed with the existing profiles in a single RF channel through a future extension frame (FEF). The details of each PHY profile are described below.

1. Base Profile

The base profile represents a main use case for fixed receiving devices that are usually connected to a roof-top antenna. The base profile also includes portable devices that could be transported to a place but belong to a relatively stationary reception category. Use of the base profile could be extended to handheld devices or even vehicular by some improved implementations, but those use cases are not expected for the base profile receiver operation.

Target SNR range of reception is from approximately 10 to 20 dB, which includes the 15 dB SNR reception capability of the existing broadcast system (e.g. ATSC A/53). The receiver complexity and power consumption is not as critical as in the battery-operated handheld devices, which will use the handheld profile. Key system parameters for the base profile are listed in below table 1.

TABLE 1

| | |
|---|---|
| LDPC codeword length | 16K, 64K bits |
| Constellation size | 4~10 bpcu (bits per channel use) |
| Time de-interleaving memory size | $\leq 2^{19}$ data cells |
| Pilot patterns | Pilot pattern for fixed reception |
| FFT size | 16K, 32K points |

2. Handheld Profile

The handheld profile is designed for use in handheld and vehicular devices that operate with battery power. The devices can be moving with pedestrian or vehicle speed. The power consumption as well as the receiver complexity is very important for the implementation of the devices of the handheld profile. The target SNR range of the handheld profile is approximately 0 to 10 dB, but can be configured to reach below 0 dB when intended for deeper indoor reception. In addition to low SNR capability, resilience to the Doppler Effect caused by receiver mobility is the most important performance attribute of the handheld profile. Key system parameters for the handheld profile are listed in the below table 2.

TABLE 2

| | |
|---|---|
| LDPC codeword length | 16K bits |
| Constellation size | 2~8 bpcu |
| Time de-interleaving memory size | ≤$2^{18}$ data cells |
| Pilot patterns | Pilot patterns for mobile and indoor reception |
| FFT size | 8K, 16K points |

3. Advanced Profile

The advanced profile provides highest channel capacity at the cost of more implementation complexity. This profile requires using MIMO transmission and reception, and UHDTV service is a target use case for which this profile is specifically designed. The increased capacity can also be used to allow an increased number of services in a given bandwidth, e.g., multiple SDTV or HDTV services.

The target SNR range of the advanced profile is approximately 20 to 30 dB. MIMO transmission may initially use existing elliptically-polarized transmission equipment, with extension to full-power cross-polarized transmission in the future. Key system parameters for the advanced profile are listed in below table 3.

TABLE 3

| | |
|---|---|
| LDPC codeword length | 16K, 64K bits |
| Constellation size | 8~12 bpcu |
| Time de-interleaving memory size | ≤$2^{19}$ data cells |
| Pilot patterns | Pilot pattern for fixed reception |
| FFT size | 16K, 32K points |

In this case, the base profile can be used as a profile for both the terrestrial broadcast service and the mobile broadcast service. That is, the base profile can be used to define a concept of a profile which includes the mobile profile. Also, the advanced profile can be divided advanced profile for a base profile with MIMO and advanced profile for a handheld profile with MIMO. Moreover, the three profiles can be changed according to intention of the designer. The following terms and definitions may apply to the present invention. The following terms and definitions can be changed according to design.

auxiliary stream: sequence of cells carrying data of as yet undefined modulation and coding, which may be used for future extensions or as required by broadcasters or network operators base data pipe: data pipe that carries service signaling data baseband frame (or BBFRAME): set of Kbch bits which form the input to one FEC encoding process (BCH and LDPC encoding)

cell: modulation value that is carried by one carrier of the OFDM transmission coded block: LDPC-encoded block of PLS1 data or one of the LDPC-encoded blocks of PLS2 data data pipe: logical channel in the physical layer that carries service data or related metadata, which may carry one or multiple service(s) or service component(s).

data pipe unit: a basic unit for allocating data cells to a DP in a frame.

data symbol: OFDM symbol in a frame which is not a preamble symbol (the frame signaling symbol and frame edge symbol is included in the data symbol)

DP_ID: this 8 bit field identifies uniquely a DP within the system identified by the SYSTEM_ID dummy cell: cell carrying a pseudorandom value used to fill the remaining capacity not used for PLS signaling, DPs or auxiliary streams emergency alert channel: part of a frame that carries EAS information data frame: physical layer time slot that starts with a preamble and ends with a frame edge symbol frame repetition unit: a set of frames belonging to same or different physical layer profile including a FEF, which is repeated eight times in a super-frame.

fast information channel: a logical channel in a frame that carries the mapping information between a service and the corresponding base DP FECBLOCK: set of LDPC-encoded bits of a DP data FFT size: nominal FFT size used for a particular mode, equal to the active symbol period Ts expressed in cycles of the elementary period T frame signaling symbol: OFDM symbol with higher pilot density used at the start of a frame in certain combinations of FFT size, guard interval and scattered pilot pattern, which carries a part of the PLS data frame edge symbol: OFDM symbol with higher pilot density used at the end of a frame in certain combinations of FFT size, guard interval and scattered pilot pattern frame-group: the set of all the frames having the same PHY profile type in a super-frame.

future extension frame: physical layer time slot within the super-frame that could be used for future extension, which starts with a preamble Futurecast UTB system: proposed physical layer broadcasting system, of which the input is one or more MPEG2-TS or IP or general stream(s) and of which the output is an RF signal input stream: A stream of data for an ensemble of services delivered to the end users by the system.

normal data symbol: data symbol excluding the frame signaling symbol and the frame edge symbol PHY profile: subset of all configurations that a corresponding receiver should implement PLS: physical layer signaling data consisting of PLS1 and PLS2

PLS1: a first set of PLS data carried in the FSS symbols having a fixed size, coding and modulation, which carries basic information about the system as well as the parameters needed to decode the PLS2

NOTE: PLS1 data remains constant for the duration of a frame-group.

PLS2: a second set of PLS data transmitted in the FSS symbol, which carries more detailed PLS data about the system and the DPs PLS2 dynamic data: PLS2 data that may dynamically change frame-by-frame PLS2 static data: PLS2 data that remains static for the duration of a frame-group preamble signaling data: signaling data carried by the preamble symbol and used to identify the basic mode of the system preamble symbol: fixed-length pilot symbol that carries basic PLS data and is located in the beginning of a frame NOTE: The preamble symbol is mainly used for fast initial band scan to detect the system signal, its timing, frequency offset, and FFTsize.

reserved for future use: not defined by the present document but may be defined in future superframe: set of eight frame repetition units time interleaving block (TI block): set of cells within which time interleaving is carried out, corresponding to one use of the time interleaver memory TI group: unit over which dynamic capacity allocation for a particular DP is carried out, made up of an integer, dynamically varying number of XFECBLOCKs.

NOTE: The TI group may be mapped directly to one frame or may be mapped to multiple frames. It may contain one or more TI blocks.

Type 1 DP: DP of a frame where all DPs are mapped into the frame in TDM fashion

Type 2 DP: DP of a frame where all DPs are mapped into the frame in FDM fashion

XFECBLOCK: set of Ncells cells carrying all the bits of one LDPC FECBLOCK

FIG. 1 illustrates a structure of an apparatus for transmitting broadcast signals for future broadcast services according to an embodiment of the present invention.

The apparatus for transmitting broadcast signals for future broadcast services according to an embodiment of the present invention can include an input formatting block 1000, a BICM (Bit interleaved coding & modulation) block 1010, a frame structure block 1020, an OFDM (Orthogonal Frequency Division Multiplexing) generation block 1030 and a signaling generation block 1040. A description will be given of the operation of each module of the apparatus for transmitting broadcast signals.

IP stream/packets and MPEG2-TS are the main input formats, other stream types are handled as General Streams. In addition to these data inputs, Management Information is input to control the scheduling and allocation of the corresponding bandwidth for each input stream. One or multiple TS stream(s), IP stream(s) and/or General Stream(s) inputs are simultaneously allowed.

The input formatting block 1000 can demultiplex each input stream into one or multiple data pipe(s), to each of which an independent coding and modulation is applied. The data pipe (DP) is the basic unit for robustness control, thereby affecting quality-of-service (QoS). One or multiple service(s) or service component(s) can be carried by a single DP. Details of operations of the input formatting block 1000 will be described later.

The data pipe is a logical channel in the physical layer that carries service data or related metadata, which may carry one or multiple service(s) or service component(s).

Also, the data pipe unit: a basic unit for allocating data cells to a DP in a frame.

In the BICM block 1010, parity data is added for error correction and the encoded bit streams are mapped to complex-value constellation symbols. The symbols are interleaved across a specific interleaving depth that is used for the corresponding DP. For the advanced profile, MIMO encoding is performed in the BICM block 1010 and the additional data path is added at the output for MIMO transmission. Details of operations of the BICM block 1010 will be described later.

The Frame Building block 1020 can map the data cells of the input DPs into the OFDM symbols within a frame. After mapping, the frequency interleaving is used for frequency-domain diversity, especially to combat frequency-selective fading channels. Details of operations of the Frame Building block 1020 will be described later.

After inserting a preamble at the beginning of each frame, the OFDM Generation block 1030 can apply conventional OFDM modulation having a cyclic prefix as guard interval. For antenna space diversity, a distributed MISO scheme is applied across the transmitters. In addition, a Peak-to-Average Power Reduction (PAPR) scheme is performed in the time domain. For flexible network planning, this proposal provides a set of various FFT sizes, guard interval lengths and corresponding pilot patterns. Details of operations of the OFDM Generation block 1030 will be described later.

The Signaling Generation block 1040 can create physical layer signaling information used for the operation of each functional block. This signaling information is also transmitted so that the services of interest are properly recovered at the receiver side. Details of operations of the Signaling Generation block 1040 will be described later.

Figure 2:
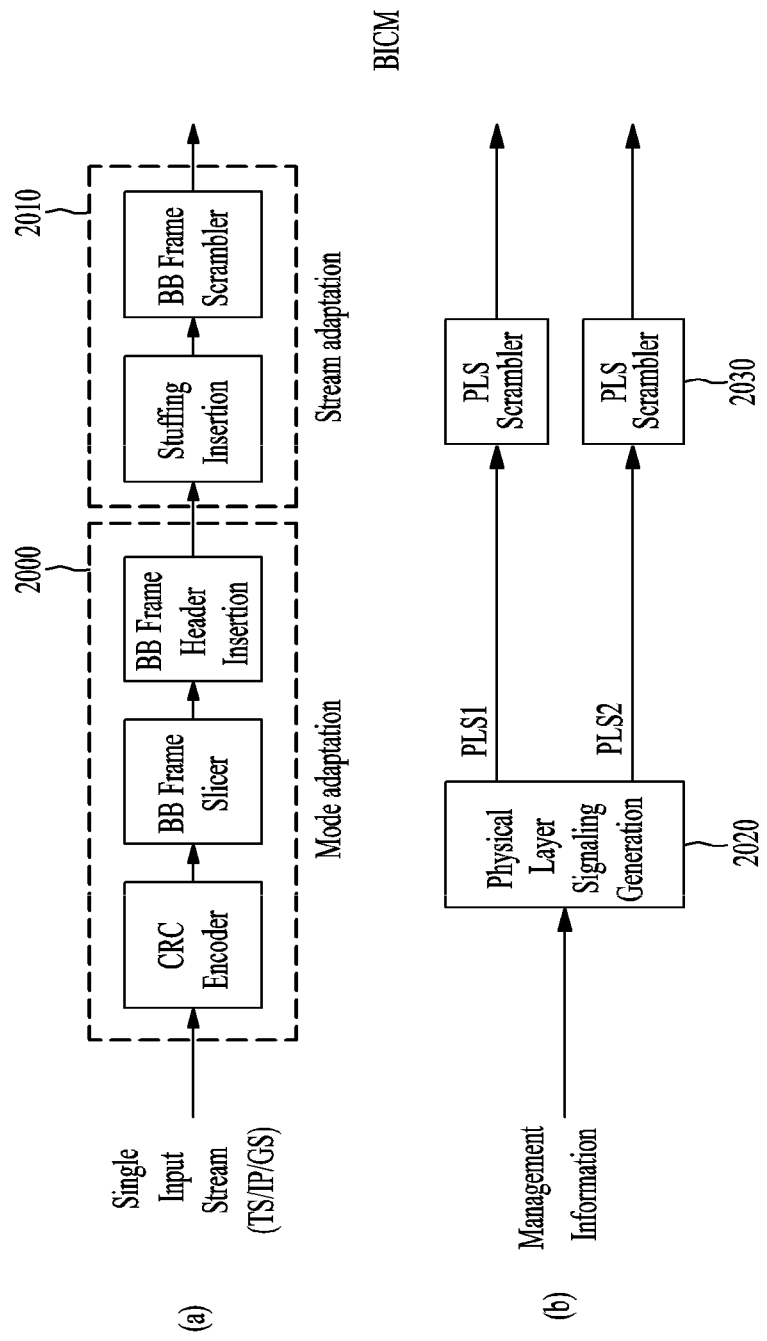
FIG. 2 illustrates an input formatting block according to one embodiment of the present invention.
Figure 3:
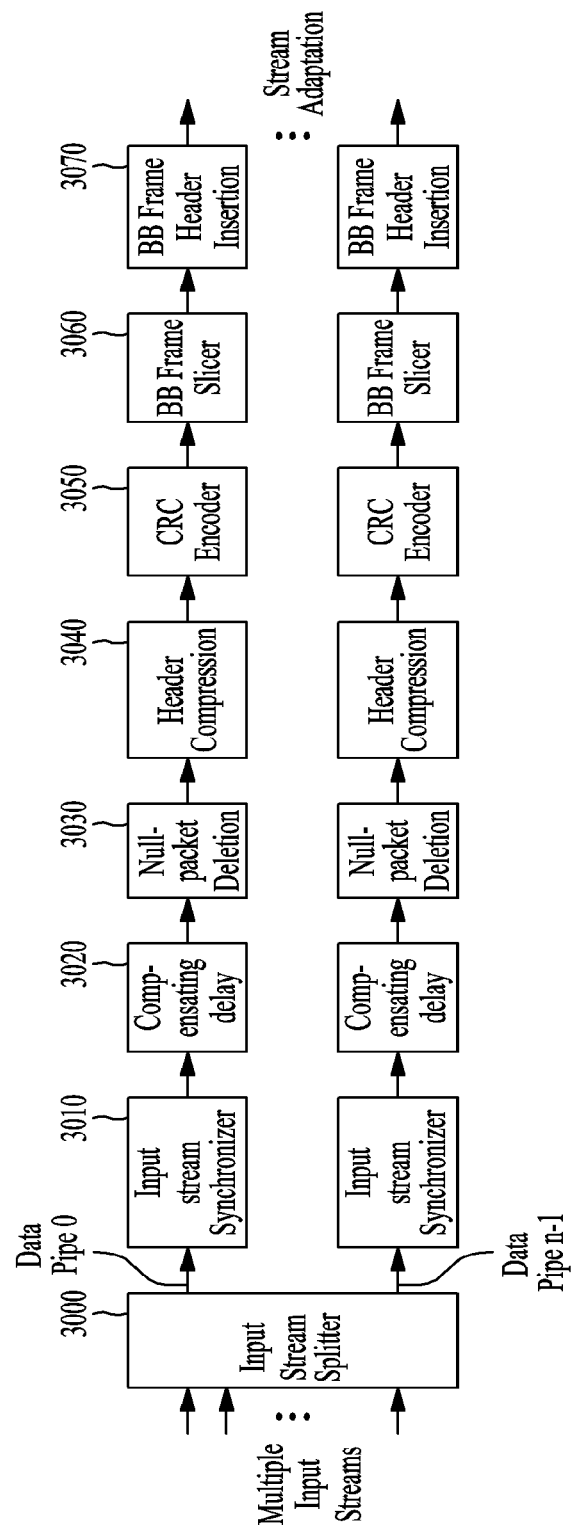
FIG. 3 illustrates an input formatting block according to another embodiment of the present invention.
Figure 4:
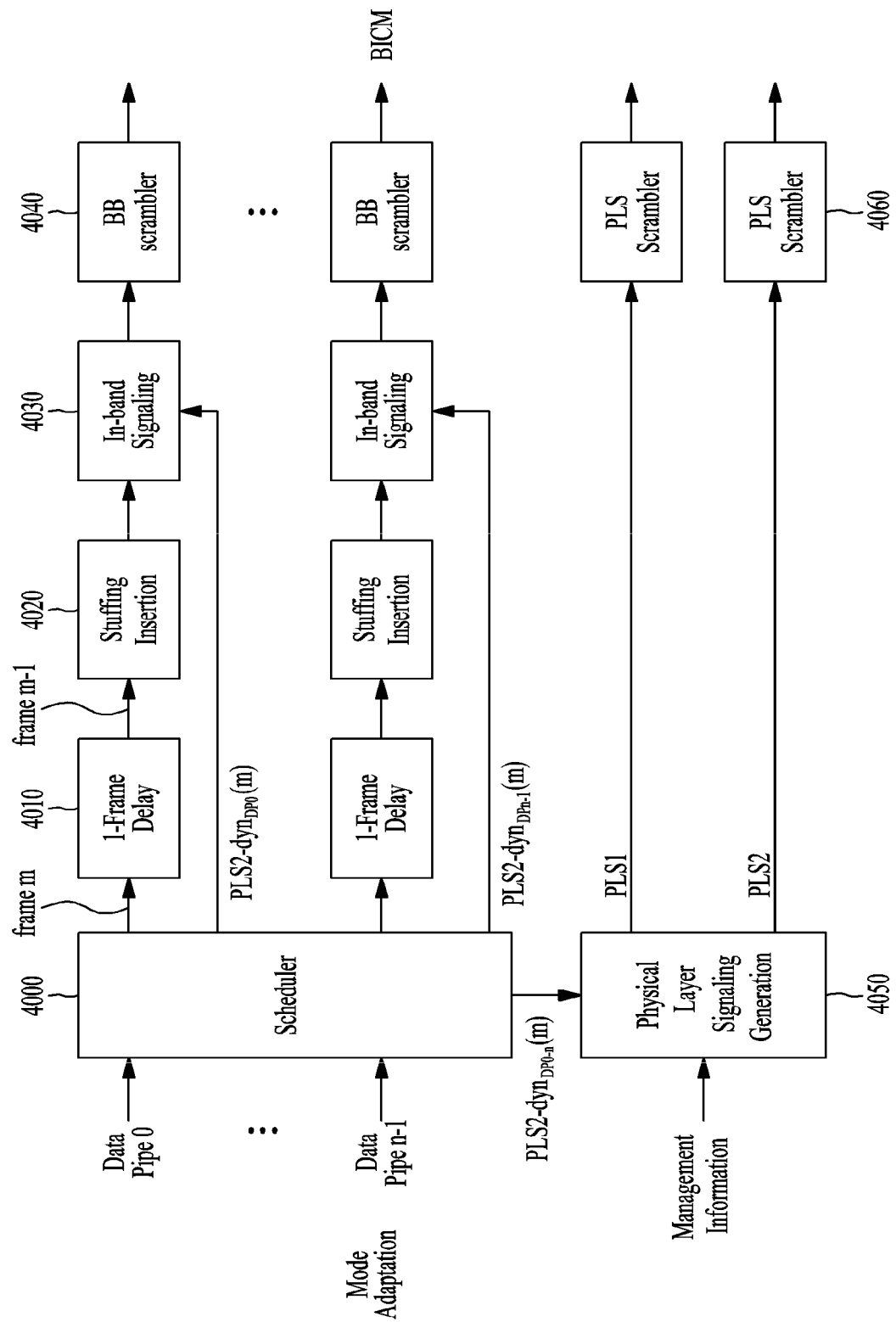
FIG. 4 illustrates an input formatting block according to another embodiment of the present invention.

FIGS. 2, 3 and 4 illustrate the input formatting block 1000 according to embodiments of the present invention. A description will be given of each figure.

FIG. 2 illustrates an input formatting block according to one embodiment of the present invention. FIG. 2 shows an input formatting module when the input signal is a single input stream.

The input formatting block illustrated in FIG. 2 corresponds to an embodiment of the input formatting block 1000 described with reference to FIG. 1.

The input to the physical layer may be composed of one or multiple data streams. Each data stream is carried by one DP. The mode adaptation modules slice the incoming data stream into data fields of the baseband frame (BBF). The system supports three types of input data streams: MPEG2-TS, Internet protocol (IP) and Generic stream (GS). MPEG2-TS is characterized by fixed length (188 byte) packets with the first byte being a sync-byte (0x47). An IP stream is composed of variable length IP datagram packets, as signaled within IP packet headers. The system supports both IPv4 and IPv6 for the IP stream. GS may be composed of variable length packets or constant length packets, signaled within encapsulation packet headers.

(a) shows a mode adaptation block 2000 and a stream adaptation 2010 for signal DP and (b) shows a PLS generation block 2020 and a PLS scrambler 2030 for generating and processing PLS data. A description will be given of the operation of each block.

The Input Stream Splitter splits the input TS, IP, GS streams into multiple service or service component (audio, video, etc.) streams. The mode adaptation module 2010 is comprised of a CRC Encoder, BB (baseband) Frame Slicer, and BB Frame Header Insertion block.

The CRC Encoder provides three kinds of CRC encoding for error detection at the user packet (UP) level, i.e., CRC-8, CRC-16, and CRC-32. The computed CRC bytes are appended after the UP. CRC-8 is used for TS stream and CRC-32 for IP stream. If the GS stream doesn't provide the CRC encoding, the proposed CRC encoding should be applied.

BB Frame Slicer maps the input into an internal logical-bit format. The first received bit is defined to be the MSB. The BB Frame Slicer allocates a number of input bits equal to the available data field capacity. To allocate a number of input bits equal to the BBF payload, the UP packet stream is sliced to fit the data field of BBF.

BB Frame Header Insertion block can insert fixed length BBF header of 2 bytes is inserted in front of the BB Frame. The BBF header is composed of STUFFI (1 bit), SYNCD (13 bits), and RFU (2 bits). In addition to the fixed 2-Byte BBF header, BBF can have an extension field (1 or 3 bytes) at the end of the 2-byte BBF header.

The stream adaptation 2010 is comprised of stuffing insertion block and BB scrambler.

The stuffing insertion block can insert stuffing field into a payload of a BB frame. If the input data to the stream adaptation is sufficient to fill a BB-Frame, STUFFI is set to '0' and the BBF has no stuffing field. Otherwise STUFFI is set to '1' and the stuffing field is inserted immediately after the BBF header. The stuffing field comprises two bytes of the stuffing field header and a variable size of stuffing data.

The BB scrambler scrambles complete BBF for energy dispersal. The scrambling sequence is synchronous with the BBF. The scrambling sequence is generated by the feed-back shift register.

The PLS generation block 2020 can generate physical layer signaling (PLS) data. The PLS provides the receiver with a means to access physical layer DPs. The PLS data consists of PLS1 data and PLS2 data.

The PLS1 data is a first set of PLS data carried in the FSS symbols in the frame having a fixed size, coding and modulation, which carries basic information about the system as well as the parameters needed to decode the PLS2 data. The PLS1 data provides basic transmission parameters including parameters required to enable the reception and decoding of the PLS2 data. Also, the PLS1 data remains constant for the duration of a frame-group.

The PLS2 data is a second set of PLS data transmitted in the FSS symbol, which carries more detailed PLS data about the system and the DPs. The PLS2 contains parameters that provide sufficient information for the receiver to decode the desired DP. The PLS2 signaling further consists of two types of parameters, PLS2 Static data (PLS2-STAT data) and PLS2 dynamic data (PLS2-DYN data). The PLS2 Static data is PLS2 data that remains static for the duration of a frame-group and the PLS2 dynamic data is PLS2 data that may dynamically change frame-by-frame.

Details of the PLS data will be described later.

The PLS scrambler 2030 can scramble the generated PLS data for energy dispersal.

The above-described blocks may be omitted or replaced by blocks having similar or identical functions.

FIG. 3 illustrates an input formatting block according to another embodiment of the present invention.

The input formatting block illustrated in FIG. 3 corresponds to an embodiment of the input formatting block 1000 described with reference to FIG. 1.

FIG. 3 shows a mode adaptation block of the input formatting block when the input signal corresponds to multiple input streams.

The mode adaptation block of the input formatting block for processing the multiple input streams can independently process the multiple input streams.

Referring to FIG. 3, the mode adaptation block for respectively processing the multiple input streams can include an input stream splitter 3000, an input stream synchronizer 3010, a compensating delay block 3020, a null packet deletion block 3030, a head compression block 3040, a CRC encoder 3050, a BB frame slicer 3060 and a BB header insertion block 3070. Description will be given of each block of the mode adaptation block.

Operations of the CRC encoder 3050, BB frame slicer 3060 and BB header insertion block 3070 correspond to those of the CRC encoder, BB frame slicer and BB header insertion block described with reference to FIG. 2 and thus description thereof is omitted.

The input stream splitter 3000 can split the input TS, IP, GS streams into multiple service or service component (audio, video, etc.) streams.

The input stream synchronizer 3010 may be referred as ISSY. The ISSY can provide suitable means to guarantee Constant Bit Rate (CBR) and constant end-to-end transmission delay for any input data format. The ISSY is always used for the case of multiple DPs carrying TS, and optionally used for multiple DPs carrying GS streams.

The compensating delay block 3020 can delay the split TS packet stream following the insertion of ISSY information to allow a TS packet recombining mechanism without requiring additional memory in the receiver.

The null packet deletion block 3030, is used only for the TS input stream case. Some TS input streams or split TS streams may have a large number of null-packets present in order to accommodate VBR (variable bit-rate) services in a CBR TS stream. In this case, in order to avoid unnecessary transmission overhead, null-packets can be identified and not transmitted. In the receiver, removed null-packets can be re-inserted in the exact place where they were originally by reference to a deleted null-packet (DNP) counter that is inserted in the transmission, thus guaranteeing constant bit-rate and avoiding the need for time-stamp (PCR) updating.

The head compression block 3040 can provide packet header compression to increase transmission efficiency for TS or IP input streams. Because the receiver can have a priori information on certain parts of the header, this known information can be deleted in the transmitter.

For Transport Stream, the receiver has a-priori information about the sync-byte configuration (0x47) and the packet length (188 Byte). If the input TS stream carries content that has only one PID, i.e., for only one service component (video, audio, etc.) or service sub-component (SVC base layer, SVC enhancement layer, MVC base view or MVC dependent views), TS packet header compression can be applied (optionally) to the Transport Stream. IP packet header compression is used optionally if the input steam is an IP stream.

The above-described blocks may be omitted or replaced by blocks having similar or identical functions.

FIG. 4 illustrates an input formatting block according to another embodiment of the present invention.

The input formatting block illustrated in FIG. 4 corresponds to an embodiment of the input formatting block 1000 described with reference to FIG. 1.

FIG. 4 illustrates a stream adaptation block of the input formatting module when the input signal corresponds to multiple input streams.

Referring to FIG. 4, the mode adaptation block for respectively processing the multiple input streams can include a scheduler 4000, an 1-Frame delay block 4010, a stuffing insertion block 4020, an in-band signaling 4030, a BB Frame scrambler 4040, a PLS generation block 4050 and a PLS scrambler 4060. Description will be given of each block of the stream adaptation block.

Operations of the stuffing insertion block 4020, the BB Frame scrambler 4040, the PLS generation block 4050 and the PLS scrambler 4060 correspond to those of the stuffing insertion block, BB scrambler, PLS generation block and the PLS scrambler described with reference to FIG. 2 and thus description thereof is omitted.

The scheduler 4000 can determine the overall cell allocation across the entire frame from the amount of FECBLOCKs of each DP. Including the allocation for PLS, EAC and FIC, the scheduler generate the values of PLS2-DYN data, which is transmitted as in-band signaling or PLS cell in FSS of the frame. Details of FECBLOCK, EAC and FIC will be described later.

The 1-Frame delay block 4010 can delay the input data by one transmission frame such that scheduling information about the next frame can be transmitted through the current frame for in-band signaling information to be inserted into the DPs.

The in-band signaling 4030 can insert un-delayed part of the PLS2 data into a DP of a frame.

The above-described blocks may be omitted or replaced by blocks having similar or identical functions.

Figure 5:
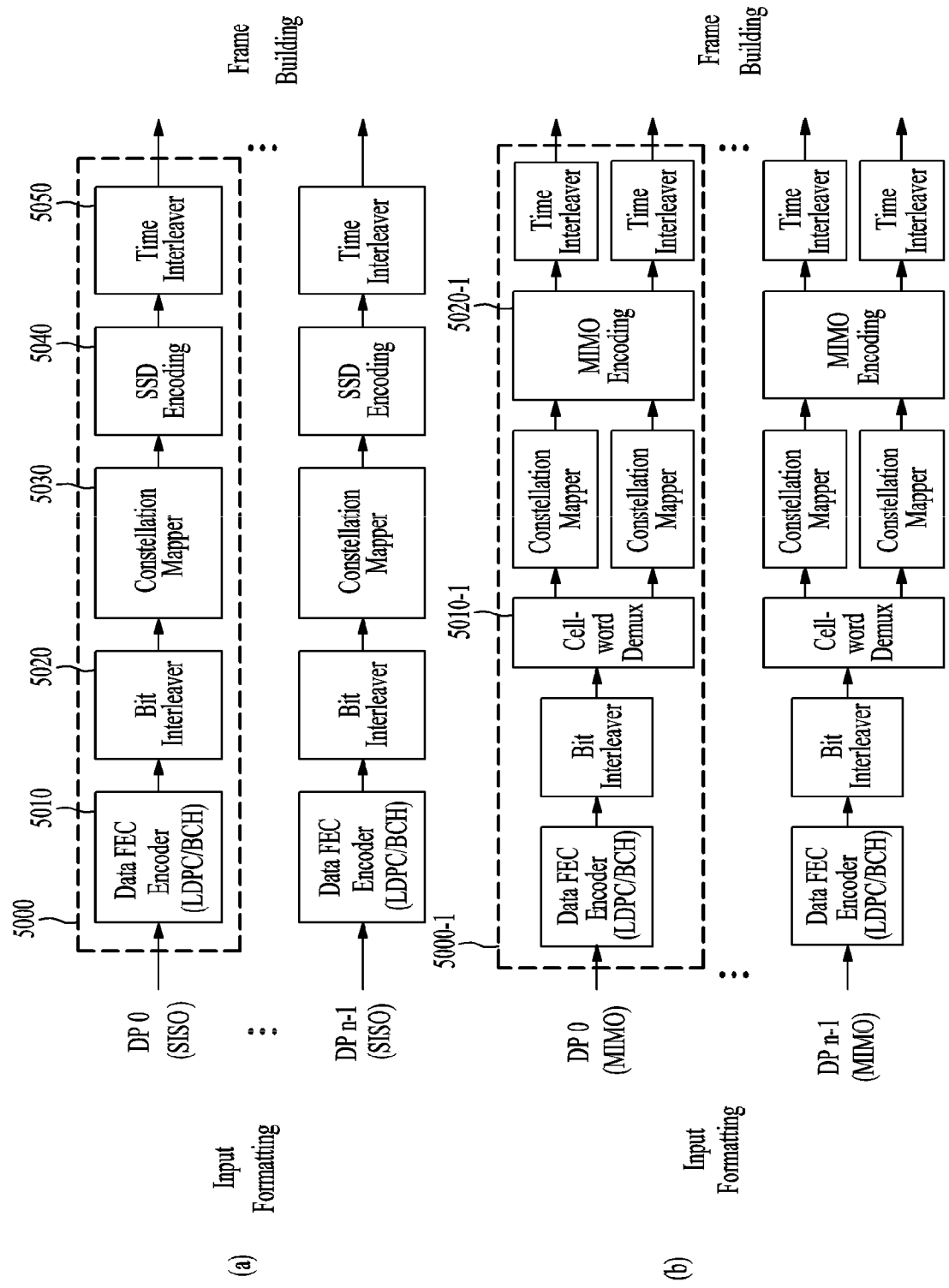
FIG. 5 illustrates a BICM block according to an embodiment of the present invention.

FIG. 5 illustrates a BICM block according to an embodiment of the present invention.

The BICM block illustrated in FIG. 5 corresponds to an embodiment of the BICM block 1010 described with reference to FIG. 1.

As described above, the apparatus for transmitting broadcast signals for future broadcast services according to an embodiment of the present invention can provide a terrestrial broadcast service, mobile broadcast service, UHDTV service, etc.

Since QoS (quality of service) depends on characteristics of a service provided by the apparatus for transmitting broadcast signals for future broadcast services according to an embodiment of the present invention, data corresponding to respective services needs to be processed through different schemes. Accordingly, the a BICM block according to an embodiment of the present invention can independently process DPs input thereto by independently applying SISO, MISO and MIMO schemes to the data pipes respectively corresponding to data paths. Consequently, the apparatus for transmitting broadcast signals for future broadcast services according to an embodiment of the present invention can control QoS for each service or service component transmitted through each DP.

(a) shows the BICM block shared by the base profile and the handheld profile and (b) shows the BICM block of the advanced profile.

The BICM block shared by the base profile and the handheld profile and the BICM block of the advanced profile can include plural processing blocks for processing each DP.

A description will be given of each processing block of the BICM block for the base profile and the handheld profile and the BICM block for the advanced profile.

A processing block 5000 of the BICM block for the base profile and the handheld profile can include a Data FEC encoder 5010, a bit interleaver 5020, a constellation mapper 5030, an SSD (Signal Space Diversity) encoding block 5040 and a time interleaver 5050.

The Data FEC encoder 5010 can perform the FEC encoding on the input BBF to generate FECBLOCK procedure using outer coding (BCH), and inner coding (LDPC). The outer coding (BCH) is optional coding method. Details of operations of the Data FEC encoder 5010 will be described later.

The bit interleaver 5020 can interleave outputs of the Data FEC encoder 5010 to achieve optimized performance with combination of the LDPC codes and modulation scheme while providing an efficiently implementable structure. Details of operations of the bit interleaver 5020 will be described later.

The constellation mapper 5030 can modulate each cell word from the bit interleaver 5020 in the base and the handheld profiles, or cell word from the Cell-word demultiplexer 5010-1 in the advanced profile using either QPSK, QAM-16, non-uniform QAM (NUQ-64, NUQ-256, NUQ-1024) or non-uniform constellation (NUC-16, NUC-64, NUC-256, NUC-1024) to give a power-normalized constellation point, $e_1$. This constellation mapping is applied only for DPs. Observe that QAM-16 and NUQs are square shaped, while NUCs have arbitrary shape. When each constellation is rotated by any multiple of 90 degrees, the rotated constellation exactly overlaps with its original one. This "rotation-sense" symmetric property makes the capacities and the average powers of the real and imaginary components equal to each other. Both NUQs and NUCs are defined specifically for each code rate and the particular one used is signaled by the parameter DP_MOD filed in PLS2 data.

The SSD encoding block 5040 can precode cells in two (2D), three (3D), and four (4D) dimensions to increase the reception robustness under difficult fading conditions.

The time interleaver 5050 can operates at the DP level. The parameters of time interleaving (TI) may be set differently for each DP. Details of operations of the time interleaver 5050 will be described later.

A processing block 5000-1 of the BICM block for the advanced profile can include the Data FEC encoder, bit interleaver, constellation mapper, and time interleaver. However, the processing block 5000-1 is distinguished from the processing block 5000 further includes a cell-word demultiplexer 5010-1 and a MIMO encoding block 5020-1.

Also, the operations of the Data FEC encoder, bit interleaver, constellation mapper, and time interleaver in the processing block 5000-1 correspond to those of the Data FEC encoder 5010, bit interleaver 5020, constellation mapper 5030, and time interleaver 5050 described and thus description thereof is omitted.

The cell-word demultiplexer 5010-1 is used for the DP of the advanced profile to divide the single cell-word stream into dual cell-word streams for MIMO processing. Details of operations of the cell-word demultiplexer 5010-1 will be described later.

The MIMO encoding block 5020-1 can processing the output of the cell-word demultiplexer 5010-1 using MIMO encoding scheme. The MIMO encoding scheme was optimized for broadcasting signal transmission. The MIMO technology is a promising way to get a capacity increase but it depends on channel characteristics. Especially for broadcasting, the strong LOS component of the channel or a difference in the received signal power between two antennas caused by different signal propagation characteristics makes it difficult to get capacity gain from MIMO. The proposed MIMO encoding scheme overcomes this problem using a rotation-based pre-coding and phase randomization of one of the MIMO output signals.

MIMO encoding is intended for a 2×2 MIMO system requiring at least two antennas at both the transmitter and the receiver. Two MIMO encoding modes are defined in this proposal; full-rate spatial multiplexing (FR-SM) and full-rate full-diversity spatial multiplexing (FRFD-SM). The FR-SM encoding provides capacity increase with relatively small complexity increase at the receiver side while the FRFD-SM encoding provides capacity increase and additional diversity gain with a great complexity increase at the receiver side. The proposed MIMO encoding scheme has no restriction on the antenna polarity configuration.

MIMO processing is required for the advanced profile frame, which means all DPs in the advanced profile frame are processed by the MIMO encoder. MIMO processing is applied at DP level. Pairs of the Constellation Mapper outputs NUQ ($e_{1,i}$ and $e_{2,i}$) are fed to the input of the MIMO Encoder. Paired MIMO Encoder output (g1,i and g2,i) is transmitted by the same carrier k and OFDM symbol l of their respective TX antennas.

The above-described blocks may be omitted or replaced by blocks having similar or identical functions.

Figure 6:
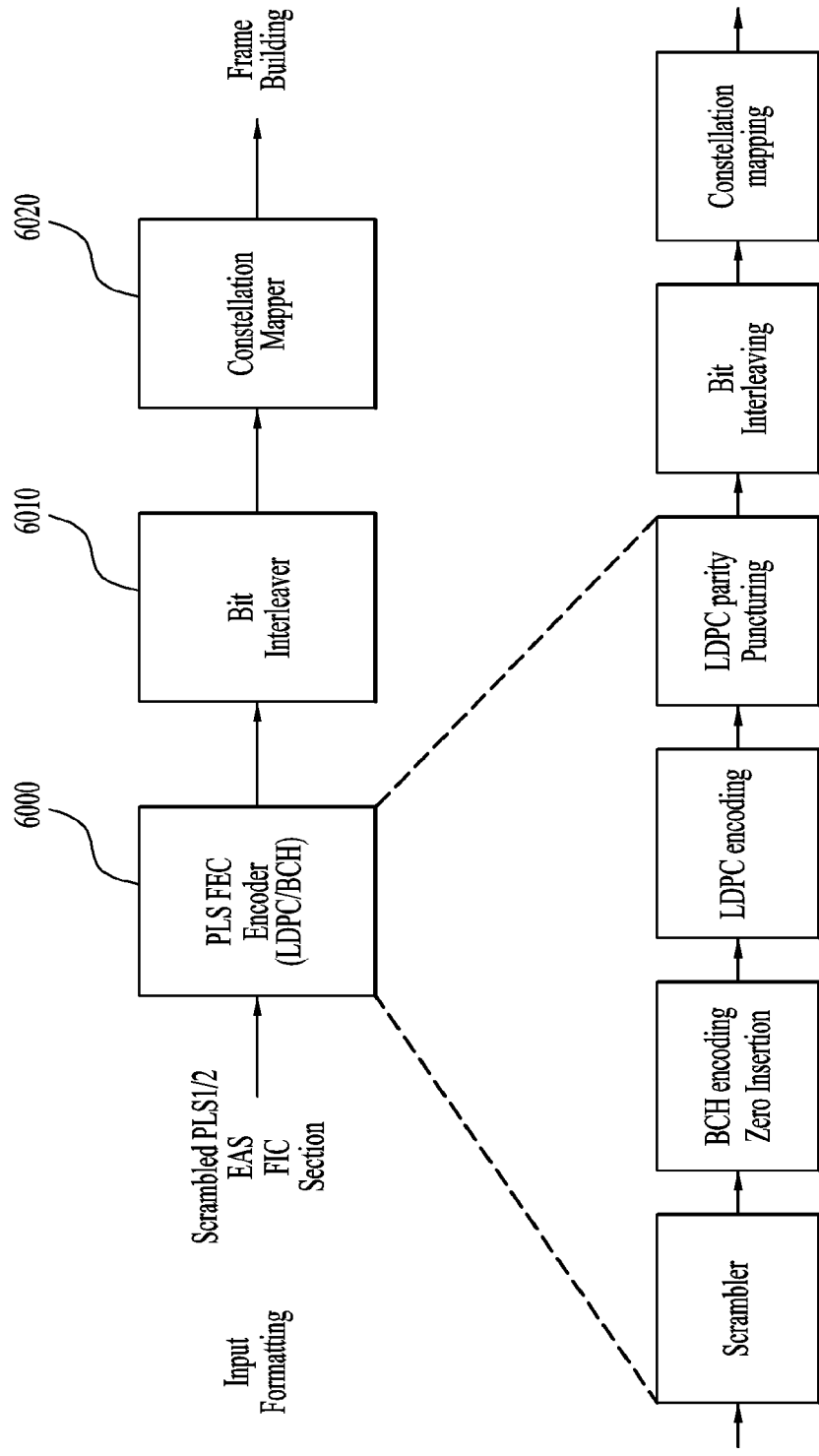
FIG. 6 illustrates a BICM block according to another embodiment of the present invention.

FIG. 6 illustrates a BICM block according to another embodiment of the present invention.

The BICM block illustrated in FIG. 6 corresponds to an embodiment of the BICM block 1010 described with reference to FIG. 1.

FIG. 6 illustrates a BICM block for protection of physical layer signaling (PLS), emergency alert channel (EAC) and fast information channel (FIC). EAC is a part of a frame that carries EAS information data and FIC is a logical channel in a frame that carries the mapping information between a service and the corresponding base DP. Details of the EAC and FIC will be described later.

Referring to FIG. 6, the BICM block for protection of PLS, EAC and FIC can include a PLS FEC encoder 6000, a bit interleaver 6010 and a constellation mapper 6020.

Also, the PLS FEC encoder 6000 can include a scrambler, BCH encoding/zero insertion block, LDPC encoding block and LDPC parity puncturing block. Description will be given of each block of the BICM block.

The PLS FEC encoder 6000 can encode the scrambled PLS 1/2 data, EAC and FIC section.

The scrambler can scramble PLS1 data and PLS2 data before BCH encoding and shortened and punctured LDPC encoding.

The BCH encoding/zero insertion block can perform outer encoding on the scrambled PLS 1/2 data using the shortened BCH code for PLS protection and insert zero bits after the BCH encoding. For PLS1 data only, the output bits of the zero insertion may be permitted before LDPC encoding.

The LDPC encoding block can encode the output of the BCH encoding/zero insertion block using LDPC code. To generate a complete coded block, $C_{ldpc}$, parity bits, $P_{ldpc}$ are encoded systematically from each zero-inserted PLS information block, $I_{ldpc}$ and appended after it.

$$C_{ldpc} = [I_{ldpc} P_{ldpc}] = [i_0, i_1, \ldots, i_{K_{ldpc}-1}, p_0, p_1, \ldots, p_{N_{ldpc}-K_{ldpc}-1}]$$ [Math Figure 1]

The LDPC code parameters for PLS1 and PLS2 are as following table 4.

The LDPC parity puncturing block can perform puncturing on the PLS1 data and PLS 2 data.

When shortening is applied to the PLS1 data protection, some LDPC parity bits are punctured after LDPC encoding. Also, for the PLS2 data protection, the LDPC parity bits of PLS2 are punctured after LDPC encoding. These punctured bits are not transmitted.

The bit interleaver 6010 can interleave the each shortened and punctured PLS1 data and PLS2 data.

The constellation mapper 6020 can map the bit interleaved PLS1 data and PLS2 data onto constellations.

The above-described blocks may be omitted or replaced by blocks having similar or identical functions.

Figure 7:
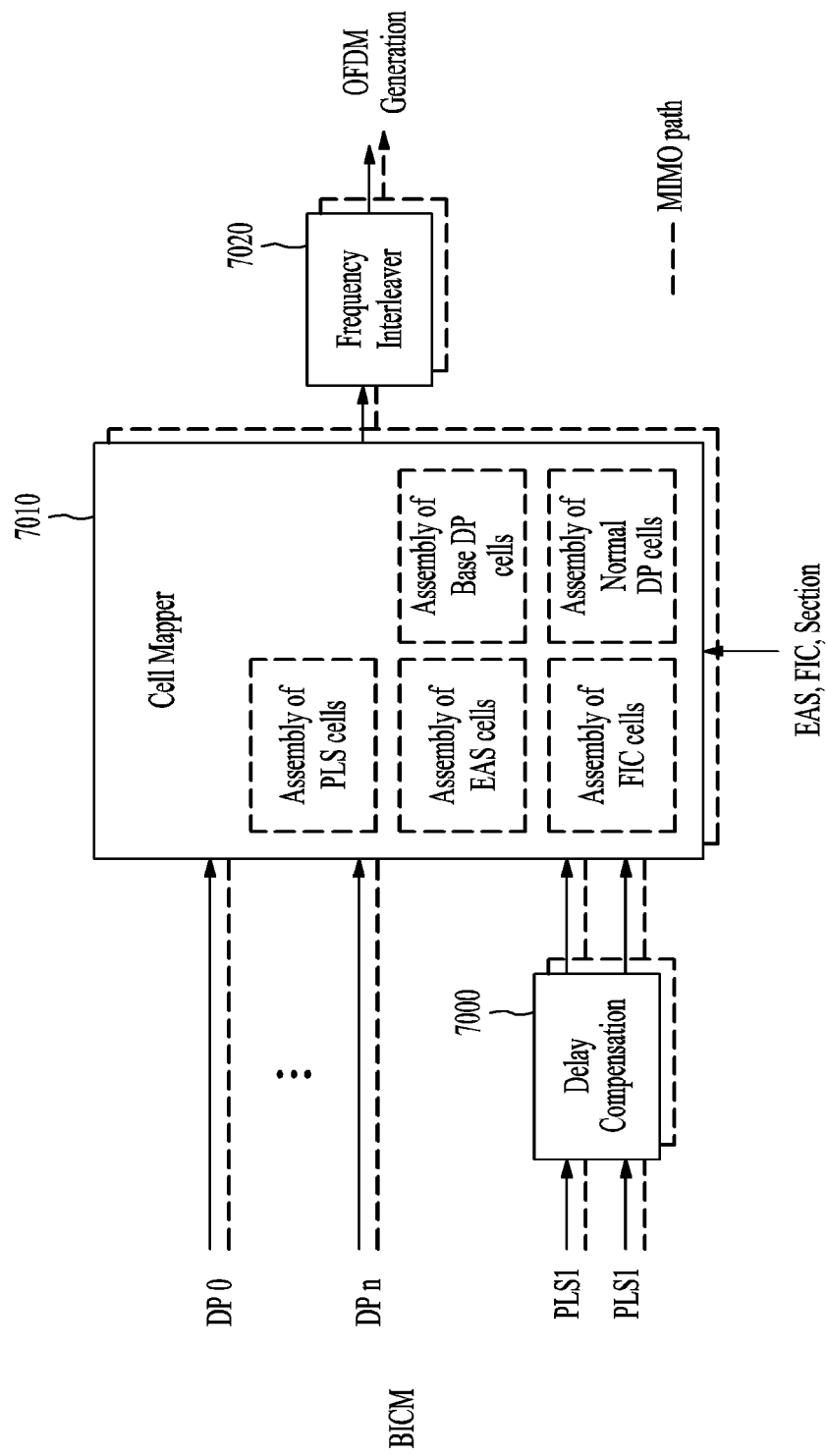
FIG. 7 illustrates a frame building block according to one embodiment of the present invention.

FIG. 7 illustrates a frame building block according to one embodiment of the present invention.

The frame building block illustrated in FIG. 7 corresponds to an embodiment of the frame building block 1020 described with reference to FIG. 1.

Referring to FIG. 7, the frame building block can include a delay compensation block 7000, a cell mapper 7010 and a frequency interleaver 7020. Description will be given of each block of the frame building block.

The delay compensation block 7000 can adjust the timing between the data pipes and the corresponding PLS data to ensure that they are co-timed at the transmitter end. The PLS data is delayed by the same amount as data pipes are by addressing the delays of data pipes caused by the Input Formatting block and BICM block. The delay of the BICM block is mainly due to the time interleaver. In-band signaling data carries information of the next TI group so that they are carried one frame ahead of the DPs to be signaled. The Delay Compensating block delays in-band signaling data accordingly.

The cell mapper 7010 can map PLS, EAC, FIC, DPs, auxiliary streams and dummy cells into the active carriers of the OFDM symbols in the frame. The basic function of the cell mapper 7010 is to map data cells produced by the TIs for each of the DPs, PLS cells, and EAC/FIC cells, if any, into arrays of active OFDM cells corresponding to each of the OFDM symbols within a frame. Service signaling data (such as PSI (program specific information)/SI) can be separately gathered and sent by a data pipe. The Cell Mapper operates according to the dynamic information produced by the scheduler and the configuration of the frame structure. Details of the frame will be described later.

The frequency interleaver 7020 can randomly interleave data cells received from the cell mapper 7010 to provide frequency diversity. Also, the frequency interleaver 7020 can operate on very OFDM symbol pair comprised of two sequential OFDM symbols using a different interleaving-seed order to get maximum interleaving gain in a single frame. Details of operations of the frequency interleaver 7020 will be described later.

The above-described blocks may be omitted or replaced by blocks having similar or identical functions.

Figure 8:
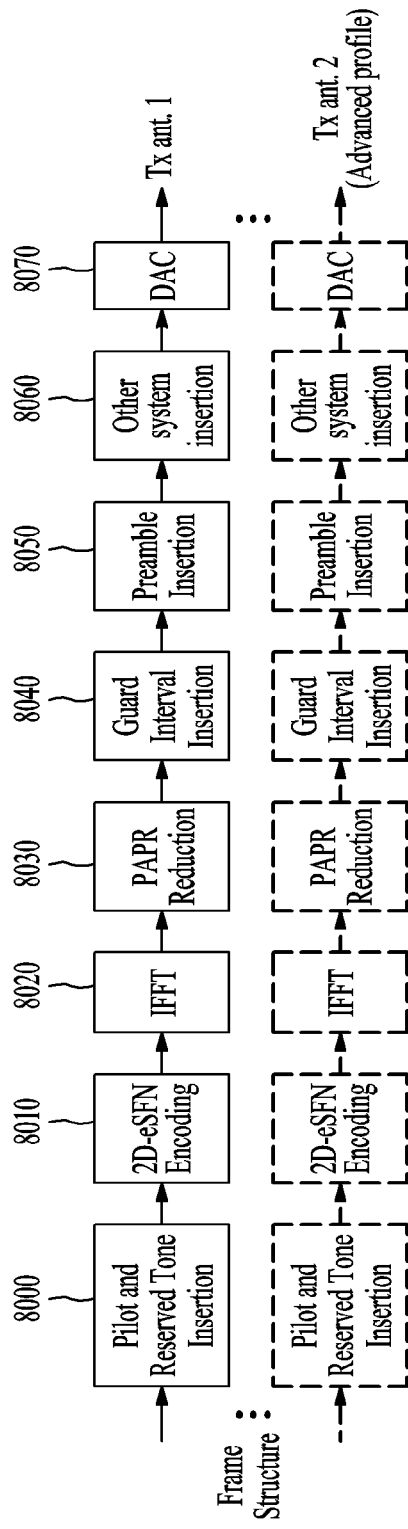
FIG. 8 illustrates an OFMD generation block according to an embodiment of the present invention.

FIG. 8 illustrates an OFMD generation block according to an embodiment of the present invention.

TABLE 4

| Signaling Type | $K_{sig}$ | $K_{bch}$ | $N_{bch\_parity}$ | $K_{ldpc}$ ($=N_{bch}$) | $N_{ldpc}$ | $N_{ldpc\_parity}$ | code rate | $Q_{ldpc}$ |
|---|---|---|---|---|---|---|---|---|
| PLS1 | 342 | 1020 | 60 | 1080 | 4320 | 3240 | 1/4 | 36 |
| PLS2 | <1021 | | | | | | | |
| | >1020 | 2100 | | 2160 | 7200 | 5040 | 3/10 | 56 |

The OFMD generation block illustrated in FIG. 8 corresponds to an embodiment of the OFMD generation block 1030 described with reference to FIG. 1.

The OFDM generation block modulates the OFDM carriers by the cells produced by the Frame Building block, inserts the pilots, and produces the time domain signal for transmission. Also, this block subsequently inserts guard intervals, and applies PAPR (Peak-to-Average Power Radio) reduction processing to produce the final RF signal.

Referring to FIG. 8, the frame building block can include a pilot and reserved tone insertion block 8000, a 2D-eSFN encoding block 8010, an IFFT (Inverse Fast Fourier Transform) block 8020, a PAPR reduction block 8030, a guard interval insertion block 8040, a preamble insertion block 8050, other system insertion block 8060 and a DAC block 8070. Description will be given of each block of the frame building block.

The pilot and reserved tone insertion block 8000 can insert pilots and the reserved tone.

Various cells within the OFDM symbol are modulated with reference information, known as pilots, which have transmitted values known a priori in the receiver. The information of pilot cells is made up of scattered pilots, continual pilots, edge pilots, FSS (frame signaling symbol) pilots and FES (frame edge symbol) pilots. Each pilot is transmitted at a particular boosted power level according to pilot type and pilot pattern. The value of the pilot information is derived from a reference sequence, which is a series of values, one for each transmitted carrier on any given symbol. The pilots can be used for frame synchronization, frequency synchronization, time synchronization, channel estimation, and transmission mode identification, and also can be used to follow the phase noise.

Reference information, taken from the reference sequence, is transmitted in scattered pilot cells in every symbol except the preamble, FSS and FES of the frame. Continual pilots are inserted in every symbol of the frame. The number and location of continual pilots depends on both the FFT size and the scattered pilot pattern. The edge carriers are edge pilots in every symbol except for the preamble symbol. They are inserted in order to allow frequency interpolation up to the edge of the spectrum. FSS pilots are inserted in FSS(s) and FES pilots are inserted in FES. They are inserted in order to allow time interpolation up to the edge of the frame.

The system according to an embodiment of the present invention supports the SFN network, where distributed MISO scheme is optionally used to support very robust transmission mode. The 2D-eSFN is a distributed MISO scheme that uses multiple TX antennas, each of which is located in the different transmitter site in the SFN network.

The 2D-eSFN encoding block 8010 can process a 2D-eSFN processing to distorts the phase of the signals transmitted from multiple transmitters, in order to create both time and frequency diversity in the SFN configuration. Hence, burst errors due to low flat fading or deep-fading for a long time can be mitigated.

The IFFT block 8020 can modulate the output from the 2D-eSFN encoding block 8010 using OFDM modulation scheme. Any cell in the data symbols which has not been designated as a pilot (or as a reserved tone) carries one of the data cells from the frequency interleaver. The cells are mapped to OFDM carriers.

The PAPR reduction block 8030 can perform a PAPR reduction on input signal using various PAPR reduction algorithm in the time domain.

The guard interval insertion block 8040 can insert guard intervals and the preamble insertion block 8050 can insert preamble in front of the signal. Details of a structure of the preamble will be described later. The other system insertion block 8060 can multiplex signals of a plurality of broadcast transmission/reception systems in the time domain such that data of two or more different broadcast transmission/reception systems providing broadcast services can be simultaneously transmitted in the same RF signal bandwidth. In this case, the two or more different broadcast transmission/reception systems refer to systems providing different broadcast services. The different broadcast services may refer to a terrestrial broadcast service, mobile broadcast service, etc. Data related to respective broadcast services can be transmitted through different frames.

The DAC block 8070 can convert an input digital signal into an analog signal and output the analog signal. The signal output from the DAC block 7800 can be transmitted through multiple output antennas according to the physical layer profiles. A Tx antenna according to an embodiment of the present invention can have vertical or horizontal polarity.

The above-described blocks may be omitted or replaced by blocks having similar or identical functions according to design.

Figure 9:
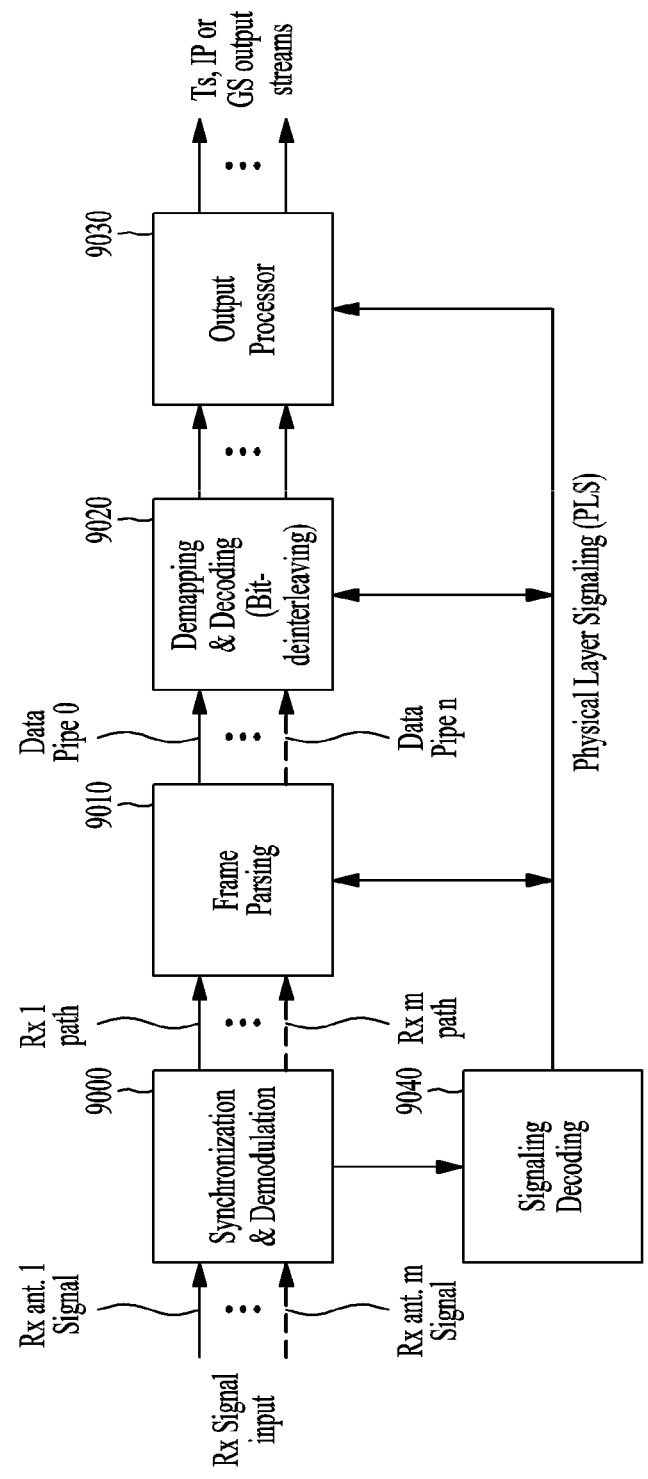
FIG. 9 illustrates a structure of an apparatus for receiving broadcast signals for future broadcast services according to an embodiment of the present invention.

FIG. 9 illustrates a structure of an apparatus for receiving broadcast signals for future broadcast services according to an embodiment of the present invention.

The apparatus for receiving broadcast signals for future broadcast services according to an embodiment of the present invention can correspond to the apparatus for transmitting broadcast signals for future broadcast services, described with reference to FIG. 1.

The apparatus for receiving broadcast signals for future broadcast services according to an embodiment of the present invention can include a synchronization & demodulation module 9000, a frame parsing module 9010, a demapping & decoding module 9020, an output processor 9030 and a signaling decoding module 9040. A description will be given of operation of each module of the apparatus for receiving broadcast signals.

The synchronization & demodulation module 9000 can receive input signals through m Rx antennas, perform signal detection and synchronization with respect to a system corresponding to the apparatus for receiving broadcast signals and carry out demodulation corresponding to a reverse procedure of the procedure performed by the apparatus for transmitting broadcast signals.

The frame parsing module 9100 can parse input signal frames and extract data through which a service selected by a user is transmitted. If the apparatus for transmitting broadcast signals performs interleaving, the frame parsing module 9100 can carry out deinterleaving corresponding to a reverse procedure of interleaving. In this case, the positions of a signal and data that need to be extracted can be obtained by decoding data output from the signaling decoding module 9400 to restore scheduling information generated by the apparatus for transmitting broadcast signals.

The demapping & decoding module 9200 can convert the input signals into bit domain data and then deinterleave the same as necessary. The demapping & decoding module 9200 can perform demapping for mapping applied for transmission efficiency and correct an error generated on a transmission channel through decoding. In this case, the demapping & decoding module 9200 can obtain transmission parameters necessary for demapping and decoding by decoding the data output from the signaling decoding module 9400.

The output processor 9300 can perform reverse procedures of various compression/signal processing procedures which are applied by the apparatus for transmitting broadcast signals to improve transmission efficiency. In this case, the output processor 9300 can acquire necessary control information from data output from the signaling decoding module 9400. The output of the output processor 8300 corresponds to a signal input to the apparatus for transmitting broadcast signals and may be MPEG-TSs, IP streams (v4 or v6) and generic streams.

The signaling decoding module 9400 can obtain PLS information from the signal demodulated by the synchronization & demodulation module 9000. As described above, the frame parsing module 9100, demapping & decoding module 9200 and output processor 9300 can execute functions thereof using the data output from the signaling decoding module 9400.

Figure 10:
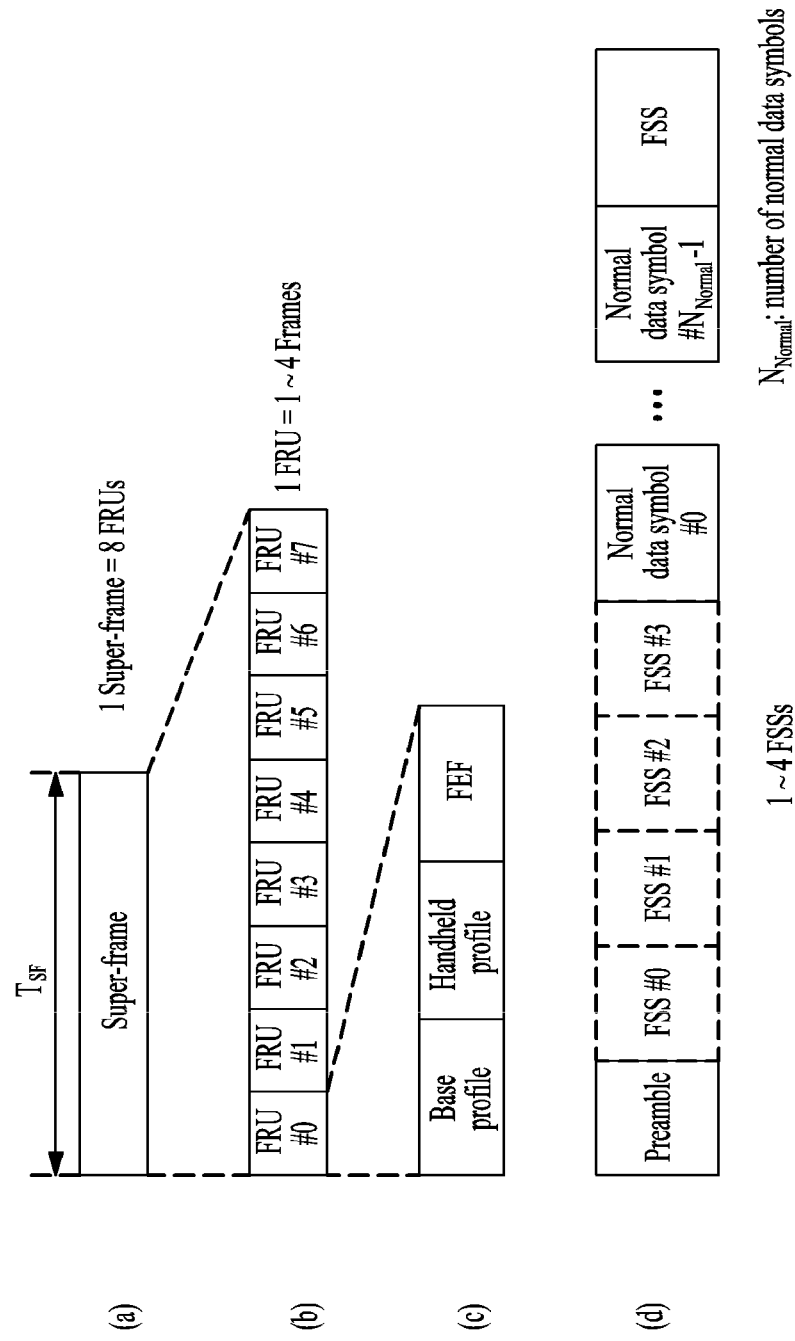
FIG. 10 illustrates a frame structure according to an embodiment of the present invention.

FIG. 10 illustrates a frame structure according to an embodiment of the present invention.

FIG. 10 shows an example configuration of the frame types and FRUs in a super-frame. (a) shows a super frame according to an embodiment of the present invention, (b) shows FRU (Frame Repetition Unit) according to an embodiment of the present invention, (c) shows frames of variable PHY profiles in the FRU and (d) shows a structure of a frame.

A super-frame may be composed of eight FRUs. The FRU is a basic multiplexing unit for TDM of the frames, and is repeated eight times in a super-frame.

Each frame in the FRU belongs to one of the PHY profiles, (base, handheld, advanced) or FEF. The maximum allowed number of the frames in the FRU is four and a given PHY profile can appear any number of times from zero times to four times in the FRU (e.g., base, base, handheld, advanced). PHY profile definitions can be extended using reserved values of the PHY_PROFILE in the preamble, if required.

The FEF part is inserted at the end of the FRU, if included. When the FEF is included in the FRU, the minimum number of FEFs is 8 in a super-frame. It is not recommended that FEF parts be adjacent to each other.

One frame is further divided into a number of OFDM symbols and a preamble. As shown in (d), the frame comprises a preamble, one or more frame signaling symbols (FSS), normal data symbols and a frame edge symbol (FES).

The preamble is a special symbol that enables fast Futurecast UTB system signal detection and provides a set of basic transmission parameters for efficient transmission and reception of the signal. The detailed description of the preamble will be will be described later.

The main purpose of the FSS(s) is to carry the PLS data. For fast synchronization and channel estimation, and hence fast decoding of PLS data, the FSS has more dense pilot pattern than the normal data symbol. The FES has exactly the same pilots as the FSS, which enables frequency-only interpolation within the FES and temporal interpolation, without extrapolation, for symbols immediately preceding the FES.

Figure 11:
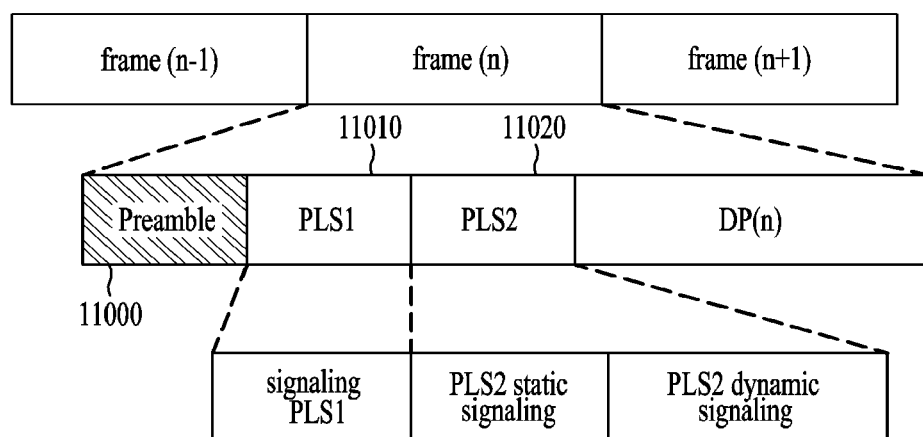
FIG. 11 illustrates a signaling hierarchy structure of the frame according to an embodiment of the present invention.

FIG. 11 illustrates a signaling hierarchy structure of the frame according to an embodiment of the present invention.

FIG. 11 illustrates the signaling hierarchy structure, which is split into three main parts: the preamble signaling data 11000, the PLS1 data 11010 and the PLS2 data 11020. The purpose of the preamble, which is carried by the preamble symbol in every frame, is to indicate the transmission type and basic parameters of that frame. The PLS1 enables the receiver to access and decode the PLS2 data, which contains the parameters to access the DP of interest. The PLS2 is carried in every frame and split into two main parts: PLS2-STAT data and PLS2-DYN data. The static and dynamic portion of PLS2 data is followed by padding, if necessary.

FIG. 12 illustrates preamble signaling data according to an embodiment of the present invention.

Preamble signaling data carries 21 bits of information that are needed to enable the receiver to access PLS data and trace DPs within the frame structure. Details of the preamble signaling data are as follows:

PHY_PROFILE: This 3-bit field indicates the PHY profile type of the current frame. The mapping of different PHY profile types is given in below table 5.

TABLE 5

| Value | PHY Profile |
|---|---|
| 000 | Base profile |
| 001 | Handheld profile |
| 010 | Advanced profiled |
| 011~110 | Reserved |
| 111 | FEF |

FFT_SIZE: This 2 bit field indicates the FFT size of the current frame within a frame-group, as described in below table 6.

TABLE 6

| Value | FFT size |
|---|---|
| 00 | 8K FFT |
| 01 | 16K FFT |
| 10 | 32K FFT |
| 11 | Reserved |

GI_FRACTION: This 3 bit field indicates the guard interval fraction value in the current super-frame, as described in below table 7.

TABLE 7

| Value | GI_FRACTION |
|---|---|
| 000 | 1/5 |
| 001 | 1/10 |
| 010 | 1/20 |
| 011 | 1/40 |
| 100 | 1/80 |
| 101 | 1/160 |
| 110~111 | Reserved |

EAC_FLAG: This 1 bit field indicates whether the EAC is provided in the current frame. If this field is set to '1', emergency alert service (EAS) is provided in the current frame. If this field set to '0', EAS is not carried in the current frame. This field can be switched dynamically within a super-frame.

PILOT_MODE: This 1-bit field indicates whether the pilot mode is mobile mode or fixed mode for the current frame in the current frame-group. If this field is set to '0', mobile pilot mode is used. If the field is set to '1', the fixed pilot mode is used.

PAPR_FLAG: This 1-bit field indicates whether PAPR reduction is used for the current frame in the current frame-group. If this field is set to value '1', tone reservation is used for PAPR reduction. If this field is set to '0', PAPR reduction is not used.

FRU_CONFIGURE: This 3-bit field indicates the PHY profile type configurations of the frame repetition units (FRU) that are present in the current super-frame. All profile types conveyed in the current super-frame are identified in this field in all preambles in the current super-frame. The 3-bit field has a different definition for each profile, as show in below table 8.

TABLE 8

|  | Current PHY_PROFILE = '000' (base) | Current PHY_PROFILE = '001' (handheld) | Current PHY_PROFILE = '110' (advanced) | Current PHY_PROFILE = '111' (FEF) |
|---|---|---|---|---|
| FRU_CONFIGURE = 000 | Only base profile present | Only handheld profile present | Only advanced profile present | Only FEF present |
| FRU_CONFIGURE = 1XX | Handheld profile present | Base profile present | Base profile present | Base profile present |
| FRU_CONFIGURE = X1X | Advanced profile present | Advanced profile present | Handheld profile present | Handheld profile present |
| FRU_CONFIGURE = XX1 | FEF present | FEF present | FEF present | Advanced profile present |

RESERVED: This 7-bit field is reserved for future use.

FIG. 13 illustrates PLS1 data according to an embodiment of the present invention.

PLS1 data provides basic transmission parameters including parameters required to enable the reception and decoding of the PLS2. As above mentioned, the PLS1 data remain unchanged for the entire duration of one frame-group. The detailed definition of the signaling fields of the PLS1 data are as follows:

PREAMBLE_DATA: This 20-bit field is a copy of the preamble signaling data excluding the EAC_FLAG.

NUM_FRAME_FRU: This 2-bit field indicates the number of the frames per FRU.

PAYLOAD_TYPE: This 3-bit field indicates the format of the payload data carried in the frame-group. PAYLOAD_TYPE is signaled as shown in table 9.

TABLE 9

| value | Payload type |
|---|---|
| 1XX | TS stream is transmitted |
| X1X | IP stream is transmitted |
| XX1 | GS stream is transmitted |

NUM_FSS: This 2-bit field indicates the number of FSS symbols in the current frame.

SYSTEM_VERSION: This 8-bit field indicates the version of the transmitted signal format. The SYSTEM_VERSION is divided into two 4-bit fields, which are a major version and a minor version.

Major version: The MSB four bits of SYSTEM_VERSION field indicate major version information. A change in the major version field indicates a non-backward-compatible change. The default value is '0000'. For the version described in this standard, the value is set to '0000'.

Minor version: The LSB four bits of SYSTEM_VERSION field indicate minor version information. A change in the minor version field is backward-compatible.

CELL_ID: This is a 16-bit field which uniquely identifies a geographic cell in an ATSC network. An ATSC cell coverage area may consist of one or more frequencies, depending on the number of frequencies used per Futurecast UTB system. If the value of the CELL_ID is not known or unspecified, this field is set to '0'.

NETWORK_ID: This is a 16-bit field which uniquely identifies the current ATSC network.

SYSTEM_ID: This 16-bit field uniquely identifies the Futurecast UTB system within the ATSC network. The Futurecast UTB system is the terrestrial broadcast system whose input is one or more input streams (TS, IP, GS) and whose output is an RF signal. The Futurecast UTB system carries one or more PHY profiles and FEF, if any. The same Futurecast UTB system may carry different input streams and use different RF frequencies in different geographical areas, allowing local service insertion. The frame structure and scheduling is controlled in one place and is identical for all transmissions within a Futurecast UTB system. One or more Futurecast UTB systems may have the same SYSTEM_ID meaning that they all have the same physical layer structure and configuration.

The following loop consists of FRU_PHY_PROFILE, FRU_FRAME_LENGTH, FRU_GI_FRACTION, and RESERVED which are used to indicate the FRU configuration and the length of each frame type. The loop size is fixed so that four PHY profiles (including a FEF) are signaled within the FRU. If NUM_FRAME_FRU is less than 4, the unused fields are filled with zeros.

FRU_PHY_PROFILE: This 3-bit field indicates the PHY profile type of the $(i+1)^{th}$ (i is the loop index) frame of the associated FRU. This field uses the same signaling format as shown in the table 8.

FRU_FRAME_LENGTH: This 2-bit field indicates the length of the $(i+1)^{th}$ frame of the associated FRU. Using FRU_FRAME_LENGTH together with FRU_GI_FRACTION, the exact value of the frame duration can be obtained.

FRU_GI_FRACTION: This 3-bit field indicates the guard interval fraction value of the $(i+1)^{th}$ frame of the associated FRU. FRU_GI_FRACTION is signaled according to the table 7.

RESERVED: This 4-bit field is reserved for future use.

The following fields provide parameters for decoding the PLS2 data.

PLS2_FEC_TYPE: This 2-bit field indicates the FEC type used by the PLS2 protection. The FEC type is signaled according to table 10. The details of the LDPC codes will be described later.

TABLE 10

| Content | PLS2 FEC type |
|---|---|
| 00 | 4K-1/4 and 7K-3/10 LDPC codes |
| 01~11 | Reserved |

PLS2_MOD: This 3-bit field indicates the modulation type used by the PLS2. The modulation type is signaled according to table 11.

| Value | PLS2_MODE |
| --- | --- |
| 000 | BPSK |
| 001 | QPSK |
| 010 | QAM-16 |
| 011 | NUQ-64 |
| 100~111 | Reserved |

PLS2_SIZE_CELL: This 15-bit field indicates $C_{total\_partial\_block}$, the size (specified as the number of QAM cells) of the collection of full coded blocks for PLS2 that is carried in the current frame-group. This value is constant during the entire duration of the current frame-group.

PLS2_STAT_SIZE_BIT: This 14-bit field indicates the size, in bits, of the PLS2-STAT for the current frame-group. This value is constant during the entire duration of the current frame-group.

PLS2_DYN_SIZE_BIT: This 14-bit field indicates the size, in bits, of the PLS2-DYN for the current frame-group. This value is constant during the entire duration of the current frame-group.

PLS2_REP_FLAG: This 1-bit flag indicates whether the PLS2 repetition mode is used in the current frame-group. When this field is set to value '1', the PLS2 repetition mode is activated. When this field is set to value '0', the PLS2 repetition mode is deactivated.

PLS2_REP_SIZE_CELL: This 15-bit field indicates $C_{total\_partial\_block}$, the size (specified as the number of QAM cells) of the collection of partial coded blocks for PLS2 carried in every frame of the current frame-group, when PLS2 repetition is used. If repetition is not used, the value of this field is equal to 0. This value is constant during the entire duration of the current frame-group.

PLS2_NEXT_FEC_TYPE: This 2-bit field indicates the FEC type used for PLS2 that is carried in every frame of the next frame-group. The FEC type is signaled according to the table 10.

PLS2_NEXT_MOD: This 3-bit field indicates the modulation type used for PLS2 that is carried in every frame of the next frame-group. The modulation type is signaled according to the table 11.

PLS2_NEXT_REP_FLAG: This 1-bit flag indicates whether the PLS2 repetition mode is used in the next frame-group. When this field is set to value '1', the PLS2 repetition mode is activated. When this field is set to value '0', the PLS2 repetition mode is deactivated.

PLS2_NEXT_REP_SIZE_CELL: This 15-bit field indicates $C_{total\_full\_block}$. The size (specified as the number of QAM cells) of the collection of full coded blocks for PLS2 that is carried in every frame of the next frame-group, when PLS2 repetition is used. If repetition is not used in the next frame-group, the value of this field is equal to 0. This value is constant during the entire duration of the current frame-group.

PLS2_NEXT_REP_STAT_SIZE_BIT: This 14-bit field indicates the size, in bits, of the PLS2-STAT for the next frame-group. This value is constant in the current frame-group.

PLS2_NEXT_REP_DYN_SIZE_BIT: This 14-bit field indicates the size, in bits, of the PLS2-DYN for the next frame-group. This value is constant in the current frame-group.

PLS2_AP_MODE: This 2-bit field indicates whether additional parity is provided for PLS2 in the current frame-group. This value is constant during the entire duration of the current frame-group. The below table 12 gives the values of this field. When this field is set to '00', additional parity is not used for the PLS2 in the current frame-group.

TABLE 12

| Value | PLS2-AP mode |
| --- | --- |
| 00 | AP is not provided |
| 01 | AP1 mode |
| 10~11 | Reserved |

PLS2_AP_SIZE_CELL: This 15-bit field indicates the size (specified as the number of QAM cells) of the additional parity bits of the PLS2. This value is constant during the entire duration of the current frame-group.

PLS2_NEXT_AP_MODE: This 2-bit field indicates whether additional parity is provided for PLS2 signaling in every frame of next frame-group. This value is constant during the entire duration of the current frame-group. The table 12 defines the values of this field PLS2 NEXT_AP_SIZE_CELL: This 15-bit field indicates the size (specified as the number of QAM cells) of the additional parity bits of the PLS2 in every frame of the next frame-group. This value is constant during the entire duration of the current frame-group.

RESERVED: This 32-bit field is reserved for future use.

CRC_32: A 32-bit error detection code, which is applied to the entire PLS1 signaling.

FIG. 14 illustrates PLS2 data according to an embodiment of the present invention.

FIG. 14 illustrates PLS2-STAT data of the PLS2 data. The PLS2-STAT data are the same within a frame-group, while the PLS2-DYN data provide information that is specific for the current frame.

The details of fields of the PLS2-STAT data are as follows:

FIC_FLAG: This 1-bit field indicates whether the FIC is used in the current frame-group. If this field is set to '1', the FIC is provided in the current frame. If this field set to '0', the FIC is not carried in the current frame. This value is constant during the entire duration of the current frame-group.

AUX_FLAG: This 1-bit field indicates whether the auxiliary stream(s) is used in the current frame-group. If this field is set to '1', the auxiliary stream is provided in the current frame. If this field set to '0', the auxiliary stream is not carried in the current frame. This value is constant during the entire duration of current frame-group.

NUM_DP: This 6-bit field indicates the number of DPs carried within the current frame. The value of this field ranges from 1 to 64, and the number of DPs is NUM_DP+1.

DP_ID: This 6-bit field identifies uniquely a DP within a PHY profile.

DP_TYPE: This 3-bit field indicates the type of the DP. This is signaled according to the below table 13.

TABLE 13

| Value | DP Type |
| --- | --- |
| 000 | DP Type 1 |
| 001 | DP Type 2 |
| 010~111 | reserved |

DP_GROUP_ID: This 8-bit field identifies the DP group with which the current DP is associated. This can be used by a receiver to access the DPs of the service components associated with a particular service, which will have the same DP_GROUP_ID.

BASE_DP_ID: This 6-bit field indicates the DP carrying service signaling data (such as PSI/SI) used in the Management layer. The DP indicated by BASE_DP_ID may be either a normal DP carrying the service signaling data along with the service data or a dedicated DP carrying only the service signaling data DP_FEC_TYPE: This 2-bit field indicates the FEC type used by the associated DP. The FEC type is signaled according to the below table 14.

TABLE 14

| Value | FEC_TYPE |
|---|---|
| 00 | 16K LDPC |
| 01 | 64K LDPC |
| 10~11 | Reserved |

DP_COD: This 4-bit field indicates the code rate used by the associated DP. The code rate is signaled according to below table 15.

TABLE 15

| Value | Code rate |
|---|---|
| 0000 | 5/15 |
| 0001 | 6/15 |
| 0010 | 7/15 |
| 0011 | 8/15 |
| 0100 | 9/15 |
| 0101 | 10/15 |
| 0110 | 11/15 |
| 0111 | 12/15 |
| 1000 | 13/15 |
| 1001~1111 | Reserved |

DP_MOD: This 4-bit field indicates the modulation used by the associated DP. The modulation is signaled according to the below table 16.

TABLE 16

| Value | Modulation |
|---|---|
| 0000 | QPSK |
| 0001 | QAM-16 |
| 0010 | NUQ-64 |
| 0011 | NUQ-256 |
| 0100 | NUQ-1024 |
| 0101 | NUC-16 |
| 0110 | NUC-64 |
| 0111 | NUC-256 |
| 1000 | NUC-1024 |
| 1001~1111 | reserved |

DP_SSD_FLAG: This 1-bit field indicates whether the SSD mode is used in the associated DP. If this field is set to value '1', SSD is used. If this field is set to value '0', SSD is not used.

The following field appears only if PHY_PROFILE is equal to '010', which indicates the advanced profile:

DP_MIMO: This 3-bit field indicates which type of MIMO encoding process is applied to the associated DP. The type of MIMO encoding process is signaled according to the table 17.

TABLE 17

| Value | MIMO encoding |
|---|---|
| 0000 | FR-SM |
| 0001 | FRFD-SM |
| 010~111 | reserved |

DP_TI_TYPE: This 1-bit field indicates the type of time-interleaving. A value of '0' indicates that one TI group corresponds to one frame and contains one or more TI-blocks. A value of '1' indicates that one TI group is carried in more than one frame and contains only one TI-block.

DP_TI_LENGTH: The use of this 2-bit field (the allowed values are only 1, 2, 4, 8) is determined by the values set within the DP_TI_TYPE field as follows:

If the DP_TI_TYPE is set to the value '1', this field indicates $P_I$, the number of the frames to which each TI group is mapped, and there is one TI-block per TI group ($N_{TI}=1$). The allowed $P_I$ values with 2-bit field are defined in the below table 18.

If the DP_TI_TYPE is set to the value '0', this field indicates the number of TI-blocks $N_{TI}$ per TI group, and there is one TI group per frame ($P_I=1$). The allowed $P_I$ values with 2-bit field are defined in the below table 18.

TABLE 18

| 2-bit field | $P_I$ | $N_{TI}$ |
|---|---|---|
| 00 | 1 | 1 |
| 01 | 2 | 2 |
| 10 | 4 | 3 |
| 11 | 8 | 4 |

DP_FRAME_INTERVAL: This 2-bit field indicates the frame interval ($I_{JUMP}$) within the frame-group for the associated DP and the allowed values are 1, 2, 4, 8 (the corresponding 2-bit field is '00', '01', '10', or '11', respectively). For DPs that do not appear every frame of the frame-group, the value of this field is equal to the interval between successive frames. For example, if a DP appears on the frames 1, 5, 9, 13, etc., this field is set to '4'. For DPs that appear in every frame, this field is set to '1'.

DP_TI_BYPASS: This 1-bit field determines the availability of time interleaver. If time interleaving is not used for a DP, it is set to '1'. Whereas if time interleaving is used it is set to '0'.

DP_FIRST_FRAME_IDX: This 5-bit field indicates the index of the first frame of the super-frame in which the current DP occurs. The value of DP_FIRST_FRAME_IDX ranges from 0 to 31

DP_NUM_BLOCK_MAX: This 10-bit field indicates the maximum value of DP_NUM_BLOCKS for this DP. The value of this field has the same range as DP_NUM_BLOCKS.

DP_PAYLOAD_TYPE: This 2-bit field indicates the type of the payload data carried by the given DP. DP_PAYLOAD_TYPE is signaled according to the below table 19.

TABLE 19

| Value | Payload Type |
|---|---|
| 00 | TS. |
| 01 | IP |
| 10 | GS |
| 11 | reserved |

DP_INBAND_MODE: This 2-bit field indicates whether the current DP carries in-band signaling information. The in-band signaling type is signaled according to the below table 20.

TABLE 20

| Value | In-band mode |
|---|---|
| 00 | In-band signaling is not carried. |
| 01 | INBAND-PLS is carried only |
| 10 | INBAND-ISSY is carried only |
| 11 | INBAND-PLS and INBAND-ISSY are carried |

DP_PROTOCOL_TYPE: This 2-bit field indicates the protocol type of the payload carried by the given DP. It is signaled according to the below table 21 when input payload types are selected.

TABLE 21

| Value | If DP_PAYLOAD_TYPE Is TS | If DP_PAYLOAD_TYPE Is IP | If DP_PAYLOAD_TYPE Is GS |
|---|---|---|---|
| 00 | MPEG2-TS | IPv4 | (Note) |
| 01 | Reserved | IPv6 | Reserved |
| 10 | Reserved | Reserved | Reserved |
| 11 | Reserved | Reserved | Reserved |

DP_CRC_MODE: This 2-bit field indicates whether CRC encoding is used in the Input Formatting block. The CRC mode is signaled according to the below table 22.

TABLE 22

| Value | CRC mode |
|---|---|
| 00 | Not used |
| 01 | CRC-8 |
| 10 | CRC-16 |
| 11 | CRC-32 |

DNP_MODE: This 2-bit field indicates the null-packet deletion mode used by the associated DP when DP_PAYLOAD_TYPE is set to TS ('00'). DNP_MODE is signaled according to the below table 23. If DP_PAYLOAD_TYPE is not TS ('00'), DNP_MODE is set to the value '00'.

TABLE 23

| Value | Null-packet deletion mode |
|---|---|
| 00 | Not used |
| 01 | DNP-NORMAL |
| 10 | DNP-OFFSET |
| 11 | reserved |

ISSY_MODE: This 2-bit field indicates the ISSY mode used by the associated DP when DP_PAYLOAD_TYPE is set to TS ('00'). The ISSY_MODE is signaled according to the below table 24 If DP_PAYLOAD_TYPE is not TS ('00'), ISSY_MODE is set to the value '00'.

TABLE 24

| Value | ISSY mode |
|---|---|
| 00 | Not used |
| 01 | ISSY-UP |
| 10 | ISSY-BBF |
| 11 | reserved |

HC_MODE_TS: This 2-bit field indicates the TS header compression mode used by the associated DP when DP_PAYLOAD_TYPE is set to TS ('00'). The HC_MODE_TS is signaled according to the below table 25.

TABLE 25

| Value | Header compression mode |
|---|---|
| 00 | HC_MODE_TS 1 |
| 01 | HC_MODE_TS 2 |
| 10 | HC_MODE_TS 3 |
| 11 | HC_MODE_TS 4 |

HC_MODE_IP: This 2-bit field indicates the IP header compression mode when DP_PAYLOAD_TYPE is set to IP ('01'). The HC_MODE_IP is signaled according to the below table 26.

TABLE 26

| Value | Header compression mode |
|---|---|
| 00 | No compression |
| 01 | HC_MODE_IP 1 |
| 10~11 | reserved |

PID: This 13-bit field indicates the PID number for TS header compression when DP_PAYLOAD_TYPE is set to TS ('00') and HC_MODE_TS is set to '01' or '10'.

RESERVED: This 8-bit field is reserved for future use.

The following field appears only if FIC_FLAG is equal to '1':

FIC_VERSION: This 8-bit field indicates the version number of the FIC.

FIC_LENGTH_BYTE: This 13-bit field indicates the length, in bytes, of the FIC.

RESERVED: This 8-bit field is reserved for future use.

The following field appears only if AUX_FLAG is equal to '1':

NUM_AUX: This 4-bit field indicates the number of auxiliary streams. Zero means no auxiliary streams are used.

AUX_CONFIG_RFU: This 8-bit field is reserved for future use.

AUX_STREAM_TYPE: This 4-bit is reserved for future use for indicating the type of the current auxiliary stream.

AUX_PRIVATE_CONFIG: This 28-bit field is reserved for future use for signaling auxiliary streams.

FIG. 15 illustrates PLS2 data according to another embodiment of the present invention.

FIG. 15 illustrates PLS2-DYN data of the PLS2 data. The values of the PLS2-DYN data may change during the duration of one frame-group, while the size of fields remains constant.

The details of fields of the PLS2-DYN data are as follows:

FRAME_INDEX: This 5-bit field indicates the frame index of the current frame within the super-frame. The index of the first frame of the super-frame is set to '0'.

PLS_CHANGE_COUNTER: This 4-bit field indicates the number of super-frames ahead where the configuration will change. The next super-frame with changes in the configuration is indicated by the value signaled within this field. If this field is set to the value '0000', it means that no scheduled change is foreseen: e.g., value '1' indicates that there is a change in the next super-frame.

FIC_CHANGE_COUNTER: This 4-bit field indicates the number of super-frames ahead where the configuration (i.e., the contents of the FIC) will change. The next super-frame with changes in the configuration is indicated by the value signaled within this field. If this field is set to the value '0000', it means that no scheduled change is foreseen: e.g. value '0001' indicates that there is a change in the next super-frame.

RESERVED: This 16-bit field is reserved for future use.

The following fields appear in the loop over NUM_DP, which describe the parameters associated with the DP carried in the current frame.

DP_ID: This 6-bit field indicates uniquely the DP within a PHY profile.

DP_START: This 15-bit (or 13-bit) field indicates the start position of the first of the DPs using the DPU addressing scheme. The DP_START field has differing length according to the PHY profile and FFT size as shown in the below table 27.

TABLE 27

|  | DP_START field size | |
| --- | --- | --- |
| PHY profile | 64K | 16K |
| Base | 13 bit | 15 bit |
| Handheld | — | 13 bit |
| Advanced | 13 bit | 15 bit |

DP_NUM_BLOCK: This 10-bit field indicates the number of FEC blocks in the current TI group for the current DP. The value of DP_NUM_BLOCK ranges from 0 to 1023

RESERVED: This 8-bit field is reserved for future use.

The following fields indicate the FIC parameters associated with the EAC.

EAC_FLAG: This 1-bit field indicates the existence of the EAC in the current frame. This bit is the same value as the EAC_FLAG in the preamble.

EAS_WAKE_UP_VERSION_NUM: This 8-bit field indicates the version number of a wake-up indication.

If the EAC_FLAG field is equal to '1', the following 12 bits are allocated for EAC_LENGTH_BYTE field. If the EAC_FLAG field is equal to '0', the following 12 bits are allocated for EAC_COUNTER.

EAC_LENGTH_BYTE: This 12-bit field indicates the length, in byte, of the EAC.

EAC_COUNTER: This 12-bit field indicates the number of the frames before the frame where the EAC arrives.

The following field appears only if the AUX_FLAG field is equal to '1':

AUX_PRIVATE_DYN: This 48-bit field is reserved for future use for signaling auxiliary streams. The meaning of this field depends on the value of AUX_STREAM_TYPE in the configurable PLS2-STAT.

CRC_32: A 32-bit error detection code, which is applied to the entire PLS2.

Figure 16:
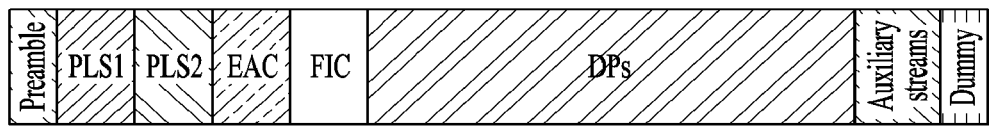
FIG. 16 illustrates a logical structure of a frame according to an embodiment of the present invention.

FIG. 16 illustrates a logical structure of a frame according to an embodiment of the present invention.

As above mentioned, the PLS, EAC, FIC, DPs, auxiliary streams and dummy cells are mapped into the active carriers of the OFDM symbols in the frame. The PLS1 and PLS2 are first mapped into one or more FSS(s). After that, EAC cells, if any, are mapped immediately following the PLS field, followed next by FIC cells, if any. The DPs are mapped next after the PLS or EAC, FIC, if any. Type 1 DPs follows first, and Type 2 DPs next. The details of a type of the DP will be described later. In some case, DPs may carry some special data for EAS or service signaling data. The auxiliary stream or streams, if any, follow the DPs, which in turn are followed by dummy cells. Mapping them all together in the above mentioned order, i.e. PLS, EAC, FIC, DPs, auxiliary streams and dummy data cells exactly fill the cell capacity in the frame.

Figure 17:
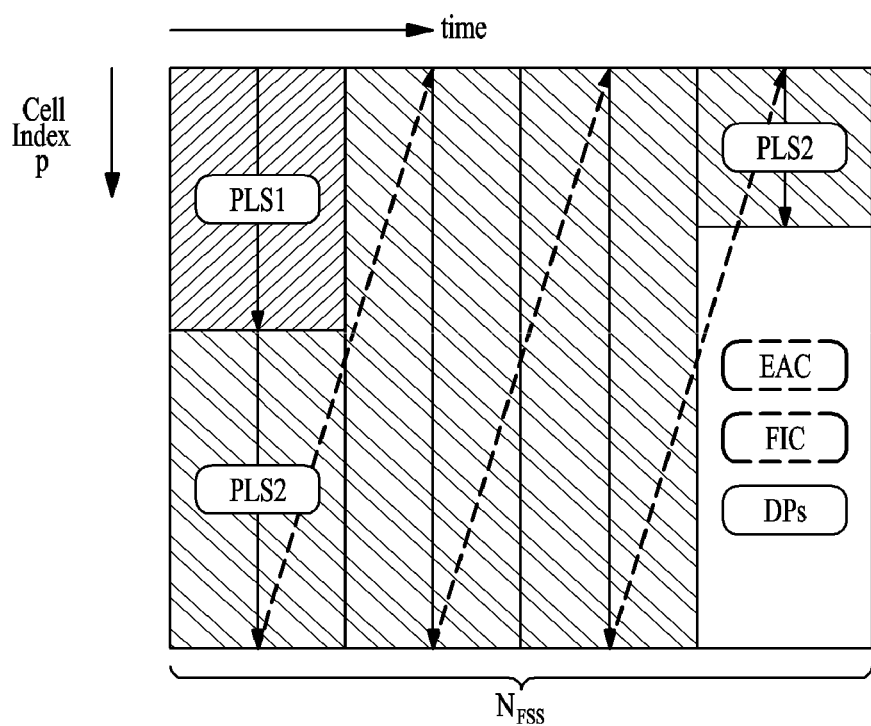
FIG. 17 illustrates PLS mapping according to an embodiment of the present invention.

FIG. 17 illustrates PLS mapping according to an embodiment of the present invention.

PLS cells are mapped to the active carriers of FSS(s). Depending on the number of cells occupied by PLS, one or more symbols are designated as FSS(s), and the number of FSS(s) $N_{FSS}$ is signaled by NUM_FSS in PLS1. The FSS is a special symbol for carrying PLS cells. Since robustness and latency are critical issues in the PLS, the FSS(s) has higher density of pilots allowing fast synchronization and frequency-only interpolation within the FSS.

PLS cells are mapped to active carriers of the $N_{FSS}$ FSS(s) in a top-down manner as shown in an example in FIG. 17. The PLS1 cells are mapped first from the first cell of the first FSS in an increasing order of the cell index. The PLS2 cells follow immediately after the last cell of the PLS1 and mapping continues downward until the last cell index of the first FSS. If the total number of required PLS cells exceeds the number of active carriers of one FSS, mapping proceeds to the next FSS and continues in exactly the same manner as the first FSS.

After PLS mapping is completed, DPs are carried next. If EAC, FIC or both are present in the current frame, they are placed between PLS and "normal" DPs.

Figure 18:
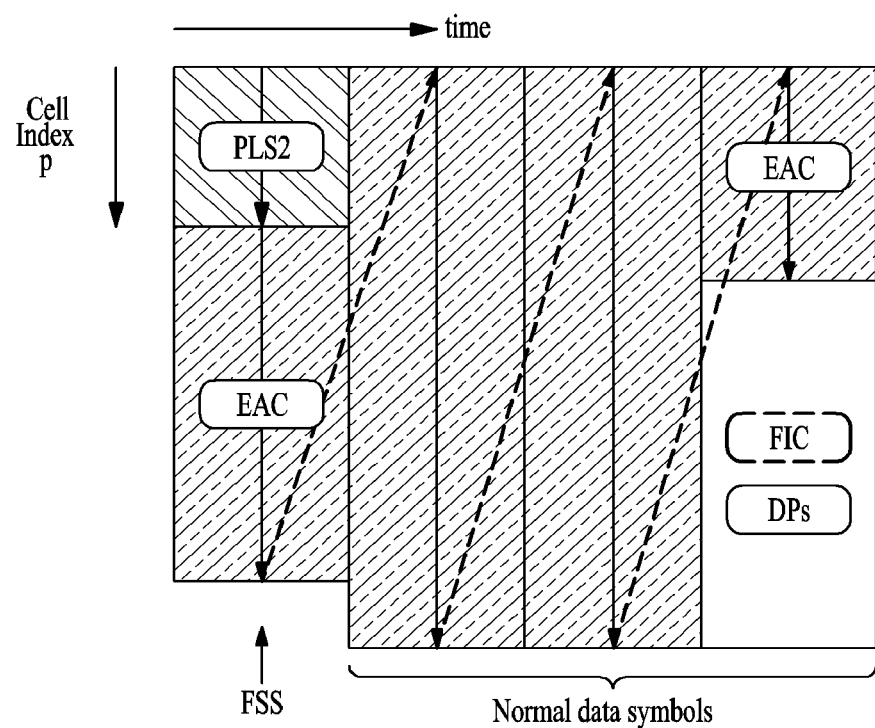
FIG. 18 illustrates EAC mapping according to an embodiment of the present invention.

FIG. 18 illustrates EAC mapping according to an embodiment of the present invention.

EAC is a dedicated channel for carrying EAS messages and links to the DPs for EAS. EAS support is provided but EAC itself may or may not be present in every frame. EAC, if any, is mapped immediately after the PLS2 cells. EAC is not preceded by any of the FIC, DPs, auxiliary streams or dummy cells other than the PLS cells. The procedure of mapping the EAC cells is exactly the same as that of the PLS.

The EAC cells are mapped from the next cell of the PLS2 in increasing order of the cell index as shown in the example in FIG. 18. Depending on the EAS message size, EAC cells may occupy a few symbols, as shown in FIG. 18.

EAC cells follow immediately after the last cell of the PLS2, and mapping continues downward until the last cell index of the last FSS. If the total number of required EAC cells exceeds the number of remaining active carriers of the last FSS mapping proceeds to the next symbol and continues in exactly the same manner as FSS(s). The next symbol for mapping in this case is the normal data symbol, which has more active carriers than a FSS.

After EAC mapping is completed, the FIC is carried next, if any exists. If FIC is not transmitted (as signaled in the PLS2 field), DPs follow immediately after the last cell of the EAC.

Figure 19:
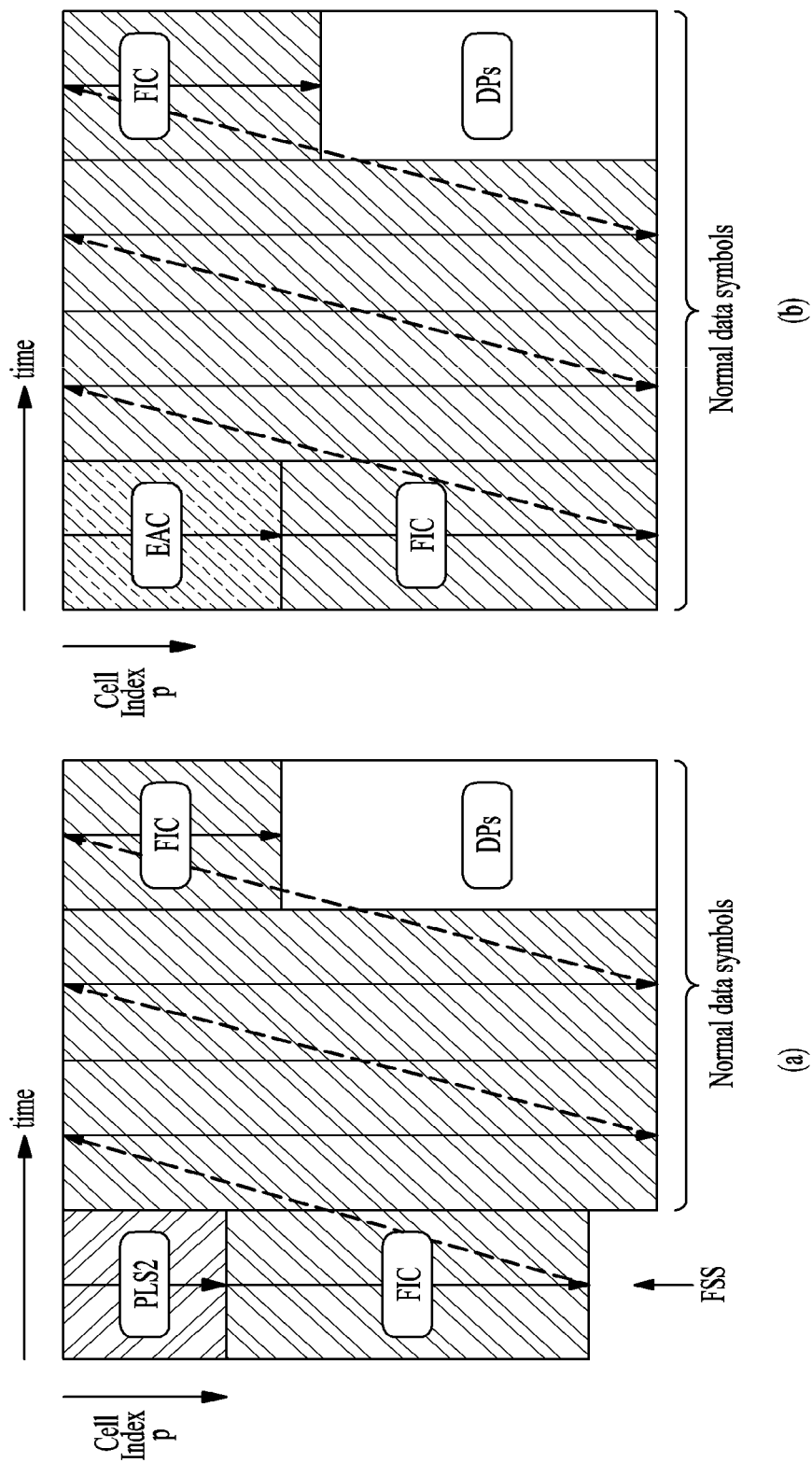
FIG. 19 illustrates FIC mapping according to an embodiment of the present invention.

FIG. 19 illustrates FIC mapping according to an embodiment of the present invention.

(a) shows an example mapping of FIC cell without EAC and (b) shows an example mapping of FIC cell with EAC.

FIC is a dedicated channel for carrying cross-layer information to enable fast service acquisition and channel scanning. This information primarily includes channel binding information between DPs and the services of each broadcaster. For fast scan, a receiver can decode FIC and obtain information such as broadcaster ID, number of services, and BASE_DP_ID. For fast service acquisition, in addition to FIC, base DP can be decoded using BASE_DP_ID. Other than the content it carries, a base DP is encoded and mapped to a frame in exactly the same way as a normal DP. Therefore, no additional description is required for a base DP. The FIC data is generated and consumed in the Management Layer. The content of FIC data is as described in the Management Layer specification.

The FIC data is optional and the use of FIC is signaled by the FIC_FLAG parameter in the static part of the PLS2. If FIC is used, FIC_FLAG is set to '1' and the signaling field for FIC is defined in the static part of PLS2. Signaled in this field are FIC_VERSION, and FIC_LENGTH_BYTE. FIC uses the same modulation, coding and time interleaving parameters as PLS2. FIC shares the same signaling parameters such as PLS2_MOD and PLS2_FEC. FIC data, if any, is mapped immediately after PLS2 or EAC if any. FIC is not preceded by any normal DPs, auxiliary streams or dummy cells. The method of mapping FIC cells is exactly the same as that of EAC which is again the same as PLS.

Without EAC after PLS, FIC cells are mapped from the next cell of the PLS2 in an increasing order of the cell index as shown in an example in (a). Depending on the FIC data size, FIC cells may be mapped over a few symbols, as shown in (b).

FIC cells follow immediately after the last cell of the PLS2, and mapping continues downward until the last cell index of the last FSS. If the total number of required FIC cells exceeds the number of remaining active carriers of the last FSS, mapping proceeds to the next symbol and continues in exactly the same manner as FSS(s). The next symbol for mapping in this case is the normal data symbol which has more active carriers than a FSS.

If EAS messages are transmitted in the current frame, EAC precedes FIC, and FIC cells are mapped from the next cell of the EAC in an increasing order of the cell index as shown in (b).

After FIC mapping is completed, one or more DPs are mapped, followed by auxiliary streams, if any, and dummy cells.

Figure 20:
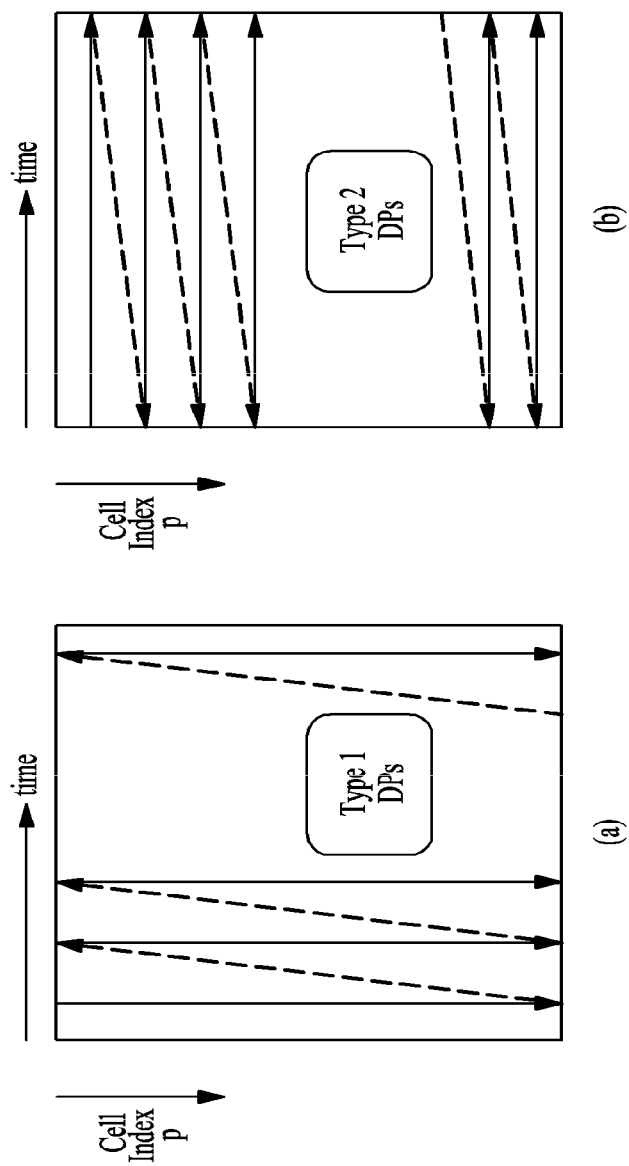
FIG. 20 illustrates a type of DP according to an embodiment of the present invention.

FIG. 20 illustrates a type of DP according to an embodiment of the present invention.

(a) shows type 1 DP and (b) shows type 2 DP.

After the preceding channels, i.e., PLS, EAC and FIC, are mapped, cells of the DPs are mapped. A DP is categorized into one of two types according to mapping method:

Type 1 DP: DP is mapped by TDM
Type 2 DP: DP is mapped by FDM

The type of DP is indicated by DP_TYPE field in the static part of PLS2. FIG. 20 illustrates the mapping orders of Type 1 DPs and Type 2 DPs. Type 1 DPs are first mapped in the increasing order of cell index, and then after reaching the last cell index, the symbol index is increased by one. Within the next symbol, the DP continues to be mapped in the increasing order of cell index starting from p=0. With a number of DPs mapped together in one frame, each of the Type 1 DPs are grouped in time, similar to TDM multiplexing of DPs.

Type 2 DPs are first mapped in the increasing order of symbol index, and then after reaching the last OFDM symbol of the frame, the cell index increases by one and the symbol index rolls back to the first available symbol and then increases from that symbol index. After mapping a number of DPs together in one frame, each of the Type 2 DPs are grouped in frequency together, similar to FDM multiplexing of DPs.

Type 1 DPs and Type 2 DPs can coexist in a frame if needed with one restriction; Type 1 DPs always precede Type 2 DPs. The total number of OFDM cells carrying Type 1 and Type 2 DPs cannot exceed the total number of OFDM cells available for transmission of DPs:

$$D_{DP1}+D_{DP2} \leq D_{DP}$$ [Math Figure 2]

where DDP1 is the number of OFDM cells occupied by Type 1 DPs, DDP2 is the number of cells occupied by Type 2 DPs. Since PLS, EAC, FIC are all mapped in the same way as Type 1 DP, they all follow "Type 1 mapping rule". Hence, overall, Type 1 mapping always precedes Type 2 mapping.

Figure 21:
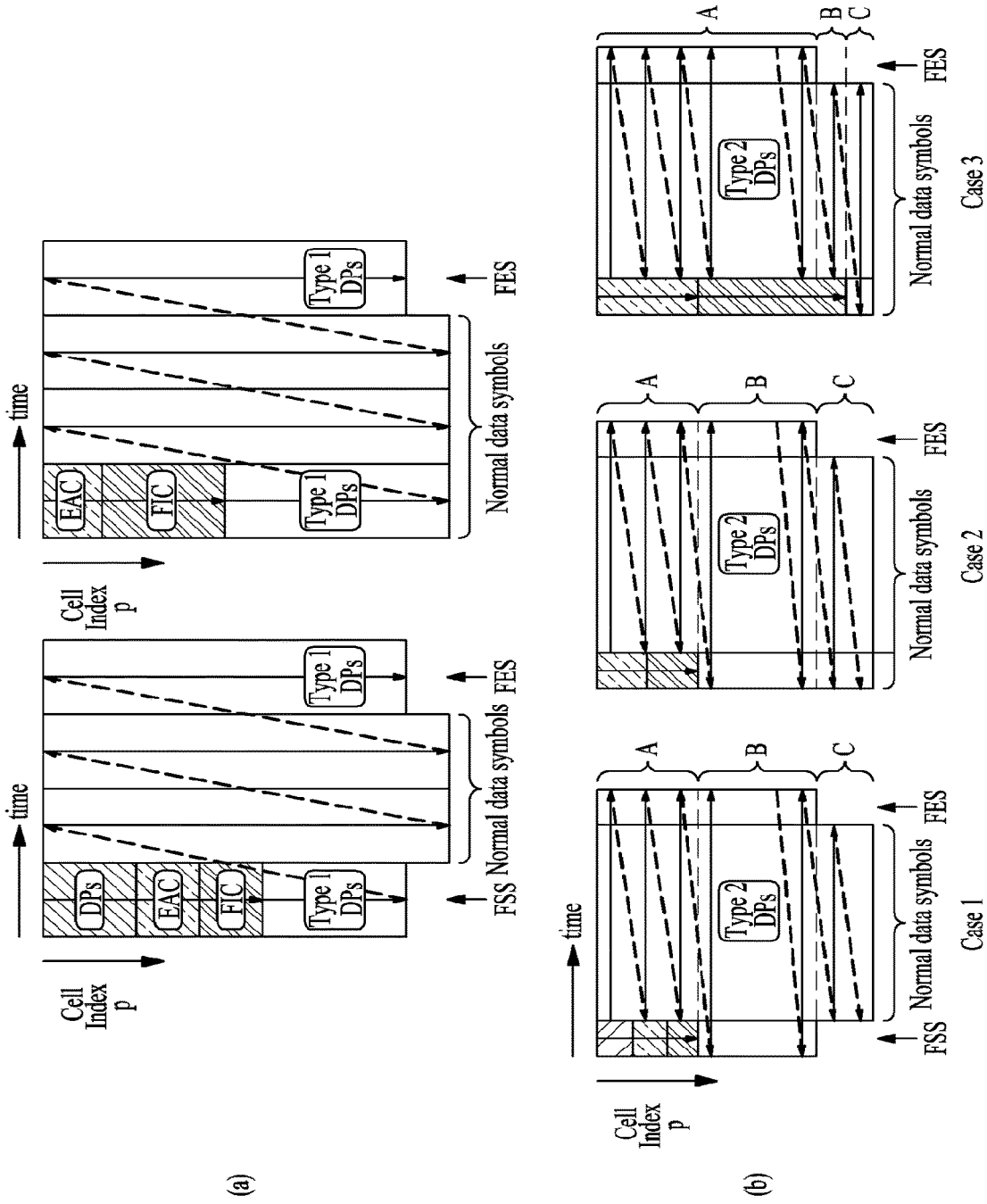
FIG. 21 illustrates DP mapping according to an embodiment of the present invention.

FIG. 21 illustrates DP mapping according to an embodiment of the present invention.

(a) shows an addressing of OFDM cells for mapping type 1 DPs and (b) shows an an addressing of OFDM cells for mapping for type 2 DPs.

Addressing of OFDM cells for mapping Type 1 DPs (0, . . . , DDP11) is defined for the active data cells of Type 1 DPs. The addressing scheme defines the order in which the cells from the TIs for each of the Type 1 DPs are allocated to the active data cells. It is also used to signal the locations of the DPs in the dynamic part of the PLS2.

Without EAC and FIC, address 0 refers to the cell immediately following the last cell carrying PLS in the last FSS. If EAC is transmitted and FIC is not in the corresponding frame, address 0 refers to the cell immediately following the last cell carrying EAC. If FIC is transmitted in the corresponding frame, address 0 refers to the cell immediately following the last cell carrying FIC. Address 0 for Type 1 DPs can be calculated considering two different cases as shown in (a). In the example in (a), PLS, EAC and FIC are assumed to be all transmitted. Extension to the cases where either or both of EAC and FIC are omitted is straightforward. If there are remaining cells in the FSS after mapping all the cells up to FIC as shown on the left side of (a).

Addressing of OFDM cells for mapping Type 2 DPs (0, . . . , DDP21) is defined for the active data cells of Type 2 DPs. The addressing scheme defines the order in which the cells from the TIs for each of the Type 2 DPs are allocated to the active data cells. It is also used to signal the locations of the DPs in the dynamic part of the PLS2.

Three slightly different cases are possible as shown in (b). For the first case shown on the left side of (b), cells in the last FSS are available for Type 2 DP mapping. For the second case shown in the middle, FIC occupies cells of a normal symbol, but the number of FIC cells on that symbol is not larger than $C_{FSS}$. The third case, shown on the right side in (b), is the same as the second case except that the number of FIC cells mapped on that symbol exceeds $C_{FSS}$.

The extension to the case where Type 1 DP(s) precede Type 2 DP(s) is straightforward since PLS, EAC and FIC follow the same "Type 1 mapping rule" as the Type 1 DP(s).

A data pipe unit (DPU) is a basic unit for allocating data cells to a DP in a frame.

A DPU is defined as a signaling unit for locating DPs in a frame. A Cell Mapper 7010 may map the cells produced by the TIs for each of the DPs. A Time interleaver 5050 outputs a series of TI-blocks and each TI-block comprises a variable number of XFECBLOCKs which is in turn composed of a set of cells. The number of cells in an XFECBLOCK, $N_{cells}$, is dependent on the FECBLOCK size, $N_{ldpc}$, and the number of transmitted bits per constellation symbol. A DPU is defined as the greatest common divisor of all possible values of the number of cells in a XFECBLOCK, $N_{cells}$, supported in a given PHY profile. The length of a DPU in cells is defined as $L_{DPU}$. Since each PHY profile supports different combinations of FECBLOCK size and a different number of bits per constellation symbol, $L_{DPU}$ is defined on a PHY profile basis.

Figure 22:
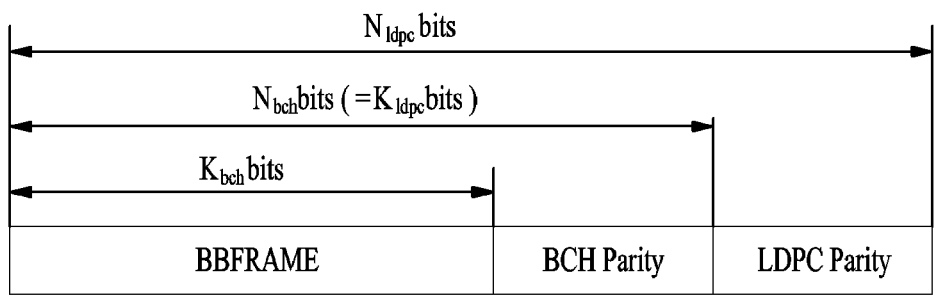
FIG. 22 illustrates an FEC structure according to an embodiment of the present invention.

FIG. 22 illustrates an FEC structure according to an embodiment of the present invention.

FIG. 22 illustrates an FEC structure according to an embodiment of the present invention before bit interleaving. As above mentioned, Data FEC encoder may perform the FEC encoding on the input BBF to generate FECBLOCK procedure using outer coding (BCH), and inner coding (LDPC). The illustrated FEC structure corresponds to the FECBLOCK. Also, the FECBLOCK and the FEC structure have same value corresponding to a length of LDPC codeword.

The BCH encoding is applied to each BBF ($K_{bch}$ bits), and then LDPC encoding is applied to BCH-encoded BBF ($K_{ldpc}$ bits=$N_{bch}$ bits) as illustrated in FIG. 22.

The value of $N_{ldpc}$ is either 64800 bits (long FECBLOCK) or 16200 bits (short FECBLOCK).

The below table 28 and table 29 show FEC encoding parameters for a long FECBLOCK and a short FECBLOCK, respectively.

TABLE 28

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 64800 | 21600 | 21408 | 12 | 192 |
| 6/15 | | 25920 | 25728 | | |
| 7/15 | | 30240 | 30048 | | |
| 8/15 | | 34560 | 34368 | | |
| 9/15 | | 38880 | 38688 | | |
| 10/15 | | 43200 | 43008 | | |
| 11/15 | | 47520 | 47328 | | |
| 12/15 | | 51840 | 51648 | | |
| 13/15 | | 56160 | 55968 | | |

TABLE 29

| LDPC Rate | $N_{ldpc}$ | $K_{ldpc}$ | $K_{bch}$ | BCH error correction capability | $N_{bch}$-$K_{bch}$ |
|---|---|---|---|---|---|
| 5/15 | 16200 | 5400 | 5232 | 12 | 168 |
| 6/15 | | 6480 | 6312 | | |
| 7/15 | | 7560 | 7392 | | |
| 8/15 | | 8640 | 8472 | | |
| 9/15 | | 9720 | 9552 | | |
| 10/15 | | 10800 | 10632 | | |
| 11/15 | | 11880 | 11712 | | |
| 12/15 | | 12960 | 12792 | | |
| 13/15 | | 14040 | 13872 | | |

The details of operations of the BCH encoding and LDPC encoding are as follows:

A 12-error correcting BCH code is used for outer encoding of the BBF. The BCH generator polynomial for short FECBLOCK and long FECBLOCK are obtained by multiplying together all polynomials.

LDPC code is used to encode the output of the outer BCH encoding. To generate a completed $B_{ldpc}$ (FECBLOCK), $P_{ldpc}$ (parity bits) is encoded systematically from each $I_{ldpc}$ (BCH-encoded BBF), and appended to $I_{ldpc}$. The completed $B_{ldpc}$ (FECBLOCK) are expressed as follow Math figure.

$$B_{ldpc}=[I_{ldpc}P_{ldpc}]=[i_0,i_1,\ldots,i_{K_{ldpc}-1},p_0,p_1,\ldots,p_{N_{ldpc}-K_{ldpc}-1}]$$ [Math Figure 3]

The parameters for long FECBLOCK and short FECBLOCK are given in the above table 28 and 29, respectively.

The detailed procedure to calculate $N_{ldpc}$-$K_{ldpc}$ parity bits for long FECBLOCK, is as follows:

1) Initialize the parity bits, $$p_0=p_1=p_2=\ldots=p_{N_{ldpc}-K_{ldpc}-1}=0$$ [Math Figure 4]

2) Accumulate the first information bit—$i_0$, at parity bit addresses specified in the first row of an addresses of parity check matrix. The details of addresses of parity check matrix will be described later. For example, for rate 13/15:

$$p_{983} = p_{983} \oplus i_0$$ [Math Figure 5]
$$p_{2815} = p_{2815} \oplus i_0$$
$$p_{4837} = p_{4837} \oplus i_0$$
$$p_{4989} = p_{4989} \oplus i_0$$
$$p_{6138} = p_{6138} \oplus i_0$$
$$p_{6458} = p_{6458} \oplus i_0$$
$$p_{6921} = p_{6921} \oplus i_0$$
$$p_{6974} = p_{6974} \oplus i_0$$
$$p_{7572} = p_{7572} \oplus i_0$$
$$p_{8260} = p_{8260} \oplus i_0$$
$$p_{8496} = p_{8496} \oplus i_0$$

3) For the next 359 information bits, $i_s$, s=1, 2, ..., 359 accumulate $i_s$ at parity bit addresses using following Math figure.

$$\{x+(s \bmod 360) \times Q_{ldpc}\} \bmod (N_{ldpc}-K_{ldpc})$$ [Math Figure 6]

where x denotes the address of the parity bit accumulator corresponding to the first bit $i_0$, and $Q_{ldpc}$ is a code rate dependent constant specified in the addresses of parity check matrix. Continuing with the example, $Q_{ldpc}$=24 for rate 13/15, so for information bit $i_1$, the following operations are performed:

$$p_{1007} = p_{1007} \oplus i_1$$ [Math Figure 7]
$$p_{2839} = p_{2839} \oplus i_1$$
$$p_{4861} = p_{4861} \oplus i_1$$
$$p_{5013} = p_{5013} \oplus i_1$$
$$p_{6162} = p_{6162} \oplus i_1$$
$$p_{6482} = p_{6482} \oplus i_1$$
$$p_{6945} = p_{6945} \oplus i_1$$
$$p_{6998} = p_{6998} \oplus i_1$$
$$p_{7596} = p_{7596} \oplus i_1$$
$$p_{8284} = p_{8284} \oplus i_1$$
$$p_{8520} = p_{8520} \oplus i_1$$

4) For the 361st information bit $i_{360}$, the addresses of the parity bit accumulators are given in the second row of the addresses of parity check matrix. In a similar manner the addresses of the parity bit accumulators for the following 359 information bits is, s=361, 362, ..., 719 are obtained using the Math Figure 6, where x denotes the address of the parity bit accumulator corresponding to the information bit $i_{360}$, i.e., the entries in the second row of the addresses of parity check matrix.

In a similar manner, for every group of 360 new information bits, a new row from addresses of parity check matrixes used to find the addresses of the parity bit accumulators.

After all of the information bits are exhausted, the final parity bits are obtained as follows:

6) Sequentially perform the following operations starting with i=1

$$p_i = p_i \oplus p_{i-1}, i=1, 2, \ldots, N_{ldpc} - K_{ldpc} - 1 \quad \text{[Math Figure 8]}$$

where final content of $p_i$, i=0, 1, ... $N_{ldpc} - K_{ldpc} - 1$ is equal to the parity bit $p_i$.

TABLE 30

| Code Rate | $Q_{ldpc}$ |
| --- | --- |
| 5/15 | 120 |
| 6/15 | 108 |
| 7/15 | 96 |
| 8/15 | 84 |
| 9/15 | 72 |
| 10/15 | 60 |
| 11/15 | 48 |
| 12/15 | 36 |
| 13/15 | 24 |

This LDPC encoding procedure for a short FECBLOCK is in accordance with t LDPC encoding procedure for the long FECBLOCK, except replacing the table 30 with table 31, and replacing the addresses of parity check matrix for the long FECBLOCK with the addresses of parity check matrix for the short FECBLOCK.

TABLE 31

| Code Rate | $Q_{ldpc}$ |
| --- | --- |
| 5/15 | 30 |
| 6/15 | 27 |
| 7/15 | 24 |
| 8/15 | 21 |
| 9/15 | 18 |
| 10/15 | 15 |
| 11/15 | 12 |
| 12/15 | 9 |
| 13/15 | 6 |

Figure 23:
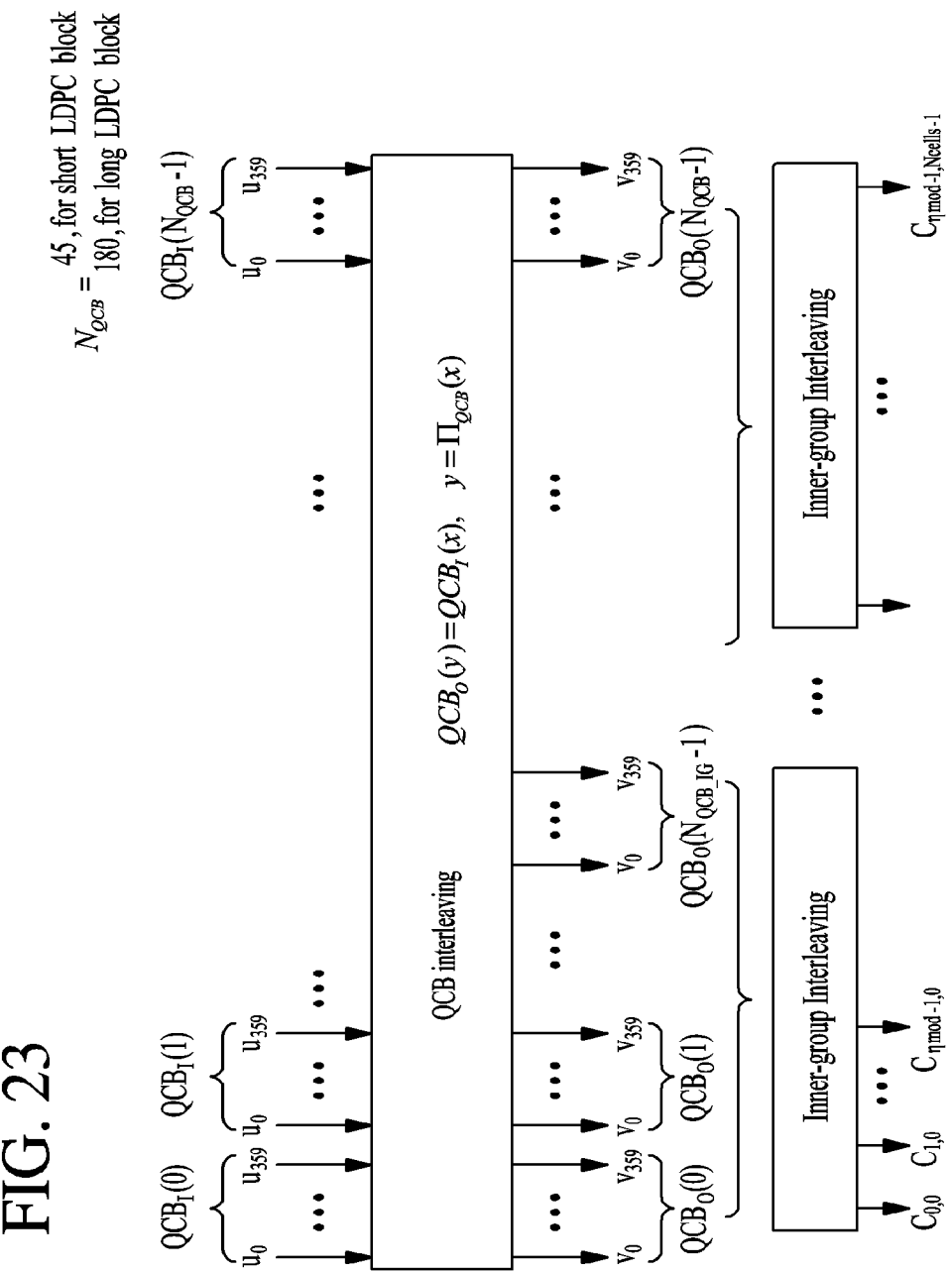
FIG. 23 illustrates a bit interleaving according to an embodiment of the present invention.

FIG. 23 illustrates a bit interleaving according to an embodiment of the present invention.

The outputs of the LDPC encoder are bit-interleaved, which consists of parity interleaving followed by Quasi-Cyclic Block (QCB) interleaving and inner-group interleaving.

(a) shows Quasi-Cyclic Block (QCB) interleaving and (b) shows inner-group interleaving.

The FECBLOCK may be parity interleaved. At the output of the parity interleaving, the LDPC codeword consists of 180 adjacent QC blocks in a long FECBLOCK and 45 adjacent QC blocks in a short FECBLOCK. Each QC block in either a long or short FECBLOCK consists of 360 bits. The parity interleaved LDPC codeword is interleaved by QCB interleaving. The unit of QCB interleaving is a QC block. The QC blocks at the output of parity interleaving are permutated by QCB interleaving as illustrated in FIG. 23, where $N_{cells} = 64800/\eta_{mod}$ or $16200/\eta_{mod}$ according to the FECBLOCK length. The QCB interleaving pattern is unique to each combination of modulation type and LDPC code rate.

After QCB interleaving, inner-group interleaving is performed according to modulation type and order ($\eta_{mod}$) which is defined in the below table 32. The number of QC blocks for one inner-group, $N_{QCB\_IG}$, is also defined.

TABLE 32

| Modulation type | $\eta_{mod}$ | $N_{QCB\_IG}$ |
| --- | --- | --- |
| QAM-16 | 4 | 2 |
| NUC-16 | 4 | 4 |
| NUQ-64 | 6 | 3 |
| NUC-64 | 6 | 6 |
| NUQ-256 | 8 | 4 |
| NUC-256 | 8 | 8 |
| NUQ-1024 | 10 | 5 |
| NUC-1024 | 10 | 10 |

The inner-group interleaving process is performed with $N_{QCB\_IG}$ QC blocks of the QCB interleaving output. Inner-group interleaving has a process of writing and reading the bits of the inner-group using 360 columns and $N_{QCB\_IG}$ rows. In the write operation, the bits from the QCB interleaving output are written row-wise. The read operation is performed column-wise to read out m bits from each row, where m is equal to 1 for NUC and 2 for NUQ.

Figure 24:
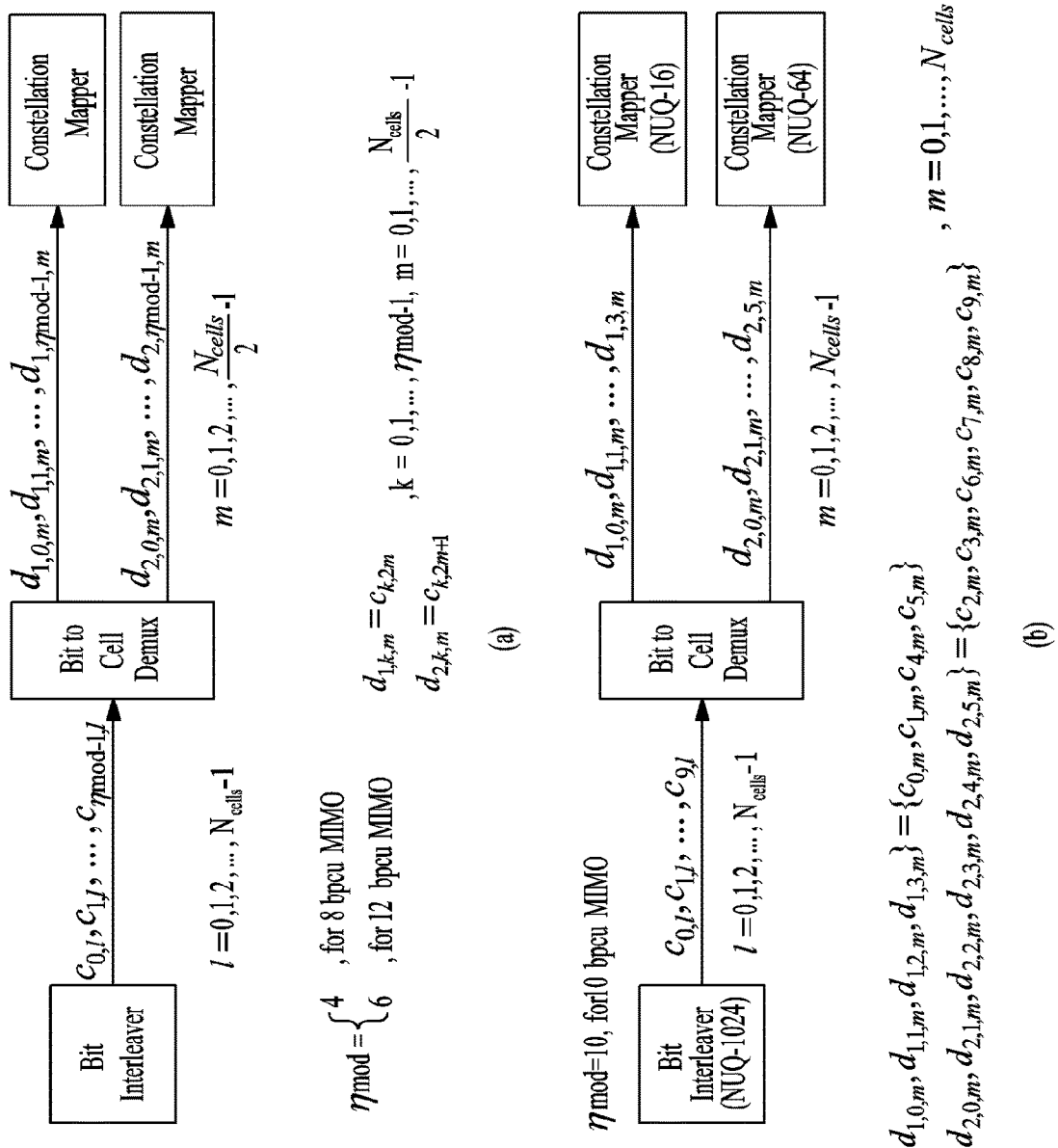
FIG. 24 illustrates a cell-word demultiplexing according to an embodiment of the present invention.

FIG. 24 illustrates a cell-word demultiplexing according to an embodiment of the present invention.

(a) shows a cell-word demultiplexing for 8 and 12 bpcu MIMO and (b) shows a cell-word demultiplexing for 10 bpcu MIMO.

Each cell word $(c_{0,l}, c_{1,l}, \ldots, c_{nmod-1,l})$ of the bit interleaving output is demultiplexed into $(d_{1,0,m}, d_{1,1,m} \ldots, d_{1,nmod-1,m})$ and $(d_{2,0,m}, d_{2,1,m} \ldots, d_{2,nmod-1,m})$ as shown in (a), which describes the cell-word demultiplexing process for one XFECBLOCK.

For the 10 bpcu MIMO case using different types of NUQ for MIMO encoding, the Bit Interleaver for NUQ-1024 is re-used. Each cell word $(c_{0,l}, c_{1,l}, \ldots, c_{9,l})$ of the Bit Interleaver output is demultiplexed into $(d_{1,0,m}, d_{1,1,m} \ldots, d_{1,3,m})$ and $(d_{2,0,m}, d_{2,1,m} \ldots, d_{2,5,m})$, as shown in (b).

Figure 25:
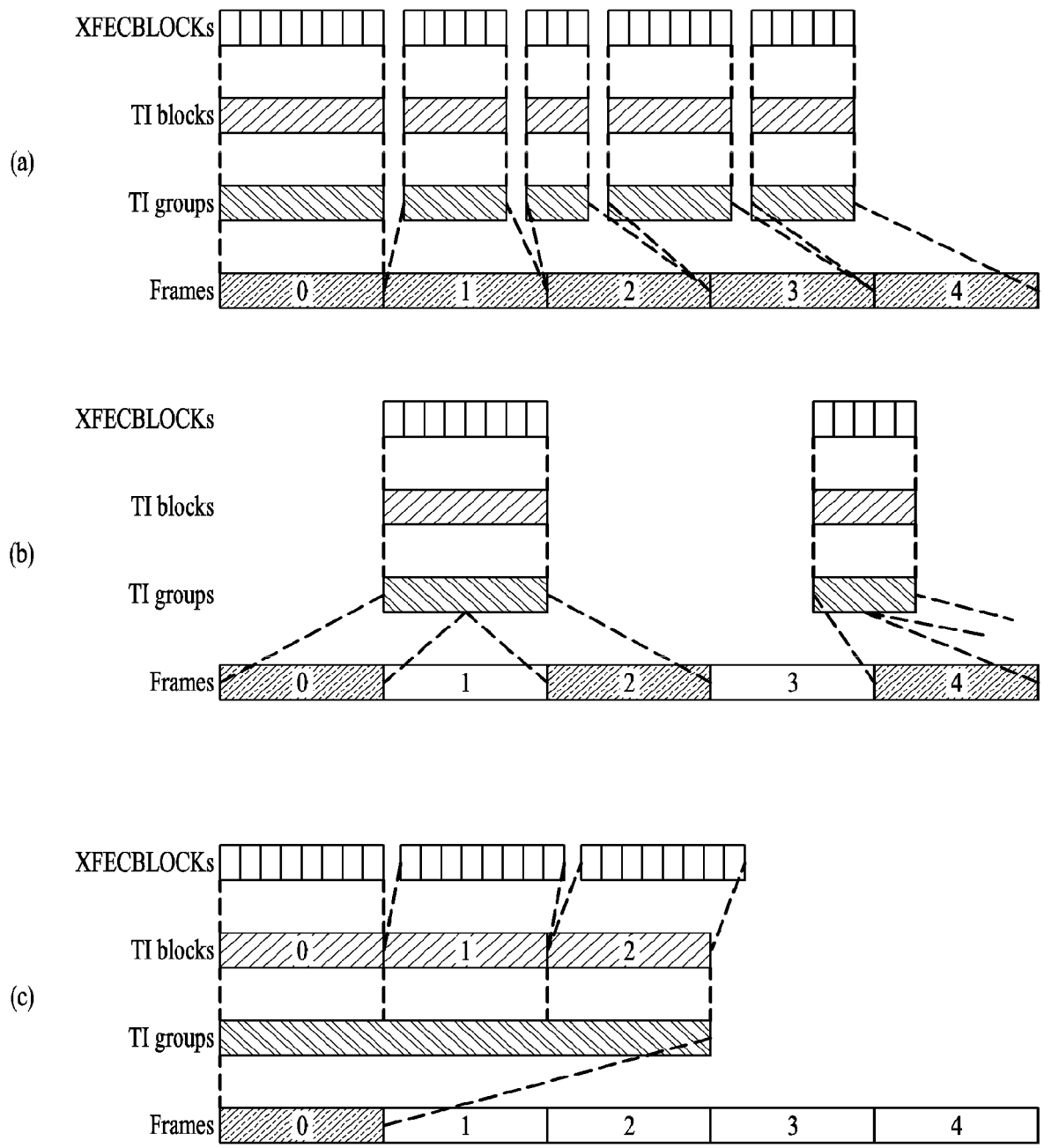
FIG. 25 illustrates a time interleaving according to an embodiment of the present invention.

FIG. 25 illustrates a time interleaving according to an embodiment of the present invention.

(a) to (c) show examples of TI mode.

The time interleaver operates at the DP level. The parameters of time interleaving (TI) may be set differently for each DP.

The following parameters, which appear in part of the PLS2-STAT data, configure the TI:

DP_TI_TYPE (allowed values: 0 or 1): Represents the TI mode; '0' indicates the mode with multiple TI blocks (more than one TI block) per TI group. In this case, one TI group is directly mapped to one frame (no inter-frame interleaving). '1' indicates the mode with only one TI block per TI group. In this case, the TI block may be spread over more than one frame (inter-frame interleaving).

DP_TI_LENGTH: If DP_TI_TYPE='0', this parameter is the number of TI blocks $N_{TI}$ per TI group. For DP_TI_TYPE='1', this parameter is the number of frames $P_I$ spread from one TI group.

DP_NUM_BLOCK_MAX (allowed values: 0 to 1023): Represents the maximum number of XFECBLOCKs per TI group.

DP_FRAME_INTERVAL (allowed values: 1, 2, 4, 8): Represents the number of the frames $I_{JUMP}$ between two successive frames carrying the same DP of a given PHY profile.

DP_TI_BYPASS (allowed values: 0 or 1): If time interleaving is not used for a DP, this parameter is set to '1'. It is set to '0' if time interleaving is used.

Additionally, the parameter DP_NUM_BLOCK from the PLS2-DYN data is used to represent the number of XFEC-BLOCKs carried by one TI group of the DP.

When time interleaving is not used for a DP, the following TI group, time interleaving operation, and TI mode are not considered. However, the Delay Compensation block for the dynamic configuration information from the scheduler will still be required. In each DP, the XFECBLOCKs received from the SSD/MIMO encoding are grouped into TI groups. That is, each TI group is a set of an integer number of XFECBLOCKs and will contain a dynamically variable number of XFECBLOCKs. The number of XFECBLOCKs in the TI group of index n is denoted by $N_{xBLOCK\_Group}(n)$ and is signaled as DP_NUM_BLOCK in the PLS2-DYN data. Note that $N_{xBLOCK\_Group}(n)$ may vary from the minimum value of 0 to the maximum value $N_{xBLOCK\_Group\_MAX}$ (corresponding to DP_NUM_BLOCK_MAX) of which the largest value is 1023.

Each TI group is either mapped directly onto one frame or spread over $P_I$ frames. Each TI group is also divided into more than one TI blocks ($N_{TI}$), where each TI block corresponds to one usage of time interleaver memory. The TI blocks within the TI group may contain slightly different numbers of XFECBLOCKs. If the TI group is divided into multiple TI blocks, it is directly mapped to only one frame. There are three options for time interleaving (except the extra option of skipping the time interleaving) as shown in the below table 33.

TABLE 33

| Modes | Descriptions |
| --- | --- |
| Option-1 | Each TI group contains one TI block and is mapped directly to one frame as shown in (a). This option is signaled in the PLS2-STAT by DP_TI_TYPE = '0' and DP_TI_LENGTH = '1' (NTI = 1). |
| Option-2 | Each TI group contains one TI block and is mapped to more than one frame. (b) shows an example, where one TI group is mapped to two frames, i.e., DP_TI_LENGTH = '2' (PI = 2) and DP_FRAME_INTERVAL (IJUMP = 2). This provides greater time diversity for low data-rate services. This option is signaled in the PLS2-STAT by DP_TI_TYPE = '1'. |
| Option-3 | Each TI group is divided into multiple TI blocks and is mapped directly to one frame as shown in (c). Each TI block may use full TI memory, so as to provide the maximum bit-rate for a DP. This option is signaled in the PLS2-STAT signaling by DP_TI_TYPE = '0' and DP_TI_LENGTH = NTI, while PI = 1. |

In each DP, the TI memory stores the input XFECBLOCKs (output XFECBLOCKs from the SSD/MIMO encoding block). Assume that input XFECBLOCKs are defined as $(d_{n,s,0,0}, d_{n,s,0,1}, \ldots, d_{n,s,0,N_{cells}-1},$
$d_{n,s,1,N_{cells}-1}, \ldots,$
$d_{n,s,N_{xBLOCK\_TI(n,s)}-1,0}, \ldots,$
$d_{n,s,N_{xBLOCK\_TI(n,s)}-1,N_{cells}-1}),$ where $d_{n,s,r,q}$ is the qth cell of the rth XFECBLOCK in the sth TI block of the nth TI group and represents the outputs of SSD and MIMO encodings as follows.

$$d_{n,s,r,q} = \begin{cases} f_{n,s,r,q}, & \text{the output of SSD... encoding} \\ g_{n,s,r,q}, & \text{the output of MIMO encoding} \end{cases}$$

In addition, assume that output XFECBLOCKs from the time interleaver are defined as $(h_{n,s,0}, h_{n,s,1}, \ldots, h_{n,s,i}, \ldots,$
$h_{n,s,N_{xBLOCK\_TI(n,s)} \times N_{cells}-1}),$ where $h_{n,s,i}$ is the ith output cell (for i=0, ..., $N_{xBLOCK\_TI}(n,s) \times N_{cells}-1$) in the sth TI block of the nth TI group.

Typically, the time interleaver will also act as a buffer for DP data prior to the process of frame building. This is achieved by means of two memory banks for each DP. The first TI-block is written to the first bank. The second TI-block is written to the second bank while the first bank is being read from and so on.

The TI is a twisted row-column block interleaver. For the sth TI block of the nth TI group, the number of rows $N_r$ of a TI memory is equal to the number of cells $N_{cells}$, i.e., $N_r = N_{cells}$ while the number of columns $N_c$ is equal to the number $N_{xBLOCK\_TI}(n,s)$.

Figure 26:
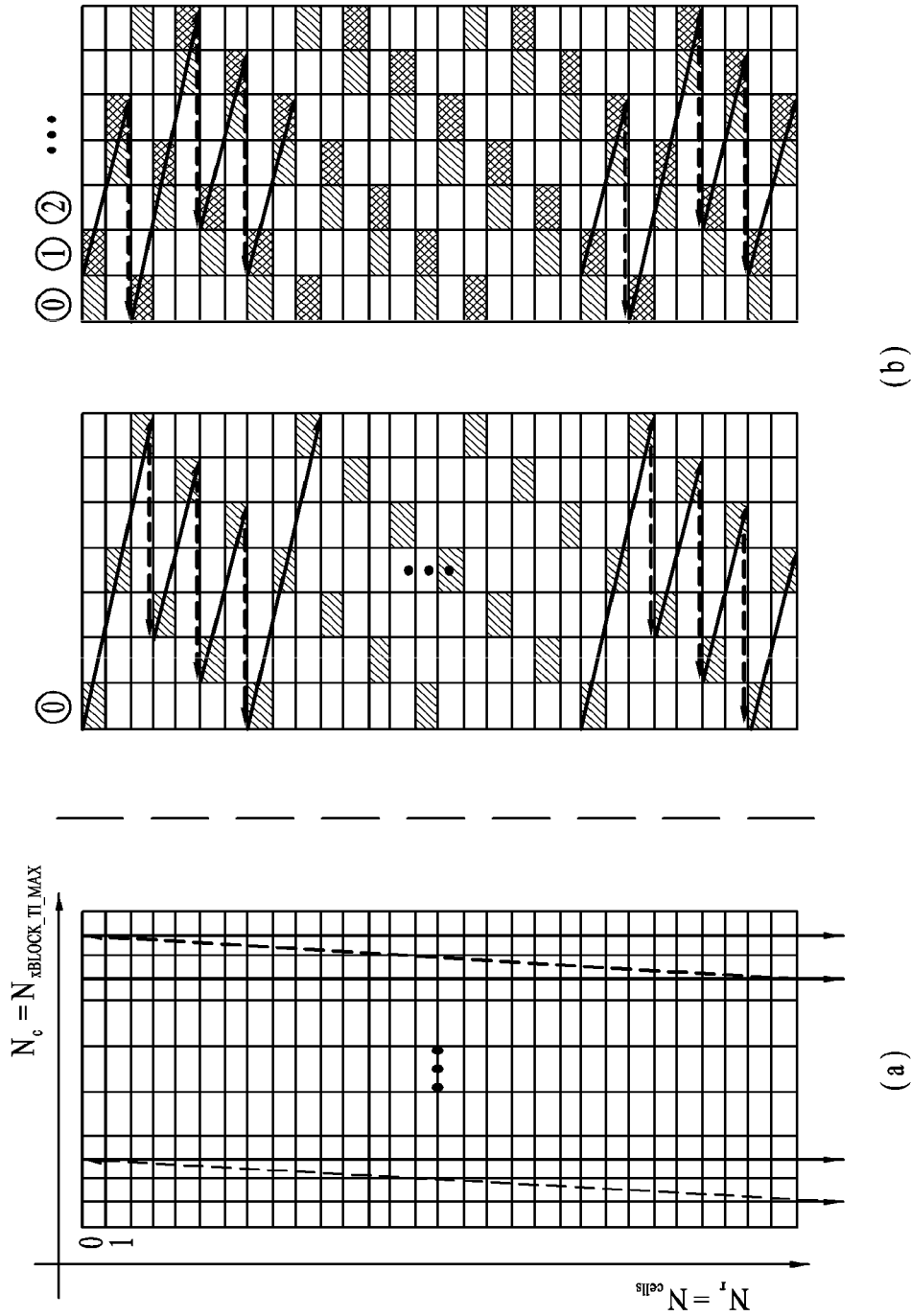
FIG. 26 illustrates the basic operation of a twisted row-column block interleaver according to an embodiment of the present invention.

FIG. 26 illustrates the basic operation of a twisted row-column block interleaver according to an embodiment of the present invention.

shows a writing operation in the time interleaver and (b) shows a reading operation in the time interleaver The first XFECBLOCK is written column-wise into the first column of the TI memory, and the second XFECBLOCK is written into the next column, and so on as shown in (a). Then, in the interleaving array, cells are read out diagonal-wise. During diagonal-wise reading from the first row (rightwards along the row beginning with the left-most column) to the last row, $N_r$ cells are read out as shown in (b). In detail, assuming $z_{n,s,i}$ (i=0, ..., $N_r N_c$) as the TI memory cell position to be read sequentially, the reading process in such an interleaving array is performed by calculating the row index $R_{n,s,i}$, the column index $C_{n,s,i}$, and the associated twisting parameter $T_{n,s,i}$ as follows expression.

$$GENERATE(R_{n,s,i}, C_{n,s,1}) = \qquad \text{[Math Figure 9]}$$
$$\{$$
$$R_{n,s,i} = \mod(i, N_r),$$
$$T_{n,s,i} = \mod(S_{shift} \times S_{n,s,i}, S_c)$$
$$C_{n,s,i} = \mod\left(T_{n,s,i} + \left\lfloor \frac{i}{N_r} \right\rfloor, N_c\right)$$
$$\}$$

where $S_{shift}$ is a common shift value for the diagonal-wise reading process regardless of $N_{xBLOCK\_TI}(n,s)$, and it is determined by $N_{xBLOCK\_TI\_MAX}$ given in the PLS2-STAT as follows expression.

$$\text{for} \begin{cases} N'_{xBLOCK\_TI\_MAX} = N_{xBLOCK\_TI\_MAX} + 1, & \text{if } N_{xBLOCK\_TI\_MAX} \mod 2 = 0 \\ N'_{xBLOCK\_TI\_MAX} = N_{xBLOCK\_TI\_MAX}, & \text{if } N_{xBLOCK\_TI\_MAX} \mod 2 = 1' \end{cases} \quad \text{[Math Figure 10]}$$

$$S_{shift} = \frac{N'_{xBLOCK\_TI\_MAX} - 1}{2}$$

As a result, the cell positions to be read are calculated by a coordinate as $z_{n,s,i}=N_r C_{n,s,i}+R_{n,s,i}$.

Figure 27:
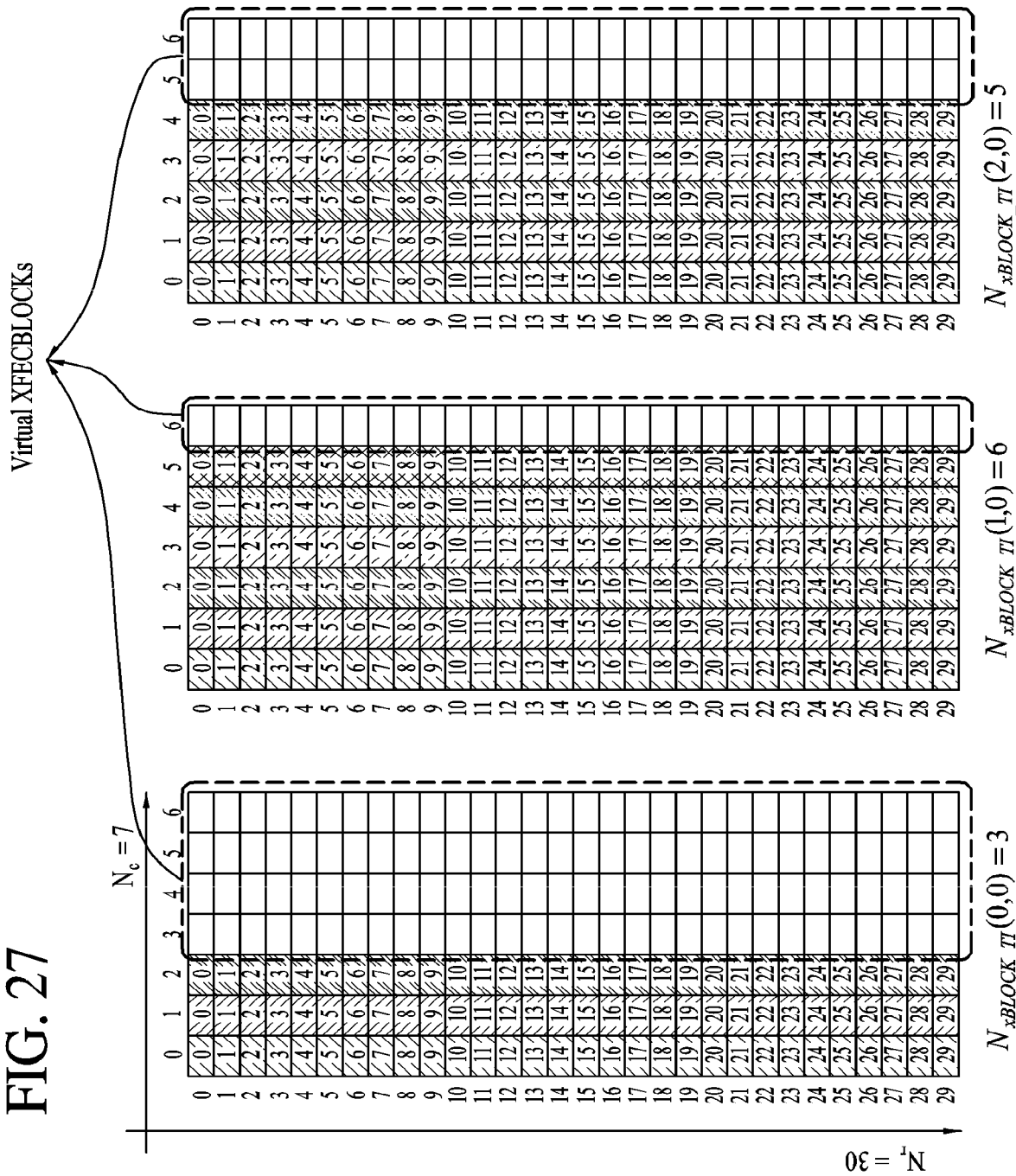
FIG. 27 illustrates an operation of a twisted row-column block interleaver according to another embodiment of the present invention.

FIG. 27 illustrates an operation of a twisted row-column block interleaver according to another embodiment of the present invention.

More specifically, FIG. 27 illustrates the interleaving array in the TI memory for each TI group, including virtual XFECBLOCKs when $N_{xBLOCK\_TI}(0,0)=3$, $N_{xBLOCK\_TI}(1,0)=6$, $N_{xBLOCK\_TI}(2,0)=5$.

The variable number $N_{xBLOCK\_TI}(n,s)=N_r$ will be less than or equal to $N'_{xBLOCK\_TI\_MAX}$. Thus, in order to achieve a single-memory deinterleaving at the receiver side, regardless of $N_{xBLOCK\_TI}(n,s)$, the interleaving array for use in a twisted row-column block interleaver is set to the size of $N_r \times N_c = N_{cells} \times N'N_{xBLOCK\_TI\_MAX}$ by inserting the virtual XFECBLOCKs into the TI memory and the reading process is accomplished as follow expression.

Math Figure 11

$$p=0;$$
$$\text{for } 1=0; \ i<N_{cells} \ N'_{xBLOCK\_TI\_MAX} ; i=i+1$$
$$\{\text{GENERATE } (R_{n,s,i}, C_{n,s,i}) ;$$
$$V_i = N_r \ C_{n,s,i} + R_{n,s,i}$$
$$\text{If } V_i < N_{cells} \ N_{xBLOCK\_TI} \ (n, s)$$
$$\{$$
$$Z_{n,s,p} = V_i \ ; p=p+1;$$
$$\}$$
$$\}$$

The number of TI groups is set to 3. The option of time interleaver is signaled in the PLS2-STAT data by DP_TI_TYPE='0', DP_FRAME_INTERVAL='1', and DP_TI_LENGTH='1', i.e., $N_{TI}=1$, $I_{JUMP}=1$, and $P_I=1$. The number of XFECBLOCKs, each of which has $N_{cells}=30$ cells, per TI group is signaled in the PLS2-DYN data by $N_{xBLOCK\_TI}(0,0)=3$, $N_{xBLOCK\_TI}(1,0)=6$, and $N_{xBLOCK\_TI}(2,0)=5$, respectively. The maximum number of XFECBLOCK is signaled in the PLS2-STAT data by $N_{xBLOCK\_Group\_Max}$, which leads to $\lfloor N_{xBLOCK\_Group\_Max}/N_{TI} \rfloor = N_{xBLOCK\_TI\_MAX}=6$.

Figure 28:
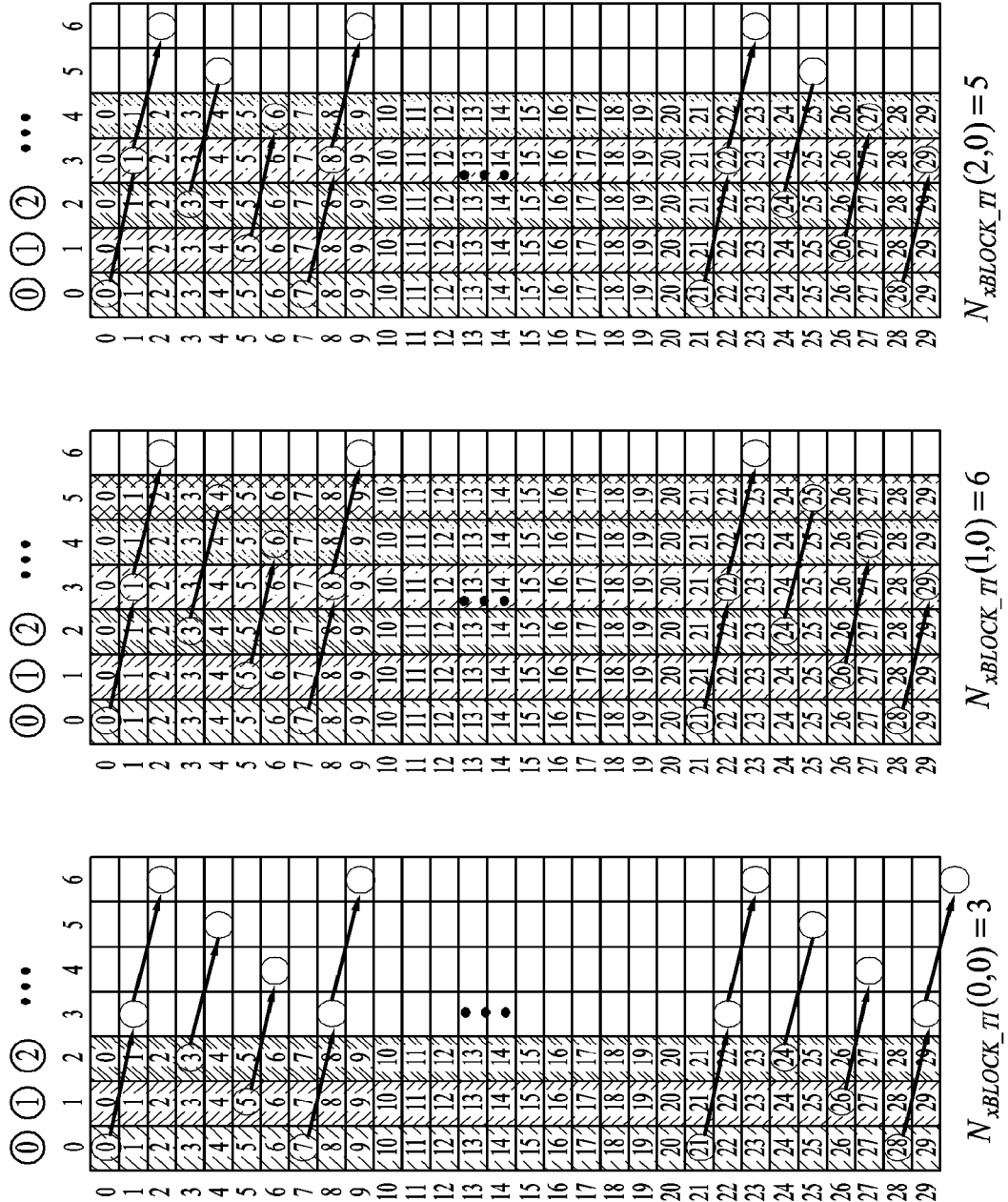
FIG. 28 illustrates a diagonal-wise reading pattern of a twisted row-column block interleaver according to an embodiment of the present invention.

FIG. 28 illustrates a diagonal-wise reading pattern of a twisted row-column block interleaver according to an embodiment of the present invention.

More specifically FIG. 28 shows a diagonal-wise reading pattern from each interleaving array with parameters of $N'N_{xBLOCK\_TI\_MAX}=7$ and $S_{shift}=(7-1)/2=3$. Note that in the reading process shown as pseudocode above, if $V_i \geq N_{cells} N_{xBLOCK\_TI}(n,s)$, the value of $V_i$ is skipped and the next calculated value of $V_i$ is used.

Figure 29:
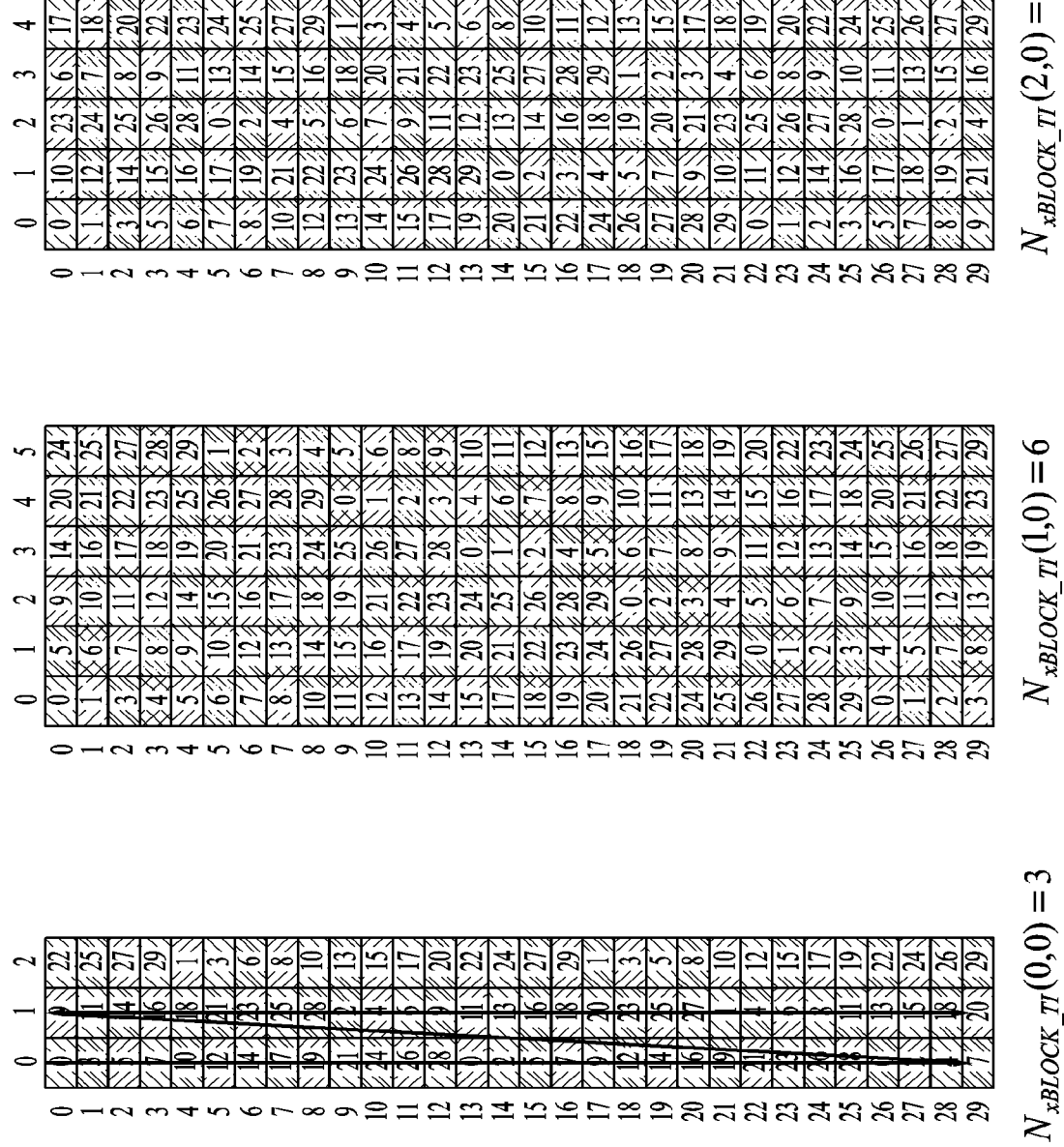
FIG. 29 illustrates interleaved XFECBLOCKs from each interleaving array according to an embodiment of the present invention.

FIG. 29 illustrates interleaved XFECBLOCKs from each interleaving array according to an embodiment of the present invention.

FIG. 29 illustrates the interleaved XFECBLOCKs from each interleaving array with parameters of $N'N_{xBLOCK\_TI\_MAX}=7$ and $S_{shift}=3$.

Figure 30:
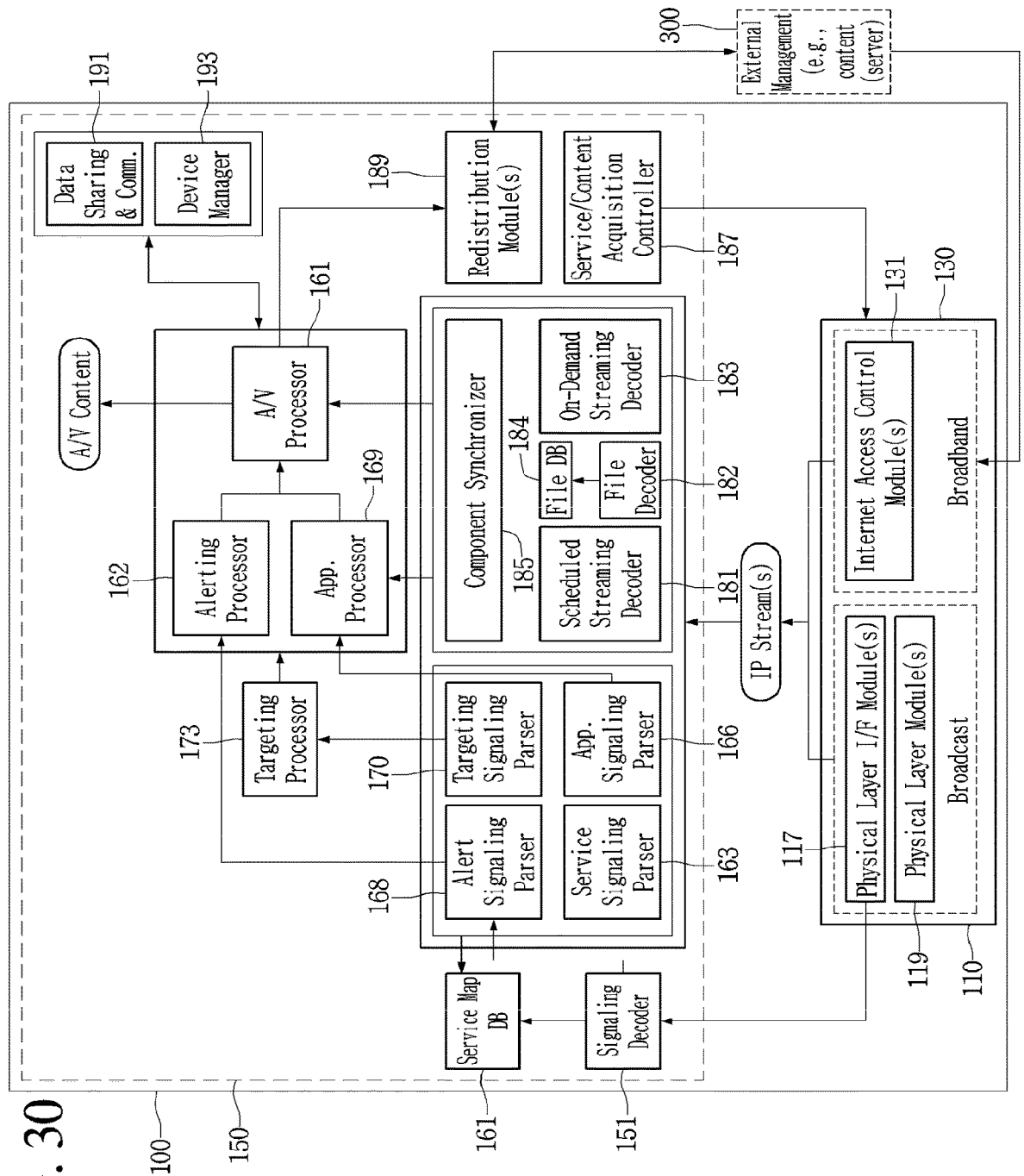
FIG. 30 is a view illustrating a configuration of a broadcast receiving device according to an embodiment of the present invention.

FIG. 30 is a view illustrating a configuration of a broadcast receiving device according to another embodiment of the present invention.

In an embodiment of FIG. 30, the broadcast receiving device 100 of FIG. 30 includes a broadcast reception unit 110, an internet protocol (IP) communication unit 130, and a control unit 150.

The broadcast reception unit 110 may include one or more processors, one or more circuits, and one or more hardware modules, which perform each of a plurality of functions that the broadcast reception unit 110 performs. In more detail, the broadcast reception unit 110 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The broadcast reception unit 110 may include a physical layer module 119 and a physical layer IP frame module 117. The physical layer module 119 receives and processes a broadcast related signal through a broadcast channel of a broadcast network. The physical layer IP frame module 117 converts a data packet such as an IP datagram obtained from the physical layer module 119 into a specific frame. For example, the physical layer module 119 may convert an IP datagram into an RS Frame or GSE.

The IP communication unit 130 may include one or more processors, one or more circuits, and one or more hardware modules, which perform each of a plurality of functions that the IP communication unit 130 performs. In more detail, the IP communication unit 130 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The IP communication unit 130 may include an internet access control module 131. The internet access control module 131 may control an operation of the broadcast receiving device 100 to obtain at least one of service, content, and signaling data through an internet communication network (for example, broad band).

The control unit 150 may include one or more processors, one or more circuits, and one or more hardware modules, which perform each of a plurality of functions that the control unit 150 performs. In more detail, the control unit 150 may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. The control unit 150 may include at least one of a signaling decoder 151, a service map database 161, a service signaling channel parser 163, an application signaling parser 166, an alert signaling parser 168, a targeting signaling parser 170, a targeting processor 173, an A/V processor 161, an alerting processor 162, an application processor 169, a scheduled streaming decoder 181, a file decoder 182, a user request streaming decoder 183, a file database 184, a component synchronization unit 185, a service/content acquisition control unit 187, a redistribution module 189, a device manager 193, and a data sharing unit 191.

The service/content acquisition control unit 187 controls operations of a receiver to obtain services or contents through a broadcast network or an internet communication network and signaling data relating to services or contents.

The signaling decoder 151 decodes signaling information.

The service signaling parser 163 parses service signaling information.

The application signaling parser 166 extracts and parses service related signaling information. At this point, the service related signaling information may be service scan related signaling information. Additionally, the service related signaling information may be signaling information relating to contents provided through a service.

The alert signaling parser 168 extracts and parses alerting related signaling information.

The target signaling parser 170 extracts and parses information for personalizing services or contents or information for signaling targeting information.

The targeting processor 173 processes information for personalizing services or contents.

The alerting processor 162 processes alerting related signaling information.

The application processor 169 controls application related information and the execution of an application. In more detail, the application processor 169 processes a state of a downloaded application and a display parameter.

The A/V processor 161 processes an A/V rendering related operation on the basis of decoded audio or video and application data.

The scheduled streaming decoder 181 decodes a scheduled streaming that is a content streamed according to a schedule defined by a contents provider such as broadcaster.

The file decoder 182 decodes a downloaded file. Especially, the file decoder 182 decodes a file downloaded through an internet communication network.

The user request streaming decoder 183 decodes a content (for example, On Demand Content) provided by a user request.

The file database 184 stores files. In more detail, the file database 184 may store a file downloaded through an internet communication network.

The component synchronization unit 185 synchronizes contents or services. In more detail, the component synchronization unit 185 synchronizes a content decoded by at least one of the scheduled streaming decoder 181, the file decoder 182, and the user request streaming decoder 183.

The service/content acquisition control unit 187 controls operations of a receiver to obtain services, contents or signaling information relating to services or contents.

When services or contents are not received through a broadcast network, the redistribution module 189 performs operations to support obtaining at least one of services, contents, service related information, and content related information. In more detail, the redistribution module 189 may request at least one of services, contents, service related information, and content related information from the external management device 300. At this point, the external management device 300 may be a content server.

The device manager 193 manages an interoperable external device. In more detail, the device manager 193 may perform at least one of the addition, deletion, and update of an external device. Additionally, an external device may perform connection and data exchange with the broadcast receiving device 100.

The data sharing unit 191 performs a data transmission operation between the broadcast receiving device 100 and an external device and processes exchange related information. In more detail, the data sharing unit 191 may transmit AV data or signaling information to an external device. Additionally, the data sharing unit 191 may receive AV data or signaling information from an external device.

As the uses of terminal devices such as smartphones or tablets increase, broadcast services interoperating with such terminal devices increase also. Accordingly, terminal devices require the properties of broadcast services representing information on the broadcast services in order to interoperate with the broadcast services. However, in many cases, companion devices do not receive broadcast services directly. In such cases, an operating device needs to obtain the properties of broadcast services through broadcast transmitting devices. Accordingly a broadcast receiving device and an operating method thereof for efficiently transmitting the properties of broadcast services are required. This will be described with reference to FIGS. 31 to 43.

FIG. 31 is a view illustrating a broadcast system providing a broadcast service interoperating with a companion device according to an embodiment of the present invention.

The broadcast system includes a broadcast receiving device 100, a companion device 200, a broadcast transmitting device 300, and a content/signaling server 400, and an ACR server 500.

The broadcast transmitting device 300 refers to a broadcast server transmitting broadcast services. At this point, the broadcast receiving device 100 receives a broadcast service from the broadcast transmitting device 300 through a broadcast channel. Additionally, the broadcast receiving device 100 may receive information signaling a broadcast service from the broadcast transmitting device 300 through a broadcast network. Additionally, the broadcast receiving device 100 may receive additional information for broadcast service, for example, a trigger, a Trigger Parameter Table (TPT), a Trigger Declarative Object (TDO), from the broadcast transmitting device 300 through a broadcast network.

The content/signaling server 400 generates and manages a content on broadcast service. At this point, the broadcast receiving device 100 may receive at least one of additional information on broadcast service and signaling information of broadcast service from the content/signaling server 400 through a communication network (for example, broadcast channel).

The ACR server 300 manages ACR related data on broadcast service. At this point, the broadcast receiving device 100 may receive at least one of a trigger and an application on broadcast service from the ACR server 300 through a communication network (for example, broadcast channel).

The companion device 200 executes a broadcast service related additional function as interoperating with the broadcast receiving device 100 through a home network. In more detail, the companion device 200 may obtain at least one of applications and files relating to broadcast service. Additionally, the companion device 200 may execute applications and files relating to broadcast service. At this point, the companion device 200 may uses a mobile communication network such as 3GPP or an HTTP proxy server instead of a home network. Additionally, according to a specific embodiment, when broadcast service related applications or files are transmitted through File Delivery over Unidirectional Transport (FLUTE), the companion device 200 may receive at least one of the broadcast service related applications or files from the broadcast receiving device 100. Additionally, the companion device 200 may be referred to as a second screen device. Additionally, the companion device 200 may include at least one of smartphones, tablets, and laptops. In more detail, the companion device 200 may be a terminal device having a communication function such as network instead of a broadcast reception function through a broadcast network. Additionally, the companion device 200 may be one or more. The companion device 200 may include a control unit controlling overall operations of the companion device 200 and a communication unit performing a communication with an external device. The control unit may include one or more processors, one or more circuits, and one or more hardware modules, which perform each of a plurality of functions that the control unit performs. In more detail, the control unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one. Additionally, a communication unit may include one or more processors, one or more circuits, and one or more hardware modules, which perform each of a plurality of functions that the communication unit performs. In more detail, the communication unit may be a System On Chip (SOC) in which several semiconductor parts are integrated into one. At this point, the SOC may be semiconductor in which various multimedia components such as graphics, audio, video, and modem and a semiconductor such as a processor and D-RAM are integrated into one.

Additionally, the broadcast receiving device 100 may be referred to as a primary device.

Additionally, according to a specific embodiment, at least two of the broadcast transmitting device 300, the content/signaling server 400, and the ACR server 500 are integrated into one server and used.

As described above, the broadcast receiving device 100 may receive signaling information of broadcast service from the broadcast transmitting device 300. Additionally, the broadcast receiving device 100 may receive signaling information of broadcast service from the content/signaling server 400. At this point, the signaling information of broadcast service may include the properties of broadcast service. This will be described in more detail with reference to FIG. 32.

Figure 32:
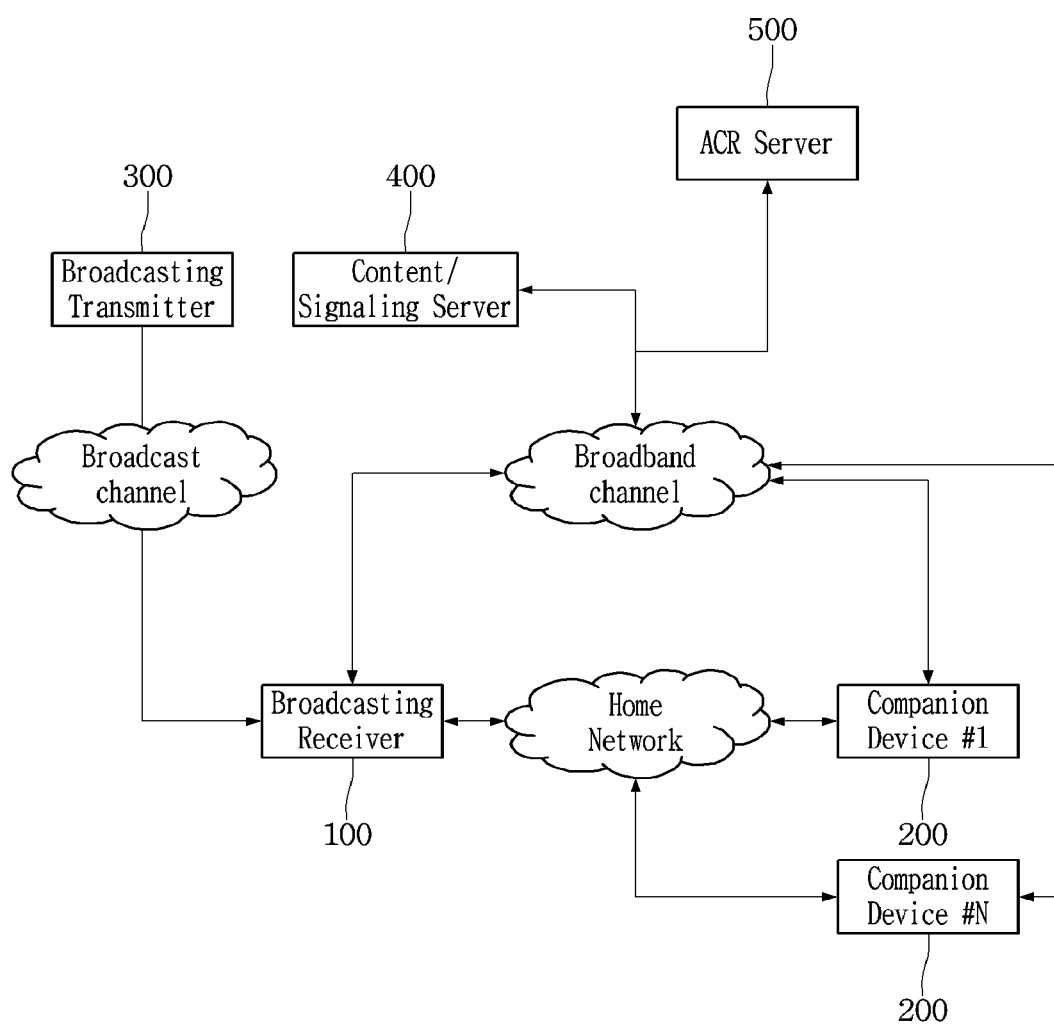
FIG. 32 is a view illustrating the properties of signaled broadcast service according to an embodiment of the present invention.

FIG. 32 is a view illustrating the properties of signaled broadcast service according to an embodiment of the present invention.

The signaling information of broadcast service that the broadcast receiving device 100 receives may include the properties of broadcast service. At this point, the properties of broadcast service may include at least one of a broadcast service identifier for identifying a broadcast service, the name of a broadcast service, the channel number of a broadcast service, a description of a broadcast service, the genre of a broadcast service, an icon representing a broadcast service, the primary language of a broadcast service, usage report information relating to a broadcast service, a targeting property representing information of a device providing a broadcast service, a property for broadcast service protection, a content advisory rating, and information on a media component in a broadcast service. The targeting property may represent at least one of a primary device or the companion device 200, as a device providing service. The channel number of a broadcast service may include a major channel number and a minor channel number. The information on a media component may include at least one of an identifier for identifying a media component, the type of a media component, the name of a media component, the start time of a media component, the duration of a media component, information representing a screen that a media components targets, URL for receiving a media component, the advisory rating of a media component, and the genre of a media component. At this point, the screen that a media component targets may represent the companion device 200.

The property of a broadcast service may be signaled in XML format as shown in FIG. 33. However, the signaling format for the property of a broadcast service is not limited thereto and the property of a broadcast service may be signaled in another format such as bit stream.

In more detail, the information signaling the property of a broadcast service may include as an element at least one of ServiceID, ServiceName, MajorChanNum, MinorChanNum, Description, Genre, Icon, Language, UsageReportingInfo, Targeting, ServiceProtection, AdvisoryRating, and ComponentItem.

ServiceID represents a broadcast service identifier for identifying service. At this point, there may be only one ServiceID. Additionally, according to a specific embodiment, ServiceID may have an unsigned short data type. In more detail, the broadcast receiving device 100 and the companion device 200 may identify broadcast service on the basis of ServiceID.

ServiceName represents the name of a broadcast service. ServiceName may be provided in zero, or one or more. According to a specific embodiment, ServiceName may have a string data type. In more detail, the broadcast receiving device 100 and the companion device 200 may display the name of a broadcast service on the basis of ServiceName.

MajorChanNum and MinorChanNum respectively represent the major number and minor number of the channel number of a broadcast service. According to a specific embodiment, MajorChanNum and MinorChanNum may be provided in zero or one. Additionally, MajorChanNum and MinorChanNum may have an integer value among 0 to 15. MajorChanNum and MinorChanNum may be used to easily select a user's broadcast service. In more detail, the broadcast receiving device 100 and the companion device 200 may display the channel number of a broadcast service on the basis of MajorChanNum and MinorChanNum.

Description represents a description of a broadcast service. Description may be provided in zero, or one or more. Description may have a string data type. A user may guess the content of a broadcast through Description. In more detail, the broadcast receiving device 100 and the companion device 200 may display a description of a broadcast service on the basis of Description.

Genre represents the genre of a broadcast service. Genre may be provided in zero, or one or more. According to a specific embodiment, Genre may have a string data type. A user may know the genre of a broadcast service through Genre. In more detail, the broadcast receiving device 100 and the companion device 200 may display the genre of a broadcast service on the basis of Genre.

Icon represents a broadcast service. Icon may be provided in zero, or one or more. Icon may have a base 64 binary data type. A user may easily know the content of a broadcast service through an icon representing a broadcast service. In more detail, the broadcast receiving device 100 and the companion device 200 may display an icon representing a broadcast service on the basis of Icon.

Language represents the main Language of a broadcast service. Language may be provided in zero or one. Language may have a string data type. In more detail, the broadcast receiving device 100 and the companion device 200 may display the primary language of a broadcast service on the basis of Language.

UsageReportingInfo represents usage report information relating to a broadcast service. UsageReportingInfo may be provided in zero, or one or more. UsageReportingInfo may have a string data type. In more detail, UsageReportingInfo may be used as a parameter for usage information report. For example, UsageReportingInfo may include at least one of a URL for usage information report and a report period. Through such usage information report, a broadcast service provider may obtain usage information of a broadcast service and billing information on a broadcast service. In more detail, the broadcast receiving device 100 and the companion device 200 may report usage information of a broadcast service on the basis of UsageReportingInfo.

Targeting represents the targeting property of a broadcast service. Targeting may be provided in zero, or one or more. In more detail, Targeting may have a string data type. In more detail, Targeting may represent whether a corresponding broadcast service is for a primary device such as the broadcast receiving device 100 or the companion device 200. In more detail, the broadcast receiving device 100 and the companion device 200 may determine whether to display a broadcast service on the basis of Targeting.

ServiceProtection represents the property on protection of a broadcast service. ServiceProtection may be provided in zero or one. In more detail, ServiceProtection may have a string data type.

AdvisoryRating represents the advisory rating of a broadcast service. AdvisoryRating may be provided in zero, or one or more. AdvisoryRating may have a string data type. The broadcast receiving device 100 and the companion device 200 may block a broadcast service on the basis of an advisory rating and personalization information.

ComponentItem represents information on a media component in a broadcast service. In more detail, ComponentItem may include at least one of componentId, ComponentType, ComponentName, StartTime, Duration, TargetScreen, URL, ContentAdvisory, and Genre.

ComponentId represents an identifier for identifying a corresponding media component. In more detail, ComponentId may be provided in one. In more detail, ComponentId may have an unsigned data type. In more detail, the broadcast receiving device 100 and the companion device 200 may identify a media component on the basis of ComponentId.

CmponentType represents the type of a corresponding media component. In more detail, CmponentType may be provided in one. CmponentType may have a string data type. In more detail, the broadcast receiving device 100 and the companion device 200 may display the type of a media component on the basis of CmponentType.

ComponentName represents the name of a corresponding media component. In more detail, ComponentName may be provided in zero, or one or more. ComponentName may have a string data type. In more detail, the broadcast receiving device 100 and the companion device 200 may display the name of a media component on the basis of ComponentName.

StartTime represents the start time of a corresponding media component. In more detail, StartTime may be provided in zero or one. In more detail, StartTime may have an unsigned short data type. In more detail, the broadcast receiving device 100 and the companion device 200 may determine the start time of a media component on the basis of StartTime.

Duration represents the Duration of a corresponding media component. In more detail, Duration may be provided in zero or one. In more detail, Duration may have an unsigned short data type. In more detail, the broadcast receiving device 100 and the companion device 200 may determine the duration of a media component on the basis of Duration.

TargetScreen represents a screen that a corresponding media component targets. In more detail, TargetScreen may be provided in zero, or one or more. In more detail, TargetScreen may have a string data type. In more detail, the broadcast receiving device 100 and the companion device 200 may determine whether to play a corresponding media component on the basis of TargetScreen.

URL represents an address for receiving a media component. In more detail, URL may be provided in zero, or one or more. In more detail, URL may have a URI data type. In more detail, URL may represent the address of the content/signaling server 400. In more detail, the broadcast receiving device 100 and the companion device 200 may receive a media component on the basis of URL.

ContentAdvisory represents the advisory rating of a corresponding media component. When a value of ContentAdvisory conflicts a value of AdvisoryRating, the value of ContentAdvisory may have priority. In more detail, ContentAdvisory may be provided in zero, or one or more. In more detail, ContentAdvisory may have a string data type. In more detail, the broadcast receiving device 100 and the companion device 200 may determine whether to play a media component on the basis of ContentAdvisory.

Genre represents the genre of a media component. In more detail, Genre may be provided in one or more. Genre may have a string data type. When Genre conflicts the above-mentioned genre of a service, Genre representing the genre of a media component may have priority. In more detail, the broadcast receiving device 100 and the companion device 200 may display the genre of a media component on the basis of Genre.

As described above, the broadcast receiving device 100 and the companion device 200 may interoperate with the broadcast receiving device 200 through at least one of a home network, a mobile communication network such as 3GPP, and an HTTP proxy server. At this point, a communication between the broadcast receiving device 100 and the companion device 200 may be made through various methods. In more detail, a communication between the broadcast receiving device 100 and the companion device 100 may be made through Universal Plug and Play (UPnP).

UPnP classifies a device into a control point (CP) and controlled devices (CDs). The CP controls the CDs through an UPnP protocol. According to a specific embodiment, the broadcast receiving device 100 corresponds to one of the CDs. Additionally, the companion device 200 may correspond to the CP. UPnP defines discovery, description, control, and eventing protocols. The discovery protocol is a protocol through which a CP searches for a CD. The description protocol is a protocol through which a CP obtains information of a CD. The control protocol is a protocol through which a CP invokes a predetermined operation of a CD. The eventing protocol is a protocol through which a CD delivers unsynchronized notifications to a CP. The broadcast receiving device 100 and the companion device 200 may interoperate with each other through at least one of the discovery, description, and control, and eventing protocols of the UPnP protocol. For example, the broadcast receiving device 100 may find the companion device 200 through the discovery protocol. Specific operations of the broadcast receiving device 100 and the companion device 200 will be described with reference to FIGS. 33 to 43.

FIG. 33 is a view illustrating a parameter representing a state of a signaled broadcast service property according to an embodiment of the present invention.

The broadcast receiving device 100 may transmit one parameter representing the property of a broadcast service to a companion device. One parameter representing the property of a broadcast service may include the property of a current broadcast service. In more detail, as shown in the embodiment of FIG. 33, a parameter such as ServiceProperty may be transmitted. According to a specific embodiment, ServiceProperty may be an essential parameter and may have a string data type. Additionally, according to a specific embodiment, ServiceProperty may not have a related action. When a subscription for ServiceProperty is requested, the broadcast receiving device 100 may transmit ServiceProperty to the companion device 200. A specific process of the broadcast receiving device 100 to transmit the property of a broadcast service is described with reference to FIG. 34.

Figure 34:
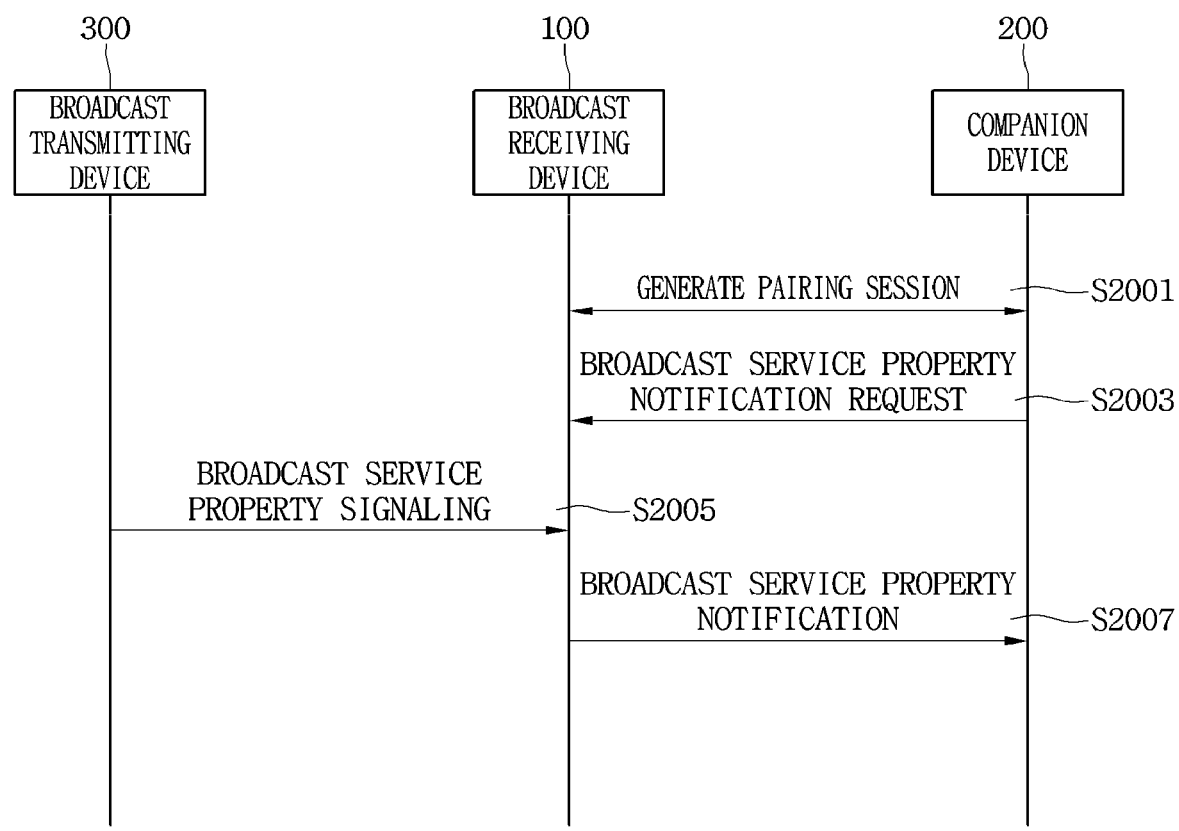
FIG. 34 is a ladder diagram illustrating operations when a broadcast receiving device signals a broadcast service property to a companion device according to an embodiment of the present invention.

FIG. 34 is a ladder diagram illustrating operations when a broadcast receiving device signals a broadcast service property to a companion device according to an embodiment of the present invention.

The broadcast receiving device 100 and the companion device 200 generate a pairing session in operation S2001. In more detail, the broadcast receiving device 100 may generate a pairing session with the companion device 200 through an IP communication unit 130. In more detail, the companion device 200 may generate a pairing session with the broadcast receiving device 100 through a communication unit. In more detail, the broadcast receiving device 100 and the companion device 200 may generate a pairing session for bidirectional communication. In more detail, the broadcast receiving device 100 and the companion device 200 may generate a pairing session by using the UPnP protocol. According to a specific embodiment, the broadcast receiving device 100 may find the companion device 200 through the discovery protocol of UPnP. For example, a discovery message that the broadcast receiving device 100 searches for a companion device to interoperate through a well known IP address may be multicasted. At this point, the companion device 200 receiving a multicasted message may request a description from the broadcast receiving device 100. The broadcast receiving device 100 may provide the description to the companion device 200 on the basis of the description request of the companion device 200. The companion device 200 may access the broadcast receiving device 200 on the basis of the description. According to another embodiment, the companion device 200 may find the broadcast receiving device 100 through the discovery protocol of UPnP. For example, a message that the companion device 200 searches for the broadcast receiving device 100 to interoperate through a well known IP address may be multicasted. At this point, the broadcast receiving device 100 may reply with a display message on the basis of the multicasted message. Accordingly, the companion device 200 receiving the discovery message may request a description from the broadcast receiving device 100. The broadcast receiving device 100 may provide the description to the companion device 200 on the basis of the description request of the companion device 200. The companion device 200 may access the broadcast receiving device 200 on the basis of the description.

The companion device 200 requests a property notification of a broadcast service from the broadcast receiving device 100 in operation S2003. In more detail, the companion device 200 may request a property notification of a broadcast service from the broadcast receiving device 100 through a control unit. In more detail, the companion device 200 may request a property notification of a broadcast service from the broadcast receiving device 100 through the UPnP protocol. According to a specific embodiment, the companion device 200 may request an event subscription for the property of a broadcast service from the broadcast receiving device 100 on the basis of an eventing protocol.

The broadcast receiving device 100 receives information signaling a broadcast service property on the basis of a broadcast service in operation S2005. In more detail, the broadcast receiving device 100 may receive information signaling a broadcast service property from the broadcast transmitting device 300 through the broadcast reception unit 110.

The broadcast receiving device 100 notifies the broadcast service property to the companion device 200 on the basis of the information signaling the property of a broadcast service in operation S2007. In more detail, the broadcast receiving device 100 notifies the broadcast service property to the companion device 200 through the control unit 150 on the basis of the information signaling the property of a broadcast service. In more detail, the broadcast receiving device 100 may determine whether the property of a broadcast service is changed compared to before. When the property of a broadcast service is changed compared to before, the broadcast receiving device 100 may notify the property of a broadcast service to the companion device 200. According to a specific embodiment, the broadcast receiving device 100 may notify the property of a broadcast service to the companion device 200 through a parameter representing a state of the broadcast service property. According to a specific embodiment, the parameter representing a state of the broadcast service property may be ServiceProperty of FIG. 33. A data format of the parameter representing a state of the broadcast service property will be described in more detail with reference to FIG. 35.

FIG. 35 is a view illustrating a data format of a broadcast service property that a broadcast receiving device signals to a companion device according to an embodiment of the present invention.

The data format of a broadcast service property may be XML format as shown in FIG. 35. However, the data format of a broadcast service property is not limited thereto. In the embodiment of FIG. 35, the data format of a broadcast service property includes all the properties of a broadcast service described with reference to FIG. 32. Accordingly, even if only part of the broadcast service properties is changed, the broadcast receiving device 100 needs to transmit the entire broadcast service properties and the companion device 200 needs to receive the entire broadcast service properties. In such a case, the data amount exchanged between the broadcast receiving device 100 and the companion device 200 increases. Additionally, the companion device 200 needs to check which broadcast service property is changed again. Accordingly, a method of the broadcast receiving device 100 to efficiently signal a broadcast service property to the companion device 200 is required. This will be described with reference to FIGS. 36 to 38.

FIG. 36 is a view illustrating a parameter representing a state of a broadcast service property that a broadcast receiving device signals to a companion device, an action for broadcast service property, and an action argument according to another embodiment of the present invention.

According to another embodiment of the present invention, the parameter representing the property of a broadcast service may include at least one of a parameter representing a broadcast service property, a parameter representing the name of a broadcast service property, and a parameter representing whether a broadcast service property is changed. In more detail, when the companion device 200 requests a specific property of a broadcast service, the broadcast receiving device 100 may transmit the property of a broadcast service on the basis of the request of the companion device 200. In more detail, the broadcast receiving device 100 may transmit the specific property of the broadcast service that the companion device 200 requests. For example, the broadcast receiving device 100 may notify the companion device 200 whether the property of a broadcast service is changed through a parameter representing whether the property of the broadcast service is changed. At this point, the companion device 200 may request the property of a broadcast service through a parameter representing the name of a broadcast service property. The broadcast receiving device 100 may notify the broadcast service property to the companion device 200 through a parameter representing the broadcast service property.

According to a specific embodiment, the parameter representing the property of a broadcast service may include at least one of ServiceProperty, ServicePropertyName, and ServicePropertyChangeFlag. ServiceProperty represents the property of a broadcast service. According to a specific embodiment, ServiceProperty may be an essential parameter and may have a string data type. ServicePropertyName represents the name of a broadcast service property. ServicePropertyName is an essential parameter and may have a string data type. ServicePropertyChangeFlag represents whether a broadcast service property is changed. According to a specific embodiment, ServicePropertyChangeFlag may be an essential parameter and may have a Boolean data type. Additionally, when the companion device 200 request a subscription for ServicePropertyChangeFlag, the broadcast receiving device 100 may transmit ServicePropertyChangeFlag to the companion device 200.

The companion device 200 may use a GetServiceProperty action to request the property of a broadcast service through a parameter representing the name of a broadcast service property. GetServiceProperty is an essential action. At this point, GetServiceProperty may have ServiceProgpertyName as an argument for input. Additionally, GetServiceProperty may have ServiceProperty as an argument for output. According to a specific embodiment, when the companion device 200 sets the property of a broadcast service to be obtained to SevicePropertyName and transmits a GetServiceProperty action to the broadcast receiving device 100, the companion device 200 may receive the property of a broadcast service corresponding to ServicePropertyName as ServiceProperty. Specific operations of the broadcast receiving device 100 and the companion device 200 will be described with reference to FIG. 37.

FIG. 37 is a ladder diagram illustrating operations when a broadcast receiving device signals a broadcast service property to a companion device according to another embodiment of the present invention.

The broadcast receiving device 100 and the companion device 200 generate a pairing session in operation S2021. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 34.

The companion device 200 requests a property change notification of a broadcast service from the broadcast receiving device 100 in operation S2023. In more detail, the companion device 200 may request a property change notification of a broadcast service from the broadcast receiving device 100 through a control unit. In more detail, operations of the companion device 200 may be identical to those in the embodiment of FIG. 34.

The broadcast receiving device 100 receives information signaling a broadcast service property on the basis of a broadcast service in operation S2025. In more detail, the broadcast receiving device 100 may receive information signaling a broadcast service property from the broadcast transmitting device 300 through the broadcast reception unit 110.

The broadcast receiving device 100 notifies the companion device 200 whether the broadcast service property is changed on the basis of the information signaling the property of a broadcast service in operation S2027. In more detail, the broadcast receiving device 100 notifies the companion device 200 whether the broadcast service property is changed through the control unit 150 on the basis of the information signaling the property of a broadcast service. In more detail, the broadcast receiving device 100 may determine whether the property of a broadcast service is changed compared to before. When the property of a broadcast service is changed compared to before, the broadcast receiving device 100 may notify the property change of a broadcast service to the companion device 200. In more detail, the broadcast receiving device 100 may determine whether the property of a broadcast service is changed on the basis of the version of information signaling the property of a broadcast is changed compared to before. Additionally, according to a specific embodiment, the broadcast receiving device 100 may notify the companion device 200 whether the property of a broadcast service is changed through a parameter representing whether the broadcast service property is changed. According to a specific embodiment, the parameter representing whether the broadcast service property is changed may be ServicePropertyChangedFlag of FIG. 33. At this point, a data format representing whether the broadcast service property is changed will be described in more detail with reference to FIG. 38.

FIG. 38 is a view illustrating a data format of whether a broadcast service property is changed that a broadcast receiving device signals to a companion device according to another embodiment of the present invention.

The data format of whether a broadcast service property is changed may be XML format. However, the data format of whether a broadcast service property is not limited thereto. According to a specific embodiment, the broadcast receiving device 100 may notify the companion device 200 only whether the property of a broadcast service is changed. As shown in the embodiment of FIG. 38, the broadcast receiving device 100 may display whether the property of a broadcast service is changed to the companion device 200 through a Boolean parameter having a TRUE value or a FALSE value. For example, when the property of a broadcast service is changed, the broadcast receiving device 100 may transmit to the companion device 200 data in which a parameter representing whether the property of a broadcast service has a TRUE value. However, in such an embodiment, the companion device 200 may not know which property in a broadcast service is changed and may only know that at least one of broadcast service properties is changed. Accordingly, even when a broadcast service property that the companion device 200 does not require is changed, the companion device 200 requests the property of a broadcast service. Accordingly, such an embodiment may cause unnecessary operations and unnecessary data exchanges of the broadcast receiving device 100 and the companion device 200. To resolve this issue, the broadcast receiving device 100 may need to notify a changed broadcast service property to the companion device 200. This will be described with reference to FIGS. 39 and 40.

FIG. 39 is a view illustrating parameters representing a state of a broadcast service property that a broadcast receiving device signals to a companion device according to another embodiment of the present invention.

When the property of a broadcast service is changed, the broadcast receiving device 100 may notify the companion device 200 the changed property and whether the broadcast service property is changed together. For this, the parameter representing whether a broadcast service property is changed may include information representing the changed property of a broadcast service. For this, the parameter representing whether a broadcast service property is changed may have a binary hex type. Accordingly, other parameters, actions, and action arguments are the same and according to an embodiment of FIG. 36, ServiceProperty-ChangedFlag that is a parameter representing whether the property of a broadcast service is changed may be a binary hex type. When a subscription for ServicePropertyChangedFlag is requested, the broadcast receiving device 100 may transmit ServicePropertyChangedFlag to the companion device 200. A data format of whether the property of a broadcast service is changed that the broadcast receiving device 100 signals to the companion device 200 will be described with reference to FIG. 40.

FIG. 40 is a view illustrating a data format of whether a broadcast service property is changed that a broadcast receiving device signals to a companion device according to another embodiment of the present invention.

The data format of whether a broadcast service property is changed may be XML format. However, the data format of whether a broadcast service property is not limited thereto. The broadcast receiving device 100 allocates a specific bit to each broadcast service property and when the property of a broadcast is changed, displays a corresponding bit with 1. In the embodiment of FIG. 4, a hexadecimal number 90080004 is a binary number 1001 0000 0000 1000 0000 0000 0100. At this point, the first four bits represent the primary language, genre, advisory rating, and targeting property of a broadcast, respectively. In this case, the companion device 200 may recognize that the primary language and targeting property of a broadcast are changed.

Again, referring to FIG. 37, the case that the broadcast receiving device 100 signals a broadcast service property to the companion device 2200 will be described according to another embodiment of the present invention.

Figure 42:
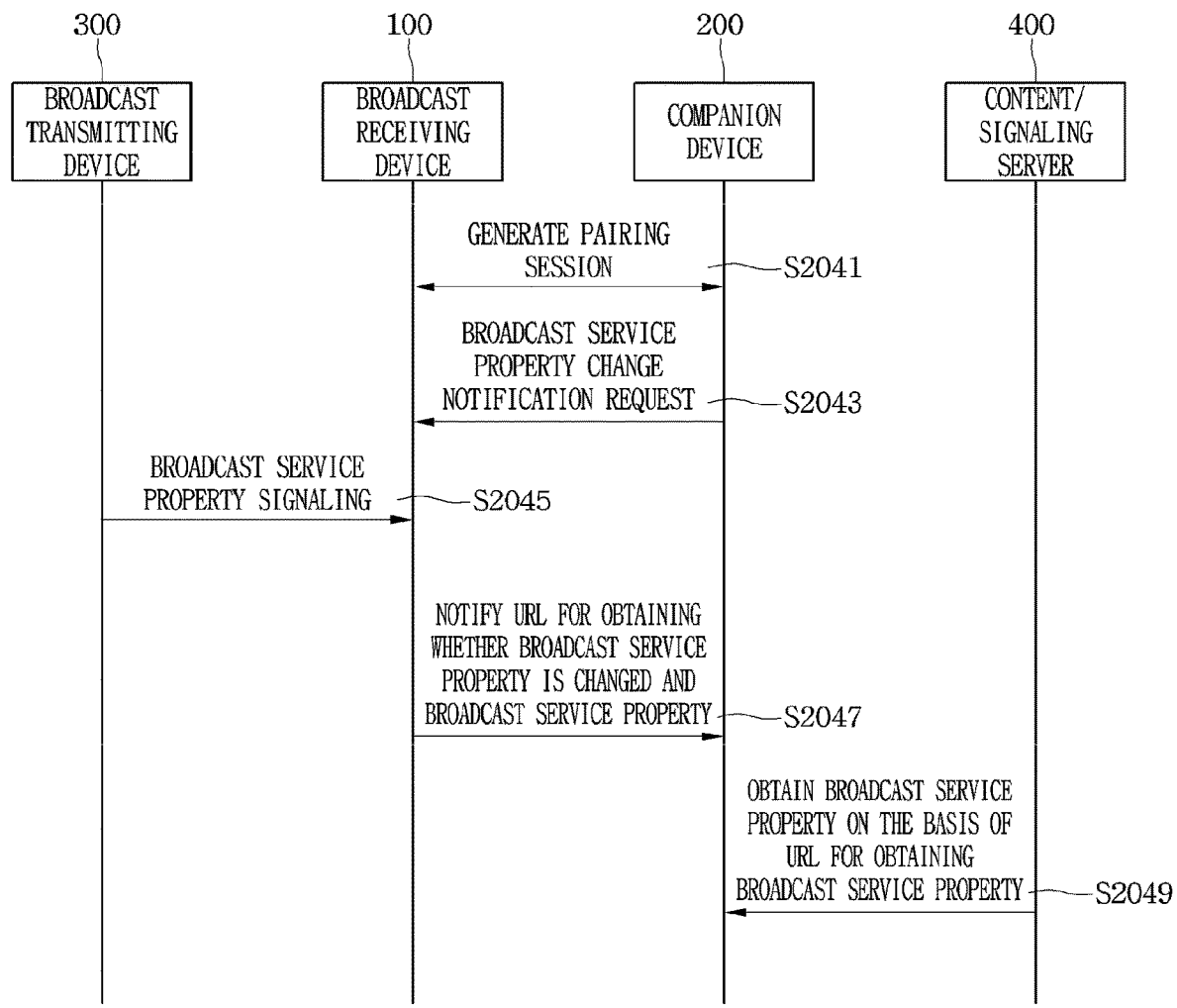
FIG. 42 is a ladder diagram illustrating operations when a broadcast receiving device signals a broadcast service property to a companion device according to another embodiment of the present invention.

The companion device 200 requests a specific property of a broadcast service from the broadcast receiving device 100 in operation S2029. The specific property of a broadcast service may be one or more properties among a plurality of broadcast service properties in information signaling the property of a broadcast. The companion device 200 may request a specific property of a broadcast service from the broadcast receiving device 100 through a control unit. In more detail, when the broadcast receiving device 100 transmits a property change notification of a broadcast service, the companion device 200 may request the specific property of the broadcast service from the broadcast receiving device 100. At this point, the specific property of the broadcast service may be the property of a broadcast service necessary for the companion device 200 to provide broadcast service related additional services. Additionally, as shown in FIGS. 41 and 42, when the broadcast receiving device 100 signals changed part among broadcast service properties, the companion device 100 may request the specific property of the broadcast service on the basis of the changed property type of the broadcast service. In more detail, when a specific property of a broadcast service is changed, the companion device 200 may request the specific property of the broadcast service. The specific property of the broadcast service may be a property necessary for the companion device 200 to provide broadcast service related additional services. For example, in the case that the companion device 200 determines whether to present a broadcast service on the basis of the targeting property of the broadcast service, when the targeting property of the broadcast service is changed, the companion device 200 may request the targeting property of the broadcast service.

The broadcast receiving device 100 notifies the specific property of the broadcast service to the companion device 200 in operation S2031. In more detail, the broadcast receiving device 100 may notify the specific property of the broadcast service to the companion device 200 through the control unit 150. In more detail, the broadcast receiving device 100 may notify the specific property of the broadcast service on the basis of a request of the companion device 200. For example, the broadcast receiving device 100 may transmit the specific property of the broadcast service that the companion device 200 requests to the companion device 200.

However, such an embodiment may require a continuous communication between the broadcast receiving device 100 and the companion device 200. Especially, when the broadcast receiving device 100 interoperates with a plurality of companion devices 200, a continuous communication may cause the overload to an operation of the broadcast receiving device 100. This issue may be resolved if the companion device 100 receives the property of a broadcast service from the content/signaling server 400. This will be described with reference to FIGS. 41 and 42.

FIG. 41 is a view illustrating parameters representing a state of a broadcast service property that a broadcast receiving device signals to a companion device according to another embodiment of the present invention.

When the property of a broadcast service is changed, the broadcast receiving device 100 may notify the companion device 200 of a URL address for receiving whether the broadcast service property is changed and the property of the broadcast service. For this, a parameter representing a state of a broadcast service property that the broadcast receiving device 100 signals to the companion device 200 may include information representing a URL address for the property of the broadcast service. According to a specific embodiment, a parameter representing a state of a signaled broadcast service property may include ServicePropertyChangeFlag representing a URL address for receiving the property of a broadcast service. According to a specific embodiment, ServicePropertyChangeFlag may be an optional parameter and may have a string data type. Specific operations of the broadcast receiving device 100 and the companion device 200 will be described with reference to FIG. 42.

FIG. 42 is a ladder diagram illustrating operations when a broadcast receiving device signals a broadcast service property to a companion device according to another embodiment of the present invention.

The broadcast receiving device 100 and the companion device 200 generate a pairing session in operation S2041. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 37.

The companion device 200 requests a property change notification of a broadcast service from the broadcast receiving device 100 in operation S2043. In more detail, the companion device 200 may request a property notification of a broadcast service from the broadcast receiving device 100 through a control unit. In more detail, operations of the companion device 200 may be identical to those in the embodiment of FIG. 37.

The broadcast receiving device 100 receives information signaling a broadcast service property on the basis of a broadcast service in operation S2045. In more detail, the broadcast receiving device 100 may receive information signaling a broadcast service property from the broadcast transmitting device 300 through the broadcast reception unit 110.

The broadcast receiving device 100 notifies the companion device 200 of a URL for obtaining whether the broadcast service property is changed and the property of a broadcast service on the basis of the information signaling the property of the broadcast service in operation S2047. In more detail, the broadcast receiving device 100 notifies the companion device 200 of a URL for obtaining whether the broadcast service property is changed and the property of a broadcast service through the control unit 150 on the basis of the information signaling the property of a broadcast service. In more detail, the broadcast receiving device 100 may determine whether the property of a broadcast service is changed compared to before. In more detail, the broadcast receiving device 100 may determine whether the property of a broadcast service is changed on the basis of the version of information signaling the property of a broadcast is changed compared to before. Additionally, when the property of a broadcast service is changed compared to before, the broadcast receiving device 100 may notify the companion device 200 of a URL address for obtaining the broadcast service property change and the broadcast service property. According to a specific embodiment, the broadcast receiving device 100 may notify the companion device 200 whether the property of a broadcast service is changed through a parameter representing whether the broadcast service property is changed. According to a specific embodiment, the parameter representing whether the broadcast service property is changed may be ServicePropertyChangeFlag of FIG. 41. Additionally, the broadcast receiving device 100 may notify the companion device 200 whether the property of a broadcast service is changed through a parameter representing a URL for obtaining the property of the broadcast service. According to a specific embodiment, the parameter representing a URL for obtaining the property of the broadcast service may be ServicePropertyURL of FIG. 41.

The companion device 200 obtains the property of a broadcast service on the basis of a URL for obtaining the property of the broadcast service in operation S2049. In more detail, the companion device 200 obtains the property of a broadcast service through a control unit on the basis of a URL for obtaining the property of the broadcast service. In more detail, the companion device 200 obtains the property of a broadcast service from the content/signaling server 400 on the basis of a URL for obtaining the property of the broadcast service. In more detail, the companion device 200 requests the property of a broadcast service from the content/signaling server 400 on the basis of a URL for obtaining the property of the broadcast service and then obtains the property of the broadcast service from the content/signaling server 400. Through this, the load of the broadcast communication device 100 resulting from a communication between the broadcast receiving device 100 and the companion device 200 may be reduced. However, according to such an embodiment, even when the property of a broadcast service that the companion device 200 does not require is changed, the broadcast receiving device 100 needs to notify the broadcast service property change. Accordingly, the broadcast receiving device 100 needs to perform an unnecessary operation. As a necessary broadcast service property is set in advance when the companion device 200 requests a notification change from the broadcast receiving device 100, unnecessary operations of the broadcast receiving device 100 may be reduced. This will be described with reference to FIGS. 43 and 44.

FIG. 43 is a view illustrating a parameter representing a state of a broadcast service property that a broadcast receiving device signals to a companion device, an action for broadcast service property, and an action argument according to another embodiment of the present invention.

The companion device 200 may designate a desired broadcast service property to be notified as requesting a property change notification of a broadcast service from the broadcast receiving device 100. For this, the companion device 200 may include an action for designating the desired broadcast service property to be notified. At this point, the action may have a parameter representing a desired broadcast service property to be notified as an input argument. Such an action may be SetServiceProperty of FIG. 43. According to a specific embodiment, SetServiceProperty may be an essential action. Additionally, SetServiceProperty may have ServicePropertyName representing the type of a broadcast service property as an input argument. Specific operations of the broadcast receiving device 100 and the companion device 200 will be described with reference to FIG. 44.

Figure 44:
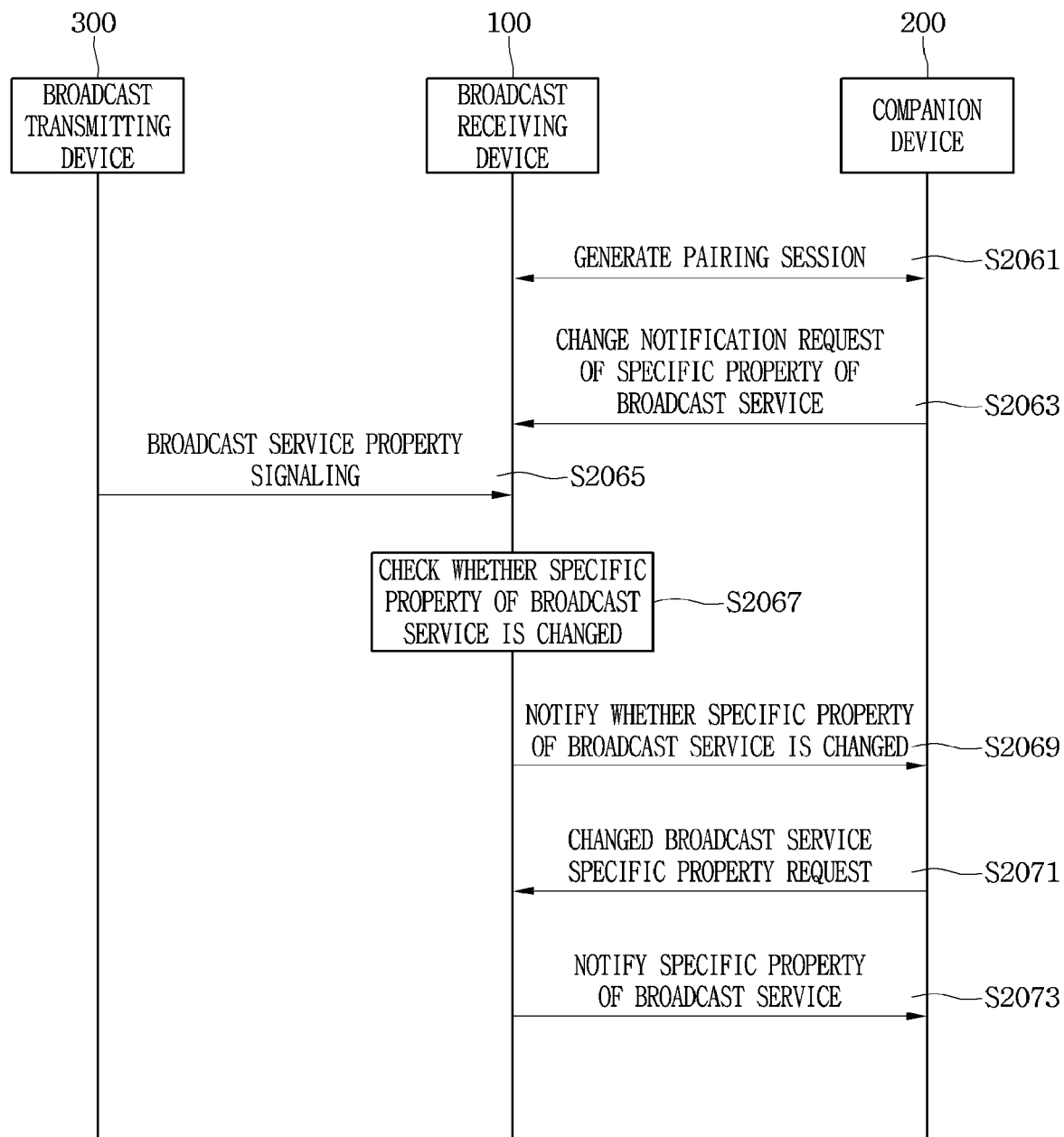
FIG. 44 is a ladder diagram illustrating operations when a broadcast receiving device signals a broadcast service property to a companion device according to another embodiment of the present invention.

FIG. 44 is a ladder diagram illustrating operations when a broadcast receiving device signals a broadcast service property to a companion device according to another embodiment of the present invention.

The broadcast receiving device 100 and the companion device 200 generate a pairing session in operation S2061. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 42.

The companion device 200 requests a specific property change notification of a broadcast service from the broadcast receiving device 100 in operation S2063. In more detail, the companion device 200 may request a specific property change notification of a broadcast service from the broadcast receiving device 100 through a control unit. The companion device 200 may request only a specific property change of a broadcast service necessary for providing broadcast service related additional services. According to a specific embodiment, the companion device 200 may request a specific property change notification of a broadcast service through an action for requesting only the specific property change notification. At this point, the action for requesting only the specific property change notification may be Set- ServiceProperty of FIG. 43. An operation of the companion device 200 to request a specific property change notification of a broadcast service from the broadcast receiving device 100 may include the following operations. The companion device 200 requests a subscription for service property change notification from the broadcast receiving device 100. When accepting the request for service property change notification subscription, the broadcast receiving device 100 may transmit an acceptance message and a subscription identifier (SID) for identifying the subscription request to the companion device 200. The companion device 200 may request a specific property change notification of a broadcast service from the broadcast receiving device 100 on the basis of the SID. In more detail, the companion device 200 may transmit both the SID and a specific property change of a broadcast service to be notified. Additionally, the companion device 200 may request a plurality of changed specific properties of a broadcast service from the broadcast receiving device 100. At this point, the companion device 200 may request a plurality of specific properties of a broadcast service as in a list form.

The broadcast receiving device 100 receives information signaling a broadcast service property on the basis of a broadcast service in operation S2065. In more detail, the broadcast receiving device 100 may receive information signaling a broadcast service property from the broadcast transmitting device 300 through the broadcast reception unit 110.

The broadcast receiving device 100 checks whether a specific property of a broadcast is changed in operation S2067. In more detail, the broadcast receiving device 100 may check whether a specific property of a broadcast service is changed through the control unit 150. In more detail, the broadcast receiving device 100 may determine whether the specific property of a broadcast service is changed compared to before. In more detail, the broadcast receiving device 100 may determine whether the specific property of a broadcast service is changed by comparing a previous value and the current value of the specific property of the broadcast service.

When the specific property of the broadcast service is changed, the broadcast receiving device 100 notifies the companion device 200 whether the specific broadcast service property is changed on the basis of the information signaling the property of a broadcast service in operation S2069. In more detail, when the specific broadcast service property is changed, the broadcast receiving device 100 notifies the companion device 200 whether the specific broadcast service property is changed through the control unit 150 on the basis of the information signaling the property of a broadcast service.

The companion device 200 requests a specific property of a broadcast service from the broadcast receiving device 100 in operation S2071. In more detail, the companion device 200 may request a specific property of a broadcast service from the broadcast receiving device 100 through a control unit. In more detail, when the broadcast receiving device 100 transmits a specific property change notification of a broadcast service, the companion device 200 may request the specific property of the broadcast service from the broadcast receiving device 100. Specific operations of the companion device 200 may be identical to those in the embodiment of FIG. 37.

The broadcast receiving device 100 notifies the specific property of the broadcast service to the companion device 200 in operation S2073. The broadcast receiving device 100 may notify the specific property of the broadcast service to the companion device 200 through the control unit 150. In more detail, the broadcast receiving device 100 may notify the specific property of the broadcast service on the basis of a request of the companion device 200. For example, the broadcast receiving device 100 may transmit the specific property of the broadcast service that the companion device 200 requests to the companion device 200.

Additionally, the companion device 200 does not obtain the specific property of the broadcast service from the broadcast receiving device 100 but as described with reference to FIG. 42, obtains a URL for obtaining a broadcast service property and then obtains the specific property of the broadcast service on the basis of the URL for obtaining the broadcast service property. Through such an operation, unnecessary operations of the broadcast receiving device 100 to notify the property change of a broadcast service to the companion device 200 may be reduced.

The broadcast receiving device 100 may receive an emergency alert for disaster situations such as natural disasters, terrorism, and war through a network. Additionally, the broadcast receiving device 100 may notify this to users. Through this, many people can recognize national disaster situations quickly and efficiently. However, if a user cannot stare at the broadcast receiving device 100 all the time, there may be an emergency alert situation that is not recognized by the user. Even when a user cannot stare at the broadcast receiving device 100 all the time, it is highly possible for the user to carry the companion device 200 such as a mobile phone or a tablet all the time. Accordingly, if the broadcast receiving device 100 transmits an emergency alert to the companion device 200 and the companion device displays the emergency alert, a national disaster situation can be quickly notified to a user efficiently. This will be described with reference to FIGS. 45 to 57.

Figure 45:
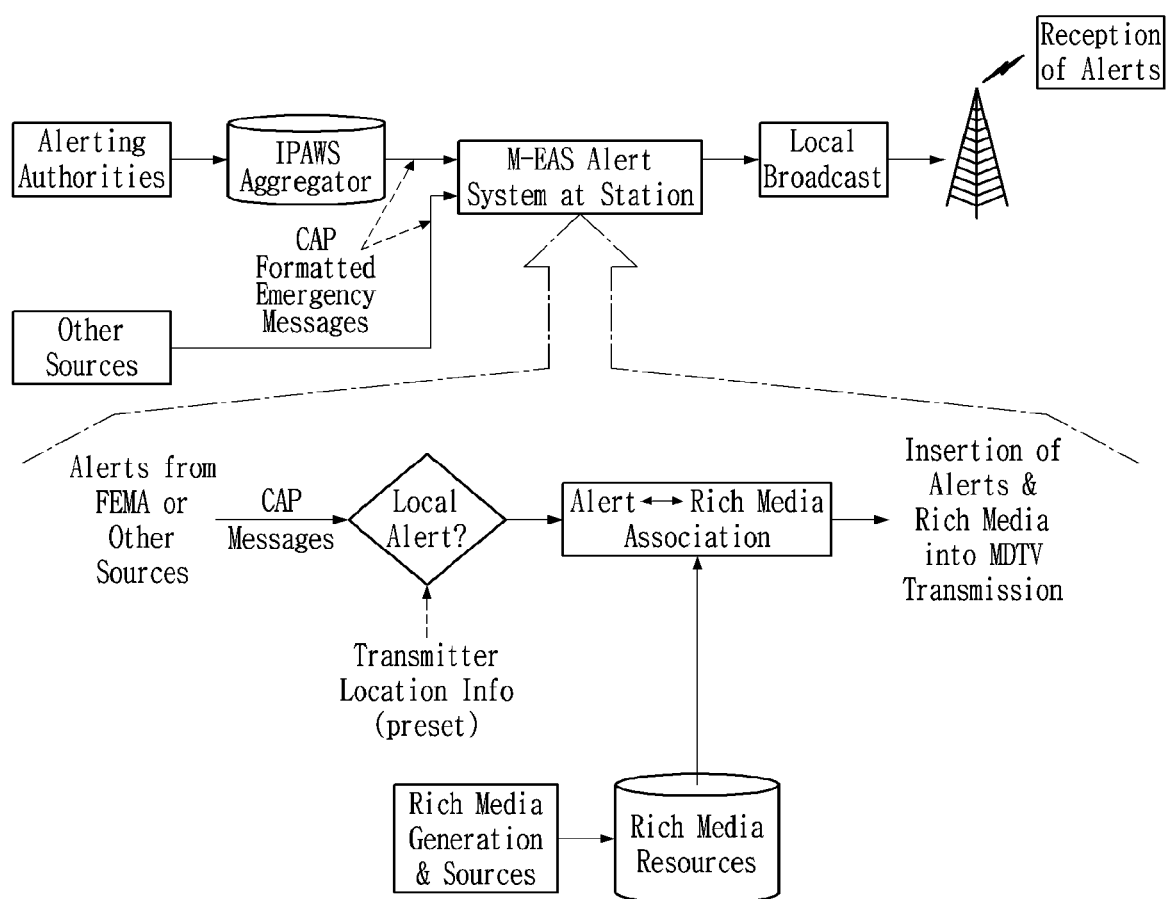
FIG. 45 is a view illustrating operations when an emergency alert is generated and transmitted through a broadcast network according to an embodiment of the present invention.

FIG. 45 is a view illustrating operations when an emergency alert is generated and transmitted through a broadcast network according to an embodiment of the present invention.

An alert system managing an emergency alert through broadcast service may receive an emergency situation from authorities having the authority to issue an emergency issue through Integrated Public Alert & Warning System (IPWS) or a message according to Common Alerting Protocol (CAP) through other sources. The alert system determines whether a CAP message corresponds to a current region. When the CAP message corresponds to the current region, the alert system inserts the CAP message into a broadcast signal. Accordingly, the CAP message is transmitted through a broadcast signal. An operation of the broadcast receiving device 100 to receive a broadcast signal and transmit an emergency alert to a user is described with reference to FIG. 46.

Figure 46:
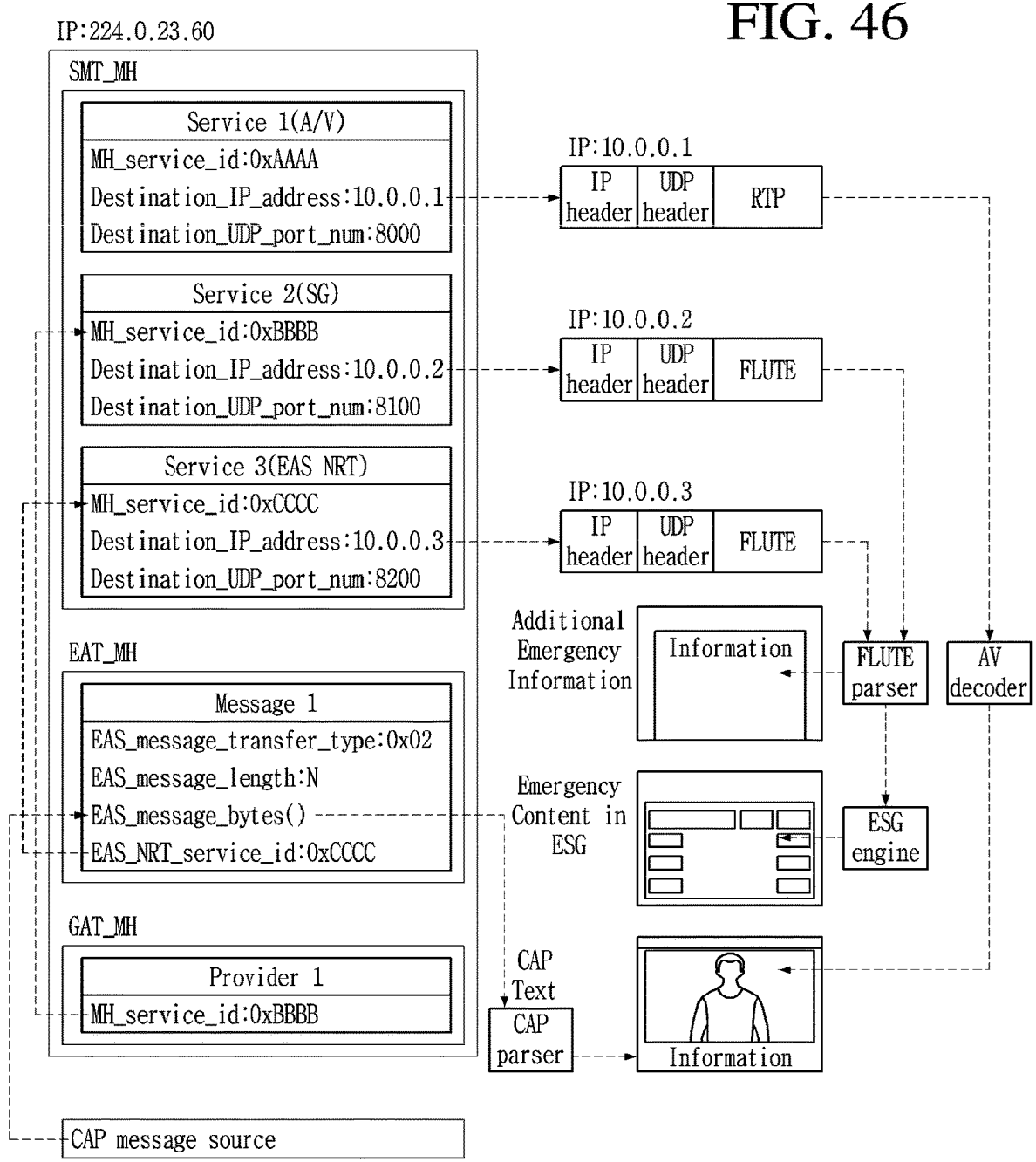
FIG. 46 is a view when a broadcast receiving device extracts and displays emergency information signaled through a broadcast network according to an embodiment of the present invention.

FIG. 46 is a view when a broadcast receiving device extracts and displays emergency information signaled through a broadcast network according to an embodiment of the present invention.

The broadcast transmitting device 200 may extract an Emergency Alter Table (EAT) on the basis of a broadcast signal and may extract a CAP message from the EAT. Additionally, the broadcast transmitting device 200 may obtain additional information relating to the emergency alert on the basis of an NRT service identifier in the EAT. In more detail, the broadcast receiving device 200 may obtain additional information relating to the emergency alert on the basis of an EAS_NRT_service_id field in the EAT. In more detail, the broadcast receiving device 200 may obtain information on a FLUTE session transmitting additional information relating to the emergency alert from a table signaling NRT service on the basis of the NRT service identifier in the EAT. At this point, the table signaling NRT service may be a Service Map Table (SMT). The broadcast receiving device 200 may receive additional information relating to an emergency alert from a corresponding FLUTE session on the basis of information on the FLUTE session. The broadcast receiving device 200 may receive the emergency alert and may then display it on a service guide displaying information on a broadcast service and a broadcast service program. In more detail, the broadcast receiving device 200 extracts a service identifier from a Guide Access Table (GAT) and extracts and receives information corresponding to the service identifier from a table signaling NRT service. According to a specific embodiment, the broadcast receiving device 200 may obtain information on the FLUTE session of a service corresponding to the extracted service identifier from the GAT. Then, the broadcast receiving device 200 may receive an emergency alert message on the basis of the information on the FLUTE session and may display the emergency alert message on the service guide. The format of the CAP message may be the same as FIG. 47.

Specific operations of the broadcast receiving device 100 and the companion device 200 will be described with reference to FIGS. 48 to 57.

FIG. 48 is a view illustrating a parameter representing a state of an emergency alert that a broadcast receiving device signals, an action for emergency alert, and an action argument according to an embodiment of the present invention.

According to an embodiment of the present invention, the parameter representing a state of an emergency alert may include at least one of a parameter representing information on an emergency alert message including an emergency alert and a parameter representing information on an emergency alert including all emergency alert messages. In more detail, when receiving an emergency alert, the broadcast receiving device 100 may notify the information on the emergency alert message to the companion device 100. The information on the emergency alert will be described with reference to FIG. 49.

FIG. 49 is a view illustrating information on an emergency alert message signaled by a broadcast receiving device according to an embodiment of the present invention.

The information on an emergency alert message may include at least one of the version of an emergency alert, the format of an emergency alert message, the date of receiving an emergency alert message, and the time of receiving an emergency alert message. In more detail, the information may include at least one of messageType representing the format of an emergency alert message, dateTime representing the date of receiving an emergency alert message and the time of receiving an emergency alert message, and version representing the version of an emergency alert. According to a specific embodiment, information on a message including an emergency alert may be in XML format as shown in FIG. 49. However, the format of a message including an emergency alert is not limited thereto.

Again, referring to FIG. 48, a parameter representing a state of an emergency alert that a broadcast receiving device signals, an action for emergency alert, and an action argument are described according to an embodiment of the present invention.

Additionally, the companion device 200 may request information on an emergency alert including all emergency alert messages through an action. At this point, the broadcast receiving device 100 may signal to the companion device 100 the information on an emergency alert including all emergency alert messages through the parameter including information on an emergency alert. According to a specific embodiment, the parameter representing a state of an emergency alert may include at least one of EmergencyAlert and EmergencyAlertProperty. EmergencyAlert includes information on a message including an emergency alert. According to a specific embodiment, EmergencyAlert may be an essential parameter and may have a string data type. The broadcast receiving device 100 may transmit EmergencyAlert through an eventing protocol of UPnP. According to a specific embodiment, when the broadcast receiving device 100 receives an emergency alert, EmergencyAlertProperty includes information on an emergency alert. EmergencyAlertProperty is an essential parameter and may have a string data type. Additionally, an action for requesting information on an emergency alert including all emergency alert message may be GetAllEmergencyAlertMessage. According to a specific embodiment, GetAllEmergencyAlertMessage may be an essential action. Additionally, GetAllEmergencyAlertMessage may have EmergencyAlertProperty as an output argument.

Operations of the broadcast receiving device 100 and the companion device 200 will be described with reference to FIG. 50.

Figure 50:
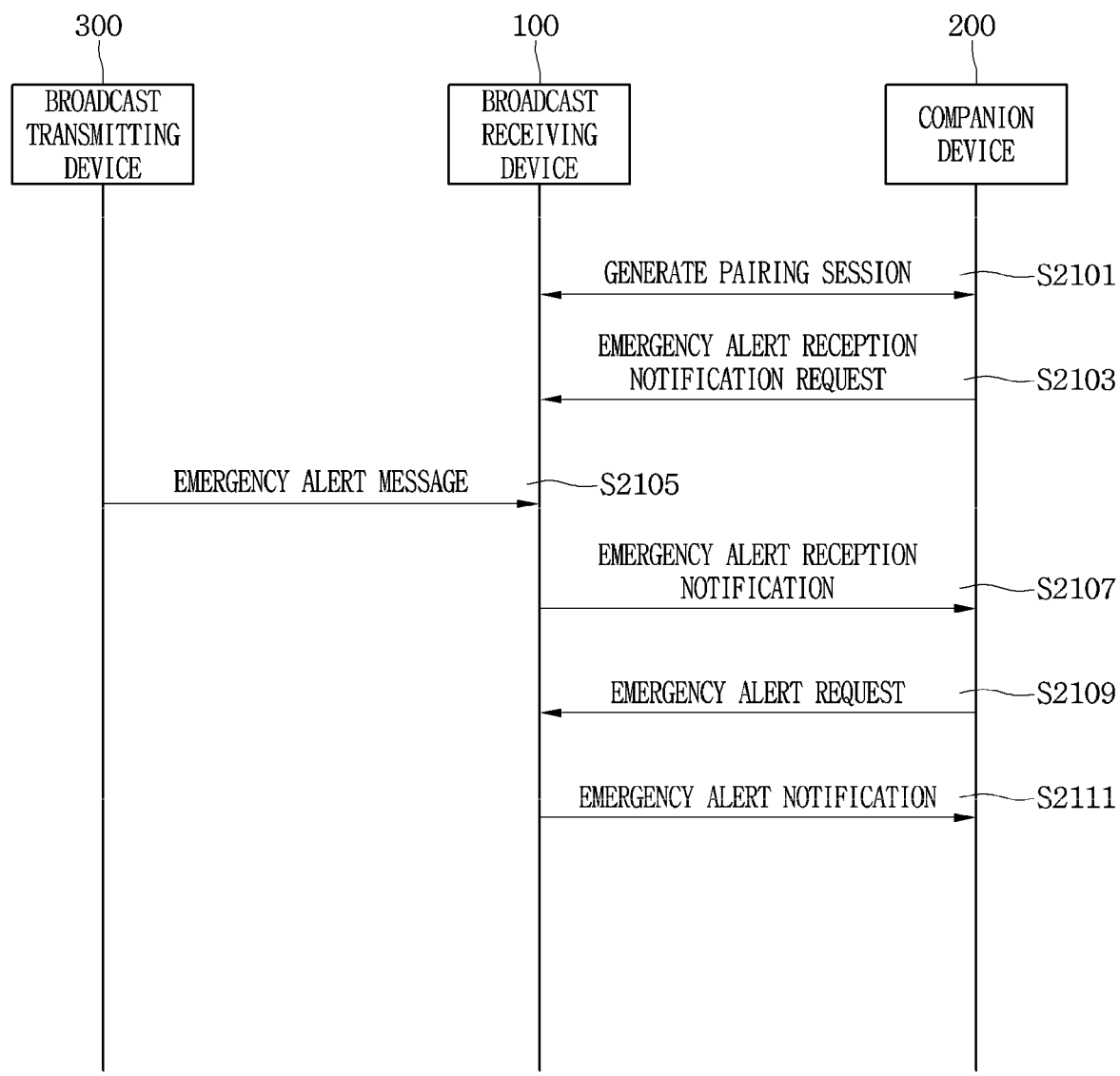
FIG. 50 is a ladder diagram illustrating operations when a broadcast receiving device signals an emergency alert to a companion device according to an embodiment of the present invention.

FIG. 50 is a ladder diagram illustrating operations when a broadcast receiving device signals an emergency alert to a companion device according to an embodiment of the present invention.

The broadcast receiving device 100 and the companion device 200 generate a pairing session in operation 52101. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 34.

The companion device 200 requests an emergency alert reception notification from the broadcast receiving device 100 in operation 52103. In more detail, the companion device 200 may request an emergency alert reception notification from the broadcast receiving device 100 through a control unit. In more detail, the companion device 200 may request an emergency alert reception notification from the broadcast receiving device 100 through the UPnP protocol. According to a specific embodiment, the companion device 200 may requests an event subscription for an emergency alert reception notification from the broadcast receiving device 100 on the basis of an eventing protocol.

The broadcast receiving device 100 receives a message including an emergency alert from the broadcast transmission unit 300 in operation S2105. In more detail, the broadcast receiving device 100 may receive an emergency alert message from the broadcast transmitting device 300 through the broadcast reception unit 110.

The broadcast receiving device 100 notifies information on the emergency alert message to the companion device 200 on the basis of the emergency alert message in operation S2107. In more detail, the broadcast receiving device 100 may notify information on the emergency alert message to the companion device 200 through the control unit 150 on the basis of the emergency alert message. According to a specific embodiment, the broadcast receiving device 100 may notify the companion device 200 of the information on the emergency alert message through a parameter representing the information on the emergency alert message. According to a specific embodiment, the parameter representing the information on the emergency alert message may be EmergencyAlert of FIG. 49.

The companion device 200 requests the information on the emergency alert from the broadcast receiving device 100 in operation S2109. In more detail, the companion device 200 may request an emergency alert from the broadcast receiving device 100 through a control unit. According to a specific embodiment, the companion device 200 may request an emergency alert through an action requesting an emergency alert. According to a specific embodiment, the action requesting an emergency alert may be GetEmergencyAlertMessage of FIG. 49.

The broadcast receiving device 100 notifies information on an emergency alert including all emergency alert messages to the companion device 200 in operation S2111. In more detail, the broadcast receiving device 100 may notify information on the emergency alert including all emergency alert messages to the companion device 200 through the control unit 150. However, in such a case, since all emergency alert message need to be transmitted and received, this may serve as a load to operations of the broadcast receiving device 100 and the companion device 200. Accordingly, a method of efficiently transmitting an emergency alert message to the companion device 200 is required.

The broadcast receiving device 100 may extract information necessary for the companion device 200 from an emergency alert message and may then transmit the extracted information to the companion device 200. According to a specific embodiment, the broadcast receiving device 100 may extract from the emergency alert message at least one of an identifier for identifying an emergency alert, information representing the category of an emergency alert, information representing a description for an emergency alert, information representing a region corresponding to an emergency alert, information representing the urgency of an emergency alert, information representing the severity of a disaster causing an emergency alert, and information representing the certainty of a disaster causing an emergency alert. According to a specific embodiment, the broadcast receiving device 100 may extract from the emergency alert message at least one of identifier that is an element for identifying an emergency alert, category that is an element representing the category of an emergency alert, description that is an element representing a description for an emergency alert, areaDesc that is an element representing a region corresponding to an emergency alert, urgency that is an element representing the urgency of an emergency alert, severity that is an element representing the severity of a disaster causing an emergency alert, and certainty that is an element representing the certainty of a disaster causing an emergency alert.

The companion device 200 may determine the priority of an emergency alert and may operate on the basis of the priority of the emergency alert. A method of determining the priority of an emergency alert will be described with reference to FIGS. 51 to 53.

FIGS. 51 to 53 are views illustrating the criteria of a broadcast receiving device to determine the priority of an emergency alert according to an embodiment of the present invention.

The companion device 200 may classify the priority of an emergency alert on the basis of each value of information representing the urgency of an emergency alert, information representing the severity of a disaster causing an emergency alert, and information representing the certainty of a disaster causing an emergency alert. At this point, the companion device 200 may determine the priority of an emergency alert according to a value having the highest priority among information representing the urgency of an emergency alert, information representing the severity of a disaster causing an emergency alert, and information representing the certainty of a disaster causing an emergency alert. According to a specific embodiment, the companion device 200 may classify the priority of an emergency alert into three urgencies according to values of information representing the urgency of an emergency alert, information representing the severity of a disaster causing an emergency alert, and information representing the certainty of a disaster causing an emergency alert. For example, as shown in FIG. 52, it is determined that the companion device 200 has the highest priority when the Urgency element corresponds to Immediate or Expected, has a medium priority lower than the highest priority and higher than the lowest priority when the Urgency element corresponds to Future, has the lowest priority when the Urgency element corresponds to Past, and has a priority corresponding to an initial value when the Urgency element corresponds to Unknown. At this point, the initial value may have a medium priority lower than the highest priority and higher than the lowest priority. Additionally, as shown in FIG. 52, it is determined that the companion device 200 has the highest priority when the Severity element corresponds to Extreme or Severe, has a medium priority lower than the highest priority and higher than the lowest priority when the Severity element corresponds to Moderate, has the lowest priority when the Severity element corresponds to Minor, and has a priority corresponding to an initial value when the Severity element corresponds to Unknown. At this point, the initial value may have a medium priority lower than the highest priority and higher than the lowest priority. Additionally, as shown in FIG. 52, it is determined that the companion device 200 has the highest priority when the Certainty element corresponds to Very likely or likely, has a medium priority lower than the highest priority and higher than the lowest priority when the Certainty element corresponds to Possible, has the lowest priority when the Certainty element corresponds to Unlikely, and has a priority corresponding to an initial value when the Certainty element corresponds to Unknown. At this point, the initial value may have a medium priority lower than the highest priority and higher than the lowest priority.

According to another embodiment, the companion device 200 may assign points on the basis of each value of information representing the urgency of an emergency alert, information representing the severity of a disaster causing an emergency alert, and information representing the certainty of a disaster causing an emergency alert, and may then determine the priority of an emergency alert according to the point sum. According to a specific embodiment, the companion device 200 may assign points with the same weight to information representing the urgency of an emergency alert, information representing the severity of a disaster causing an emergency alert, and information representing the certainty of a disaster causing an emergency alert. For example, as shown in FIG. 53, the companion device 200 may assign five points when the Urgency element corresponds to Immediate, four points when the Urgency element corresponds to Expected, three points when the Urgency element corresponds to Future, two points when Urgency element corresponds to Past, and one point when Urgency element corresponds to Unknown. Additionally, as shown in FIG. 53, the companion device 200 may assign five points when the Severity element corresponds to Extreme, four points when the Severity element corresponds to Severe, three points when the Severity element corresponds to Moderate, two points when Severity element corresponds to Minor, and one point when Severity element corresponds to Unknown. Additionally, as shown in FIG. 53, the companion device 200 may assign five points when the Certainty element corresponds to Very likely, four points when the Certainty element corresponds to likely, three points when the Certainty element corresponds to Possible, two points when Certainty element corresponds to Unlikely, and one point when Certainty element corresponds to Unknown. At this point, when the point sum is greater than 10 or less than 15, the companion device 200 determines that an emergency alert has the highest priority. Additionally, when the point sum is greater than 5 or less than 10, the companion device 200 determines that an emergency alert has a medium priority lower than the highest priority and higher than the lowest priority. Additionally, when the point sum is greater than 0 or less than 5, the companion device 200 determines that an emergency alert has the lowest priority.

Additionally, according to another specific embodiment, the companion device 200 may assign points with different weights to information representing the urgency of an emergency alert, information representing the severity of a disaster causing an emergency alert, and information representing the certainty of a disaster causing an emergency alert. For example, as shown in FIG. 200, the companion device 200 may assign nine points when the Urgency element corresponds to Immediate, eight points when the Urgency element corresponds to Expected, seven points when the Urgency element corresponds to Future, five points when Urgency element corresponds to Past, and zero point when Urgency element corresponds to Unknown. Additionally, as shown in FIG. 54, the companion device 200 may assign five points when the Severity element corresponds to Extreme, four points when the Severity element corresponds to Severe, three points when the Severity element corresponds to Moderate, two points when Severity element corresponds to Minor, and zero point when Severity element corresponds to Unknown. Additionally, as shown in FIG. 54, the companion device 200 may assign six points when the Certainty element corresponds to Very likely, five points when the Certainty element corresponds to likely, four points when the Certainty element corresponds to Possible, three points when Certainty element corresponds to Unlikely, and zero point when Certainty element corresponds to Unknown. At this point, when the point sum is greater than 10 or less than 15, the companion device 200 determines that an emergency alert has the highest priority. Additionally, when the point sum is greater than 5 or less than 10, the companion device 200 determines that an emergency alert has a medium priority lower than the highest priority and higher than the lowest priority. Additionally, when the point sum is greater than 0 or less than 5, the companion device 200 determines that an emergency alert has the lowest priority.

The companion device 200 may display an emergency alert on the basis of the priority of an emergency alert. According to a specific embodiment, the companion device 200 may change at least one of an alarm sound according to an emergency alert, the duration of an alarm, the number of alarms, and an emergency alert display time on the basis of the priority of an emergency alert. For example, as the priority of an emergency alert is higher, the companion device 200 may allow an alarm sound to be higher. Additionally, as the priority of an emergency alert is higher, the companion device 200 may allow an alarm sound to be longer.

According to the embodiments described with reference to FIGS. 50 and 51, the broadcast receiving device 100 needs to transmit all emergency alert message to the companion device 200. However, the companion device 200 may require only part of information of an emergency alert message. Accordingly, the broadcast receiving device 200 requires an operating method thereof to transmit only part of information of an emergency alert message that the companion device 200 requires. This will be described in more detail with reference to FIGS. 54 and 55.

FIG. 54 is a view illustrating a parameter representing a state of an emergency alert that a broadcast receiving device signals, an action for emergency alert, and an action argument according to another embodiment of the present invention.

The companion device 200 may designate specific information of emergency information that the companion device 200 wants to obtain while requesting information on an emergency alert from the broadcast receiving device 100. Specific information of an emergency alert may be one or more information among a plurality of information included in an emergency alert message. At this point, the broadcast receiving device 100 may transmit specific information on an emergency alert to the companion device 200. For this, the companion device 200 may use an action for requesting specific information on an emergency alert. At this point, the action may have a parameter for identifying specific information on an emergency alert as an input argument. According to a specific embodiment, a parameter that the companion device 200 wants to obtain specific information of an emergency alert may be EmergencyAlertField. According to a specific embodiment, EmergencyAlertField may be an essential parameter and may have a string data type. An action for requesting specific information on an emergency alert may be GetEmergencyAlerMessage. GetEmergencyAlerMessage is an essential parameter and may have EmergencyAlertField as an input argument. Specific operations of the broadcast receiving device 100 and the companion device 200 will be described with reference to FIG. 55.

Figure 55:
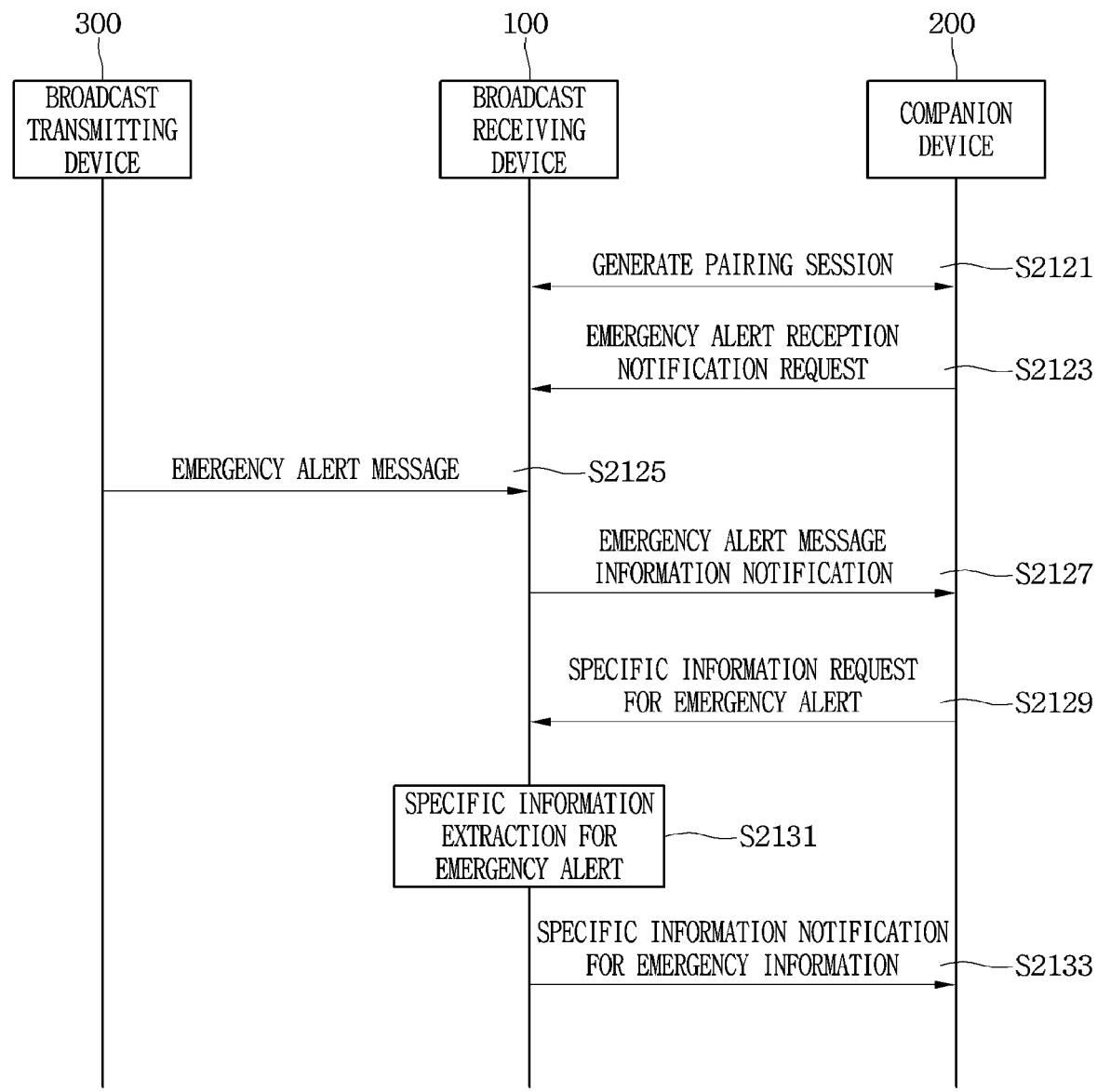
FIG. 55 is a ladder diagram illustrating operations when a broadcast receiving device signals an emergency alert to a companion device according to another embodiment of the present invention.

FIG. 55 is a ladder diagram illustrating operations when a broadcast receiving device signals an emergency alert to a companion device according to another embodiment of the present invention.

The broadcast receiving device 100 and the companion device 200 generate a pairing session in operation S2121. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 50.

The companion device 200 requests an emergency alert reception notification from the broadcast receiving device 100 in operation S2123. In more detail, the companion device 200 may request an emergency alert reception notification from the broadcast receiving device 100 through a control unit. In more detail, operations of the companion device 200 may be identical to those in the embodiment of FIG. 50.

The broadcast receiving device 100 receives an emergency alert message including an emergency alert on the basis of broadcast service in operation S2125. In more detail, the broadcast receiving device 100 may receive an emergency alert message including an emergency alert from the broadcast transmitting device 300 through the broadcast reception unit 110.

The broadcast receiving device 100 notifies information on the emergency alert message to the companion device 200 on the basis of the emergency alert message in operation S2127. In more detail, the broadcast receiving device 100 may notify information on the emergency alert message to the companion device 200 through the control unit 150 on the basis of the emergency alert message. Additionally, according to a specific embodiment, the broadcast receiving device 100 may notify the companion device 200 of the information on the emergency alert message through a parameter representing the information on the emergency alert message. According to a specific embodiment, the broadcast receiving device 100 may notify the companion device 200 of the information on the emergency alert message through a parameter representing the information on the emergency alert message. According to a specific embodiment, the parameter representing the emergency alert message may be EmergencyAlert of FIG. 49.

The companion device 200 requests specific information on the emergency alert from the broadcast receiving device 100 in operation S2129. The companion device 200 may requests specific information on the emergency alert from the broadcast receiving device 100 through a control unit. At this point, the specific information on the emergency alert may be information necessary for the companion device 200 to provide additionally information on the emergency alert. According to a specific embodiment, the companion device 200 may request from the broadcast receiving device 100 at least one of an identifier for identifying an emergency alert, information representing the category of an emergency alert, information representing a description for an emergency alert, information representing a region corresponding to an emergency alert, information representing the urgency of an emergency alert, information representing the Severity of a disaster causing an emergency alert, and information representing the certainty of a disaster causing an emergency alert in the emergency alert message. For example, the companion device 200 may request from the broadcast receiving device 100 at least one of identifier that is an element for identifying an emergency alert, category that is an element representing the category of an emergency alert, description that is an element representing a description for an emergency alert, areaDesc that is an element representing a region corresponding to an emergency alert, urgency that is an element representing the urgency of an emergency alert, severity that is an element representing the severity of a disaster causing an emergency alert, and certainty that is an element representing the certainty of a disaster causing an emergency alert in the emergency alert message. According to a specific embodiment, the companion device may request specific information on the emergency alert from the broadcast receiving device 100 through the GetEmergencyAlertMessage action and EmergencyAlertField of FIG. 54.

The broadcast receiving device 100 extracts specific information on the emergency alert on the basis of the emergency alert message in operation S2131. In more detail, the broadcast receiving device 100 may extract the specific information on the emergency alert through the control unit 150 on the basis of the emergency alert message. In more detail, the broadcast receiving device 100 may extract the specific information on the emergency alert from the emergency alert message through the control unit 150.

The broadcast receiving device 100 notifies a specific property on the emergency alert to the companion device 200 in operation S2133. In more detail, the broadcast receiving device 100 may notify the specific property on the emergency alert to the companion device 200 through the control unit 150. In more detail, the broadcast receiving device 100 may notify the specific property on the emergency alert on the basis of a request of the companion device 200.

However, when the broadcast receiving device 100 interoperates with a plurality of companion devices 200, as the broadcast receiving device 100 directly transmits the specific information on the emergency alert necessary for the companion device 200, this may cause the overload to an operation of the broadcast receiving device 100. Accordingly, a method of signaling an emergency alert to the companion device 200, which reduces the load of the broadcast receiving device 100, may be required. This will be described with reference to FIG. 56.

Figure 56:
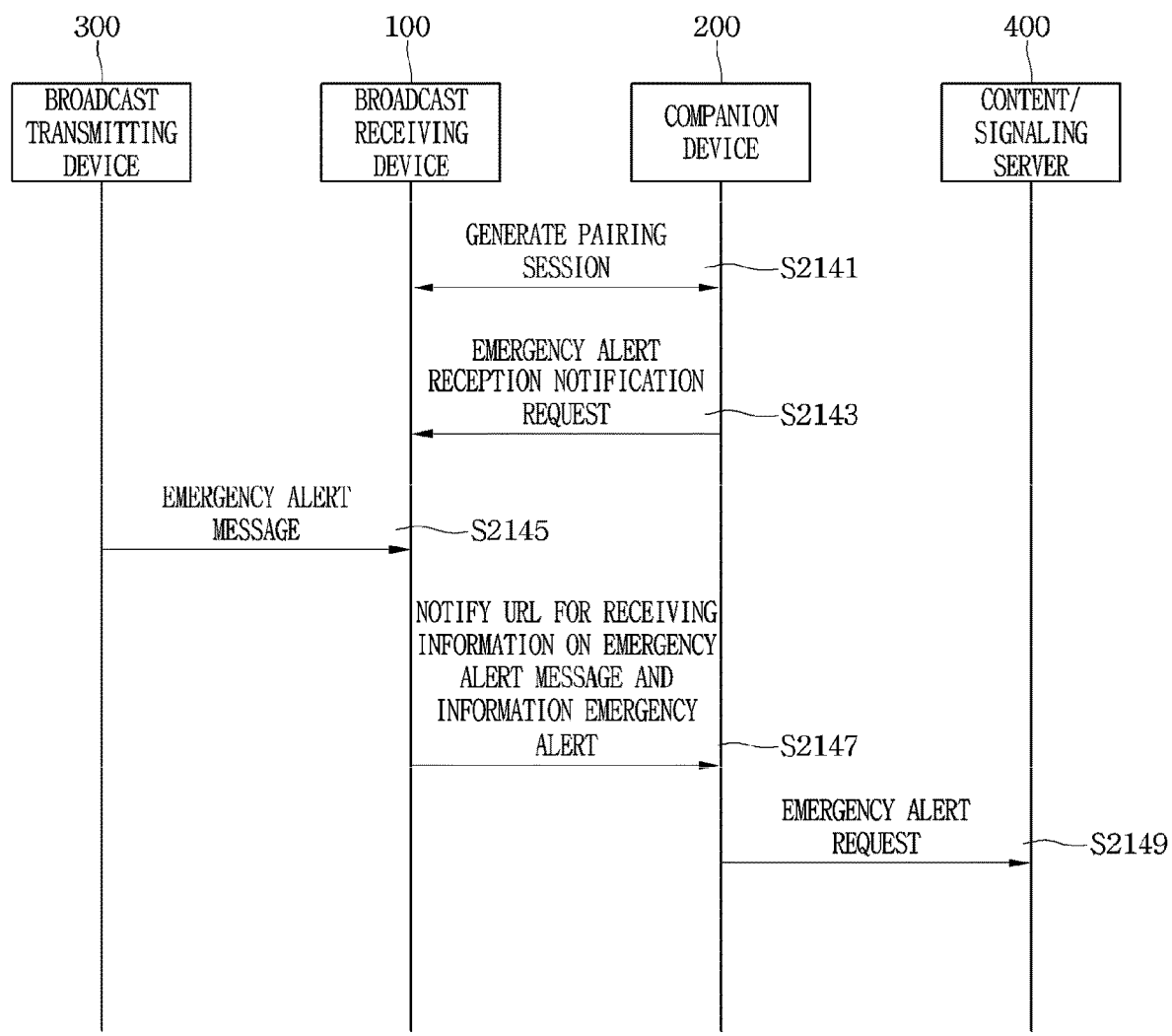
FIG. 56 is a ladder diagram illustrating operations when a broadcast receiving device signals an emergency alert to a companion device according to another embodiment of the present invention.

FIG. 56 is a ladder diagram illustrating operations when a broadcast receiving device signals an emergency alert to a companion device according to another embodiment of the present invention.

The broadcast receiving device 100 and the companion device 200 generate a pairing session in operation S2141. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 55.

The companion device 200 requests an emergency alert reception notification from the broadcast receiving device 100 in operation S2143. In more detail, the companion device 200 may request an emergency alert reception notification from the broadcast receiving device 100 through a control unit. In more detail, operations of the companion device 200 may be identical to those in the embodiment of FIG. 55.

The broadcast receiving device 100 receives an emergency alert message including an emergency alert on the basis of broadcast service in operation S2145. In more detail, the broadcast receiving device 100 may receive an emergency alert message including an emergency alert from the broadcast transmitting device 300 through the broadcast reception unit 110.

The broadcast receiving device 100 notifies a URL for obtaining information on an emergency alert message and information on an emergency alert to the companion device 200 on the basis of the emergency alert message in operation S2147. In more detail, the broadcast receiving device 100 notifies a URL for obtaining information on an emergency alert message and information on an emergency alert to the companion device 200 through the control unit 150 on the basis of the emergency alert message.

The companion device 200 obtains information on an emergency alert on the basis of a URL for obtaining the information on the emergency alert. In more detail, the companion device 200 may obtain information on an emergency alert on the basis of a URL for obtaining the information on the emergency alert through a control unit. In more detail, the companion device 200 may obtain information on an emergency alert from the content/signaling server 400 on the basis of a URL for obtaining the information on the emergency alert. In more detail, the companion device 200 may request information on an emergency alert from the content/signaling server 400 on the basis of a URL for obtaining the information on the emergency alert and may then obtain the information on the emergency alert from the content/signaling server 400. Through this, the load of the broadcast communication device 100 resulting from a communication between the broadcast receiving device 100 and the companion device 200 may be reduced.

When the broadcast receiving device 100 transmits a user interface (UI) representing an emergency alert to the companion device 200, the load for processing the emergency alert of the companion device 200 may be reduced. This will be described with reference to FIG. 57.

Figure 57:
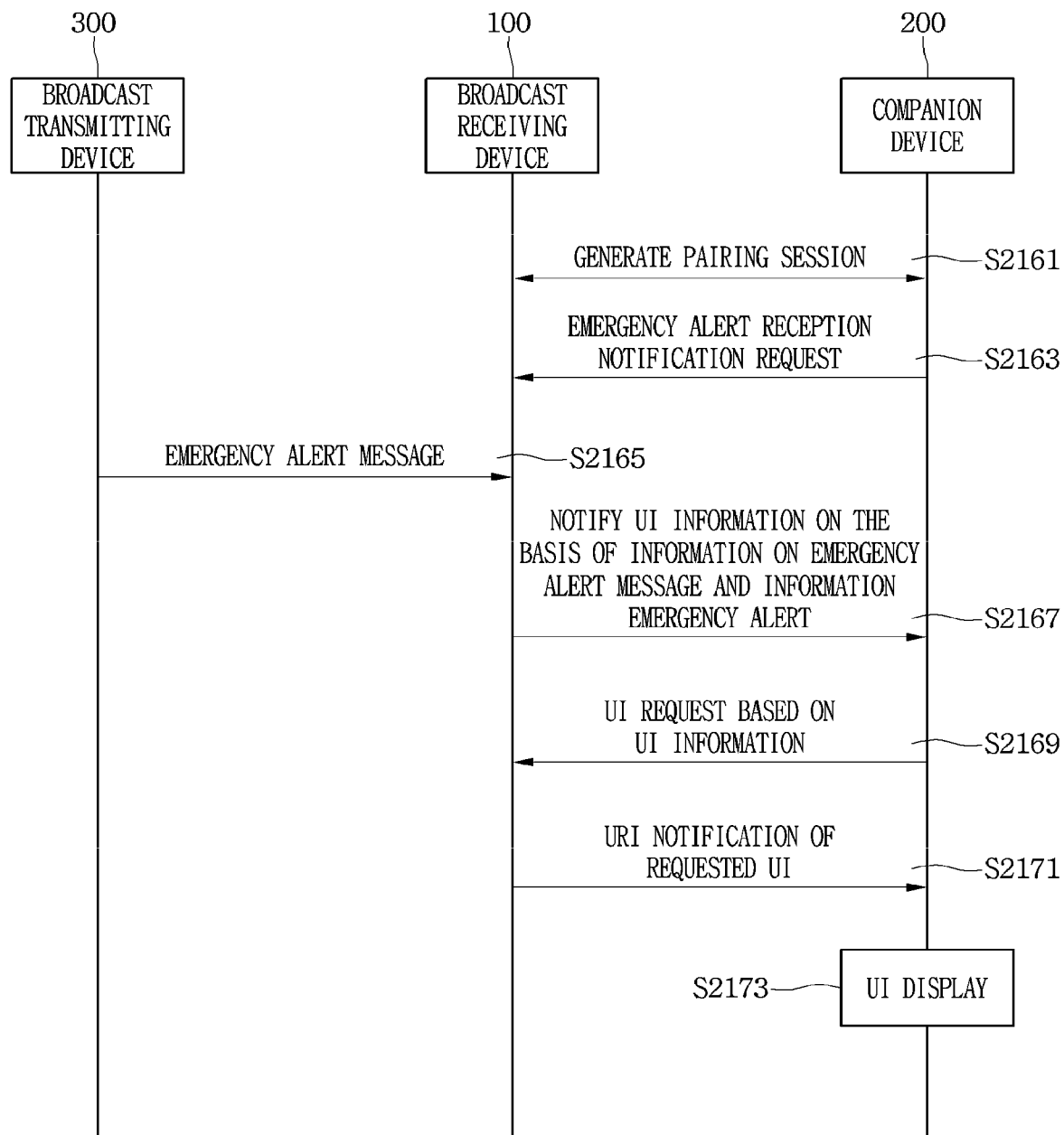
FIG. 57 is a ladder diagram illustrating operations when a broadcast receiving device signals an emergency alert to a companion device according to another embodiment of the present invention.

FIG. 57 is a ladder diagram illustrating operations when a broadcast receiving device signals an emergency alert to a companion device according to another embodiment of the present invention.

The broadcast receiving device 100 and the companion device 200 generate a pairing session in operation S2161. In more detail, the broadcast receiving device 100 may generate a pairing session with the companion device 200 through an IP communication unit 130. In more detail, the companion device 200 may generate a pairing session with the broadcast receiving device 100 through a communication unit. As described above, the broadcast receiving device 100 and the companion device 200 may generate a pairing session for bidirectional communication. In more detail, operations of the broadcast receiving device 100 and the companion device 200 may be identical to those in the embodiment of FIG. 56.

The companion device 200 requests an emergency alert reception notification from the broadcast receiving device 100 in operation S2163. In more detail, the companion device 200 may request an emergency alert reception notification from the broadcast receiving device 100 through a control unit. In more detail, operations of the companion device 200 may be identical to those in the embodiment of FIG. 56.

The broadcast receiving device 100 receives an emergency alert message including an emergency alert on the basis of broadcast service in operation S2165. In more detail, the broadcast receiving device 100 may receive an emergency alert message including an emergency alert from the broadcast transmitting device 300 through the broadcast reception unit 110.

The broadcast receiving device 100 notifies information on an emergency alert message and UI information on an emergency alert to the companion device 200 on the basis of the emergency alert message in operation S2167. In more detail, the broadcast receiving device 100 notifies the information on the emergency alert message and the UI information on the emergency alert to the companion device 200 through the control unit 150 on the basis of the emergency alert message. At this point, the UI information on the emergency alert may include a list of UIs representing the emergency alert.

The companion device 200 requests a UI for emergency alert from the broadcast receiving device 100 on the basis of the UI information on the emergency alert in operation S2169. In more detail, the companion device 200 may request a UI for emergency alert from the broadcast receiving device 100 through a control unit on the basis of the UI information on the emergency alert.

The broadcast receiving device 100 transmits a URI for obtaining the UI for emergency alert to the companion device 200 on the basis of a request of the companion device 200 in operation S2171. The broadcast receiving device 100 may transmit a UI for obtaining the UI for emergency alert through the control unit 150 on the basis of a request of the companion device 200.

The companion device 200 displays the UI for emergency alert on the basis of a URI for obtaining the UI for emergency alert in operation S2173. The companion device 200 may display a UI for emergency alert on the basis of a URI for obtaining the UI for emergency alert. In more detail, the companion device 200 may obtain a UI on the basis of a URI for obtaining the UI for emergency alert. At this point, the companion device 200 may obtain the UI for emergency information fro an external server. For example, the companion device 200 may receive at least one of image files, HTML files, and XML files for the UI for emergency information. At this point the external server may be the content/signaling server 400. According to another specific embodiment, the companion device 200 may store a UI for emergency alert in advance and may call a UI corresponding to URI among stored UIs. Additionally, the companion device 200 may display the UI for emergency obtained through such an operation. Since the companion device 200 processes an emergency alert through such an operation, the load of the companion device 200 may be reduced.

In the case of receiving an ATSC terrestrial broadcast via a cable or satellite instead of directly receiving the broadcast, information on a broadcast program currently being watched is identified by using an ACR function, and a supplementary service related to a real-time broadcast is provided based on the information. An object of the present invention is to provide a mechanism for providing a program-related supplementary service, which is provided to a TV by using the ACR function, to a user via a 2nd device such as a smart device or tablet so as not to cause inconvenience in watching content. Further, the present invention provides a method for providing a supplementary service by identifying a program being watched by using a 2nd device in the case where a TV does not have the ACR function.

Figure 58:
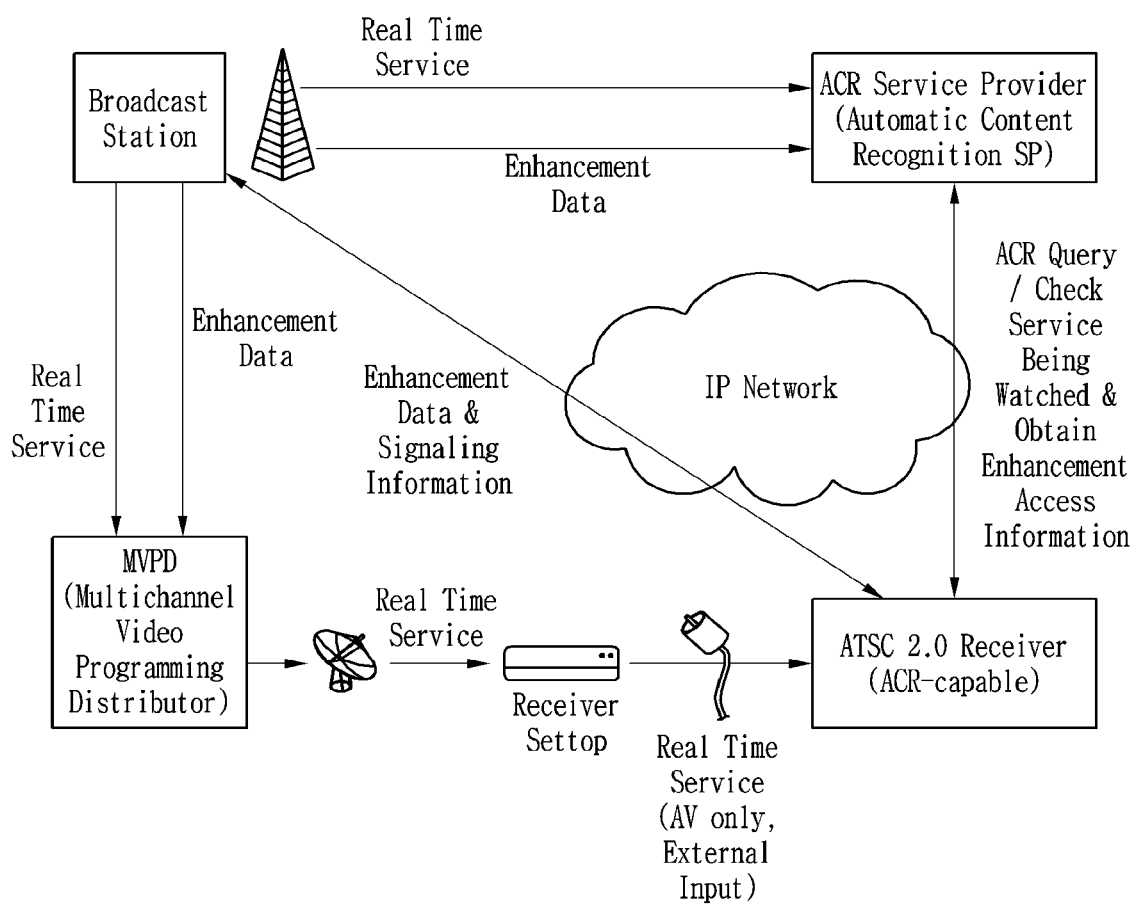
FIG. 58 is a conceptual diagram illustrating an enhanced TV service based on automatic content recognition (ACR).

FIG. 58 is a conceptual diagram illustrating an enhanced TV service based on automatic content recognition (ACR).

Even when a terrestrial broadcast station transmits a real-time service and enhancement data at the same time, the enhancement data cannot be received and only AV can be received in the case of receiving the service and data via a multichannel video programming distributor (MVPD) such as a cable or satellite broadcaster. In this case, an ATSC 2.0 receiver (enhanced TV service-capable receiver) having an ACR function may analyze and process the AV received as an external input according to an ACR function to identify a program. Based on this identified program information and related metadata, the enhancement data can be received via an IP network so as to provide improved experience of watching TV. Although the enhancement data are obtained via the IP network in this embodiment, the enhancement data may also be obtained via an ATSC MH service for providing improved performance of indoor reception. Further, in the case of performing ACR based on a watermark technique, a receiver may perform this operation independently without intervention of a special ACR SP.

Figure 59:
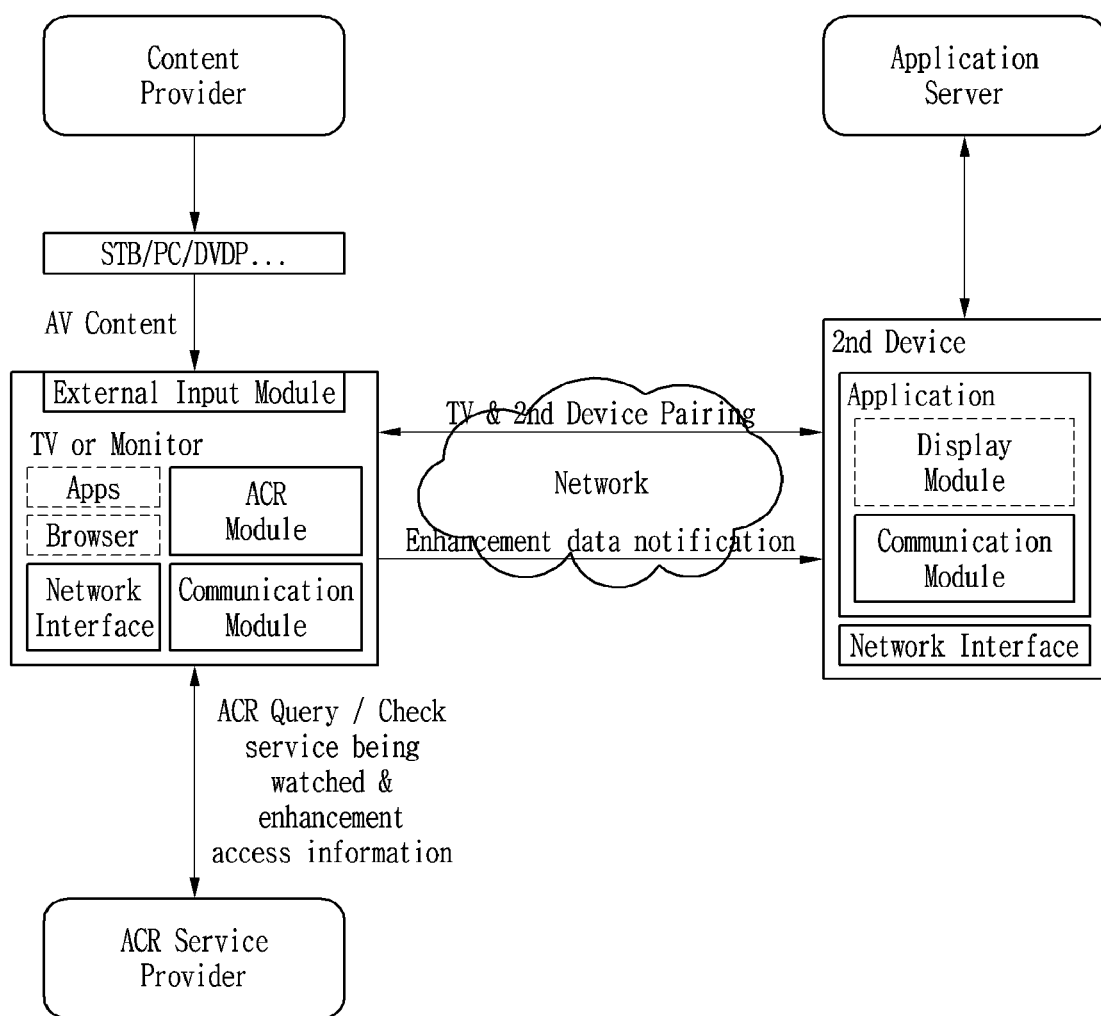
FIG. 59 is conceptual diagrams illustrating a service of providing, via a 2nd device, program information identified via ACR and enhancement data obtained based on related metadata.
Figure 62:
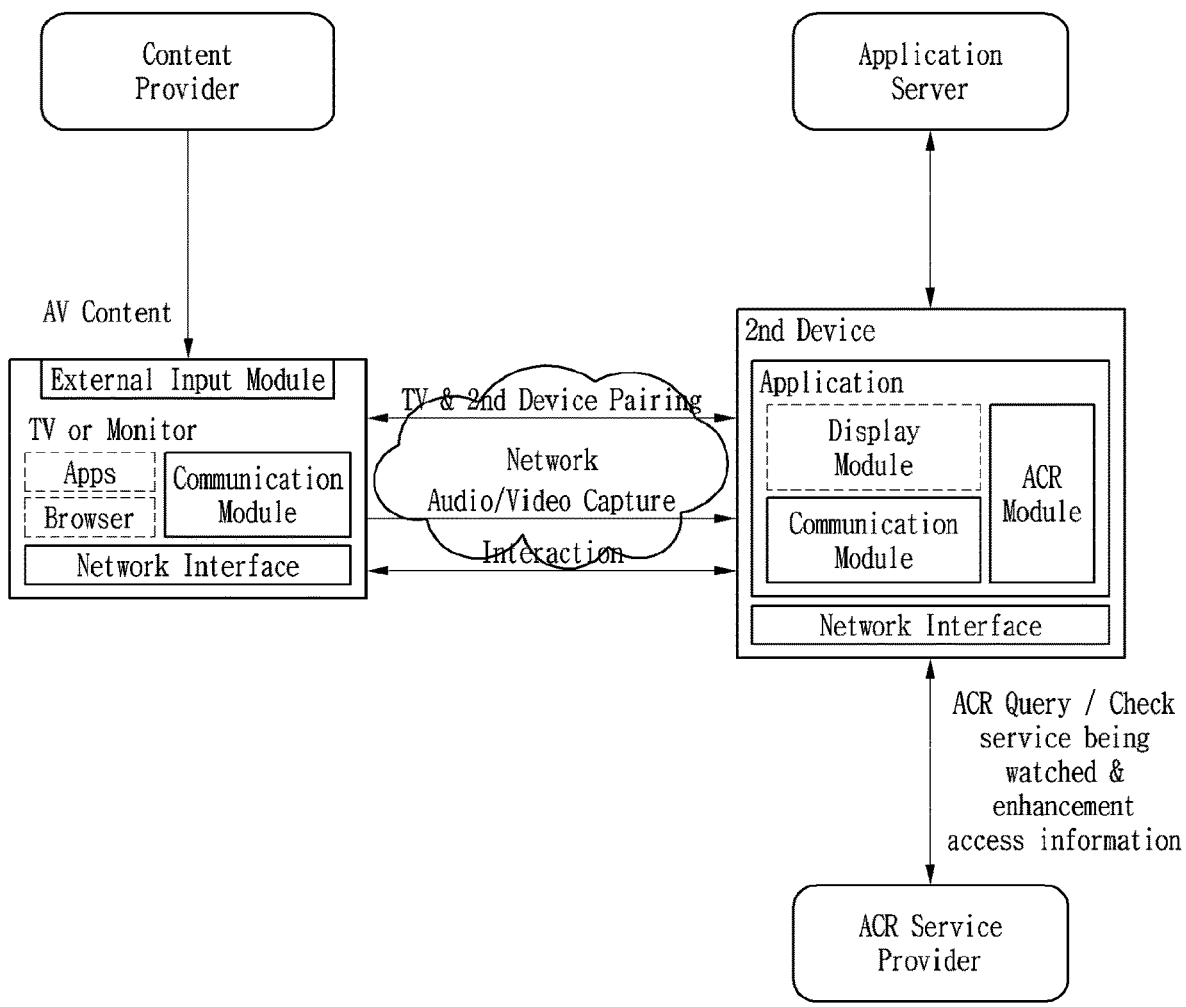
FIG. 62 is conceptual diagrams illustrating a service of providing, via a 2nd device, program information identified via ACR and enhancement data obtained based on related metadata.

FIGS. 59 and 62 are conceptual diagrams illustrating a service of providing, via a 2nd device, program information identified via ACR and enhancement data obtained based on related metadata.

Figure 60:
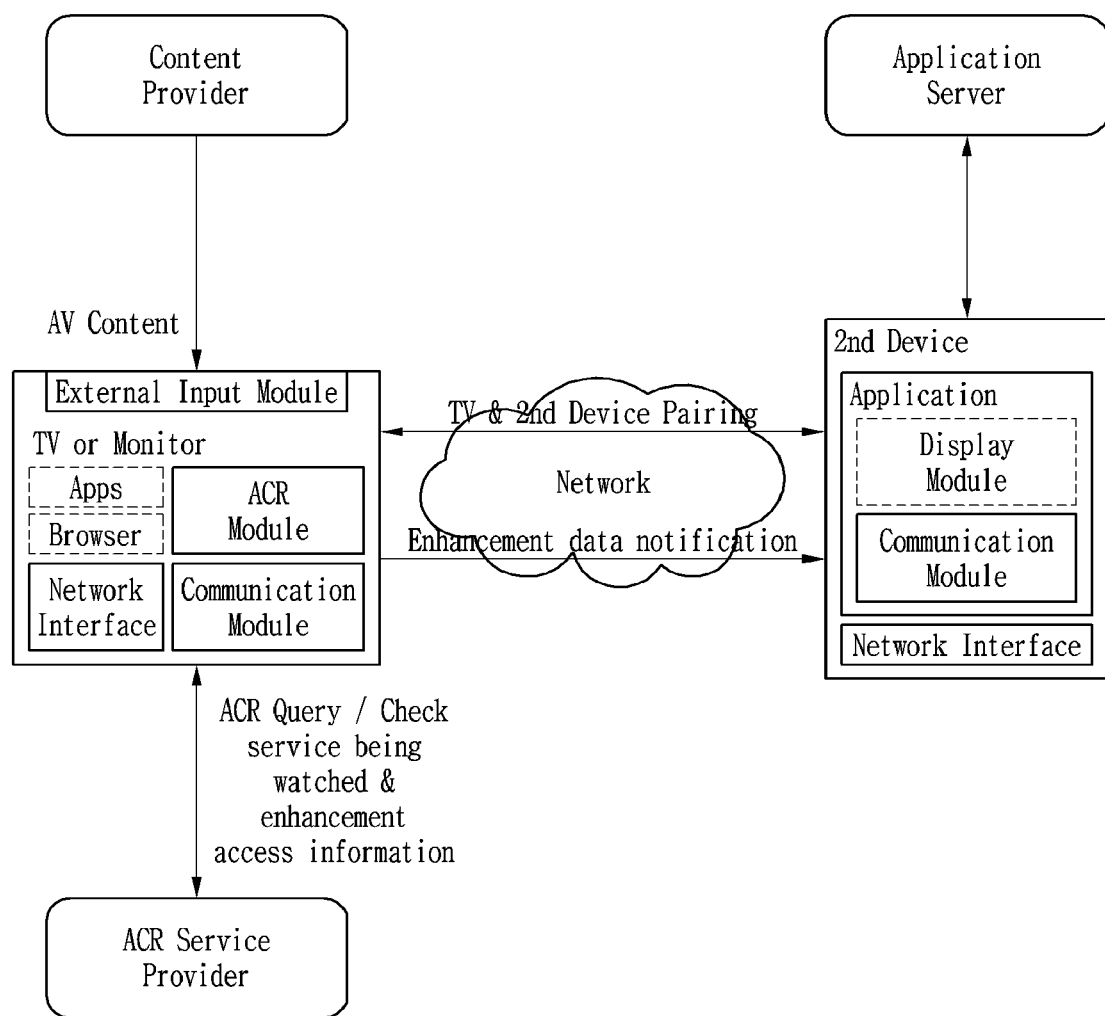
FIG. 60 is conceptual diagrams illustrating a service of providing, via a 2nd device, program information identified via ACR and enhancement data obtained based on related metadata.

FIG. 59 and FIG. 60 illustrate examples in which an ACR function is performed by a 2nd device application equipped with an ACR module in the case where an ACR module is installed in a TV, and [FIG. 4] and [FIG. 5] illustrate examples in which an ACR function is performed by a 2nd device application equipped with an ACR module in the case of watching a TV not equipped with an ACR module.

Figure 61:
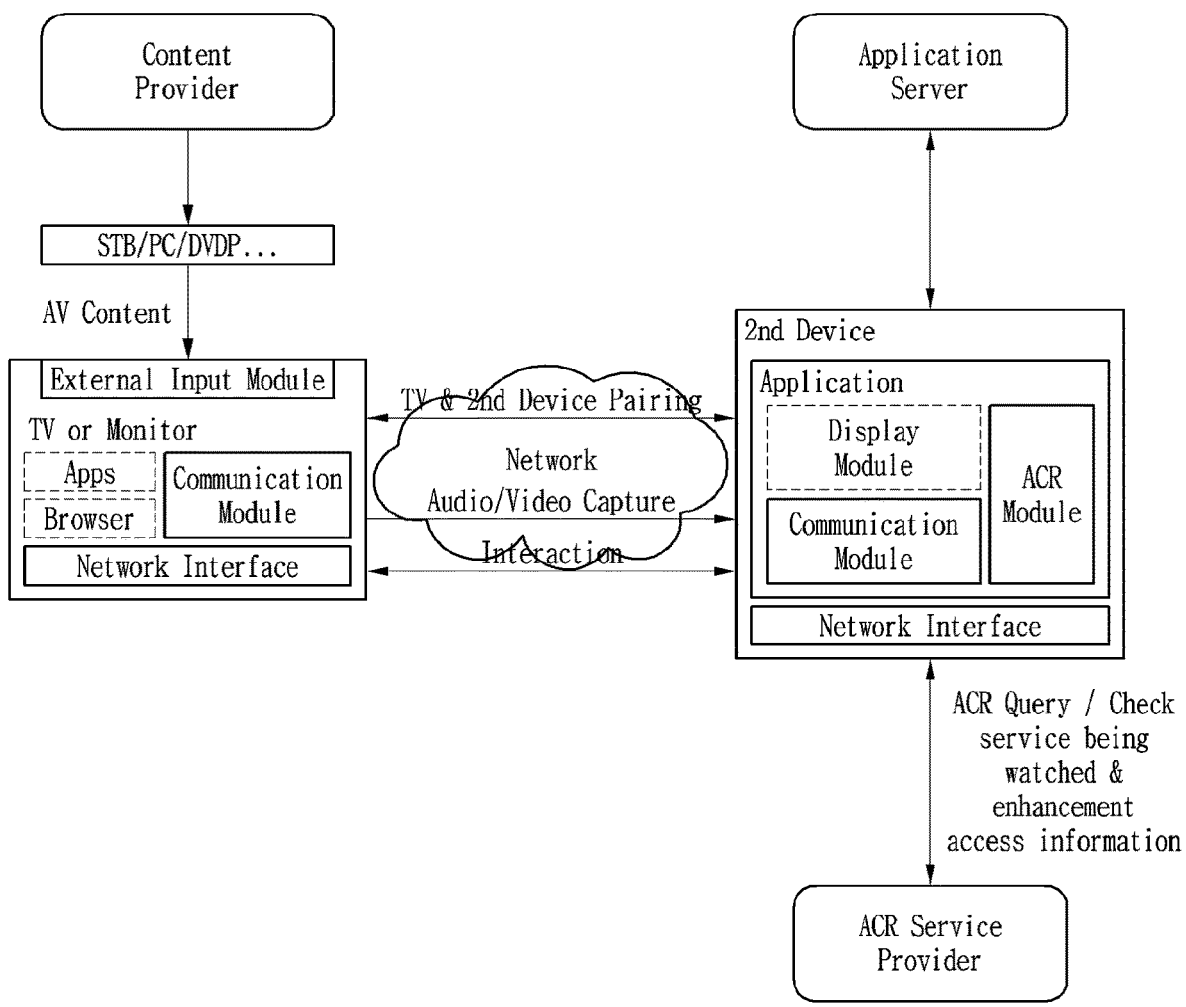
FIG. 61 is conceptual diagrams illustrating a service of providing, via a 2nd device, program information identified via ACR and enhancement data obtained based on related metadata.

FIG. 59 and FIG. 61 illustrate examples in which a TV or monitor receives terrestrially broadcasted audio/video content by using an external input device. [FIG. 3] and [FIG. 5] illustrate examples in which a TV or monitor directly receives terrestrially broadcasted audio/video content.

To actually receive audio/video content, an internal hardware module is needed, but the conceptual diagrams illustrate only the modules needed for describing the present invention. Smart devices connected to the Internet, such as a smartphone and smartpad, are examples of the 2nd device, but are not illustrated in the conceptual diagrams for the above-mentioned reason.

- Content Provider: Agent of provision of audio/video content watched or listened to by a user. A broadcasting company or other content producers may be included.
- ACR Service Provider: A module which compares a fingerprint of currently-watched content extracted from an ACR module with a reference fingerprint to find matched content. This operation may be performed by using a reference fingerprint DB stored in Local, or by sending a query to a fingerprint query server on the Internet and receiving an answer.
- Application Server: This server provides enhancement data such as additional services related to the currently-watched content identified via the ACR module and ACR service provider. This server may be the same as a content provider, or may mean any agent such as an advertiser or web portal capable of providing related services.
- ACR Module: This module extracts a fingerprint characteristic point or extracts watermarked data from an audio/video stream
- Network Interface: A module for connection to or communication with each server on a network
- Communication Module: A module for pairing or communication between a TV and a 2nd device. Although described independently from a network interface, this module is implemented by using the network interface. In FIG. 61 and FIG. 62, a communication module of the 2nd device provides functions not only for communication with a TV but also for communication with the content provider, ACR service provider, and application server for ACR query/request/response.
- Browser: This browser may display a web-formatted additional service related to a broadcast, but is not essential.
- Apps (Applications): An application module which controls a function of ACR or provides a service enhanced based on ACR. This module may identify broadcast content being watched and may provide an extended service related thereto. In the present invention, since an object of this module is to provide the additional service not in a TV but in the 2nd device, this module may be selectively included in the TV.
- STB/PC/DVDP: These elements may include any device such as a set-top, PC, or DVDP for inputting content to be displayed on a TV.
- External Input Module: This module handles content externally inputted via STB.
- Display Module: This module displays a supplementary service related to a currently-watched program in a 2nd device. This module may be mainly used when a service is provided in the format of web content or web service. Since the supplementary service may also be provided in the form of a special application in addition to being exposed via the display module, the display module may be optional.

Figure 63:
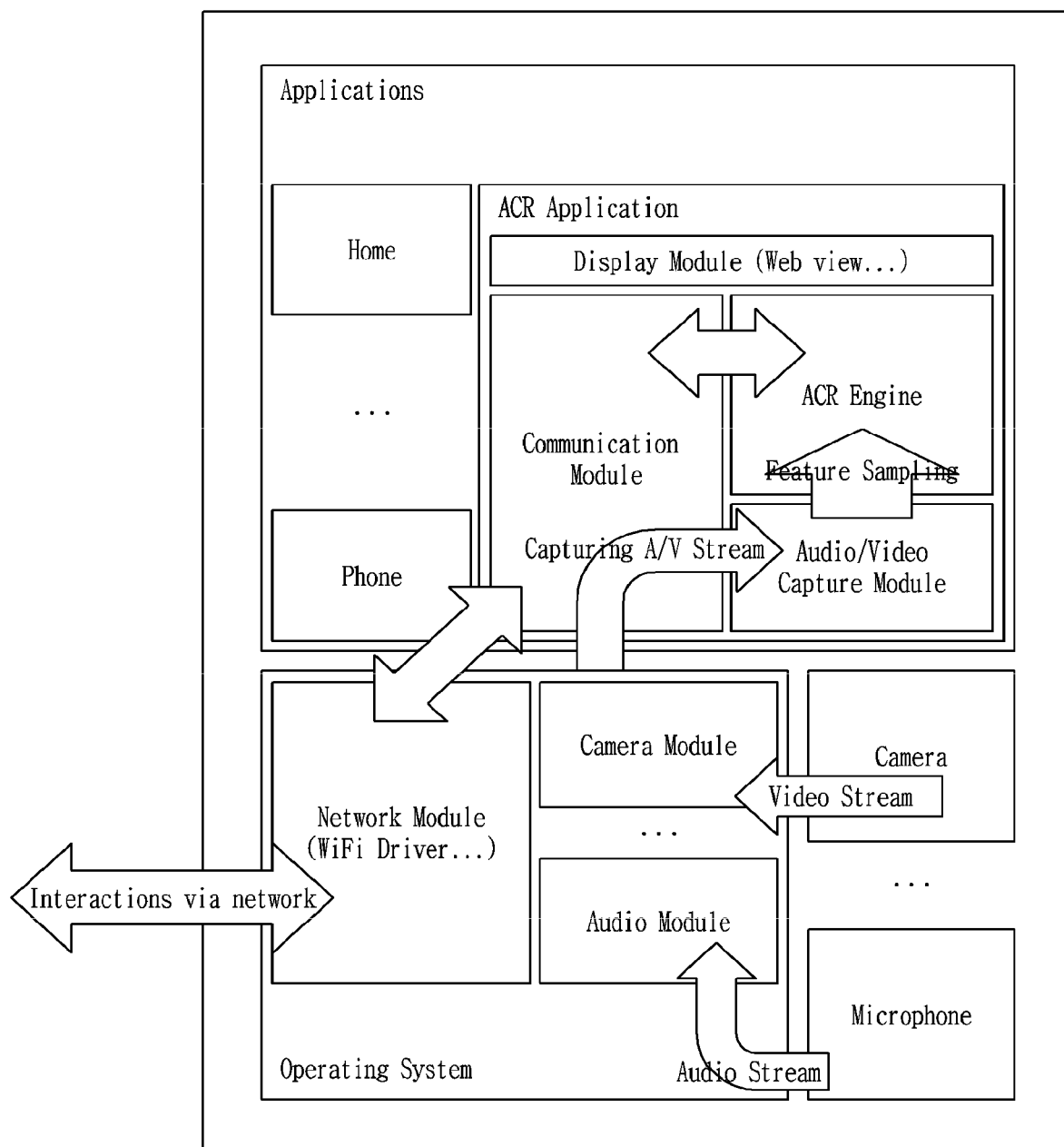
FIG. 63 is illustrates an example structure of the 2nd device having the ACR function.

FIG. 63 is illustrates an example structure of the 2nd device having the ACR function.

The second device may include a camera and microphone H/W and each operating system may provide drivers and libraries for controlling the camera and microphone H/W. The 2nd device receives audio/video streams of a currently-broadcasted program on a TV via the camera and microphone. Although it is described that the ACR function is provided in the form of an application installed in the 2nd device in the present invention, the corresponding function may be provided to the operating system of the device. An ACR application captures the A/V streams inputted via the 2nd device to extract features thereof in an ACR engine, wherein these features may be the above-mentioned fingerprints or information extracted from a watermark. The extracted features are transmitted to the ACR service provider via the communication module and a network module of the OS so as to query identification information on the corresponding A/V streams. The 2nd device which has obtained program identification information and supplementary data may provide the obtained supplementary data in the display module of the application or in the form of a separate application according to a type and character of corresponding supplementary information. If data or service which can be displayed on a TV exist, the data or service may be transmitted to the TV via the network module so as to be provided.

Figure 64:
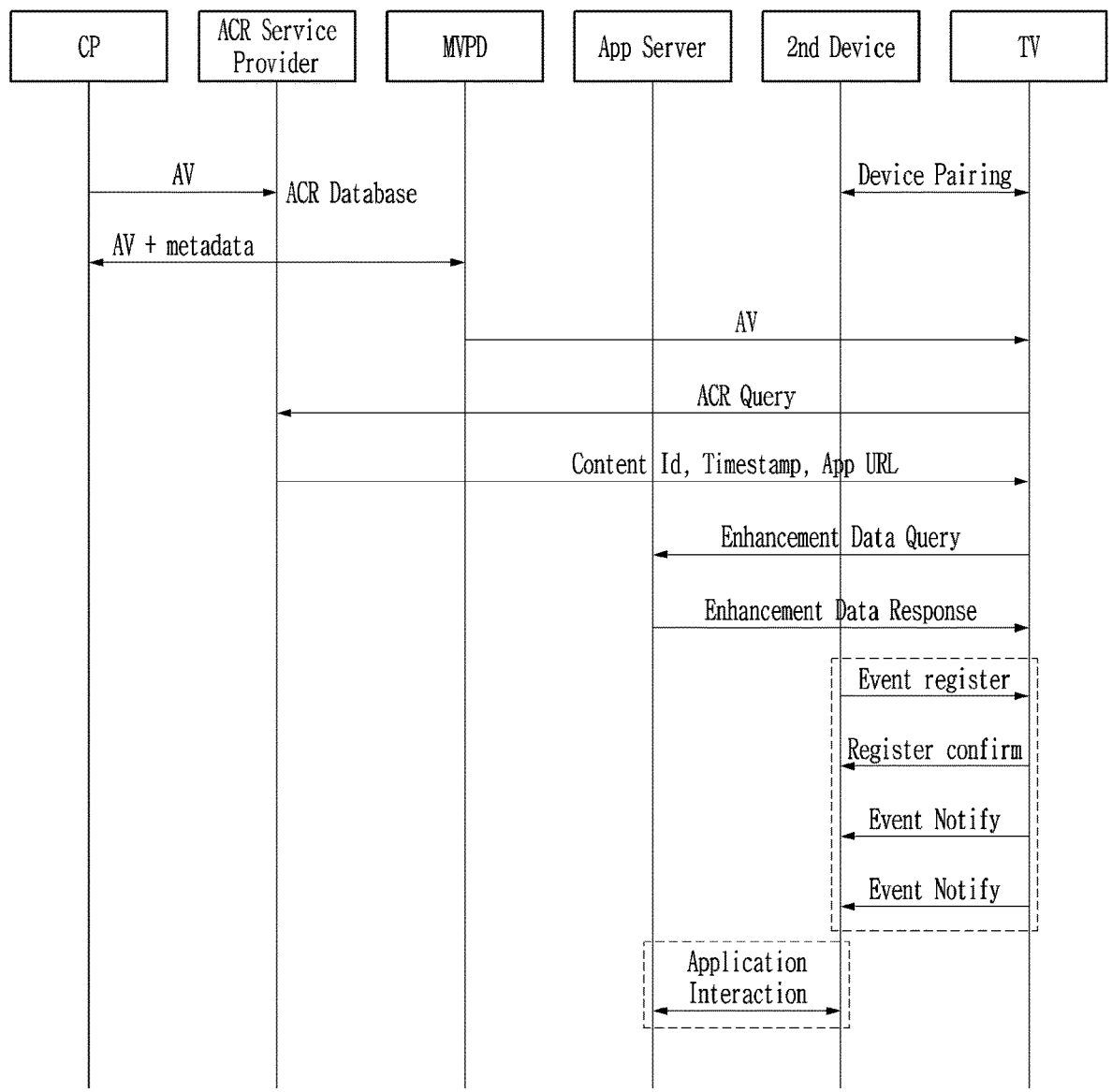
FIG. 64 is a ladder diagram for ACR-based 2nd device content display, in the case of TV having ACR function.

FIG. 64 is a ladder diagram for ACR-based 2nd device content display, in the case of TV having ACR function.

The ACR service provider receives audio/video (AV) information on content from the content provider (CP) to construct an ACR database. The ACR database includes information for identifying corresponding content, e.g., may include content ID and content time matched to a fingerprint of the content. In the case where the CP inserts a watermark into content to provide information related to the content, a role of the ACR database may be reduced.

Device Pairing: The TV and the 2nd device are paired for interaction therebetween.

The CP transmits the AV and metadata to the MVPD, and the TV receives the AV.

ACR Query: The TV may extract a fingerprint from the received AV or extract information stored in a watermark, and sends a query to the ACR service provider based on the extracted information.

The ACR service provider provides, as a response to the query, a content ID, content time, enhancement data, and URL of current AV content to the TV.

Enhancement Data Query: The TV may ask the application server whether enhancement data related to content, i.e., supplementary service, exist.

Enhancement Data Response: The TV may know whether enhancement data that can be displayed on the 2nd device exist according to a response from the application server.

Event Register: An event desired to be received by the 2nd device from the TV is transmitted to the TV so as to be registered.

Register Confirm: Events which can be processed by the TV among requested events are confirmed for the 2nd device. Thereafter, whenever an event occurs, the 2nd device transmits the event to the 2nd device.

Event Notify: When a registered event occurs in the TV, the event is transmitted to the 2nd device. As an example of the event, there is a URL of an interactive service related to content. That is, when the ACR module detects an application related to the content in the TV, the TV transmits a 2nd TV version URL of this application to a 2nd TV.

Figure 65:
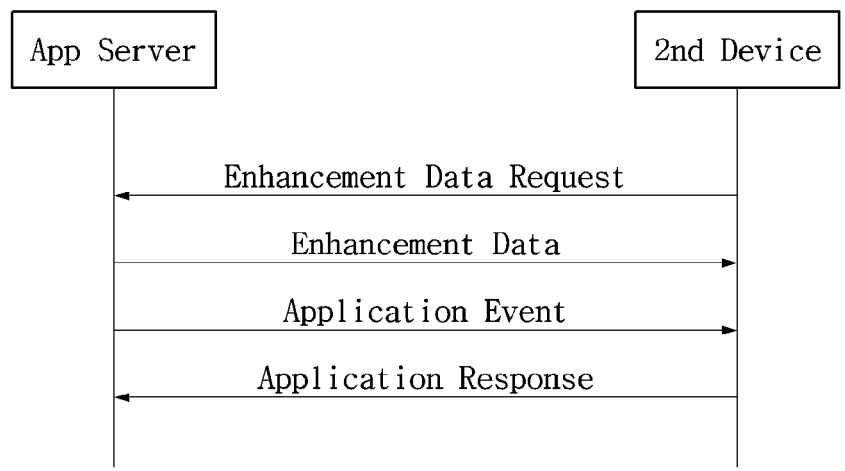
FIG. 65 is a ladder diagram for application interaction.

Application Interaction: As illustrated in FIG. 65, the 2nd device may provide a supplementary service to a user via interaction with the application server, such as request for and transmission of enhancement data and occurrence of an application event and a response thereto.

Figure 66:
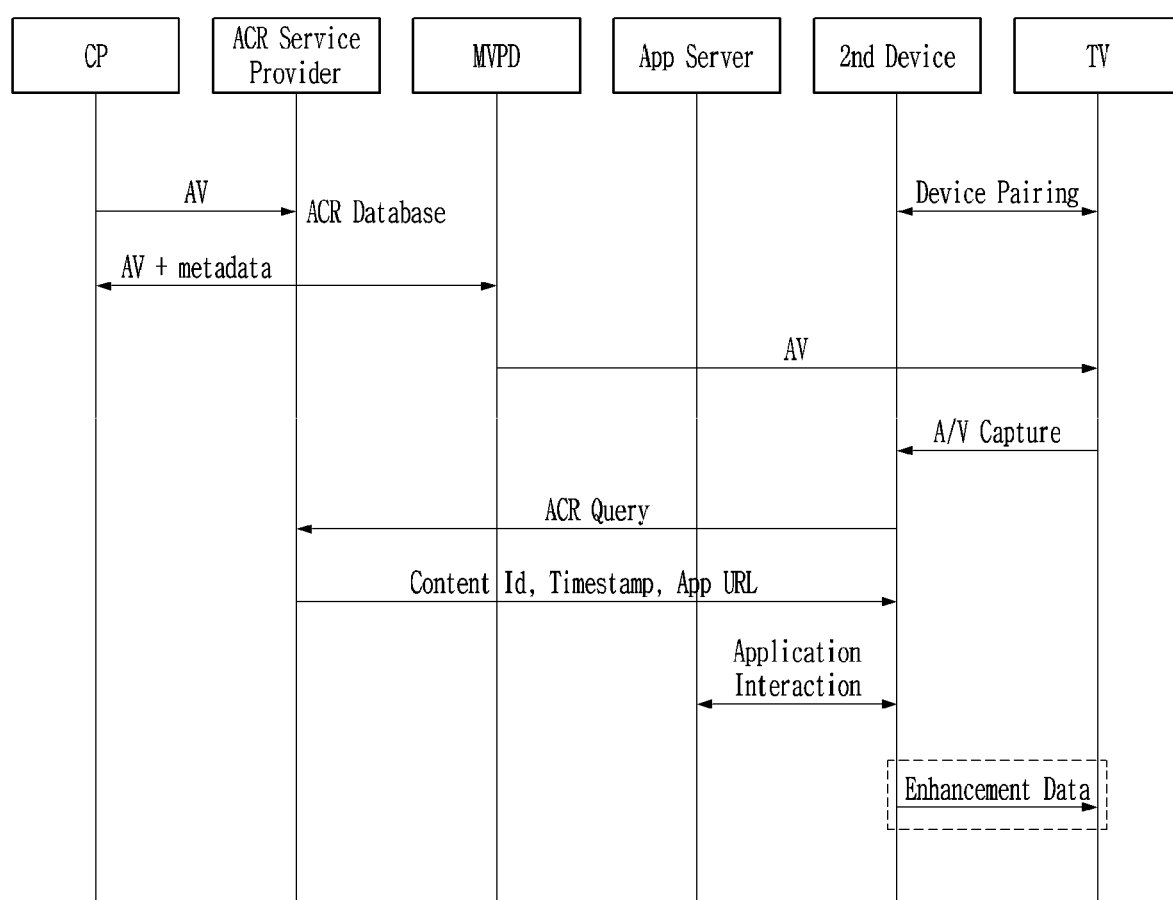
FIG. 66 is a ladder diagram for Sequence diagram 2 for ACR-based 2nd device content display, where TV does not have ACR function and 2nd device has ACR function.

FIG. 66 is a ladder diagram for Sequence diagram 2 for ACR-based 2nd device content display, where TV does not have ACR function and 2nd device has ACR function.

The ACR service provider receives audio/video (AV) information on content from the content provider (CP) to construct an ACR database. The ACR database includes information for identifying corresponding content, e.g., may include content ID and content time matched to a fingerprint of the content. In the case where the CP inserts a watermark into content to provide information related to the content, a role of the ACR database may be reduced.

Device Pairing: The TV and the 2nd device are paired for interaction therebetween.

The CP transmits the AV and metadata to the MVPD, and the TV receives the AV.

A/V Capture: The 2nd device captures A/V information from the TV

ACR Query: The ACR module of the 2nd device extracts a fingerprint from the captured AV or extracts information stored in a watermark, and sends a query to the ACR service provider based on the extracted information.

The ACR service provider provides, as a response to the query, a content ID, content time, enhancement data, and URL of current AV content to the TV.

Application Interaction: As illustrated in [FIG. 8], the 2nd device may provide a supplementary service to a user via interaction with the application server, such as request for and transmission of enhancement data and occurrence of an application event and a response thereto.

Enhancement Data: The 2nd device may provide the obtained content information and content-related enhancement data to the TV. As one of the simplest examples, when a title of currently-watched content is not known, the title can be found by using the ACR function of the 2nd device, and the title can be displayed on the 2nd device or can be transmitted to the TV so as to be displayed. As another example, when there exists supplementary information on a video related to the currently-watched program, for example a URL of full content for a video clip and a URL of a previous broadcast, the supplementary information can be obtained via interaction between the application server and the 2nd device. Further, by displaying the supplementary information on the TV, the related content can be provided to a user.

FIG. 67-FIG. 69 are a UI example 1 for ACR-based 2nd device content display.

A smart mobile device application for pairing with a TV on a network is executed. In the present embodiment, an application for remote control of the TV is executed.

Via the ACR engine installed in the TV, content being watched by a user is identified. Detailed processes are described in connection with [FIG. 2] to [FIG. 9]. When a 2nd device supplementary service related to the identified content exists, the TV sends notification to the 2nd device.

The 2nd device may provide feedback tactually (vibration or the like), visually (color change, flickering, or the like), or acoustically (notification sound or the like) to notify a user.

When a user selects an ACR tab, a message appears to ask the user whether to view a supplementary service related to a currently-watched broadcast. If the user accepts, the query message does not appear again while the remote control application is running.

When the user approves of viewing the supplementary service, information related to the 2nd device is exposed. Here, the related supplementary service is not exposed on the TV so as not to disturb the user in watching TV.

Various supplementary services may be provided according to purposes of the content provider or supplementary service content provider. Depending on intention of the CP or tendency of a user, a priority order of exposing the services may be determined. When there are many pieces of information to be exposed, selection of the user may be inputted by using a menu. Information exchange between the 2nd device and the supplementary service server is directly performed without intervening of the TV.

Figure 71:
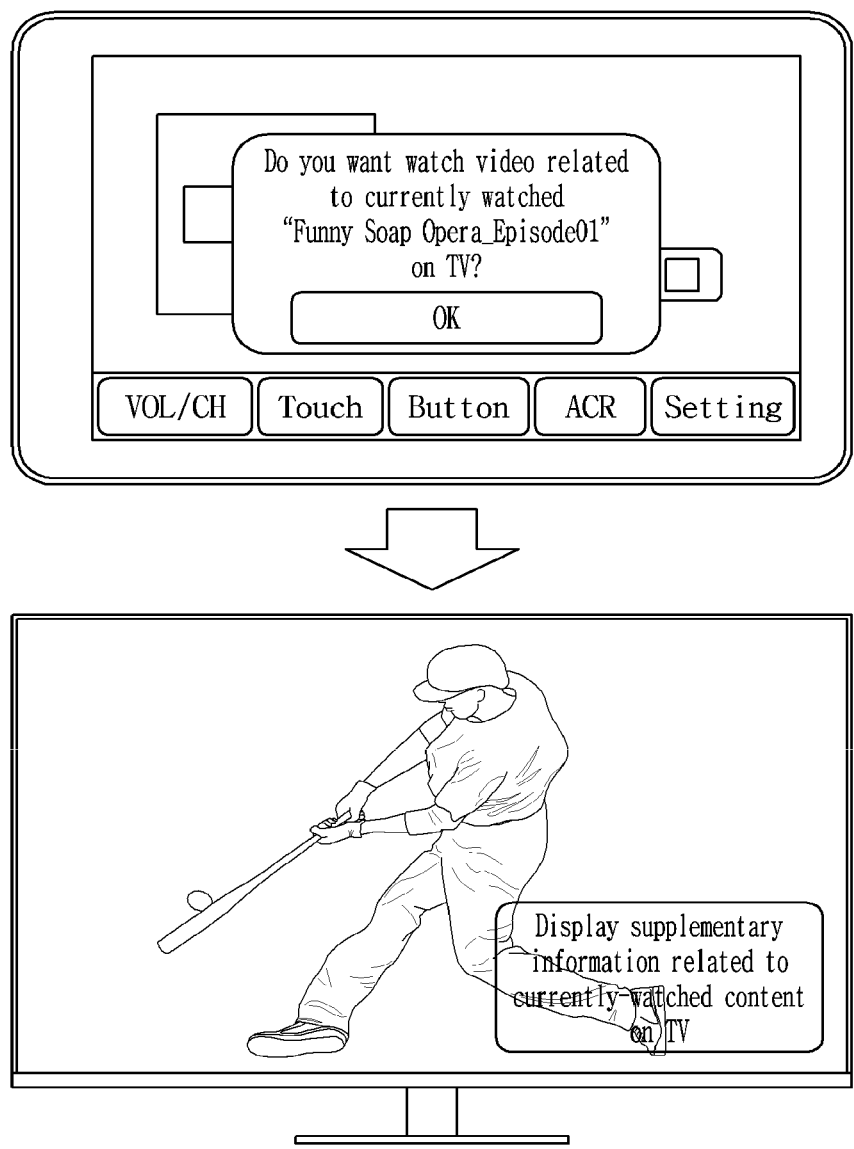
FIG. 71 is a UI example 2 for ACR-based 2nd device content display.

FIG. 70 and FIG. 71 are a UI example 2 for ACR-based 2nd device content display.

In the case of watching TV not having the ACR function, when a user wants to receive a supplementary service from the content provider, the user may execute the remote control application and capture audio/video information from the TV by selecting the ACR tab to thereby execute the ACR function of the 2nd device.

Then 2nd device may obtain information on currently-watched program via communication with the ACR service provider and may provide the obtained information to a user.

Following service processes are the same as FIG. 68 to FIG. 69. Even while the user is using a service of another tab, the ACR function can be performed, and, when there exists a supplementary service for a currently-watched program, this fact can be notified to the user as illustrated in (b) of FIG. 67.

The 2nd device can detect whether supplementary data and service to be displayed on a TV exist via interaction between the application server. Since the corresponding data and service may be displayed on the TV according to selection of a user, screen size-sensitive supplementary data and service can be more efficiently provided.

Figure 72:
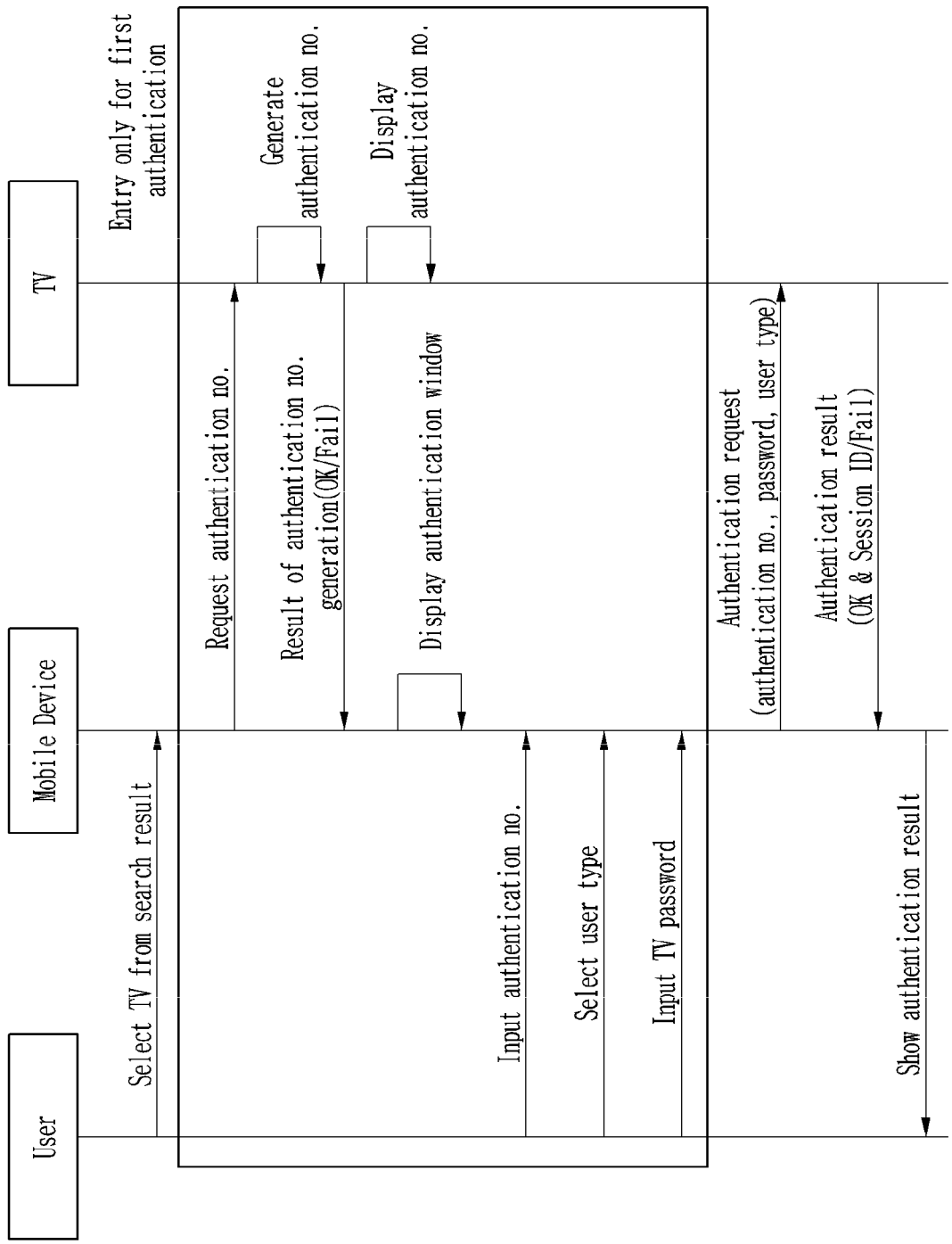
FIG. 72 is a ladder diagram illustrating Authentication Sequence.

FIG. 72 is a ladder diagram illustrating Authentication Sequence.

Following procedures are performed to link a supplementary program related to a program recognized by ACR to a TV or a mobile device 1. Pairing Phase Discovery Authentication 2. Interaction Phase

[Pairing Phase]

A pairing phase includes a discovery process for searching for a device/service and an authentication process for authentication. In the discovery process, by using a widely used Bonjour technique or UPnP technique, a search for devices connected to the same network may be conducted, and services provided to respective devices may be checked.

In the authentication process, proposed in the present invention, different authority may be assigned to different users or user groups. In the following sequence diagram, after performing the discovery process in the mobile device, a particular TV is selected from a list of host devices (TV) capable of being paired with the mobile device to start the authentication process.

The authentication process may be divided into a authentication number request/input process and an authentication request/authentication process. The former is performed only when a first authentication for the selected host device (TV), and an inputted authentication number, user type, and TV password are stored in the mobile device so that the authentication number request/input process are skipped and the authentication request process is directly performed when the authentication sequence is performed again later.

During first authentication, the mobile device requests an authentication number from the selected host device (TV) and waits for input of an authentication number, user type, and TV password displayed on the host device TV when a response to the request is received. The TV which has received the authentication number request generates the authentication number and notifies a result of the generation to the mobile device. When the authentication number generation is successful, an "OK" message is sent, otherwise a "Fail" message is sent. In one embodiment, in the case where the number of mobile devices allowed to simultaneously access the host device (TV) is limited, the "Fail" message may be sent without generating the authentication number when the authentication request from the mobile device causes overflow beyond the limitation.

When the authentication number request is successful, the mobile device inputs the authentication number displayed on the TV screen, selects the user type, and according to the need, inputs the TV password.

The user type is used for differentiating user groups, and different authority may be assigned according to the user groups. The TV password should be inputted according to authority of using a supplementary service related to a program.

In one embodiment, the user type may include "family" and "guest". In the case where the user type is "family", no restriction is imposed on use of a supplementary service related to a program recognized via ACR. In the case where the user type is "guest", the supplementary service only can be watched and input is restricted. The TV password should be inputted for normal pairing in the case of the "family" type, but is not needed in the case of the "guest" type.

Figure 73:
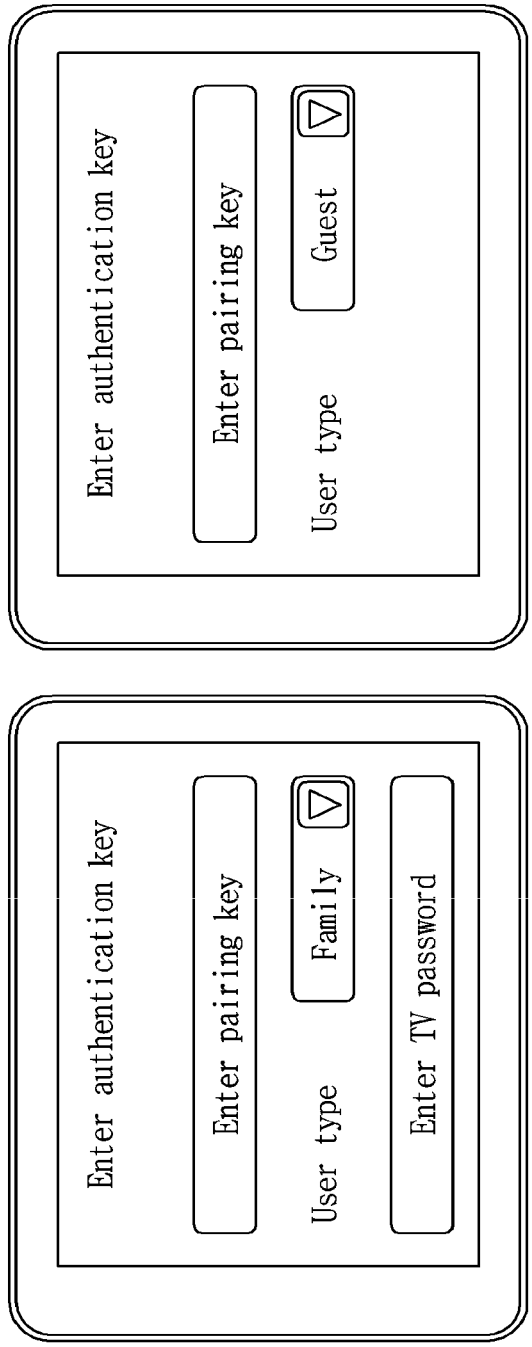
FIG. 73 is a UI example of mobile device for inputting authentication number.

FIG. 73 is a UI example of mobile device for inputting authentication number.

The following diagram illustrates examples of a mobile device screen when the user type is "family" and "guest" respectively. In the case of the "family" type, the TV password should be inputted in order to normally complete authentication. In the case of the "guest" type, there is no field for inputting the TV password, and just the authentication number displayed on the TV is inputted.

The mobile device requests authentication with the inputted information (authentication number, user type, and password), and the host device (TV) verifies the validity of the authentication information and notifies a result. When authentication is normally completed, the mobile device notifies successful pairing.

FIG. 74 is an example message of Authentication Number Request.

The requests/responses between the mobile device and the host device (TV) during the pairing phase may be performed in the format of HTTP request/response based on HTTP, or may be performed by defining a packet based on UDP or TCP. The following examples are based on HTTP, but a communication method is not limited thereto.

Authentication Number Request

During first authentication, an HTTP request for asking the host device to generate an authentication number and display the authentication number on a TV screen is as follows. A value of a type element in XML content of a body of the HTTP request indicates a command type. In the present embodiment, when the type element value is "AuthKeyRequest", the value indicates an authentication number requesting command.

FIG. 75 is an example message of Result of Authentication Number Generation.

FIG. 76 is an example of result.

As a response of the host device to the authentication number request, an HTTP response is as follows. When a value of a result element is 200, successful generation of the authentication number is indicated. The result element value according to the present embodiment is as follows. "resultDetail" indicates a detailed description on the response.

FIG. 77 is an example of Authentication Request.

An HTTP request for asking the host device for authentication by transferring the authentication information (authentication number, user type, password) thereto is as follows. When a value of a type element in XML content of a body of the HTTP request is "AuthRequest", the value indicates an authentication requesting command. A key elements represents an authentication number displayed on a TV screen, "userType" represents a user type, and "pwd" represents a password set for a TV.

FIG. 78 is an example of Result of Authentication Result.

As a response of the host device to the authentication request, an HTTP response is as follows. When a value of a result element is 200, successful generation of the authentication number is indicated. Elements of "result" and "resultDetail" have the same meaning as a result of the authentication number generation. A session element should be included in all commands/events exchanged between the mobile device and the host device (TV) for interaction. When, a session value does not match a value issued by the host device (TV), an error occurs.

Figure 79:
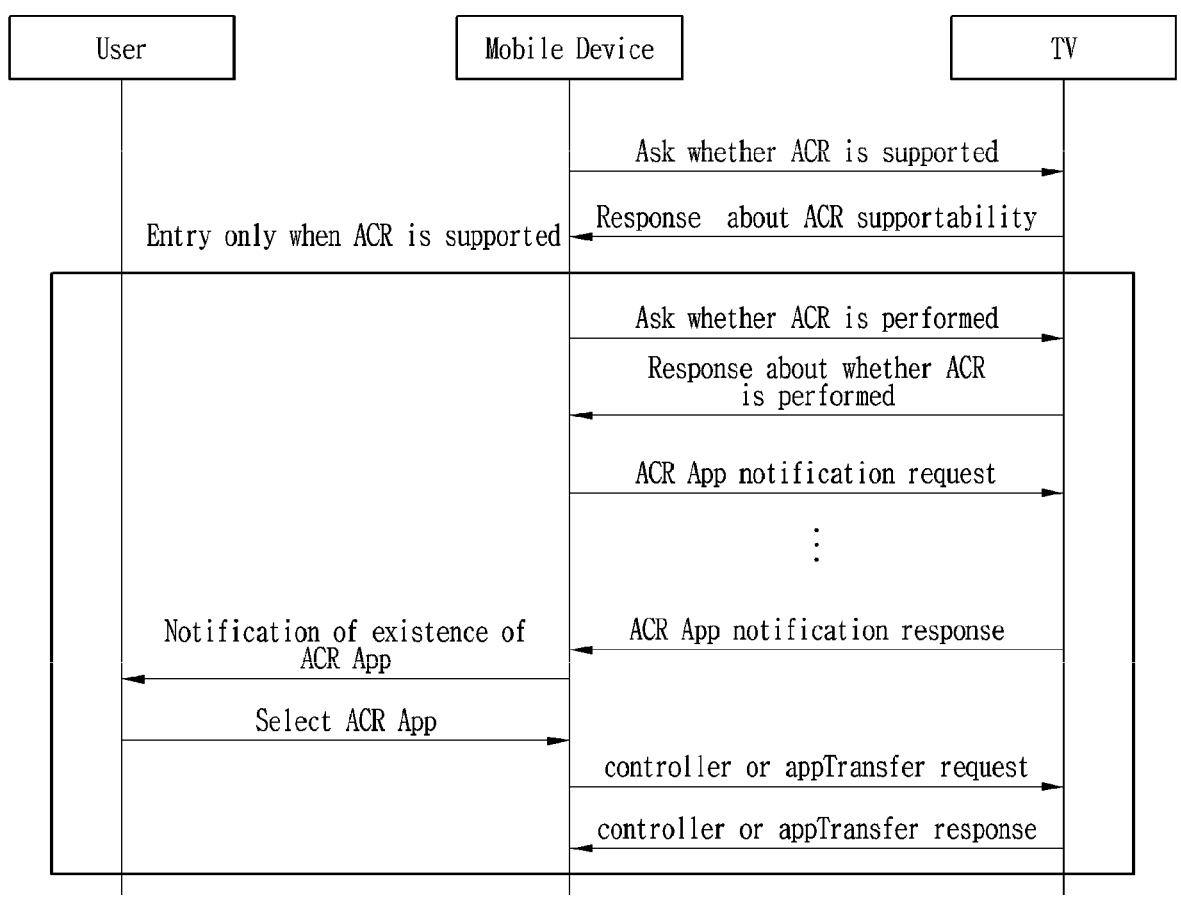
FIG. 79 is a ladder diagram illustrating Sequence Diagram of Interaction Phase.

FIG. 79 is a ladder diagram illustrating Sequence Diagram of Interaction Phase.

When the pairing phase is completed, the host device (TV) and mobile device enters an interaction phase so as to interact with each other.

In the interaction phase, for actual interaction, it is checked whether ACR is supported and whether ACR is performed. The following sequence diagram illustrates procedures of the interaction phase proposed by the present invention.

When the pairing phase is completed, the mobile device asks whether a paired TV supports the ACR. In the case where the host device (TV) supports the ACR, it is asked whether a program currently being watched by a user is recognized. In the case where the TV does not support the ACR, following processes are not performed.

In the case where the program is recognized in the TV via the ACR, the mobile device sends an ACR App notification request in order to ask whether there is a supplementary service (ACR App) related to the recognized program. The supplementary service may be synchronized with a time of the program or may be operated independently from the program time.

Figure 80:
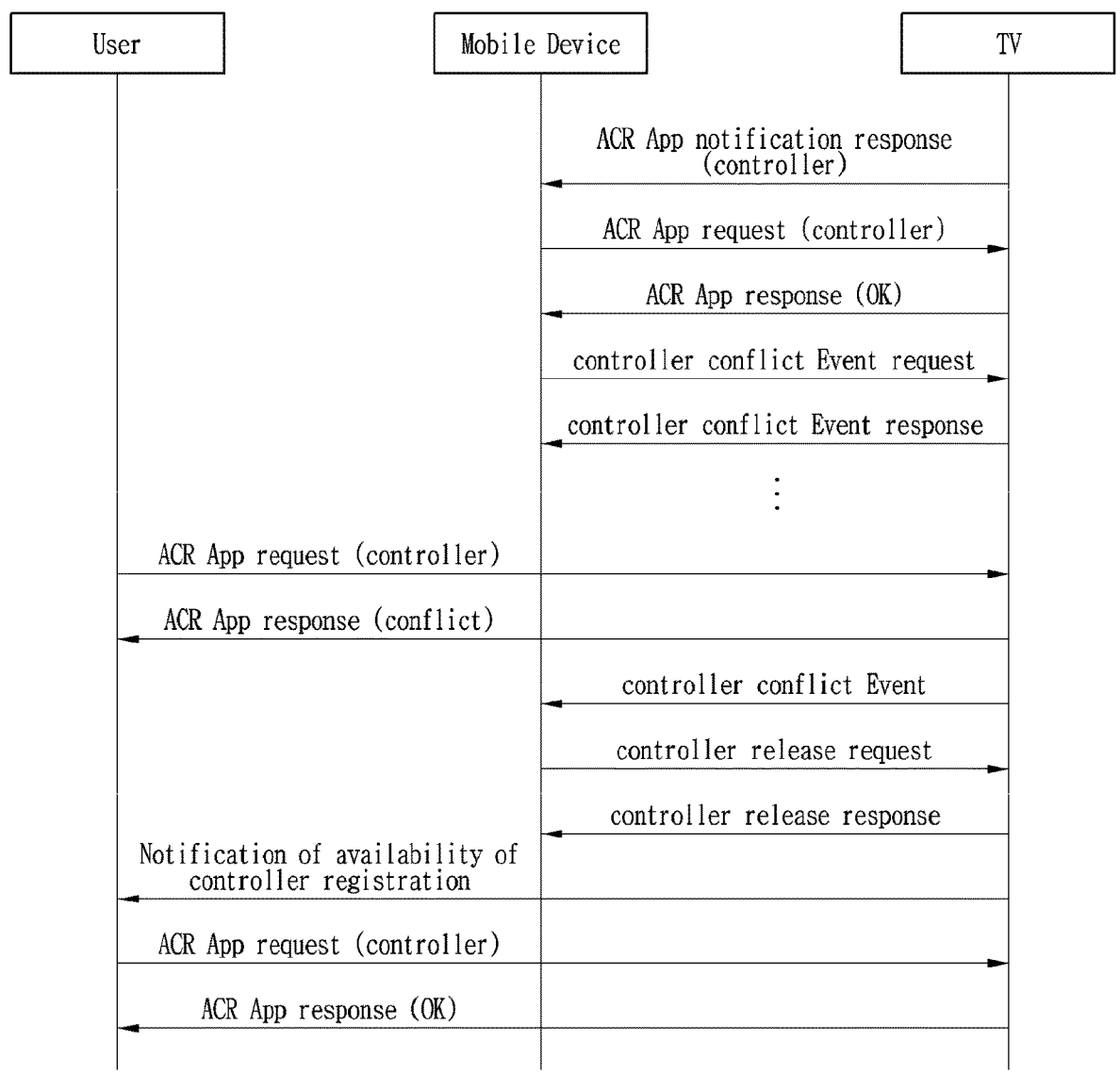
FIG. 80 illustrates operations of TV and mobile device according to ACR App type.

FIG. 80 illustrates operations of TV and mobile device according to ACR App type.

When the supplementary service related to the currently recognized program exists, the TV notifies this fact to the mobile device. Supplementary information related to the supplementary service is also provided by the ACR App notification response. The supplementary information may be different according to a type of the ACR App, which includes "controller" and "appTransfer".

The ACR App is basically driven in the TV. However, in the case of the type of "appTransfer", the ACR App is entirely driven in the mobile device in such a manner that the corresponding App is directly driven by the mobile device or an App URL for driving ACR App is obtained. In the type of "controller", the ACR App is driven in the TV, and only control thereof is performed in the mobile device.

The ACR App usually has an attribute of only one type of "controller" and "appTransfer", but may have attributes of both types of "controller" and "appTransfer". When the ACR App has both attributes, examples of a screen of the mobile device are as follows. When there is a chat room for a current program, a "TV" tab is selected to open a chat window, and the mobile device serves as "controller". Thus, only input of a character string is possible in the mobile device, and actual conversations are displayed on the TV. When a "Mobile" tab is selected to open the chat window, the chat window is displayed on the mobile device.

Figure 81:
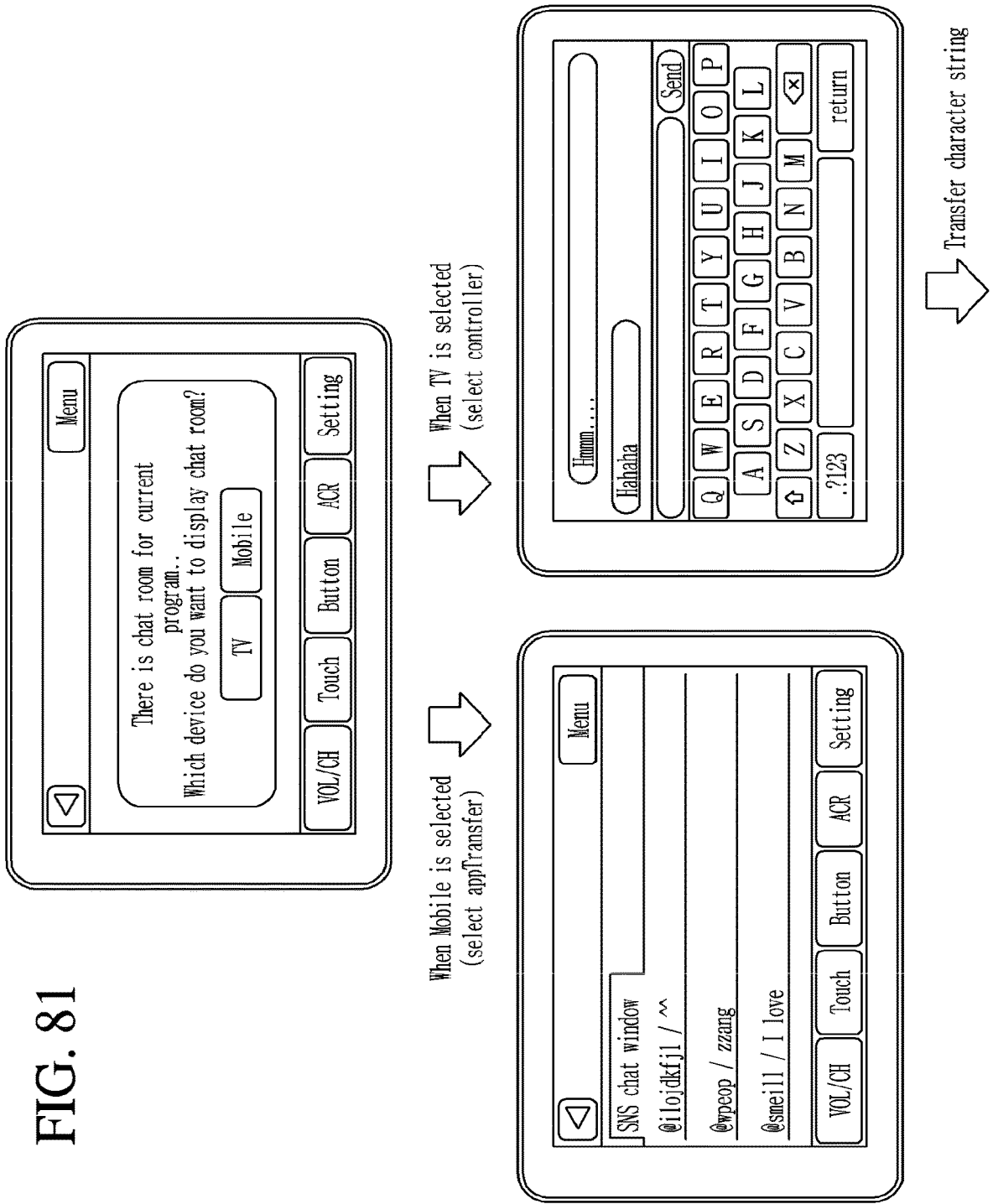
FIG. 81 illustrates controller conflict adjustment flowchart.

FIG. 81 illustrates controller conflict adjustment flowchart.

When "maxController" that is an attribute of the ACR app is provided in plurality, a plurality of mobile devices may control the ACR app driven in the TV. In one embodiment, in the case of a fighting game, when the "maxController" is 2, two mobile devices are paired with the TV in which the game is driven, and each mobile device controls a character selected thereby in order to play a multi-user game.

In the case where the "maxController" is 1, while one mobile device controls the ACR app, another mobile device may try to be registered as "controller". However, since only one "controller" is allowable, a procedure for adjusting this situation is needed. The following diagram illustrates procedures for adjusting a situation in which a new mobile device requests control when inter-mobile device control is provided.

In the above flowchart, mobile device 1 is registered as "controller", and the "maxController" attribute thereof is 1. Thus, in order to detect a controller conflict situation, a controller conflict event is registered. Thereafter, as mobile device 2 is paired with the TV, an ACR App notification response is received. Accordingly, mobile device requests controller registration, the TV notifies occurrence of conflict since the corresponding ACR App is already registered as "controller" in mobile device 1. Further, since mobile device 1 has registered the controller conflict event, the corresponding event is sent. Accordingly, mobile device 1 has authority to determine whether to release or maintain the "controller" thereof. In this flowchart, it is determined to release the "controller", and a controller release request is sent. Accordingly, the TV sends a controller release response, and notifies mobile device 2 of the availability of controller registration. When mobile device 2 requests controller registration again, the TV notifies that the "controller" has been normally registered.

The requests/responses between the mobile device and the host device (TV) during the interaction phase may be performed in the format of HTTP request/response based on HTTP, or may be performed by defining a packet based on UDP or TCP. The following examples are based on HTTP, but a communication method is not limited thereto.

FIG. 82 is an example message of asking whether ACR is supported.

Firstly, the mobile device should check whether the host device (TV) paired therewith has an ACR function, and an HTTP request for asking this is as follows. A session ID value assigned during a paring phase should be included in all requests/responses of the interaction phase. In the present embodiment, when a name element value is "ACRSupportRequest", this value indicates a command for asking whether the ACR function is supported.

FIG. 83 is an example message of response to query on ACR supportability.

As a response to the asking whether the ACR is supported, an HTTP response is as follows. A name element value is "ACRSupportRequest", which means the response to the asking whether the ACR is supported. An acrSupport element may have a value of "Support" or"NotSupport". Here, the acrSupport element has the value of "Support" in the present embodiment. When the acrSupport element value is "Support", the mobile device continuously performs following processes.

FIG. 84 is an example message of asking whether ACR is performed.

A mobile device which has checked whether ACR is supported may check whether a program currently broadcasted on a TV has been recognized. An HTTP request for this check is as follows. In the present embodiment, when a name element value is "CheckACRStatus", the value indicates a command for asking whether ACR is supported. A repeat element may have a value of "Once" or "Always". The value of "Once" means that an ACR status is desired to be notified once, and the value of "Always" means that that ACR status is desired to be notified whenever the ACR status is changed.

FIG. 85 is an example message of response to query on whether ACR is performed.

As a response to query on whether ACR is performed, an HTTP response is as follows. A name element value is "CheckACRStatus", which means the response to query on whether ACR is performed. A recognition element may have a value of "Found" or "NotFound". Here, the recognition element has the value of "Found" in the present invention. The value of "Found" means that a program has been recognized with ACR, and the value of "Found" means that ACR has not been performed. In the case of the value of "Found", "contentId" and "mediaTime" elements exist. The contentId element indicates ID of the recognized program, and the mediaTime element indicates a current playback time point (indicating a time point in an entire program in unit of second). In the present embodiment, the mediaTime is 210 seconds indicating that 3 minutes and 30 seconds have elapsed after the program started. When the repeat element of the query on whether ACR is performed is "Always", a TV sends a response whenever recognition, contentId, or mediaTime is changed.

FIG. 86 is an example message of request ACR App notification.

In the case where a supplementary service (ACR App) related to a program exists, an HTTP request for requesting notification of this fact to a mobile device is as follows. In the present embodiment, when a name element value is "RegisterAppNotifyEvent", a host device (TV) notifies a paired mobile device of the fact that the ACR App is operable or is operated when the ACR App is operable or is operated later.

FIG. 87 is an example message of ACR App notification response.

When there is a currently operable or currently operated ACR App, a host device sends a response shown below, and an HTTP response for this operation is as follows. A name element value is "RegisterAppNotifyEvent", which means a response to an ACR App notification request. An app element means the ACR App. When the number of currently operable apps is plural, the same number of apps elements may appear. "appId" indicates only one ID of App, "appName" indicates a name of App, and "appType" may have a value of "controller" or "appTransfer". A "maxController" element is valid only when appType is controller. When operated as controller, only controller as much as a maximum maxController value can control the ACR App driven in a TV. In the case of appTransfer, regardless of the number of mobile devices, a TV ACR App can be transferred to the mobile devices in order to be driven, and independent interaction is possible. In the following example, the maxController value is 1, i.e., maximal one controller is possible. When several mobile devices request controller, conflict may occur. When App supports both of controller and appTransfer as in the following example, an appType element may appear multiple times.

FIG. 88 is an example message of ACR App request.

This request is for sending a command from a mobile device with respect to an ACR App driven in a host device (TV). An HTTP request for this operation is as follows. In the present embodiment, when a name element value is "ACRAppRequest", this value indicates that a command is sent to the ACR App. A type element indicates whether to operate as controller for leaving the ACR App driven in the TV and just controlling the ACR App by a mobile device or to operate as appTransfer for transferring the ACR App driven in the TV to the mobile device. A deviceCapability element indicates capability of the mobile device, and in the present embodiment, indicates that supported resolution is 960x540. Further, this element may additionally indicate CPU specifications and available memory capacity.

FIG. 89 is an example message of ACR App response.

A host device responds to an ACR App request. An HTTP response for this operation is as follows. A name element value is "ACRAppRequest", which means a response to the ACR App request. A type element indicates whether this response is a response to controller or to appTransfer. An appURL indicates a URL of an app to be driven in a mobile device. A result element may have a value of "OK", "NotOK", or "Conflict". When an ACR App request is successful, this value is "OK", and when the ACR App request cannot be processed, this value is "NotOK". With respect to an ACR App request of which type is controller, when the request exceeds a limitation of maxController of a host device (TV), this value is "Conflict".

An appURL provides a URL suitable for a mobile device with reference to capability of the mobile device, which has been provided during ACR App request. Different URLs may be transferred to respective mobile devices. In the present embodiment, an appURL supporting 960x540 is returned. In the case of controller, it is not needed in an app that is being driven in a mobile device, and only control commands (key, touch location, and the like) may be sent. Further, a controller URL for controlling an ACR App of a host device (TV) may be notified. When a type of an ACR App request is appTransfer, the ACR App driven in a TV disappears from a TV screen, and a corresponding app is driven in a mobile device. When the host device (TV) receives an ACR App request of which type is appTransfer, the host device (TV) may terminate or hide the ACR App that is being driving in the TV. Or, a mobile device may control Show/Hide of the ACR App that is being driven in the TV in response to an ACR App OSD control request. In the case where the ACR app is such prepared as to be adaptive to resolution of a TV and a mobile device, a URL of the ACR App driven in the TV may be notified to the mobile device via appURL. Or, a URL of an ACR App suitable for a mobile device may be notified via appURL.

FIG. 90 is an example message of ACR App OSD control request.

A request from a mobile device for showing or hiding OSD of an ACR App driven in a host device. An HTTP request for this operation is as follows. In the present embodiment, when a name element value is "ShowACRApp", this element indicates a command for ACR App OSD control request. A show element may have a value of "true" or "false". When this value is true, the ACR App that is being driven in a TV is shown. When this value is false, the ACR App that is being driven in the TV is hidden. An appId element means ID of an ACR App for controlling showing/hiding of OSD, and only OSD of a corresponding ACR App can be controlled. When there is no appID element or a value thereof is empty (i.e., <appId></appId>), OSD of all ACR App driven in a TV can be controlled.

FIG. 91 is an example message of ACR App OSD control response.

A host device responds to an ACR App OSD control request. An HTTP response for this operation is as follows. A name element has a value of "ShowACRApp". An appId element means only one ID of target ACR app for OSD control. A result element has a value of "OK" or "NotOK". When the OSD control request is successfully completed, this value is "OK", otherwise this value is "NotOK".

FIG. 92 is an example message of Media playback control request.

Between paired devices, Play/Pause/Stop/Seek/FF/REW of video may be requested, or this request may be sent from a mobile device to a host device (TV), or this request may be sent from the host device (TV) to the mobile device. Additional elements for a playback control command are shown in the following table.

| control command | url element | speed element | offset element |
|---|---|---|---|
| Play | ○ | X | ○ |
| Pause | X | X | X |
| Stop | X | X | X |
| Seek | X | X | ○ |
| FF | X | ○ | X |
| REW | X | ○ | X |

In the case of playback request, a URL of a stream and a playback start point (offset) are needed. In the case of pause and stop requests, an additional element is not needed. In the case of seek request, a point desired to be reached (offset) is needed. This point may be time or byte offset. In the case of FF (fast forward) and REW (rewind) requests, a playback speed is needed. A positive playback speed indicates FF, and a negative playback speed indicates REW.

FIG. 93 is an example message of Media playback control response.

An HTTP response as an response to a media playback request is as follows. A name element may have a value of "Play", "Pause", "Stop", "Seek", "FF", or "REW". A result element has a value of "OK" or "NotOK". When media playback is successful, this value is "OK", otherwise this value is "NotOK".

FIG. 94 is an example message of controller conflict Event request.

In the case where a mobile device is successfully registered as controller, another mobile device may request controller later, causing conflict. An Event registration for notifying this occurrence of conflict may be requested. An HTTP request for this operation is as follows. In the present embodiment, when a name element value is "RegisterControllerConflictEvent", this element indicates a command for registering controller conflict Event. An appId element means only one ID of a target ACR app which registers controller conflict event.

FIG. 95 is an example message of controller conflict Event response.

A host device responds to a controller conflict Event request. An HTTP response for this operation is as follows. A name element value is "RegisterControllerConflictEvent", which indicates a response to the controller conflict Event request. An appId element means only one ID of a target ACR app which registers a controller conflict event. A result element has a value of "OK" or "NotOK". When Event registration is successful, this value is "OK", otherwise this value is "NotOK".

FIG. 96 is an example message of controller conflict Event.

When an ACR App request of which controller is equal to or greater than maxController is received, a host device sends a corresponding Event to a mobile device which has registered a controller conflict Event. An appId element indicates ID of an ACR app in which a controller conflict event has occurred.

FIG. 97 is an example message of controller release request.

A mobile device requests release of controller registration of a mobile device. An HTTP request for this operation is as follows. In the present embodiment, when a name element value is "UnregisterController", this element indicates a command for requesting release of controller registration. An appId element means only one ID of a target ACR app which requests controller release.

FIG. 98 is an example message of controller release response.

A host device responds to a controller release request. An HTTP response for this operation is as follows. A name element value is "UnregisterController", which indicates a response to a controller release request. An appId element means only one ID of a target ACR app which requests controller release. A result element has a value of "OK" or "NotOK". When controller release is successfully completed, this value is "OK", otherwise this value is "NotOK".

FIG. 99 is an example message of appTransfer release request.

A mobile device requests release of appTransfer. An HTTP request for this operation is as follows. The appTransfer release is for returning an app from a mobile device to a host device (TV) in a state where the app has been transferred from the host device (TV) to the mobile device. In the present embodiment, when a name element value is "UnregisterAppTransfer", this element indicates a command for requesting release of appTransfer. An appId element means only one ID of a target ACR app which requests release of appTransfer. In the case where there is no appId element or a value thereof is empty (i.e., <appId></appId>), an App is driven not in a mobile device but in a TV with respect to all subsequent ACR apps other than a particular ACR App.

FIG. 100 is an example message of appTransfer release response.

A host device responds to a request for releasing appTransfer. An HTTP response for this operation is as follows. A name element value is "UnregisterTransfer", which indicates a response to a request for appTransfer release. An appId element means only one ID of a target ACR app which requests release of appTransfer. A result element has a value of "OK" or "NotOK". When release of appTransfer is successfully completed, this value is "OK", otherwise this value is "NotOK". When the release of appTransfer is successfully completed, an App driven in a mobile device disappears, and the ACR App which has been driven in the mobile device appears on a TV screen. Thereafter, the ACR App is controlled by using a TV remote controller, and content of the App can be watched via a TV screen.

Figure 101:
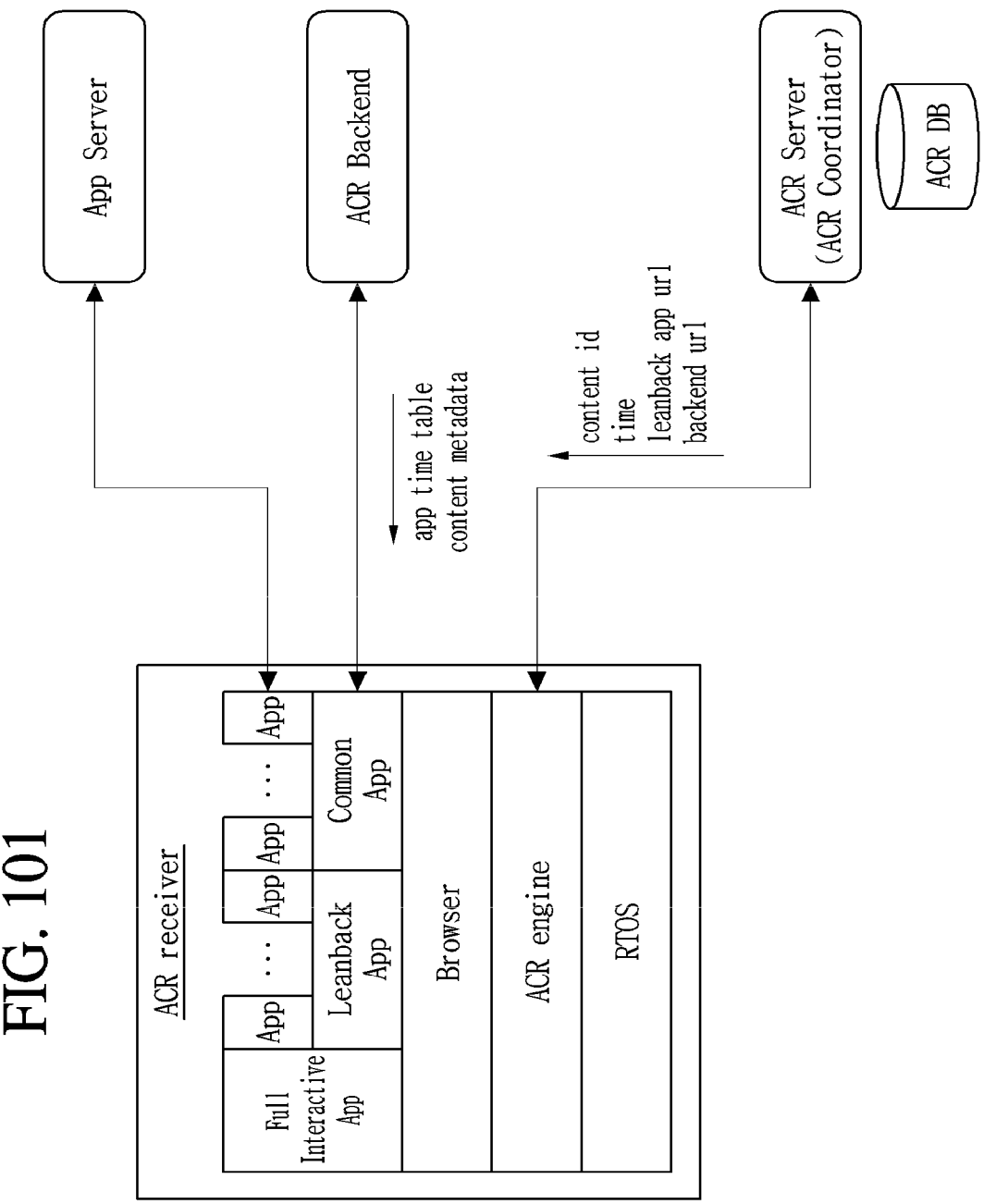
FIG. 101 is an example structural diagram of an ACR architecture including an entire ACR receiver and related server to provide an ACR function and service. This structural diagram includes the following modules.

FIG. 101 is an example structural diagram of an ACR architecture including an entire ACR receiver and related server to provide an ACR function and service. This structural diagram includes the following modules.

ACR receiver: serves to extract a signature from AV data by using an ACR engine through a receiver equipped with the ACR engine, and queries a signature to an ACR server to obtain information on whether to recognize a content and other metal information (content id, time, leanback app url, and backend url). content id and time notifies the unique id of a recognized content and the current time of a recognized content, and when there is a broadcaster app related to a corresponding content, notify them through a leanback app url. This is executed in a similar way to typical data broadcasting. An ACR receiver provides a backend url to query additional data (for example, a program name, a director, actors, and so on) related to a currently recognized content.

Common app: when recognizing a corresponding content through ACR and providing an additional service, refers to an app embedded in a receiver that a manufacturer provides additional service through ACR regardless of a broadcaster/CP. When a broadcaster/CP executes/terminates an app in a Common app, app time table information is required to be delivered to an Common app in order to manage the life cycle of a broadcaster app.

Leanback app: when recognizing a corresponding content through ACR and providing an additional service, refers to an app that a a broadcaster/CP provides. Leanback app executes/terminates an broadcaster app executed by each hour. Leanback app may have an arbitrary size and position on a TV screen if there is a broadcaster app related to a specific timing.

Full Interactive app: when recognizing a corresponding content through ACR and providing an additional service, refers to an app that a third party registers in an App store. An app provided may download an additional service related to a specific program from an app store, and then, may execute the additional service.

ACR Server (ACR Coordinator) as a server for processing an ACR query, receives a signature from an ACR receiver, inquires an ACR DB to find a matching signature, and delivers metadata related thereto.

ACR DB: is a database containing the signature of a content that is to be recognized through an ACR service and basic metadata.

ACR Backend: provides additional data related to a content through a server that a broadcaster/CP runs or a broadcaster app time table (app's url & time information, and so on) that is to be executed in a Common app.

App Server: is a server for storing an app that is to be finally executed after recognizing a content through ACR. A corresponding app is downloaded into an ACR receiver, and then, is executed.

Figure 102:
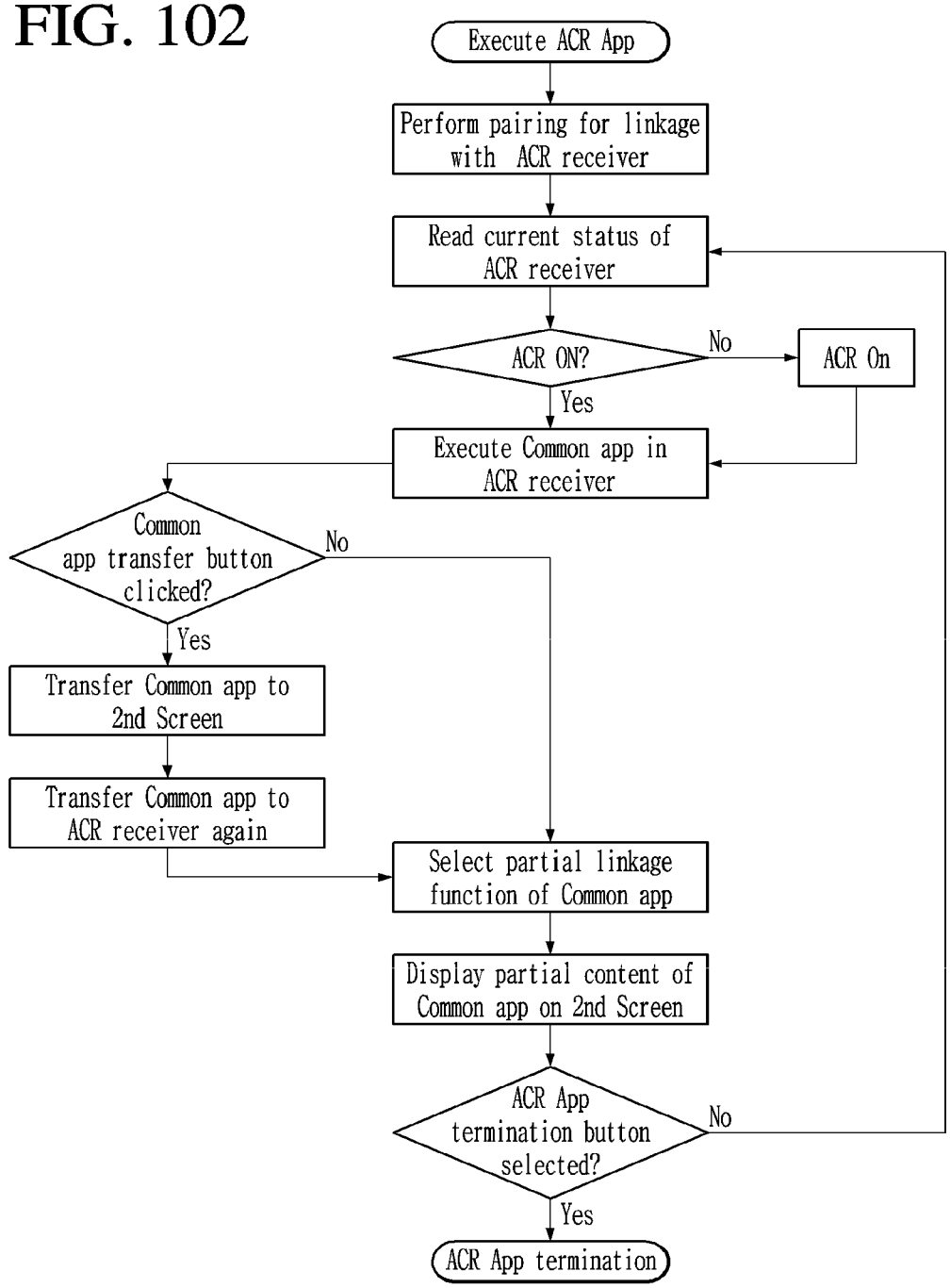
FIG. 102 is an example 2nd screen operation flowchart for ACR linkage with ACR receiver. This operation flowchart is described in more detail below.

FIG. 102 is an example 2nd screen operation flowchart for ACR linkage with ACR receiver. This operation flowchart is described in more detail below.

1. ACR App Execution

A user executes an ACR app in order to use an ACR linkage function in a 2nd screen. The ACR App may be provided from an manufacturer, and if a linkage protocol is opened, a broadcaster/CP or a thirdparty developer may directly implement the linkage protocol.

2. Pairing for Linkage with ACR Receiver

In order for ACR linkage, basically, an ACR receiver and 2nd screen need to be paired in advance. The pairing includes discovery & authentication processes as pre-operations for linkage between devices attached to the same network (typically attached to an AP).

A discovery process for searching for a device attached to a network may typically include DLAN or Bonjour. An authentication process is a first process for performing user authentication for device linkage. This may be done when a user directly input a series of strings displayed on an ACR receiver.

3. Reading Current Status of ACR Receiver

A 2nd screen may need to understand a current status of an ACR receiver in order for a future operation. Current status information of an ACR receiver may include the following contents.

ACR On/Off setting information: indicates whether a setting of an ACR receiver is ACR Off or ACR On. In the case of ACR On, a Leanback app cannot run, it is classified into a "Common App mode" where only a Common App can run and a "Leanback App mode" where a Leanback & Common app can run.

Whether to recognize content: in the case of ACR On, whether a content that is currently displayed on an ACR receiver is recognized or not is necessary. Basically, there is Content Recognized or Content Not Recognized information. In the case of Content Recognized, information such as a content id, a time, a backend url, and a leanback app url may be added.

4. Is ACR ON?

When ACR is On, several Events needs to be registered in order to entirely or partially link an ACR function in a 2nd screen.

ACR Status Event: occurs when content is changed or media time is changed due to an Event that occurs when an ACR status of an ACR receiver is changed.

ACR App Launched Event: when a specific url is clicked in an ACR receiver, there are two kinds of Events in order to notify the click to a 2nd screen.

Case that a url is a general Web URL: when it is inappropriate that a TV outputs a corresponding URL, the url is used to be outputted in a 2nd screen.

Case that a url is an ACR app: a process for resolving into an ACR app url for a 2nd screen of an app executed in a TV is required. A usage example of this case is applied to the case that input or App control is made in a 2nd screen, and display is made in a TV.

Common App Event: is an Event occurring when a Common app is executed or terminated in a TV. This Event is used to confirm that a Common app is on when a Common app completely transfers to a 2nd Screen, as prerequisites.

5. Common App Execution in ACR Receiver

A user executes a Common app in an ACR receiver in order for a 2nd screen linkage of the Common app. The 2nd screen linkage of the Common app includes a method of transferring the entire Common app and a method of displaying a partial function on the 2nd screen. As the Common app is executed, if there is a paired 2nd screen, a Common app Event occurs.

6. Common App Transfer Button Click

An App transfer button is clicked in UI on a 2nd screen in order to transfer a Common app to a $2^{nd}$ screen.

7. Transfer Common App to $2^{nd}$ Screen

On receiving a Common app transfer command from an ACR receiver, a $2^{nd}$ screen receives and executes the url of the $2^{nd}$ screen of the Common app. The Common app for $2^{nd}$ screen has the same functions to be provided but its UI layout is optimized for a $2^{nd}$ screen. When the Common app transfers to the $2^{nd}$ screen, the ACR receiver restores a resized video into an original size (i.e. a full screen) and hides the Common app displayed on the ACR receiver.

8. Transfer Common App to ACR Receiver

A process for transferring a Common app to an ACR receiver again includes hiding a Common app for $2^{nd}$ screen, resizing the video of the ACR receiver to fit the Common app, and showing the UI/OSD of the Common app.

9. Partial Linkage Function Selection of Common App

In order to output a partial function of a Common app on a $2^{nd}$ screen, a specific function of the Common app of an ACR receiver is selected.

10. Display a Partial Content of Common App on $2^{nd}$ Screen

A partial function of an Common app blocks a TV screen when it is outputted to a TV, i.e. an ACR receiver, so that it is appropriate to output the partial function to a $2^{nd}$ screen. That is, a program related search result (search sites of google and naver) of the Common app is not shown on the TV screen but is shown on the $2^{nd}$ screen. Additionally, since a user input is more difficult in the ACR receiver than a mobile device, the user input may be made on the $2^{nd}$ screen. Use cases such as locations, music sources, coupons, catalogs, media uploads may be output on the $2^{nd}$ screen.

11. ACR App Termination

Once an ACR app is terminated, an additional service of an ACR receiver is no longer linked to a $2^{nd}$ screen. Once the ACR app is terminated, an ACR Event does not occur any more, and the ACR app needs to notify the termination to the ACR receiver.

Figure 103:
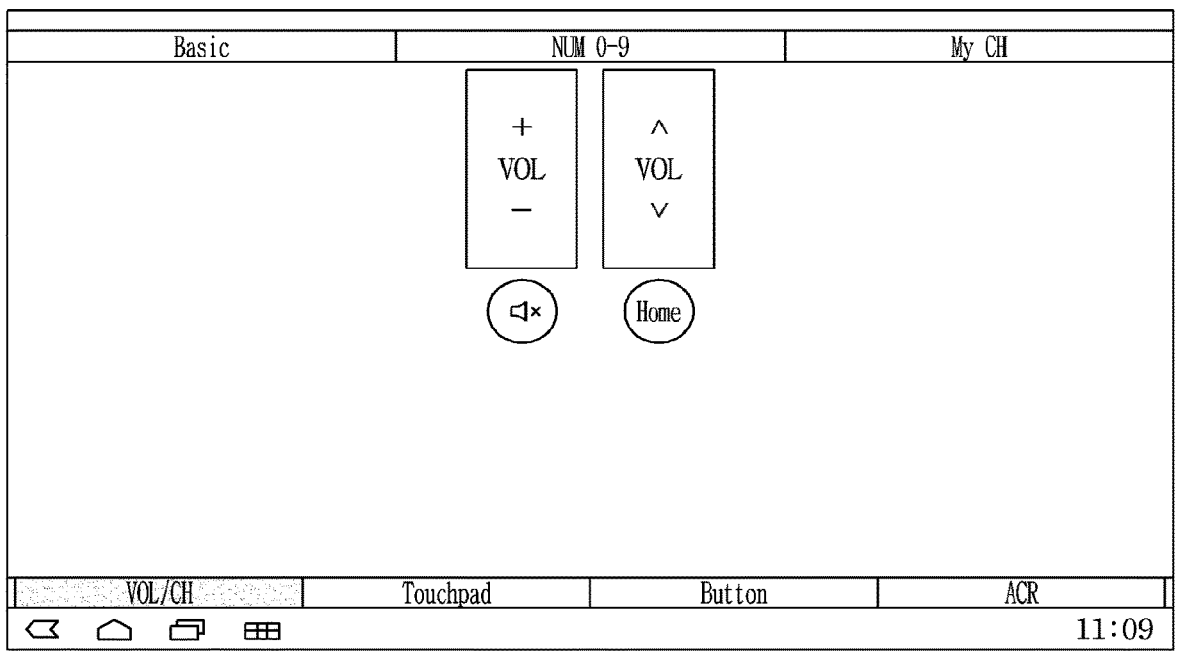
FIG. 103 is an example of a user interface of the protocol.
Figure 104:
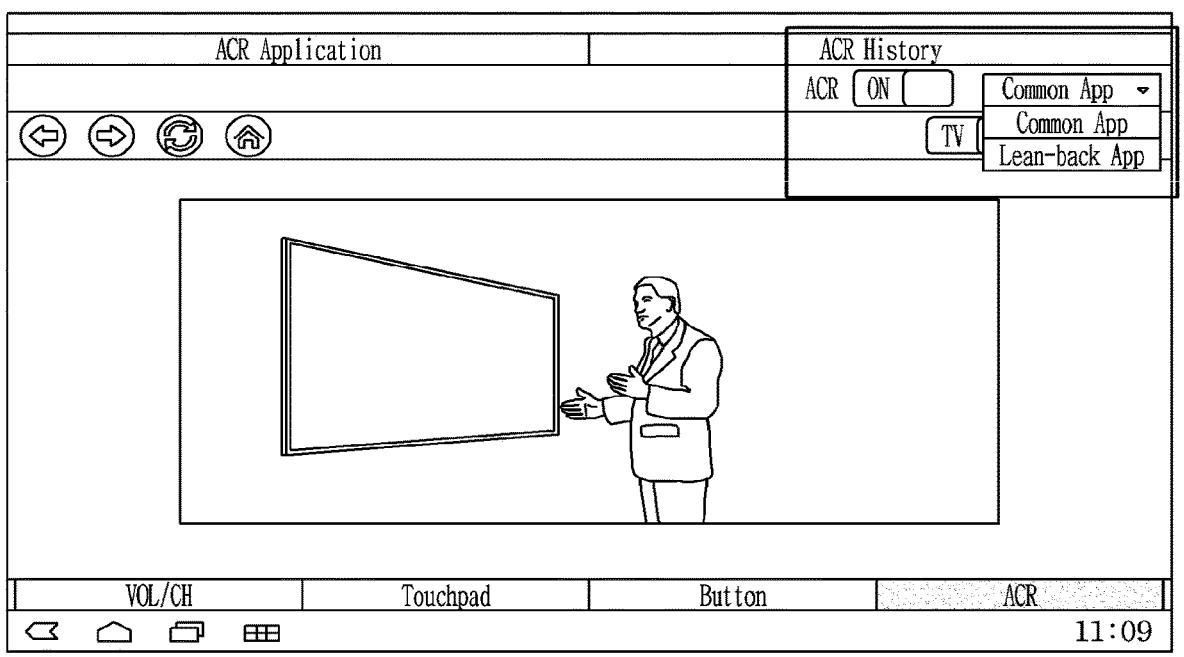
FIG. 104 is an example of a user interface of the protocol.
Figure 105:
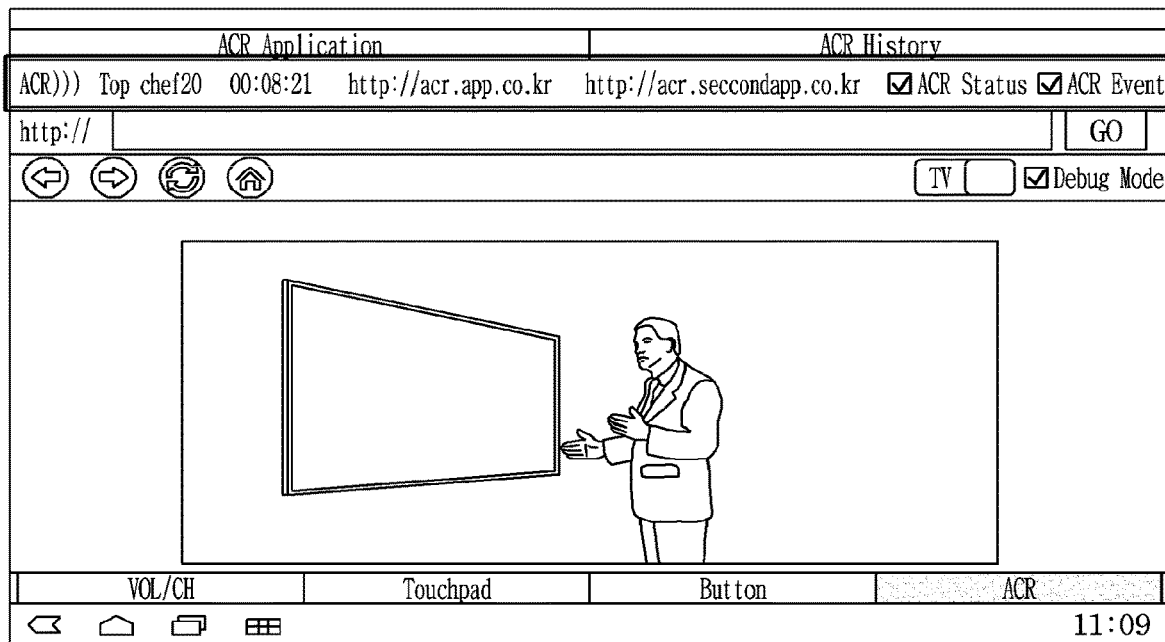
FIG. 105 is an example of a user interface of the protocol.

FIG. 103-FIG. 105 are examples of a user interface of the protocol.

A smart mobile device application for pairing on a TV and a network is executed. In this embodiment, it is assumed that an application for a remote control of a TV set is executed, and there is a protocol for exchanging command, event, and query between a TV and a $2^{nd}$ device.

ON/OFF of ACR Function and Selection Control of TV Application Type

An ACR service providing application of a $2^{nd}$ device may be equipped with a function for directly turning ON/OFF of an ACR function of a TV. When a user wants to use/end an ACR function, he/she can control it with an application of a $2^{nd}$ device without manipulating a menu of a TV separately. When a user selects ACR ON/OFF, a $2^{nd}$ device transmits a corresponding command to a TV by using a predetermined protocol. Additionally, a user may select the type of an application executed in a TV. This specification will briefly describe embodiments of two applications in various TV application forms.

Lean-back Application: In this specification, a lean-back application indicates the form of an application provided from and led by a broadcast program content provider including a broadcaster and a program production company. When a user select the lean-back application, a related additional service (an application) is executed on a program screen at a predetermined time while watching a broadcast program.

Common Application: In this specification, a common application indicates an application providing integrated program related information. All broadcasting contents built in a TV are commonly used, and information is updated according to information and time of a currently-watching program. If necessary, an application of a lean-back form may be included.

Figure 106:
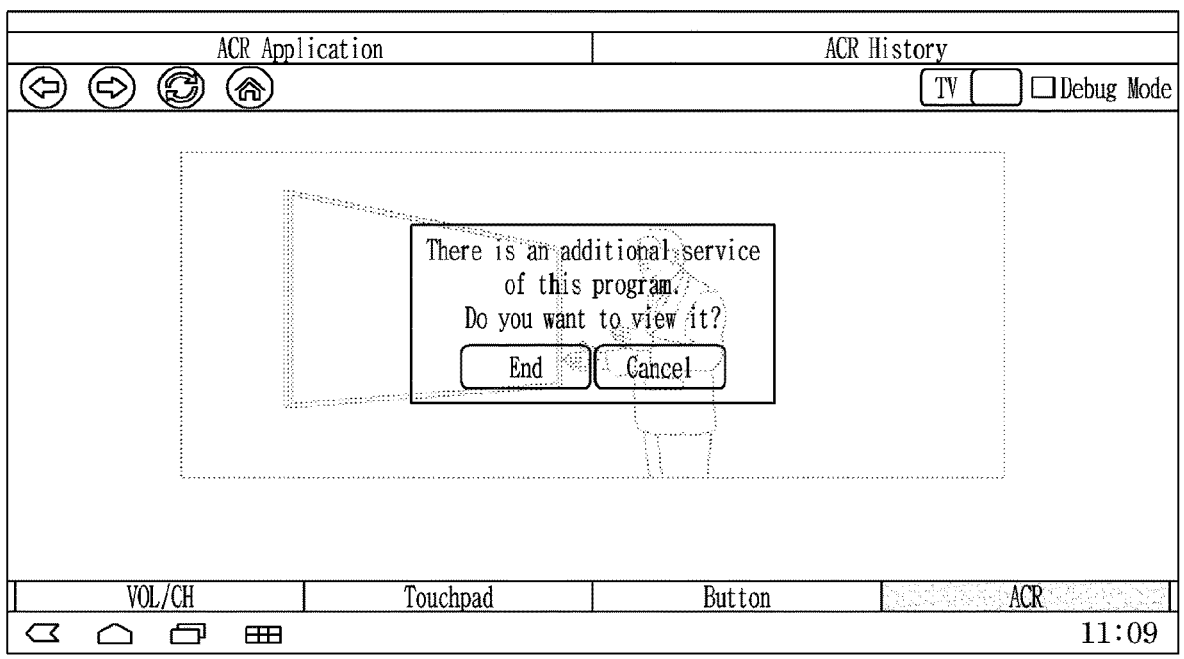
FIG. 106 is an example of a user interface notifying user when ACR event occurs in TV.

FIG. 106 is an example of a user interface notifying user when ACR event occurs in TV.

Request Registration to Obtain ACR Status

When a user executes a $2^{nd}$ device application that provides an ACR service linked with a TV, the $2^{nd}$ device may request to obtain ACR information from the TV. That is, in order for a $2^{nd}$ device to use ACR information recognized by a TV, a request on sending the information may be registered and unregistered. This request may be automatically unregistered when it is registered or terminated during execution of the ACR service providing application, or may be registered/unregistered by a use selection. In the embodiment of FIG. 106, when an ACR status is selected/released, a corresponding request is registered/unregistered in a TV. When a request on obtaining current ACR information is registered, as shown in FIG. 106, ACR information recognized from a TV may be obtained for update. The ACR information may include various information such as the id of a currently-watching program, and a currently broadcasting time of a program, and the $2^{nd}$ device may selectively display the information.

Request Registration to Obtain ACR Event

When an event occurs in a TV, a $2^{nd}$ device may register/unregister a request on obtaining the event. That is, an application is executed/terminated in a TV according to the ACR information recognized in the TV, or a request on obtaining information on event occurrence in an executed TV application is registered/unregistered to the TV. This request may be automatically unregistered when it is registered or terminated during execution of the ACR service providing application, or may be registered/unregistered by a use selection. In the embodiment of FIG. 106, when an ACR event is selected/released, a corresponding request is registered/unregistered to a TV. An example of an event transferring from a TV to a $2^{nd}$ device is as follows.

Execution/termination of TV application: when a program related application is executed in a TV, the TV delivers it to a $2^{nd}$ device.

When an execution event of a TV application is delivered to a $2^{nd}$ device, according to the type of the TV application, only information on that the TV application is simply executed is delivered, or information on whether there is a $2^{nd}$ application relating to a corresponding TV application and an identifier may be additionally delivered.

According to the type of a TV application, it may be sometimes efficient that an application for $2^{nd}$ device is executed during the TV application execution. In this case, during TV application execution, the url of a $2^{nd}$ device application is directly delivered, or the matching url of a $2^{nd}$ device application, which is obtained by searching a redefined lookup table by using the url of the TV application as a url identifier, is delivered. If there is a $2^{nd}$ device application, as shown in FIG. 102, notification is provided to a user to obtain consent and then, the $2^{nd}$ device application can be executed.

Figure 108:
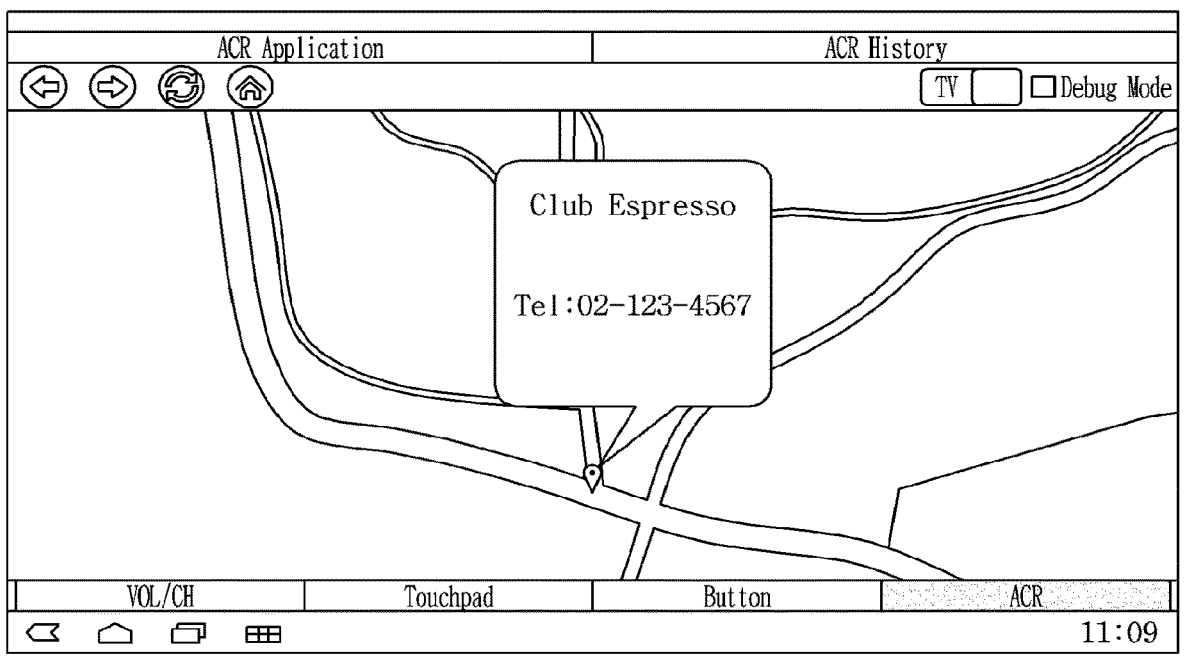
FIG. 108 is an example of a view map search result in $2^{nd}$ screen and provide additional service.

FIG. 107 is an example of a view search result of TV application in $2^{nd}$ screen. FIG. 108 is an example of a view map search result in $2^{nd}$ screen and provide additional service.

Event occurring in a TV application: during TV application use, an event occurring from a user selection is delivered to a $2^{nd}$ device. That is, if there is limitation in directly executing the event in a TV or executing the event in the $2^{nd}$ device is more effective, the event is delivered to the $2^{nd}$ device.

Search

Once content is recognized by ACR, a TV application may provide a watching program related search result in real time. However, if a user wants to keep searching related information, as shown in FIG. 107, a $2^{nd}$ device may provide a primary search result to the user. The user may freely use search service without experiencing inconvenience such as limited input of a TV remote controller and a TV browser overlapping a watching screen.

Map

A TV application may provide information on a specific place while a user watches a broadcast program. At this point, additionally providing map information may be effective. In the case of a search result that requires a free input of a user and navigation, providing the map information from the $2^{nd}$ device may be more effective. Additionally, detailed position information related to the content may be additionally provided.

FIG. 109 is an example of chanting input in $2^{nd}$ device.

Chatting

When a content of a watching program is recognized in a TV, a TV application may provide a chatting service to viewers who watch the same broadcast. However, since there are limitations in directly providing a chatting input to a TV screen, as shown in FIG. 109, more easy input may be provided from a $2^{nd}$ device.

Figure 111:
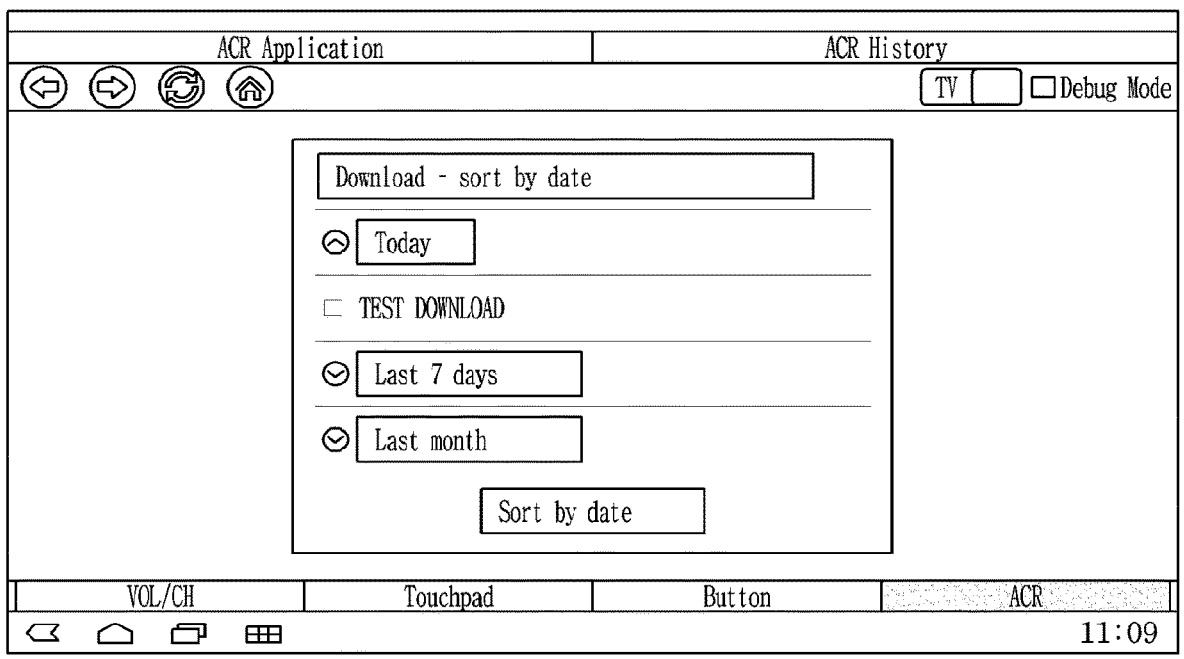
FIG. 111 is an example of a user interface for managing file downloaded in 2nd Device.

FIG. 110 is an example of a user interface downloading coupons and catalogs from $2^{nd}$ device. FIG. 111 is an example of a user interface for managing file downloaded in $2^{nd}$ Device.

Download Service

A TV application provides various broadcast program screen related services. In the case of a service such as downloading sound sources for background music of a program, previous broadcasting VODs, social commercial coupons, and product catalogues, it is more convenient for a user to download the service into the $2^{nd}$ device and then use and manage it. FIG. 110 illustrates receiving coupon and catalog information from a TV and viewing it in a $2^{nd}$ device. FIG. 111 illustrates managing files downloaded from a $2^{nd}$ device, for example.

File Upload and Execution

Figure 113:
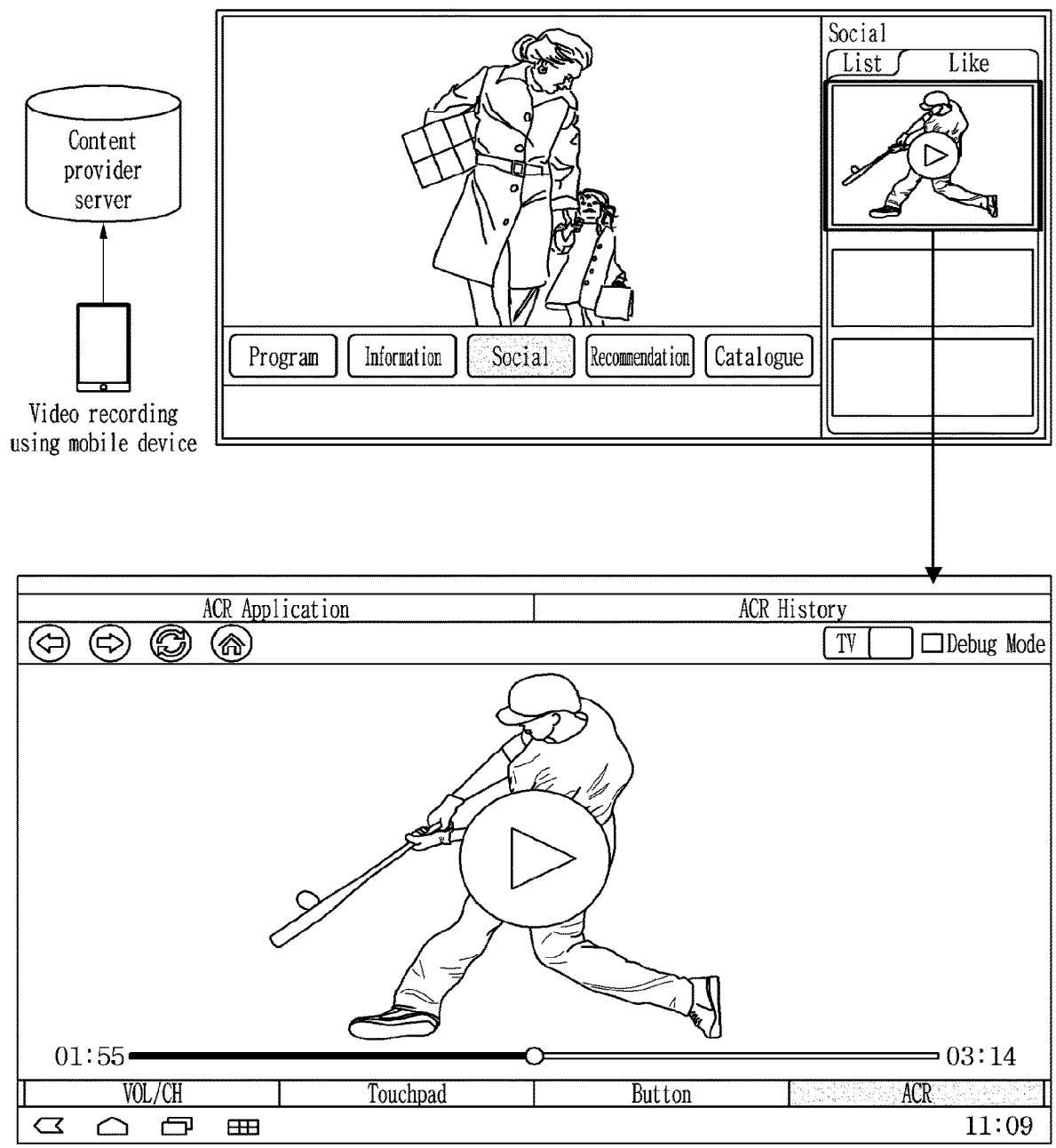
FIG. 113 illustrates an example of File upload and execution in $2^{nd}$ device.

FIG. 112 is an example of a user interface for managing event obtained from TV application in $2^{nd}$ device. FIG. 113 illustrates an example of File upload and execution in $2^{nd}$ device.

A user may upload files such as program related information on a currently watching broadcast program and tip videos to a server of a content provider by using a $2^{nd}$ device as shown in FIG. 113. A TV application may provide a video file corresponding to the TV program content and time, but it is difficult to watch the video file while a user watching a program. Due to this, providing a service for allowing a user to watch information in a $2^{nd}$ device simultaneously is effective. For example, if a user watches a related incident tip video during watching a news program or major goal scene during watching a game through a $2^{nd}$ device, he/she watches an additional video without interfering with watching an existing program.

File Upload and Execution

A user may upload files such as program related information on a currently watching broadcast program and tip videos to a server of a content provider by using a $2^{nd}$ device as shown in FIG. 113. A TV application may provide a video file corresponding to the TV program content and time, but it is difficult to watch the video file while a user watching a program. Due to this, providing a service for allowing a user to watch information in a $2^{nd}$ device simultaneously is effective. For example, if a user watches a related incident tip video during watching a news program or major goal scene during watching a game through a $2^{nd}$ device, he/she watches an additional video without interfering with watching an existing program.

Management of event delivered from TV: A $2^{nd}$ device may provide a management tool with which a user may view and delete event information obtained from a TV application. FIG. 112 is a view illustrating an example that an event delivered from a TV application is provided in a history form, and thus, is revisited or deleted each time a user wants.

Figure 114:
FIG. 114 is an example of a user interface for user navigation.

FIG. 114 is an example of a user interface for user navigation.

User Interface for user navigation of event delivered from TV: In this embodiment, an event delivered from a TV program related $2^{nd}$ device application and a TV application to a $2^{nd}$ device is provided in a web application form. Accordingly, in order to make a user's additional navigation convenient, an additional user interface may be provided. Functions for reloading a page, moving to a home page (Home), moving to a previous page (Back), and moving to the next page (Forward) of a web application and an address window that a user directly inputs a web address for an additional search may be provided.

ACR application transfer request between TV and $2^{nd}$ device

Figure 115:
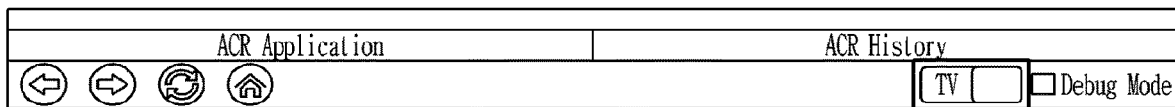
FIG. 115 illustrates an example of a user interface for Button for ACR application transfer between TV and 2nd device.
Figure 116:
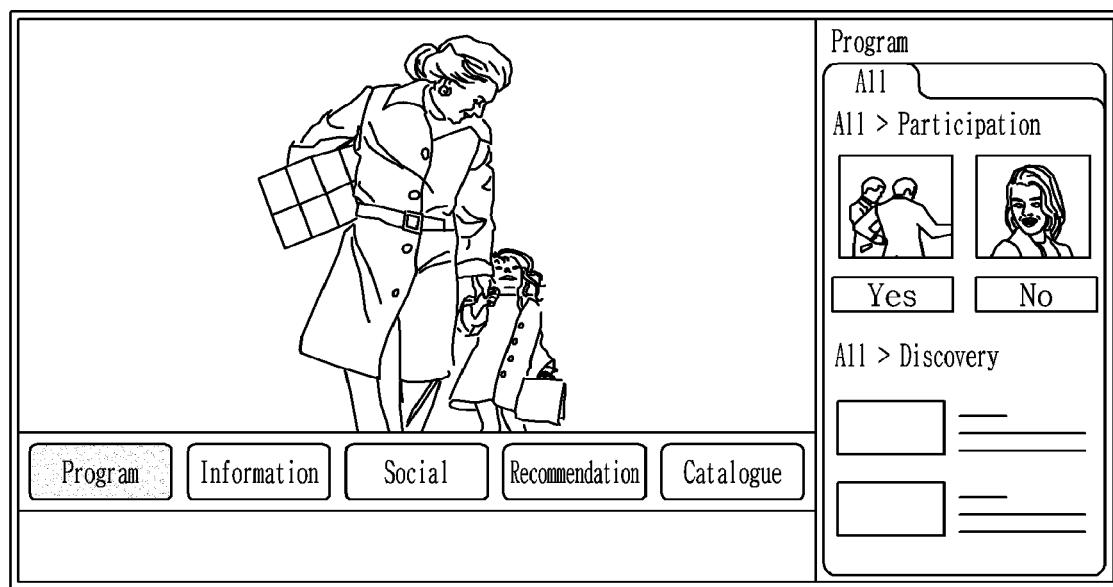
FIG. 116 illustrates an example of ACR application execution in TV.

FIG. 115 illustrates an example of a user interface for Button for ACR application transfer between TV and $2^{nd}$ device. FIG. 116 illustrates an example of ACR application execution in TV.

When a user wants to watch a TV program without being disturbed, an ACR application may transfer to a $2^{nd}$ device. As shown in FIG. 115, a button for sending a request on transferring a TV application to a $2^{nd}$ device may be provided. This button is deactivated when an ACR TV application is not executed in a TV. As shown in FIG. 116, when an ACR application is executed in a TV, as a user sends a transfer request to a $2^{nd}$ device, as shown in FIG. 115, an ACR application for $2^{nd}$ device is executed.

At this point, when a status of a current TV application is additionally delivered and a $2^{nd}$ device application is executed in a status that a user uses lastly, seamless service may be provided to a user. The $2^{nd}$ device application may be identical to a TV application, or may include a service specified for a $2^{nd}$ device. Once application is executed in a $2^{nd}$ device, as shown in FIG. 116, a TV screen hidden or reduced by a TV application is restored to normal, and program related information may be continuously provided from the $2^{nd}$ device ACR application. Therefore, a user may watch a TV with reduced inconvenient factors. When an ACR application executed in a $2^{nd}$ device is terminated, a TV application is automatically executed.

The case that the broadcast receiving device transmits an application to another device paired therewith in the middle of using the application will be described in detail with reference to FIGS. 117 to 131.

Figure 117:
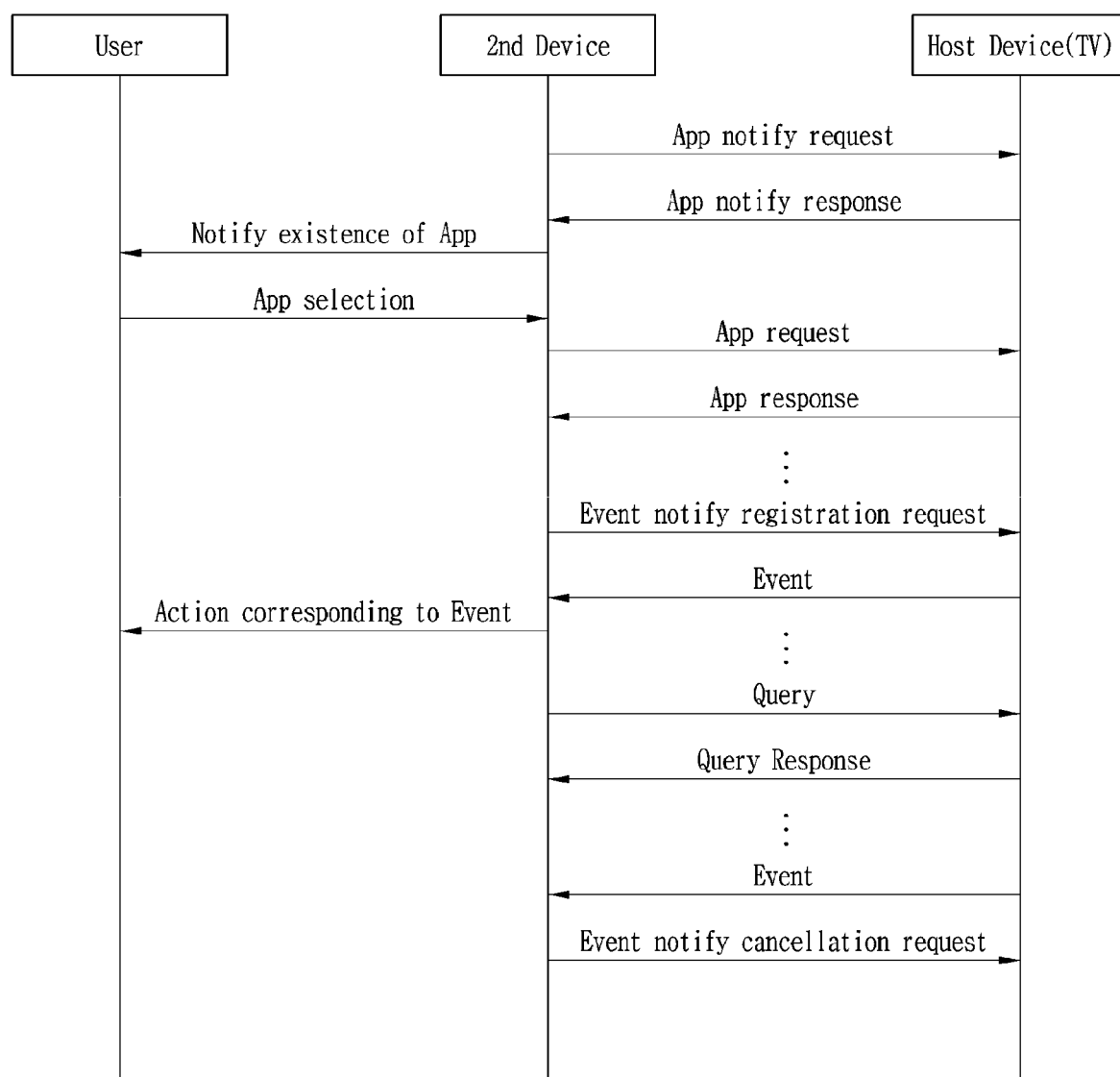
FIG. 117 is a ladder diagram illustrating that information on an application capable of being executed in accordance with one embodiment of the present invention is acquired by a 2nd screen device.

FIG. 117 is a ladder diagram illustrating that information on an application capable of being executed in accordance with one embodiment of the present invention is acquired by a $2^{nd}$ screen device.

This method is used transmitting App to another device paired with a TV while the TV is using App. At this time, even if the TV is not in a paired state, if the TV stores information on the corresponding information by previous pairing, the TV may immediately access and execute App linked with the TV by transferring messages based on a Push Notification mechanism to the corresponding device and at the same time transfer information on App currently in service by the TV to allow the 2nd screen device to immediately use this information. To this end, the operation of the receiver may perform the following steps.

1. Pairing between TV receiver and 2nd Screen device is performed.

The TV receiver maintain/manage information of the device currently paired therewith.

Also, the TV receiver may store information of the 2nd screen device connected in this pairing step, and the stored information may include information on a Push Notification mechanism available in the corresponding 2nd Screen device. Based on this, the TV receiver may perform App transfer for the device, which is not paired therewith, through Push Notification.

2. App is used by being executed on TV.

3. If all or some contents of App desire to be transmitted to the 2nd Screen, a list of 2nd Screen devices currently available on App may be invoked 4. Devices which will transmit all or some contents of App are selected from the list of the available 2nd Screen devices invoked at the third step and transmit App.

3.1 The device currently paired with the TV receiver is able to transmit App through AppTransfer command.

3.2 The device which is not currently paired with the TV receiver invokes Push Notification mechanism available for the corresponding device from the stored device information and indicates App transmission by using the corresponding mechanism.

5. The TV receiver receives the App transmitted from the $2^{nd}$ screen device or some content information of the App and displays the received information to the user.

5.1 The device paired with the TV receiver receives a command and processes and displays the command.

5.2 The device which is not paired with the TV receiver may operate as follows.

1) The device receives a message through a Push notification mechanism.

2) When the received message is selected, a general App available by being paired with the TV may be performed. Otherwise, App to be transmitted by the TV may be executed immediately.

3) The App which is executed tries pairing with the TV, and at this time, information of App or content to be received during pairing may be acquired. Otherwise, this information may previously be received through Push Notification message.

4) The device displays App or content, which will be received, to the user.

6. When performing App, the 2nd screen device may process the App by receiving an event for the App from the TV. This event may be transferred to the TV receiver through a broadcast network, etc., and events to be processed by the transferred App may be transferred to the 2nd screen device which is currently paired with the TV receiver and using App, so that the corresponding App may process the events.

The Host Device may transmit information of application capable of being executed in the 2nd Device and information of event generated in the host application to the 2nd device, so that the 2nd device may select and execute a desired application or perform action for the event. The following schematizes this process. It is assumed that the 2nd device and the host device are already paired with each other through mutual authentication, and therefore the authentication process is omitted.

The 2nd device requests App Notify to obtain information of related app capable of being executed, from the host device. This may be divided into two cases. When the 2nd device sends App Notify request, the Host Device may provide the App Notify with IDs and types of all Apps executed in the corresponding program and information such as execution time at one time, or may register the App Notify request and send App Notify response whenever app capable of being executed exists until the registration of the App Notify request is canceled by the request of the 2nd device.

In case of the former case, the 2nd device notifies the user of type and execution time of app capable of being executed, which are received from the host device, to allow the user to select the type of App or whether to execute the App, and the host device may request App. In case of the latter case, the 2nd device determines whether to execute App based on the type of the App whenever App notify is received from the host device and then notifies the user of the determined result so that the user selects the type of the App or whether to execute the App. Afterwards, the 2nd device sends App request to the host device The host device which has received the App request sends information related to actual execution such as url of the App requested by the 2nd device to the 2nd device as App response.

Registration of Event Notify is available at any time when the 2nd device needs. It means that an event generated by the host device should be notified until a cancellation is requested if the corresponding Notify is registered. The host device notifies the 2nd device of an event whenever the event is generated, and the 2nd device may take action corresponding to the event.

The event is transmitted through HTTP request and posted in the following URL.

http://target_ip:8080/hdcp/api/event

At this time, target_ip becomes IP address of the 2nd device which has registered event reception.

Although Query does not need to be notified from the host device to the 2nd device, Query may be used when information of the host device is required under a specific condition. For example, when app executed in the TV is intended to move to the 2nd device, UI currently executed in the TV should be maintained as it is and then displayed to the 2nd device. In this case, whenever TV UI is changed, the corresponding information does not need to be notified to the 2nd device, and only state information at the time when app is moved is required. Therefore, at this time, query of the UI state may be requested to the TV.

Query is requested through HTTP Get, and has URL format as follows.

http://target_ip:8080/hdcp/api/data?<query>

At this time, target_ip becomes IP address of a device which will receive Query. <query> may be composed of query terms having Key-value pair in a format of HTTP GET.

FIG. 118 illustrates an application notification request message according to one embodiment of the present invention.

App Notify Request

If an application capable of being executed in the 2nd Device, the 2nd device registers a request for notifying the existence in the host device (TV). An embodiment of HTTP Request for the registration is as follows. <name> element in the embodiment serves as an identifier for identifying types of command and response from each other. The notify request may be registered/cancelled in accordance with a value of <name> element. In the following example, the value of <name> element is RegisterAppNotifyEvent, and this case means that if there is App capable of being executed in the 2nd device, the TV should notify the 2nd device of the list.

FIG. 119 illustrates an application notification response message according to one embodiment of the present invention.

App Notify Response

The Host Device may transmit information related to execution and a list of app to the 2nd device in which a notify request is registered if there is App to be currently driven, and HTTP Response which is an embodiment of the information is as follows. Since the value of <name> element is RegisterAppNotifyEvent, the HTTP Response means a response to the App notify request. <app> element means App, and if there are a plurality of apps to be currently driven, <app> element may be represented by the same number. <appId> may be used to indicate unique ID of App, <appName> may be used to indicate name of App, and <appType> may be used to indicate format or type of app. For example, a format of application corresponding to "text" format or "html" format may be specified, or a driving format of app such as "controller", appTransfer, etc. may be specified. In this embodiment, <maxController> means a maximum number of devices when the corresponding app is executed by the multiple devices. <appType> may be represented several times if single app is supported by several formats.

FIG. 120 illustrates an application request message according to one embodiment of the present invention.

App Request

HTTP request requested to the host device by the 2nd Device by selecting app to be executed is as follows. The 2nd device selects App to be executed from the list of apps capable of being executed, which are obtained from the aforementioned App notify response, and then requests the host device of the selected app. <appId> element may have a value of unique id of app to be executed, and <type> may have a value of execution type of app. <deviceCapability> element may be added to indicate capability of the 2nd device intended to execute app. This embodiment indicates that resolution supports 960×540, and in addition, may additionally indicate CP option, available memory residual quantity, etc. The host device may provide corresponding App in accordance with a function of the 2nd display device. Also, the host may transfer additional data for app provided through a broadcast network by maintaining and managing information as to app executed by the 2nd screen devices currently paired with each other. An event for such an app may be transmitted in the name of "AppEvent", and App which will receive and process the event may be designated through AppID element. The device which has received this event may transfer the corresponding event to App designated as AppID to process the event. Fields constituting each event may be used by being freely designated in accordance with events.

FIG. 121 illustrates an application response message according to one embodiment of the present invention.

App Response

HTTP Response which is a response of the host device for ACR App request is as follows. Since a value of <name> element is AppRequest, the HTTP response means a response to the App request. <type> element is used to identify several execution formats from one another if the corresponding app has several execution formats. <appURL> indicates URL for app to be driven by the 2nd device. <result> element may have values of OK, NotOK, and Conflict. If App request is successful, <result> element has a value of OK, and if App request cannot be processed, <result> element has a value of NotOK. If the host device (TV) receives a request beyond a limit of maxController with respect to App request, <result> element has a value of conflict.

<appURL> provides proper URL with reference to capability of the device provided by the 2nd device in case of App request, and different URLs may be transferred to each mobile device. In this embodiment, appURL that supports 960×540 is returned. In case of controller, only control command (key, touch position, etc.) may be transmitted, and controller URL for controlling App of the host device (TV) may be notified. If a type of App request is appTransfer, ACR App driven in the TV disappears from the TV screen, and the corresponding app is driven in the mobile device. The host device (TV) may terminate or hide App which is being driven by the TV if App request which is appTransfer is received. Alternatively, the mobile device may control show/hide of APP which is being executed in the TV in accordance with App OSD control request. If app is drafted adaptively to resolution of the TV and the mobile device, URL of App driven by the TV may be notified to the mobile device through <appURL>. Alternatively, URL for APP suitable for resolution of the mobile device may be notified through <appURL>.

FIG. 122 illustrates an event notification request message according to one embodiment of the present invention.

In order that the 2nd device periodically obtains information for a specific event generated by the TV, if the specific event is generated as described in the above embodiment, the 2nd device may request the TV to notify occurrence of the specific event. In the embodiment, the specific event is identified by the value of <name> element, and <command> having a <value> of true is received, and occurrence of the corresponding event is notified to the 2nd device until <command> having a <value> of false is received. In the above example, when App of the TV is on/off, the corresponding information should be notified to the 2nd device. If several events of <name> are simultaneously registered, <name> element may appear several times. Supposing that the case that app capable of being executed is generated is regarded as an event, the aforementioned App Notify request may be regarded as a registration of the event.

FIG. 123 illustrates an event notification response message according to one embodiment of the present invention.

The above example is an example of an event that may be generated in the TV. If AppOnOffStatus event is registered, the corresponding event may be transmitted to the 2nd device. When a random app is on/off in the TV as described in the embodiment, identifier <appId> and on/off value of the corresponding app may be transferred, and various values such as url of a specific App or web page may exist depending on the type of the event.

FIG. 124 illustrates a query message according to one embodiment of the present invention.

Even though a specific event is not generated in the Host device, a case may occur in that the 2nd device should know information on the host device. That is, if the 2nd device needs corresponding information only under a specific condition without notifying the 2nd device of a change as an event whenever the change occurs in the TV, the 2nd device may directly make a query to the host device. For example, if the 2nd device makes a query for a current state of a specific app which is being executed by the TV, an embodiment of the query is as follows.

FIG. 125 illustrates a response message according to one embodiment of the present invention.

The following is an example of a response to the above query. A state value of App is transferred as a value of <value> element, and if the value has several values, the App may appear several time.

FIG. 126 illustrates a query message according to another embodiment of the present invention.

Even though a specific event is not generated in the Host device, a case may occur in that the 2nd device should know information on the host device. That is, if the 2nd device needs corresponding information only under a specific condition without notifying the 2nd device of a change as an event whenever the change occurs in the TV, the 2nd device may directly make a query to the host device. For example, if the 2nd device makes a query for a current state of a specific app which is being executed by the TV, an embodiment of the query is as follows.

FIG. 127 illustrates a response message according to another embodiment of the present invention.

The following is an example of a response to the above query. If a state value of App is transferred as a value of <value> element and has several values, the App may appear several time.

FIG. 128 illustrates an application execution request message for a 2nd screen device according to another embodiment of the present invention.

In the embodiment described above, url of app to be executed is acquired from the host device and executed in accordance with a request of the 2nd device. On the contrary, the host device may the 2nd device to execute a desired app. If there are 2nd devices mutually authenticated with each other, url of app capable being executed may be sent from the 2nd device so that the app may be executed, even without a request of the 2nd device. The host device may identify the authenticated 2nd devices from each other by using id of each <session>, allow the 2nd devices to determine and execute proper app by using their capacity, or determine the 2nd device which will execute app, in accordance with a user's selection.

Figure 129:
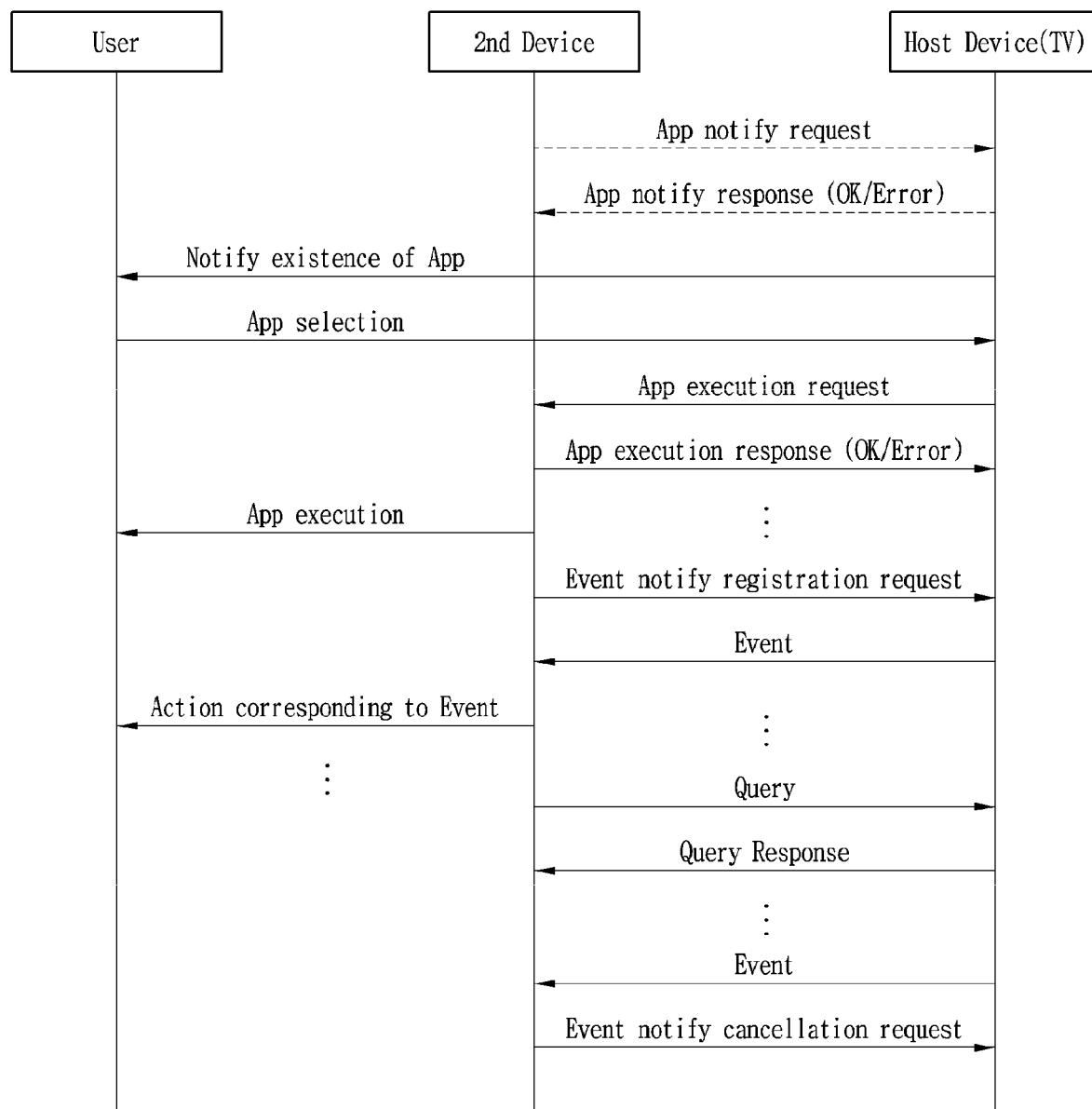

FIG. 129 is a ladder diagram illustrating that an application of a 2nd screen device is executed through a host device in accordance with another embodiment of the present invention.

A sequence when the host device intends to execute desired app even without a request of the 2nd Device is as follows. It is assumed that the 2nd device and the host device are mutually authenticated with each other. The host device may identify the 2nd device during mutual authentication and at the same time additionally request and manage information of device capacity. The 2nd device may send an app notify request to the host device to perform an execution command if there is any app capable of being executed. However, this process may be omitted, and it may already be notified by the authentication process that the 2nd device will receive app execution command from the host device.

If there is an app capable of being executed by the 2nd device, the host device may notify the user of the app. The user selects the app to be executed and the 2nd device which will execute the app, by using a remote controller, etc. At this time, the host device may notify the user of the most proper 2nd device to be executed in consideration of device capacity of the 2nd device or recommend the most proper 2nd device for the user. The host device requests the corresponding 2nd device to execute the app in accordance with the user's selection. The other event and query may be performed similarly to the aforementioned description.

An embodiment of APP API for transferring App or URL from the TV to the 2nd device will be described.

In the following embodiment, contents are recognized using ACR, and the case that metadata related to the recognized contents interact with the paired 2nd device will be described.

Plugin API of the following embodiment is provided from ACR object recognized as MIME type.

MIME Type: application/x-netcast-acr

First of all, App executed by the TV needs API that can obtain the 2nd device paired with the TV. In this embodiment, device name, device type and device resolution may be obtained. APP executed by the TV may obtain a paired device list by paging the following function, and may display the paired device list for the user to allow the user to select a specific device.

DeviceList getPairedDeviceList( )

Description: list of devices paired with TV is obtained.

typedef collection<Device> DeviceList

| | Name |
|---|---|
| Property | readonly Integer length//The number of Devices |
| Method | Device item(Integer index)//Device located in the corresponding index returns. |

Device class: individual instance of paired 2$^{nd}$ Device

| | Name |
|---|---|
| Property | Integer id//Identifier of Paired Device<br>String name//Paired Device name<br>String type//Paired Deivce Type: phone, pad, etc<br>String resolution//Resolution: 1920 x 1080, 720 x 480, etc |

The following is an embodiment of API for transferring App or URL from App executed by the TV to a specific device. In this embodiment, the user may designate one or a plurality of devices at the same time.

Boolean transferApp(DeviceParamList deviceList)

Description: App or URL is transferred to the 2nd device designated as deviceId.

typedef collection<DeviceParam> DeviceParamList

| | Name |
|---|---|
| Property | readonly Integer length//The number of Devicces |
| Method | DeviceParam item(Integer index)//DeviceParam located in the corresponding index returns. |

DeviceParam class

| | Name |
|---|---|
| Property | Integer id//Identifier of Paired Device<br>String url//App URL or Web URL<br>Boolean bApp//url is App URL in case of true, and url is Web URL in case of false |

The following is an embodiment of App API for transferring App or URL from the TV to the 2nd device.

The following embodiment describes interaction between the TV and the 2nd device paired with the TV under the HbbTV standard.

Plugin API of the following embodiment may be provided from HbbTV Object recognized as MIME type below.

MIME Type: application/oipfPairedDevice

First of all, App executed by the TV needs API that can obtain the 2nd device paired with the TV. In this embodiment, device name, device type and device resolution may be obtained. APP executed by the TV may obtain a paired device list by paging the following function, and may display the paired device list for the user to allow the user to select a specific device.

DeviceList getPairedDeviceList( )

Description: list of devices paired with TV is obtained.

typedef collection<Device> DeviceList

| | Name |
|---|---|
| Property | readonly Integer length//The number of Devices |
| Method | Device item(Integer index)//Device located in the corresponding index returns. |

Device class: Individual instance of paired 2$^{nd}$ Device

| | Name |
|---|---|
| Property | Integer id//Identifier of Paired Device<br>String name//Name of paired Device<br>String type//Paired Device Type: phone, pad, etc<br>String resolution//resolution: 1920 x 1080, 720 x 480, etc |

The following is an embodiment of API for transferring App or URL from App executed by the TV to a specific device. In this embodiment, the user may designate one or a plurality of devices at the same time.

Boolean transferApp(DeviceParamList deviceList)

Description: App or URL is transferred to the 2nd device designated as deviceId.

typedef collection<DeviceParam> DeviceParamList

| | Name |
|---|---|
| Property | readonly Integer length//The number of Devices |
| Method | DeviceParam item(Integer index)//DeviceParam located in the corresponding index returns. |

DeviceParam class

| | Name |
|---|---|
| Property | Integer id//Identifier of Paired Device<br>String url//App URL or Web URL<br>Boolean bApp//url is App URL in case of true,<br>and url is Web URL in case of false |

Figure 130:
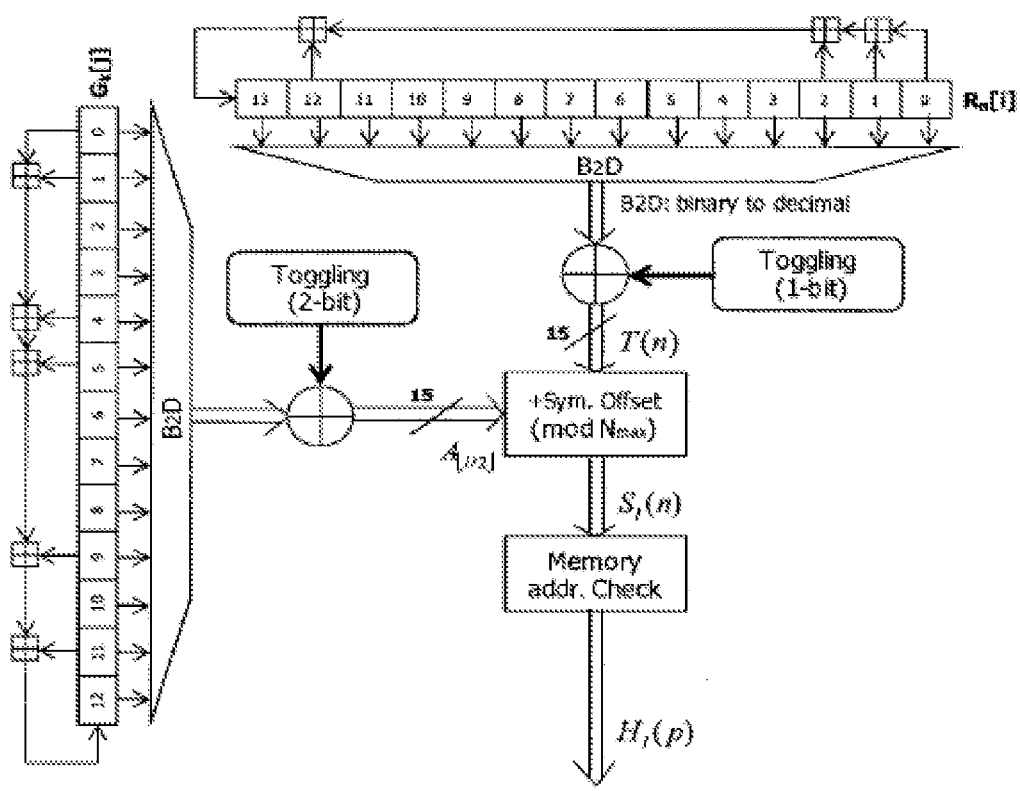

FIG. 130 is a view of a 32K FFT mode random interleaving-sequence generator according to an embodiment of the present invention.

The 32K FFT mode random interleaving-sequence generator according to an embodiment of the present invention may include a spreader (1-bit toggling), a randomizer, a random symbol-offset generator, a modulo operator and a memory-index check. As described above, the random main-sequence generator may include a spreader and a randomizer.

As shown in FIG. 154, the locations of the modulo operator and the memory-index check is changed as compared with the 32K FFT mode random main-seed generator as described above.

The locations of the modulo operator and the memory-index check as shown in FIG. 154 is to increase a frequency deinterleaving performance of the frequency deinterleaver having single memory. As above described, a signal frame (or frame) according to the present invention may have normal data symbol (normal data symbol), frame edge symbol and frame signaling symbol and a length of the frame edge symbol and the frame signaling symbol may be shorter than the normal data symbol. For this reason, a frequency deinterleaving performance of the frequency deinterleaver having single memory can be decreased. In order to increase the frequency deinterleaving performance of the frequency deinterleaver with a single memory, the present invention may provide the location of the memory-index check.

The (cell) spreader may be operated using an upper portion of n-bit of total 15-bit and may function as a multiplexer based on a look-up table. In the case of 32K FFT mode, the (cell) spreader may be a 1-bit multiplexer (or toggling).

The randomizer may be operated via a PN generator and may provide full randomness during interleaving. As described above, in the case of 32K FFT mode, the randomizer may be a PN generator that considers 14-bit. This can be changed according to a designer's intention. Also the spreader and the randomizer are operated through multiplexer and PN generator, respectively.

The random symbol-offset generator may generate a symbol-offset for cyclic-shifting main interleaving-sequence generated by the main-interleaving sequence generator for each pair-wise OFDM symbol. A detailed operation is the same as those describe above and thus are not described here.

The modulo operator may be operated when input value exceeds Ndata or Nmax. The maximum value of the Ndata (Nmax) for 32K FFT mode may be 32768.

The memory-index check may not use output from the modulo operator when a memory-index generated by the spreader and the randomizer is greater than Ndata or the maximum value of the Ndata (Nmax) and may repeatedly operate the spreader and the randomizer to adjust the output memory-index such that the output memory-index does not exceed Ndata or the maximum value of the Ndata (Nmax).

The operations in accordance with embodiments as mentioned above may be specified as follows:

$$p = 0;$$
$$\text{for } (n = 0; n < N_{max}; n = n+1)$$
$$\{T(n) = (n \bmod 2) \cdot 2^{N_n - 1} + \sum_{i=0}^{N_n - 2} (2^i \cdot R_n[i])\}$$
$$S_f(n) = (T(n) + A_{\lfloor l/2 \rfloor}) \bmod N_{max};$$
$$\text{if } S_f(n) < N_{data}$$
$$\{H_f(p) = S_f(n);$$
$$p = p+1;\}$$
$$\}$$

The present invention is not limited to the features, structures, and effects described in the above embodiments. Furthermore, the features, structures, and effects in each embodiment may be combined or modified by those skilled in the art. Accordingly, it should be interpreted that contents relating to such combinations and modifications are included in the scope of the present invention.

While this invention has been particularly shown and described with reference to preferred embodiments thereof, it will be understood by those skilled in the art that various changes in form and details may be made therein without departing from the spirit and scope of the invention as defined by the appended claims. For example, each component in an embodiment is modified and implemented. Accordingly, it should be interpreted that differences relating to such modifications and applications are included in the scope of the appended claims.

The invention claimed is:

1. A primary device (PD) configured to communicate with a companion device (CD), the primary device comprising:
    a tuner configured to receive a broadcast signal including a signal frame;
    a frequency deinterleaver configured to frequency deinterleave data in the signal frame based on a deinterleaving sequence that is generated by checking a range of a sequence and the sequence is generated based on a main sequence and a symbol offset;
    a time deinterleaver configured to time deinterleave one or more FEC (Forward Error Correction) blocks in the frequency deinterleaved data in a memory based on position information for one or more virtual FEC blocks;
    a controller configured to connect to the CD; and
    a displayer configured to display service data in the one or more FEC blocks and supplementary information related to the service data.

2. The PD according to claim 1, wherein the signal frame includes a flag for emergency alert information.

3. A method of communicating with a companion device (CD) in a primary device (PD) receiving a broadcast service, the method comprising:
    receiving a broadcast signal including a signal frame;
    frequency deinterleaving data in the signal frame based on a deinterleaving sequence that is generated by checking a range of a sequence and the sequence is generated based on a main sequence and a symbol offset;
    time deinterleaving one or more FEC (Forward Error Correction) blocks in the frequency deinterleaved data in a memory based on position information for one or more virtual FEC blocks;
    connecting to the CD; and
    displaying service data in the one or more FEC blocks and supplementary information related to the service data.

4. The method according to claim 3,
wherein the signal frame includes a flag for emergency alert information.

\* \* \* \* \*